US012482415B2

(12) United States Patent
Kimura et al.

(10) Patent No.: US 12,482,415 B2
(45) Date of Patent: Nov. 25, 2025

(54) DISPLAY APPARATUS AND ELECTRONIC DEVICE

(71) Applicant: SEMICONDUCTOR ENERGY LABORATORY CO., LTD., Atsugi (JP)

(72) Inventors: Hajime Kimura, Kanagawa (JP); Tatsunori Inoue, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 236 days.

(21) Appl. No.: 18/080,792

(22) Filed: Dec. 14, 2022

(65) Prior Publication Data

US 2023/0197004 A1 Jun. 22, 2023

(30) Foreign Application Priority Data

Dec. 22, 2021 (JP) ................................ 2021-208382

(51) Int. Cl.
*G09G 3/3233* (2016.01)

(52) U.S. Cl.
CPC ... *G09G 3/3233* (2013.01); *G09G 2300/0426* (2013.01); *G09G 2300/0871* (2013.01); *G09G 2310/08* (2013.01)

(58) Field of Classification Search
CPC ......... G09G 3/3233; G09G 2300/0426; G09G 2300/0871; G09G 2310/08; G09G 2300/0452; G09G 2300/0861; G09G 2310/0262; G09G 3/3291; G09G 2300/0819; G09G 2320/043
See application file for complete search history.

(56) References Cited

U.S. PATENT DOCUMENTS 6,930,328 B2 8/2005 Kimura et al.
7,061,451 B2 6/2006 Kimura
7,138,967 B2 11/2006 Kimura
7,180,479 B2 2/2007 Kimura
(Continued)

FOREIGN PATENT DOCUMENTS

JP 2007-310311 A 11/2007
JP 2016-212444 A 12/2016
(Continued)

*Primary Examiner* — Bryan Earles
(74) *Attorney, Agent, or Firm* — NIXON PEABODY LLP; Jeffrey L. Costellia

(57) ABSTRACT

A display apparatus having high display quality is provided. The display apparatus includes a pixel and a circuit. The pixel includes a light-emitting device, a driving transistor, a first switch, a second switch, and a first capacitor. The circuit includes a third switch, a fourth switch, a fifth switch, and a second capacitor. A first terminal of the first switch is electrically connected to a first terminal of the first capacitor, one of a source and a drain of the driving transistor, and an anode of the light-emitting device. A gate of the driving transistor is electrically connected to a first terminal of the second switch and a second terminal of the first capacitor. A second terminal of the first switch is electrically connected to a first terminal of the third switch and a first terminal of the second capacitor. A second terminal of the second capacitor is electrically connected to a first terminal of the fourth switch and a first terminal of the fifth switch.

6 Claims, 81 Drawing Sheets

(56) References Cited

U.S. PATENT DOCUMENTS

| | | | | |
|---|---|---|---|---|
| 7,532,209 | B2 | 5/2009 | Kimura | |
| 7,671,826 | B2 | 3/2010 | Kimura | |
| 7,768,485 | B2 | 8/2010 | Uchino et al. | |
| 7,898,623 | B2 | 3/2011 | Kimura et al. | |
| 7,982,385 | B2 | 7/2011 | Kimura et al. | |
| 8,004,481 | B2 | 8/2011 | Yamazaki et al. | |
| 8,300,031 | B2 | 10/2012 | Kimura | |
| 8,324,626 | B2 | 12/2012 | Kimura et al. | |
| 8,325,111 | B2 | 12/2012 | Kimura | |
| 8,350,785 | B2 | 1/2013 | Kimura | |
| 8,384,085 | B2 | 2/2013 | Kimura et al. | |
| 8,692,740 | B2 | 4/2014 | Yoshida. et al. | |
| 8,710,749 | B2 | 4/2014 | Kimura | |
| 9,280,931 | B2 | 3/2016 | Kimura | |
| 9,824,631 | B2 | 11/2017 | Yamazaki et al. | |
| 9,916,791 | B2 | 3/2018 | Kimura et al. | |
| 10,134,332 | B2 | 11/2018 | Kimura et al. | |
| 11,107,406 | B2 | 8/2021 | Ota | |
| 11,423,844 | B2 | 8/2022 | Ikeda et al. | |
| 2005/0243036 | A1 | 11/2005 | Ikeda | |
| 2012/0280962 | A1* | 11/2012 | Kawabe | G09G 3/3258 345/211 |
| 2013/0050292 | A1* | 2/2013 | Mizukoshi | G09G 3/3233 345/77 |
| 2013/0063413 | A1 | 3/2013 | Miyake | |
| 2013/0285561 | A1 | 10/2013 | Kitadani et al. | |
| 2015/0171156 | A1 | 6/2015 | Miyake | |
| 2016/0042692 | A1 | 2/2016 | Ota et al. | |
| 2016/0133187 | A1* | 5/2016 | Li | G09G 3/3233 345/77 |
| 2020/0135831 | A1 | 4/2020 | Bae et al. | |
| 2020/0320930 | A1 | 10/2020 | Toyotaka et al. | |
| 2021/0043148 | A1* | 2/2021 | Lee | G09G 3/3291 |
| 2021/0193053 | A1 | 6/2021 | Ota et al. | |
| 2024/0412689 | A1 | 12/2024 | Kimura et al. | |

FOREIGN PATENT DOCUMENTS

| | | | |
|---|---|---|---|
| JP | 2020-027753 | A | 2/2020 |
| JP | 2021-096418 | A | 6/2021 |
| WO | WO-2019/220278 | | 11/2019 |

* cited by examiner

1000B1

1000B3

FIG. 59A
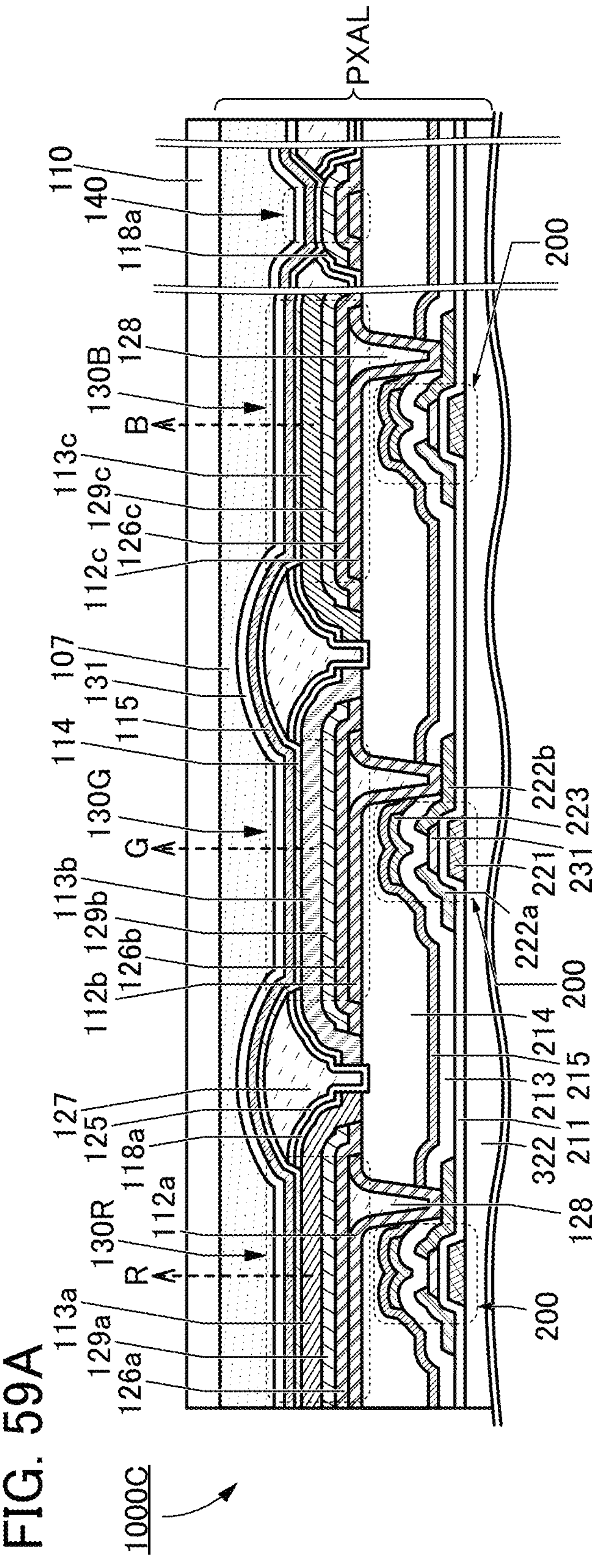
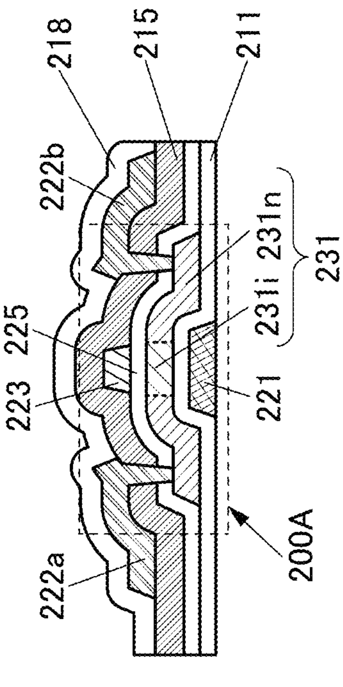
FIG. 59B
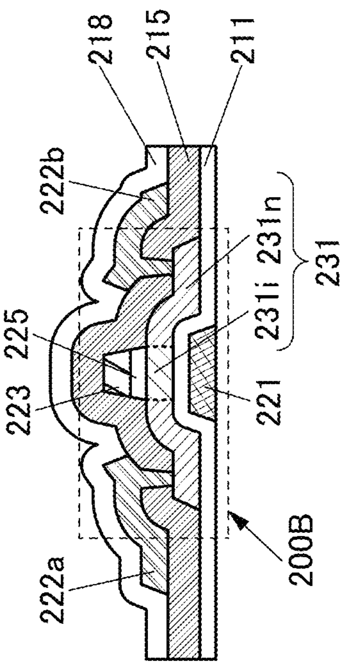
FIG. 59C

DISPLAY APPARATUS AND ELECTRONIC DEVICE

BACKGROUND OF THE INVENTION

1. Field of the Invention

One embodiment of the present invention relates to a display apparatus and an electronic device.

Note that one embodiment of the present invention is not limited to the above technical field. The technical field of the invention disclosed in this specification and the like relates to an object, a driving method, or a manufacturing method. Alternatively, one embodiment of the present invention relates to a process, a machine, manufacture, or a composition of matter. Therefore, specific examples of the technical field of one embodiment of the present invention disclosed in this specification include a semiconductor device, a display apparatus, a liquid crystal display apparatus, a light-emitting apparatus, a power storage device, an imaging device, a memory device, a signal processing device, a processor, an electronic device, a system, a driving method thereof, a manufacturing method thereof, and a testing method thereof.

2. Description of the Related Art

Display apparatuses included in, for example, electronic devices for extended reality or cross reality (XR) such as virtual reality (VR) or augmented reality (AR), mobile phones such as smartphones, tablet information terminals, notebook personal computers (PCs), and the like have been improved in various aspects in recent years. For example, display apparatuses have been developed to have features such as higher display resolution, higher color reproducibility (higher NTSC ratio), a smaller driver circuit, and lower power consumption.

In particular, improvement in the pixel density (definition) and the color reproducibility of the display apparatus enables an image to be displayed more clearly and to have enhanced sense of reality. Patent Document 1 discloses a display apparatus with a large number of pixels and high resolution, which includes a light-emitting device containing an organic electroluminescent (EL) material.

REFERENCE

Patent Document

[Patent Document 1] PCT International Publication No. 2019/220278

SUMMARY OF THE INVENTION

In particular, when the definition of a display apparatus including a light-emitting device containing an organic EL material is increased, the area of a region (a light-emitting surface) where the light-emitting device is formed becomes small. When the area of regions of light-emitting devices (the light-emitting surface) is small, the amount of current needed for light emission of the light-emitting device is small, but the allowable current amount is also small. That is, an increase in the definition of light-emitting devices of a display apparatus reduces the amount of current capable of flowing through the light-emitting device; accordingly, a fine control of current amount is necessary for adjusting the luminance of the light-emitting device.

An object of one embodiment of the present invention is to provide a display apparatus in which the amount of current flowing through a light-emitting device can be controlled finely. Another object of one embodiment of the present invention is to provide a display apparatus with high definition. Another object of one embodiment of the present invention is to provide a display apparatus with high display quality. Another object of one embodiment of the present invention is to provide a novel display apparatus. Another object of one embodiment of the present invention is to provide an electronic device including the above display apparatus.

Note that the objects of one embodiment of the present invention are not limited to the objects listed above. The objects listed above do not preclude the existence of other objects. Note that the other objects are objects that are not described in this section and will be described below. The objects that are not described in this section are derived from the description of the specification, the drawings, and the like and can be extracted as appropriate from the description by those skilled in the art. Note that one embodiment of the present invention is to achieve at least one of the objects listed above and the other objects. Note that one embodiment of the present invention does not necessarily achieve all the objects listed above and the other objects.

(1) One embodiment of the present invention is a display apparatus including a pixel and a circuit. The pixel includes a light-emitting device, a driving transistor, a first switch, a second switch, and a first capacitor. The circuit includes a third switch, a fourth switch, a fifth switch, a second capacitor, and a driver circuit. A first terminal of the first switch is electrically connected to a first terminal of the first capacitor, one of a source and a drain of the driving transistor, and an anode of the light-emitting device. A gate of the driving transistor is electrically connected to a first terminal of the second switch and a second terminal of the first capacitor. A second terminal of the first switch is electrically connected to a first terminal of the third switch and a first terminal of the second capacitor. A second terminal of the second capacitor is electrically connected to a first terminal of the fourth switch and a first terminal of the fifth switch. A second terminal of the fifth switch is electrically connected to the driver circuit. The driver circuit is configured to transmit an image data signal to the second terminal of the fifth switch.

(2) One embodiment of the present invention may be a display apparatus with the structure in (1) in which the first switch includes a first transistor being n-channel and the second switch includes a second transistor being n-channel. Specifically, it is preferable that one of a source and a drain of the first transistor be electrically connected to the first terminal of the first switch, and the other of the source and the drain of the first transistor be electrically connected to the second terminal of the first switch. Furthermore, it is preferable that one of a source and a drain of the second transistor be electrically connected to the first terminal of the second switch, and the other of the source and the drain of the second transistor be electrically connected to a second terminal of the second switch.

(3) One embodiment of the present invention is a display apparatus including a pixel and a circuit, and having a structure different from the structure in (1). The pixel includes a light-emitting device, a driving transistor, a first switch, a second switch, a sixth switch, a seventh switch, a first capacitor, and a third capacitor. The circuit includes a third switch, a fourth switch, a fifth switch, a second capacitor, and a driver circuit. The driving transistor includes a first gate and a second gate. A first terminal of the first switch is electrically connected to a first terminal of the sixth switch, a first terminal of the first capacitor, a first terminal of the third capacitor, one of a source and a drain of the driving transistor, and an anode of the light-emitting device. The first gate of the driving transistor is electrically connected to a first terminal of the second switch, a second terminal of the sixth switch, and a second terminal of the first capacitor. A second terminal of the third capacitor is electrically connected to the second gate of the driving transistor and a first terminal of the seventh switch. The second terminal of the first switch is electrically connected to the first terminal of the third switch and a first terminal of the second capacitor. The second terminal of the second capacitor is electrically connected to the first terminal of the fourth switch and a first terminal of the fifth switch, and a second terminal of the fifth switch is electrically connected to the driver circuit. The driver circuit has a function of transmitting an image data signal to the second terminal of the fifth switch.

(4) One embodiment of the present invention may be a display apparatus with the structure in (3) in which the first switch includes a first transistor being n-channel, the second switch includes a second transistor being n-channel, the sixth switch includes a sixth transistor being n-channel, and the seventh switch includes a seventh transistor being n-channel. Specifically, it is preferable that one of a source and a drain of the first transistor be electrically connected to the first terminal of the first switch, and the other of the source and the drain of the first transistor be electrically connected to the second terminal of the first switch. It is preferable that one of a source and a drain of the second transistor be electrically connected to the first terminal of the second switch, and the other of the source and the drain of the second transistor be electrically connected to a second terminal of the second switch. It is preferable that one of a source and a drain of the sixth transistor be electrically connected to the first terminal of the sixth switch, and the other of the source and the drain of the sixth transistor be electrically connected to the second terminal of the sixth switch. It is preferable that one of a source and a drain of the seventh transistor be electrically connected to the first terminal of the seventh switch, and the other of the source and the drain of the seventh transistor be electrically connected to a second terminal of the seventh switch.

(5) One embodiment of the present invention may be a display apparatus with any one of the structures in (1) to (4) in which the third switch includes a third transistor being n-channel, the fourth switch includes a fourth transistor being n-channel, and the fifth switch includes a fifth transistor being n-channel. Specifically, it is preferable that one of a source and a drain of the third transistor be electrically connected to the first terminal of the third switch, and the other of the source and the drain of the third transistor be electrically connected to a second terminal of the third switch. It is preferable that one of a source and a drain of the fourth transistor be electrically connected to the first terminal of the fourth switch, and the other of the source and the drain of the fourth transistor be electrically connected to a second terminal of the fourth switch. It is preferable that one of a source and a drain of the fifth transistor be electrically connected to the first terminal of the fifth switch, and the other of the source and the drain of the fifth transistor be electrically connected to the second terminal of the fifth switch.

(6) In any one of the above (1) to (5) of one embodiment of the present invention, the light-emitting device may include an organic EL device.

(7) One embodiment of the present invention is an electronic device including the display apparatus described in any one of (1) to (6) and a housing.

One embodiment of the present invention can provide a display apparatus in which the amount of current flowing through a light-emitting device can be controlled finely. One embodiment of the present invention can provide a display apparatus with high definition. One embodiment of the present invention can provide a display apparatus with high display quality. One embodiment of the present invention can provide a novel display apparatus. One embodiment of the present invention can provide an electronic device including the above display apparatus.

Note that the effects of one embodiment of the present invention are not limited to the effects listed above. The effects listed above do not preclude the existence of other effects. The other effects are the ones that are not described in this section and will be described below. Effects that are not described above will be apparent from and can be derived from the description of the specification, the drawings, and the like by those skilled in the art. One embodiment of the present invention has at least one of the above effects and the other effects. Accordingly, one embodiment of the present invention does not have the above effects in some cases.

BRIEF DESCRIPTION OF THE DRAWINGS

FIG. 59A is a schematic cross-sectional diagram illustrating a structure example of a display apparatus, and FIGS. 59B and 59C are cross-sectional diagrams each illustrating a structure example of a transistor.

DETAILED DESCRIPTION OF THE INVENTION

Figure 1:
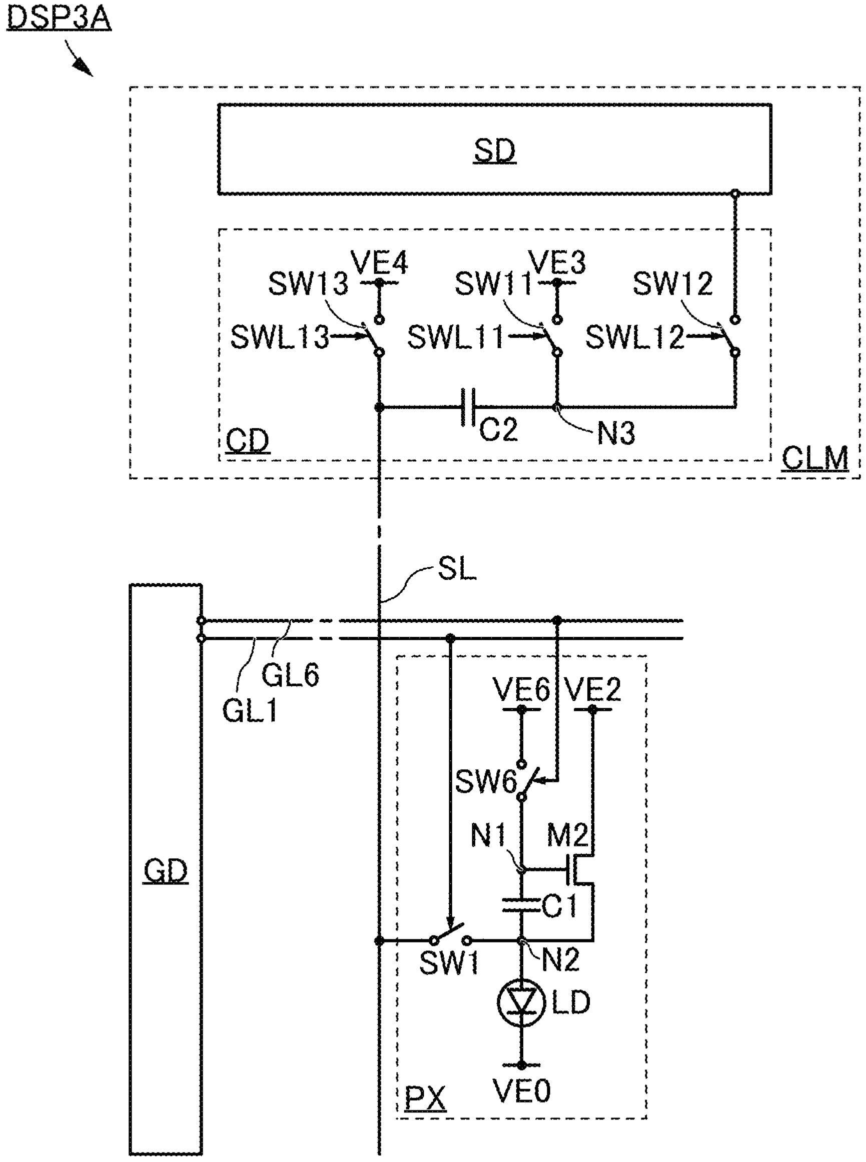
FIG. 1 is a circuit diagram illustrating a structure example of a display apparatus.

In this specification and the like, a semiconductor device means a device that utilizes semiconductor characteristics, and refers to a circuit including a semiconductor element (e.g., a transistor, a diode, or a photodiode), and a device including the circuit. The semiconductor device also means devices that can function by utilizing semiconductor characteristics. For example, an integrated circuit, a chip including an integrated circuit, and an electronic component including a chip in a package are examples of the semiconductor device. For another example, a memory device, a display apparatus, a light-emitting apparatus, a lighting device, and an electronic device themselves might be semiconductor devices, or might each include a semiconductor device.

In the case where there is a description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relation, for example, a connection relation shown in drawings or texts, a connection relation other than one shown in drawings or texts is regarded as being disclosed in the drawings or the texts. Each of X and Y denotes an object (e.g., a device, an element, a circuit, a wiring, an electrode, a terminal, a conductive film, or a layer).

For example, in the case where X and Y are electrically connected, one or more elements that allow(s) electrical connection between X and Y (e.g., a switch, a transistor, a capacitor element, an inductor, a resistor element, a diode, a display device, a light-emitting device, or a load) can be connected between X and Y. Note that a switch has a function of being controlled to be turned on or off. That is, the switch has a function of being in a conduction state (on state) or a non-conduction state (off state) to control whether a current flows or not.

In the case where an element and a power supply line (e.g., a wiring supplying VDD (high power supply potential), VSS (low power supply potential), GND (the ground potential), or a desired potential) are both provided between X and Y, X and Y are not defined as being electrically connected. In the case where only a power supply line is provided between X and Y, there is no element between X and Y; therefore, X and Y are directly connected. Accordingly, in the case where only a power supply line is provided between X and Y, X and Y can be expressed as being "electrically connected". However, in the case where an element and a power supply line are both provided between X and Y, X and Y are not defined as being electrically connected although X and the power supply line are electrically connected (through the element), and Y and the power supply line are electrically connected. Note that in the case where a gate and a source of a transistor are located between X and Y, X and Y are not defined as being electrically connected. Similarly, in the case where a gate and a drain of a transistor are located between X and Y, X and Y are not defined as being electrically connected. That is, in the case where a drain and a source of a transistor are located between X and Y, X and Y are defined as being electrically connected. In the case where a capacitor is provided between X and Y, X and Y are defined as being electrically connected in some cases and not defined in other cases. For example, in the case where a capacitor is provided between X and Y in a digital circuit or a logic circuit, X and Y are not defined as being electrically connected in some cases. On the other hand, for example, in the case where a capacitor is provided between X and Y in an analog circuit, X and Y are defined as being electrically connected in some cases.

For example, in the case where X and Y are functionally connected, one or more circuits that allow(s) functional connection between X and Y (e.g., a logic circuit (an inverter, a NAND circuit, a NOR circuit, or the like); a signal converter circuit (a digital-to-analog converter circuit, an analog-to-digital converter circuit, a gamma correction circuit, or the like); a potential level converter circuit (a power supply circuit (a step-up circuit, a step-down circuit, or the like), a level shifter circuit for changing the potential level of a signal, or the like); a voltage source; a current source; a switching circuit; an amplifier circuit (a circuit that can increase signal amplitude, the amount of a current, or the like, an operational amplifier, a differential amplifier circuit, a source follower circuit, a buffer circuit, or the like); a signal generation circuit; a memory circuit; or a control circuit) can be connected between X and Y. For example, even when another circuit is interposed between X and Y, X and Y are functionally connected when a signal output from X is transmitted to Y.

Note that an explicit description, X and Y are electrically connected, includes the case where X and Y are electrically connected (i.e., the case where X and Y are connected with another element or another circuit interposed therebetween) and the case where X and Y are directly connected (i.e., the case where X and Y are connected without another element or another circuit interposed therebetween).

It can be expressed as, for example, "X, Y, a source (sometimes called one of a first terminal and a second terminal) of a transistor, and a drain (sometimes called the other of the first terminal and the second terminal) of the transistor are electrically connected to each other, and X, the source of the transistor, the drain of the transistor, and Y are electrically connected to each other in this order". Alternatively, it can be expressed as "a source of a transistor is electrically connected to X; a drain of the transistor is electrically connected to Y; and X, the source of the transistor, the drain of the transistor, and Y are electrically connected to each other in this order". Alternatively, it can be expressed as "X is electrically connected to Y through a source and a drain of a transistor, and X, the source of the transistor, the drain of the transistor, and Y are provided in this connection order". When the connection order in a circuit structure is defined by an expression similar to the above examples, a source and a drain of a transistor can be distinguished from each other to specify the technical scope. Note that these expressions are examples and the expression is not limited to these expressions. Here, X and Y each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both components: a function of the wiring and a function of the electrode. Thus, electrical connection in this specification includes, in its category, such a case where one conductive film has functions of a plurality of components.

In this specification and the like, a "resistor element" can be, for example, a circuit element or a wiring having a resistance higher than 0Ω. Therefore, in this specification and the like, a "resistor element" includes a wiring having a resistance, a transistor in which a current flows between its source and drain, a diode, and a coil. Thus, the term "resistor element" can be sometimes replaced with the terms "resistor", "load", or "region having a resistance"; conversely, the terms "resistor", "load", or "region having a resistance" can be sometimes replaced with the term "resistor element". The resistance can be, for example, preferably higher than or equal to 1 mΩ and lower than or equal to 10Ω, further preferably higher than or equal to 5 mΩ and lower than or equal to 5Ω, still further preferably higher than or equal to 10 mΩ and lower than or equal to 1Ω. As another example, the resistance may be higher than or equal to 1Ω and lower than or equal to $1\times10^9$Ω.

In this specification and the like, a "capacitor element" can be, for example, a circuit element having an electrostatic capacitance greater than 0 F, a region of a wiring having an electrostatic capacitance greater than 0 F, parasitic capacitance, or gate capacitance of a transistor. The terms "capacitor element", "parasitic capacitance", or "gate capacitance" can be sometimes replaced with the term "capacitor"; conversely, the term "capacitor" can be sometimes replaced with the terms "capacitor element", "parasitic capacitance", or "gate capacitance". In addition, the "capacitor" (including a capacitor with three or more terminals) includes an insulator and a pair of conductors between which an insulator is interposed. The term "a pair of conductors" of a capacitor can be replaced with the terms "a pair of electrodes", "a pair of conductive regions" "a pair of regions", or "a pair of terminals". In addition, the terms "one of a pair of terminals" and "the other of the pair of terminals" are referred to as a first terminal and a second terminal, respectively, in some cases. Note that the electrostatic capacitance can be greater than or equal to 0.05 fF and less than or equal to 10 pF, for example. As another example, the electrostatic capacitance may be greater than or equal to 1 pF and less than or equal to 10 μF.

In this specification and the like, a transistor includes three terminals called a gate, a source, and a drain. The gate is a control terminal for controlling the on/off state of the transistor. The two terminals functioning as the source and the drain are input/output terminals of the transistor. Functions of the two input/output terminals of the transistor depend on the conductivity type (n-channel type or p-channel type) of the transistor and the levels of potentials applied to the three terminals of the transistor, and one of the two terminals serves as a source and the other serves as a drain. Therefore, the terms "source" and "drain" can be sometimes used interchangeably in this specification and the like. In this specification and the like, the terms "one of a source and a drain" (or a first electrode or a first terminal) and "the other of the source and the drain" (or a second electrode or a second terminal) are used to describe the connection relation of a transistor. Depending on the structure, a transistor may include a back gate in addition to the above three terminals. In that case, in this specification and the like, one of the gate and the back gate of the transistor may be referred to as a first gate and the other of the gate and the back gate of the transistor may be referred to as a second gate. In some cases, the terms "gate" and "back gate" can be replaced with each other in one transistor. In the case where a transistor includes three or more gates, the gates may be referred to as a first gate, a second gate, and a third gate, for example, in this specification and the like.

In this specification and the like, for example, a transistor with a multi-gate structure having two or more gate electrodes can be used as the transistor. With the multi-gate structure, channel formation regions are connected in series; accordingly, a plurality of transistors are connected in series. Thus, with the multi-gate structure, the amount of an off-state current can be reduced, and the withstand voltage of the transistor can be increased (the reliability can be improved). Alternatively, with the multi-gate structure, a drain-source current does not change very much even if a drain-source voltage changes when the transistor operates in a saturation region, so that a flat slope of voltage-current characteristics can be obtained. By utilizing the flat slope of the voltage-current characteristics, an ideal current source circuit or an active load having an extremely high resistance can be obtained. Accordingly, a differential circuit, a current mirror circuit, or the like having excellent properties can be obtained.

In this specification and the like, circuit elements such as a "light-emitting device" and a "light-receiving device" sometimes have polarities called an "anode" and a "cathode". The "light-emitting device" can sometimes emit light when a forward bias is applied (a positive potential with respect to a "cathode" is applied to an "anode"). In the "light-receiving device", current is sometimes generated between an "anode" and a "cathode" when a zero bias or a reverse bias is applied (a negative potential with respect to a "cathode" is applied to an "anode") and light is emitted to the "light-receiving device". As described above, an "anode" and a "cathode" are sometimes regarded as input/output terminals of the circuit elements such as a "light-emitting device" and a "light-receiving device". In this specification and the like, an "anode" and a "cathode" of the circuit element such as a "light-emitting device" or a "light-receiving device" are sometimes called terminals (a first terminal, a second terminal, and the like). For example, one of an "anode" and a "cathode" is called a first terminal and the other thereof is called a second terminal in some cases.

A single circuit element shown in a circuit diagram may include a plurality of circuit elements. For example, a single resistor shown in a circuit diagram may be two or more resistors electrically connected to each other in series. For another example, a single capacitor shown in a circuit diagram may be two or more capacitors electrically connected to each other in parallel. For another example, a single transistor shown in a circuit diagram may be two or more transistors which are electrically connected to each other in series and whose gates are electrically connected to each other. For another example, a single switch shown in a circuit diagram may be a switch including two or more transistors which are electrically connected to each other in series or in parallel and whose gates are electrically connected to each other.

In this specification and the like, a node can be referred to as a terminal, a wiring, an electrode, a conductive layer, a conductor, an impurity region, and the like depending on the circuit configuration and the device structure. Furthermore, a terminal, a wiring, and the like can be referred to as a node.

In this specification and the like, "voltage" and "potential" can be replaced with each other as appropriate. The term "voltage" refers to a potential difference from a reference potential. When the reference potential is a ground potential, for example, "voltage" can be replaced with "potential". Note that the ground potential does not necessarily mean 0 V. Moreover, potentials are relative values, and a potential supplied to a wiring, a potential applied to a circuit and the like, a potential output from a circuit and the like, for example, are changed with a change of the reference potential.

In this specification and the like, the term "high-level potential" or "low-level potential" does not mean a particular potential. For example, in the case where two wirings are both described as "functioning as a wiring for supplying a high-level potential", the levels of the high-level potentials that these wirings supply are not necessarily equal to each other. Similarly, in the case where two wirings are both described as "functioning as a wiring for supplying a low-level potential", the levels of the low-level potentials that these wirings supply are not necessarily equal to each other.

A current means an electric charge transfer (electrical conduction); for example, the expression "electrical conduction of positively charged particles is caused" can be rephrased as "electrical conduction of negatively charged particles is caused in the opposite direction". Therefore, unless otherwise specified, a current in this specification and the like refers to an electric charge transfer (electrical conduction) caused by carrier movement. Examples of a carrier here include an electron, a hole, an anion, a cation, and a complex ion, and the type of carrier differs between current flow systems (e.g., a semiconductor, a metal, an electrolyte solution, and a vacuum). The direction of a current in a wiring or the like refers to the direction in which a carrier with a positive electric charge moves, and the amount of a current is expressed as a positive value. In other words, the direction in which a carrier with a negative electric charge moves is opposite to the direction of a current, and the amount of a current is expressed as a negative value. Thus, in the case where the polarity of a current (or the direction of a current) is not specified in this specification and the like, the expression "a current flows from an element A to an element B" can be replaced with "a current flows from an element B to an element A". The expression "a current is input to an element A" can be replaced with "a current is output from an element A".

Ordinal numbers such as "first", "second", and "third" in this specification and the like are used in order to avoid confusion among components. Thus, the terms do not limit the number of components. The terms do not limit the order of components, either. For example, a "first" component in one embodiment in this specification and the like can be referred to as a "second" component in other embodiments or claims. For another example, a "first" component in one embodiment in this specification and the like can be omitted in other embodiments or claims.

In this specification and the like, terms for describing arrangement, such as "over", "above", "under", and "below", are sometimes used for convenience to describe the positional relation between components with reference to drawings. The positional relation between components is changed as appropriate in accordance with the direction from which each component is described. Thus, the positional relation is not limited to that described with a term used in this specification and the like and can be explained with another term as appropriate depending on the situation. For example, the expression "an insulator over (on) a top surface of a conductor" can be replaced with the expression "an insulator on a bottom surface of a conductor" when the direction of a diagram showing these components is rotated by 180°.

The terms such as "over", "above", "under", and "below" do not necessarily mean that a component is placed directly on or under and directly in contact with another component. For example, the expression "electrode B over insulating layer A" does not necessarily mean that the electrode B is on and in direct contact with the insulating layer A, and can mean the case where another component is provided between the insulating layer A and the electrode B. In a similar manner, for example, the expression "electrode B above insulating layer A" does not necessarily mean that the electrode B is over and in direct contact with the insulating layer A, and can mean the case where another component is provided between the insulating layer A and the electrode B. In a similar manner, for example, the expression "electrode B below insulating layer A" does not necessarily mean that the electrode B is under and in direct contact with the insulating layer A, and can mean the case where another component is provided between the insulating layer A and the electrode B.

In this specification and the like, components arranged in a matrix and their positional relation are sometimes described using terms such as "row" and "column". The positional relation between components is changed as appropriate in accordance with the direction from which each component is described. Thus, the positional relation is not limited to that described with a term used in this specification and the like and can be explained with another term as appropriate depending on the situation. For example, the term "row direction" can be replaced with the term "column direction" when the direction of the diagram is rotated by 90°.

In this specification and the like, wirings electrically connect components arranged in a matrix can be extended in a row direction or a column direction. For example, in this specification and the like, in the case of description a "wiring A is extended in a row direction," the wiring A can also be connected in a column direction in some cases. Similarly, in the case where the "wiring A is extended in the column direction," the wiring A can also be connected in the row direction in some cases. That is, the direction in which the wirings electrically connect components arranged in a matrix is not limited to the direction described in this specification and the like, and can be the row direction or the column direction in some cases.

In this specification and the like, the terms "film" and "layer" can be interchanged with each other depending on circumstances. For example, the term "conductive layer" can be changed to the term "conductive film" in some cases. Moreover, the term "insulating film" can be changed into the term "insulating layer" in some cases. Moreover, such terms can be replaced with a word not including the term "film" or "layer" depending on the case or circumstances. For example, the term "conductive layer" or "conductive film" can be changed into the term "conductor" in some cases. For example, in some cases, the term "insulating layer" or "insulating film" can be changed into the term "insulator" in some cases.

In this specification and the like, the terms "electrode", "wiring", and "terminal" do not have functional limitations. For example, an "electrode" is used as part of a wiring in some cases, and vice versa. Furthermore, the term "electrode" or "wiring" can also mean a combination of a plurality of electrodes or wirings provided in an integrated manner, for example. For another example, a "terminal" can be used as part of a wiring or an electrode, and a "wiring" and an "electrode" can be used as part of a terminal. Furthermore, the term "terminal" includes the case where at least two of electrodes, wirings, terminals, and the like are formed in an integrated manner. Therefore, for example, an "electrode" can be part of a wiring or a terminal, and a "terminal" can be part of a wiring or an electrode. Moreover, the terms "electrode", "wiring", or "terminal" is sometimes replaced with the term "region", for example.

In this specification and the like, the terms "wiring", "signal line", "power supply line", and the like can be interchanged with each other depending on the case or in accordance with circumstances. For example, the term "wiring" can be changed into the term "signal line" in some cases. Also, for example, the term "wiring" can be changed into the term "power supply line" in some cases. Inversely, the term "signal line", "power supply line", or the like can be changed into the term "wiring" in some cases. The term "power supply line" or the like can be changed into the term "signal line" or the like in some cases. Inversely, the term "signal line" or the like can be changed into the term "power source line" or the like in some cases. The term "potential" that is applied to a wiring can be changed into the term "signal" or the like depending on the case or in accordance with circumstances. Inversely, the term "signal" or the like can be changed into the term "potential" in some cases.

In this specification and the like, a timing chart is used in some cases to describe an operation method of a semiconductor device. In this specification and the like, the timing chart shows an ideal operation method example and a period, a level of a signal (e.g., a potential or current), and a timing described in the timing chart are not limited unless otherwise specified. In the timing chart described in this specification and the like, the level of a signal (e.g., a potential or current) input to a wiring (including a node) and a timing can be changed as appropriate. For example, even when two periods are shown to have an equal length, the two periods have different lengths in some cases. Furthermore, for example, even when one of two periods is shown longer than the other, the two periods can have the equal length in some cases, or the one of the two periods has a shorter length than the other in other cases.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide included in a channel formation region of a transistor is called an oxide semiconductor in some cases. That is, a metal oxide included in a channel formation region of a transistor that has at least one of an amplifying function, a rectifying function, and a switching function can be referred to as a metal oxide semiconductor. In addition, an OS transistor is a transistor including a metal oxide or an oxide semiconductor.

In this specification and the like, a metal oxide containing nitrogen is also referred to as a metal oxide in some cases. In addition, a metal oxide containing nitrogen may be referred to as a metal oxynitride.

In this specification and the like, an impurity in a semiconductor refers to, for example, elements other than the main components of a semiconductor layer. For instance, an element with a concentration lower than 0.1 atomic % is an impurity. When an impurity is contained, the density of defect states in the semiconductor may be increased, the carrier mobility may be decreased, or the crystallinity may be decreased. When the semiconductor is an oxide semiconductor, examples of impurities that change the characteristics of the semiconductor include Group 1 elements, Group 2 elements, Group 13 elements, Group 14 elements, Group 15 elements, and transition metals other than the main components of the oxide semiconductor. Specific examples are hydrogen (included also in water), lithium, sodium, silicon, boron, phosphorus, carbon, and nitrogen. Specifically, when the semiconductor is a silicon layer, examples of impurities that change the characteristics of the semiconductor include Group 1 elements, Group 2 elements, Group 13 elements, and Group 15 elements (with the exception of oxygen and hydrogen).

In this specification and the like, a switch is in a conduction state (on state) or in a non-conduction state (off state) to control whether a current flows therethrough or not. Alternatively, a switch has a function of selecting and changing a current path. Thus, a switch may have two or more terminals through which a current flows, in addition to a control terminal. For example, an electrical switch or a mechanical switch can be used. That is, a switch is not limited to a certain element and can be any element capable of controlling a current.

Examples of an electrical switch include a transistor (e.g., a bipolar transistor and a MOS transistor), a diode (e.g., a PN diode, a PIN diode, a Schottky diode, a metal-insulator-metal (MIM) diode, a metal-insulator-semiconductor (MIS) diode, and a diode-connected transistor), and a logic circuit in which such elements are combined. In the case of using a transistor as a switch, the conduction state of the transistor refers to a state in which a source electrode and a drain electrode of the transistor are regarded as being electrically short-circuited or a state in which a current can flow between the source electrode and the drain electrode, for example. The non-conduction state of the transistor refers to a state in which the source electrode and the drain electrode of the transistor are regarded as being electrically disconnected. In the case where a transistor operates just as a switch, there is no particular limitation on the polarity (conductivity type) of the transistor.

An example of a mechanical switch is a switch using a microelectromechanical systems (MEMS) technology. Such a switch includes an electrode that can be moved mechanically, and its conduction and non-conduction is controlled with movement of the electrode.

In this specification and the like, a device formed using a metal mask or a fine metal mask (FMM) may be referred to as a device having a metal mask (MM) structure. In this specification and the like, a device formed without using a metal mask or an FMM may be referred to as a device having a metal maskless (MML) structure.

In this specification and the like, a structure in which light-emitting layers in light-emitting devices of different colors (here, blue (B), green (G), and red (R)) are separately formed or separately patterned may be referred to as a side-by-side (SBS) structure. In this specification and the like, a light-emitting device capable of emitting white light may be referred to as a white-light-emitting device. Note that a combination of such a white-light-emitting device with coloring layers (e.g., color filters) enables providing a full-color display apparatus.

Structures of light-emitting devices can be classified roughly into a single structure and a tandem structure. A light-emitting device with a single structure includes one light-emitting unit between a pair of electrodes, and the light-emitting unit preferably includes one or more light-emitting layers. To obtain white light emission by using two light-emitting layers, the two light-emitting layers are selected such that emission colors of the light-emitting layers are complementary colors. For example, when emission colors of a first light-emitting layer and a second light-emitting layer are complementary colors, the light-emitting device can be configured to emit white light as a whole. To obtain white light emission by using three or more light-emitting layers, the light-emitting device is configured to emit white light as a whole by combining emission colors of the three or more light-emitting layers.

A light-emitting device with a tandem structure includes two or more light-emitting units between a pair of electrodes, and each light-emitting unit preferably includes one or more light-emitting layers. To obtain white light emission, the structure is made so that light from light-emitting layers of the light-emitting units can be combined to be white light. Note that a structure for obtaining white light emission is similar to that in the case of a single structure. In the light-emitting device with a tandem structure, it is preferable that an intermediate layer such as a charge-generation layer be provided between the plurality of light-emitting units.

When the white-light-emitting device (having a single structure or a tandem structure) and a light-emitting device having an SBS structure are compared to each other, the latter can have lower power consumption than the former. To reduce power consumption, a light-emitting device having an SBS structure is preferably used. Meanwhile, the white-light-emitting device is preferable in terms of lower manufacturing cost or higher manufacturing yield because the manufacturing process of the white-light-emitting device is simpler than that of a light-emitting device having an SBS structure.

In this specification, “parallel” indicates a state where the angle formed between two straight lines is greater than or equal to −10° and less than or equal to 10°. Thus, the case where the angle is greater than or equal to −5° and less than or equal to 5° is also included. The terms “approximately parallel” and “substantially parallel” indicate that the angle formed between two straight lines is greater than or equal to −30° and less than or equal to 30°. The term “perpendicular” indicates that the angle formed between two straight lines is greater than or equal to 80° and less than or equal to 100°. Thus, the case where the angle is greater than or equal to 85° and less than or equal to 95° is also included. The terms “approximately perpendicular” and “substantially perpendicular” indicate that the angle formed between two straight lines is greater than or equal to 60° and less than or equal to 120°.

In this specification and the like, one embodiment of the present invention can be constituted with an appropriate combination of a structure shown in one embodiment and any of the structures shown in the other embodiments. In the case where a plurality of structure examples are described in one embodiment, some of the structure examples can be combined as appropriate.

Note that a content (or part thereof) described in one embodiment can be applied to, combined with, or replaced with another content (or part thereof) described in the same embodiment and/or a content (or part thereof) described in another embodiment or other embodiments.

Note that in each embodiment, a content described in the embodiment is a content described with reference to a variety of diagrams or a content described with text in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

The embodiments in this specification are described with reference to the drawings. Note that the embodiments can be implemented in many different modes, and it will be readily appreciated by those skilled in the art that modes and details can be changed in various ways without departing from the spirit and scope of the present invention. Therefore, the present invention should not be construed as being limited to the description of the embodiments. Note that in the structures of the invention described in the embodiments, the same portions or portions having similar functions are denoted by the same reference numerals in different drawings and the description of such portions is not repeated in some cases. In perspective views and the like, some of components might not be illustrated for clarity of the drawings.

In this specification, a plan view is sometimes used to explain a structure in each embodiment. A plan view is a diagram showing a plane of a structure seen in the vertical direction or a diagram showing a plane (section) of a structure cut in the horizontal direction, for example. Hidden lines (e.g., dashed lines) in a plan view can indicate the positional relation between a plurality of components included in a structure or the overlapping relation between the plurality of components. In this specification and the like, the term “plan view” can be replaced with the term “schematic plan view”, “projection view”, “top view”, or “bottom view”. A plane (section) of a structure cut in a direction other than the horizontal direction may be referred to as a plan view depending on circumstances.

In this specification, a cross-sectional view is sometimes used to explain a structure in each embodiment. A plan view is a diagram showing a plane of a structure seen in the horizontal direction or a diagram showing a plane (section) of a structure cut in the vertical direction, for example. In this specification and the like, the term “cross-sectional view” can be replaced with the term “schematic cross-sectional view”, “front view” or “side view”. A plane (section) of a structure cut in a direction other than the vertical direction may be referred to as a cross-sectional view depending on circumstances.

In this specification and the like, when a plurality of components denoted by the same reference numerals need to be distinguished from each other, identification signs such as “_1”, “[n]”, and “[m,n]” are sometimes added to the reference numerals. Components denoted with identification signs such as “_1”, “[n]”, and “[m,n]” in the drawings and the like are sometimes denoted without such identification signs in this specification and the like when the components do not need to be distinguished from each other.

In the drawings of this specification, the size, the layer thickness, or the region is exaggerated for clarity in some cases. Therefore, the size, the layer thickness, or the region is not limited to the illustrated scale. The drawings are schematic views showing ideal examples, and embodiments of the present invention are not limited to shapes, values, or the like shown in the drawings. For example, the following can be included: a variation in a signal, a voltage, or a current due to noise or difference in timing.

Embodiment 1

In this embodiment, display apparatuses of embodiments of the present invention will be described.

Structure Example 1 of Display Apparatus

Figure 2:
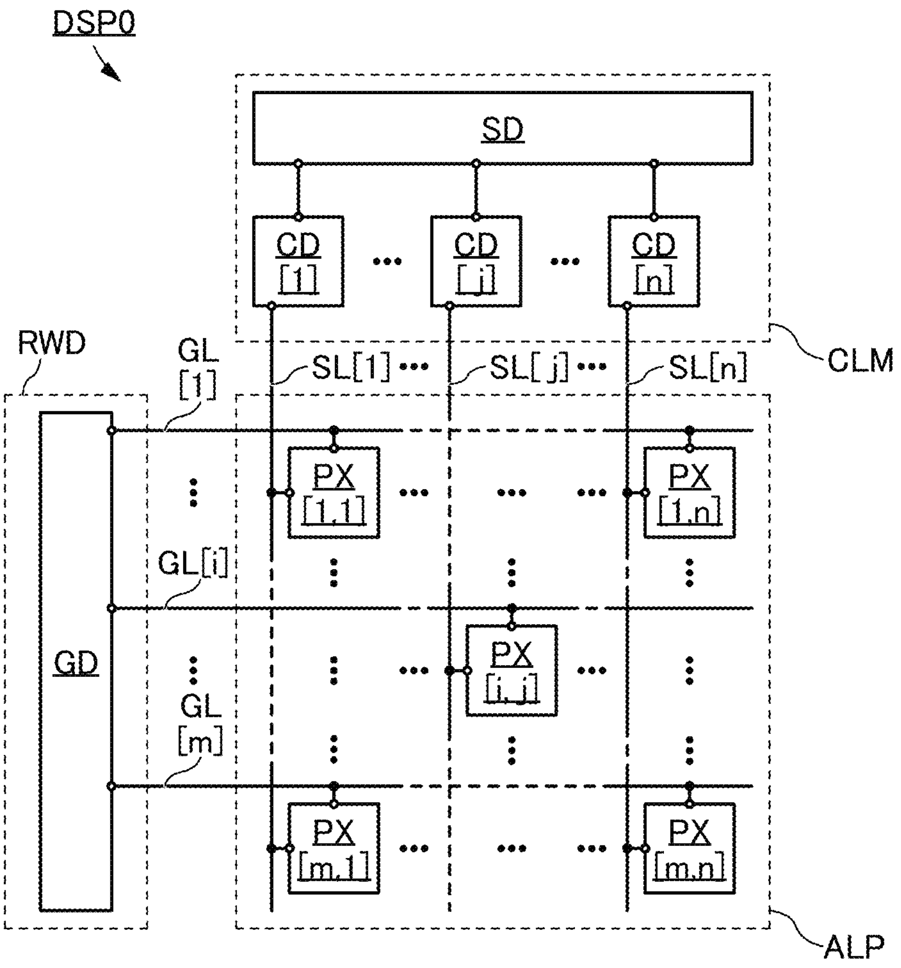
FIG. 2 is a block diagram illustrating a structure example of a display apparatus.

FIG. 2 illustrates a display apparatus of one embodiment of the present invention. A display apparatus DSP0 includes a pixel array ALP, a row driver circuit RWD, and a column driver circuit CLM, for example.

The pixel array ALP includes m×n (each of m and n is an integer greater than or equal to 1) pixels PX, for example. The pixel circuits PX are arranged in a matrix of m rows and n columns in the pixel array ALP. In FIG. 2, a pixel PX[1,1], a pixel PX[m,1], a pixel PX[1,n], a pixel PX[m,n], and a pixel PX[i,j] (i is an integer greater than or equal to 1 and less than or equal to m, and j is an integer greater than or equal to 1 and less than or equal to n) are selectively illustrated as the plurality of pixels PX.

The pixel PX has a function of a display pixel. For example, either a liquid crystal display device or a light-emitting device, or both can be applied to the display pixel. Examples of the light-emitting device include an organic EL element (organic light emitting diode (OLED)), an inorganic EL element, an LED (including a micro LED), a quantum-dot light emitting diode (QLED), and a semiconductor laser. Note that in the description in this embodiment, the pixel PX includes a light-emitting device containing an organic EL material. In particular, the luminance of light emitted from a light-emitting device capable of high luminance light emission can be, for example, higher than or equal to 500 $cd/m^2$, preferably higher than or equal to 1000 $cd/m^2$ and lower than or equal to 10000 $cd/m^2$, further preferably higher than or equal to 2000 $cd/m^2$ and lower than or equal to 5000 $cd/m^2$.

In the pixel array ALP, wirings GL[1] to GL[m] are extended in the row direction, for example. In addition, in the pixel array ALP, wirings SL[1] to SL[n] are extended in the column direction, for example.

The pixel PX[i,j] is electrically connected to a wiring GL[i] and a wiring SL[j], for example.

The wiring SL[j] serves as a wiring transmitting an image data signal to the pixel PX[i,j], for example.

Note that one wiring SL is extended per column in the pixel array in FIG. 2; however, the number of wirings SL extended per column is not limited to one. That is, the number of wirings SL extended per column in the pixel array ALP can be two or more.

The wiring GL[i] serves as a wiring transmitting a selection signal for selecting the pixel PX[i,j] that is a supply destination of an image data signal, for example. The wiring GL[i] may also serve as a wiring transmitting a selection signal for selecting the pixel PX[i,j] in order to correct the threshold voltage of a driving transistor included in the pixel PX[i,j], for example. The wiring GL[i] may also serve as a wiring transmitting a control signal (a digital potential) for changing the on/off states of a switch included in the pixel PX[i,j].

Note that one wiring GL is extended per row in the pixel array in FIG. 2; however, the number of wirings GL extended per row is not limited to one. That is, the number of wirings GL extended per row in the pixel array ALP can be two or more. For example, the number of wirings GL extended per row can be determined depending on the circuit configuration of the pixels PX, and may be two or more in accordance with the circuit configuration of the pixels PX.

The row driver circuit RWD includes a driver circuit GD, for example.

The driver circuit GD is electrically connected to the wirings GL[1] to GL[m], for example.

The driver circuit GD has a function of transmitting a selection signal to the plurality of pixels PX, which are supply destinations of an image data signal, arranged in a row selected from the first to m-th rows in the pixel array ALP. Accordingly, the driver circuit GD may be provided with a demultiplexer. Note that the selection signal can be, for example, an analog potential, a digital potential (a high-level potential or a low-level potential), or a pulse potential. The driver circuit GD may have not only a function of selecting the pixels PX to be the supply destination of an image data signal but also a function of transmitting a selection signal for correcting the threshold voltages of the transistors included in the pixels PX.

The column driver circuit CLM includes a driver circuit SD and circuits CD[1] to CD[n], for example.

Each of the circuits CD[1] to CD[n] is electrically connected to the driver circuit SD. The circuit CD[j] is electrically connected to the wiring SL[j], for example.

The driver circuit SD has a function of transmitting an image data signal to the pixels PX in the pixel array ALP, for example. The driver circuit SD may be provided with a demultiplexer depending on the method of transmitting an image data signal. Note that the image data signal can be, for example, an analog potential, a digital potential (a high-level potential or a low-level potential), or a pulse potential.

The circuit CD[j] has functions of level-shifting an image data signal input from the driver circuit SD and transmitting the level-shifted image data signal to the wiring SL[j], for example.

Next, structure examples of the pixel PX and the circuit CD are described. A display apparatus DSP3A illustrated in FIG. 1 is an example of the display apparatus DSP0 in FIG. 2. FIG. 1 selectively illustrates one of the plurality of pixels PX included in the pixel array ALP, the driver circuit GD of the row driver circuit RWD to which the pixel PX is electrically connected, and the circuit CD and the driver circuit SD in the column driver circuit CLM.

The pixel PX in the display apparatus DSP3A in FIG. 1 includes a transistor M2, a switch SW1, a switch SW6, a capacitor C1, and a light-emitting device LD, for example. The circuit CD includes a switch SW11, a switch SW12, a switch SW13, and a capacitor C2. In particular, the transistor M2 serves as a driving transistor in the pixel PX.

An OS transistor is preferably used as the transistor M2, for example. Specifically, examples of a metal oxide included in a channel formation region of the OS transistor include indium oxide, gallium oxide, and zinc oxide. The metal oxide preferably includes one or more kinds selected from indium, an element M, and zinc. The element M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, cobalt, and magnesium. Specifically, the element M is preferably one or more kinds selected from aluminum, gallium, yttrium, and tin.

It is particularly preferable that an oxide containing indium (In), gallium (Ga), and zinc (Zn) (also referred to as IGZO) be used as the metal oxide used for the semiconductor layer. Alternatively, it is preferable to use an oxide containing indium, tin, and zinc (also referred to as ITZO (registered trademark)). Alternatively, it is preferable to use an oxide containing indium, gallium, tin, and zinc. Alternatively, it is preferable to use an oxide containing indium (In), aluminum (Al), and zinc (Zn) (also referred to as IAZO). Alternatively, it is preferable to use an oxide containing indium (In), aluminum (Al), gallium (Ga), and zinc (Zn) (also referred to as IAGZO). Note that the OS transistor will be described in detail in Embodiment 5.

A transistor other than the OS transistor may be used as the transistor M2. For example, a transistor including silicon in a channel formation region (hereinafter referred to as a Si transistor) can be employed as the transistor M2. As the silicon, single crystal silicon, amorphous silicon (sometimes referred to as hydrogenated amorphous silicon), microcrystalline silicon, or polycrystalline silicon (including low-temperature polycrystalline silicon) can be used, for example.

Examples of a transistor that can be used as the transistor M2 other than the OS transistor and the Si transistor include a transistor including germanium in a channel formation region, a transistor including a compound semiconductor, such as zinc selenide, cadmium sulfide, gallium arsenide, indium phosphide, gallium nitride, or silicon germanium, in a channel formation region, a transistor including a carbon nanotube in a channel formation region, and a transistor including an organic semiconductor in a channel formation region.

Although the transistor M2 illustrated in FIG. 1 is an n-channel transistor, the transistor M2 may be a p-channel transistor depending on conditions or circumstances. In the case where the n-channel transistor is replaced with a p-channel transistor, a potential input to the pixel PX needs to be changed as appropriate so that the pixel PX operates normally. Note that the same applies to transistors described in other parts of the specification and transistors illustrated in the drawings other than FIG. 1. In this embodiment, a structure and operation of the pixel PX are described on the assumption that the transistor M2 is an n-channel transistor.

The transistor M2 preferably operates such that a current depending on not a source-drain voltage but a gate-source voltage flows between a source and a drain. In other words, the transistor M2 in the on state preferably operates in a saturation region. By making the transistor M2 operate in the saturation region, the amount of current flowing through the transistor M2 can be determined by the gate-source voltage. By making the transistor M2 operate in the saturation region, a drain current does not change largely even when the source-drain voltage of the transistor M2 changes. That is, the amount of current flowing through the transistor M2 is determined in accordance with the gate-source voltage, in which case the transistor M2 can make a stable current flow between an anode and a cathode of the light-emitting device LD. Depending on circumstances, the transistor M2 in the on state may operate in a linear region. Alternatively, the transistor M2 may operate in a subthreshold region.

Note that the above description of the transistor applies to not only the transistor M2 but also transistors described in other parts of the specification and transistors illustrated in the drawings.

As each of the switches SW1, SW6, SW11, SW12, and SW13, an electrical switch such as an analog switch or a transistor can be used, for example. Specifically, the above-described transistors are preferably used as electrical switches serving as the switches SW1, SW6, SW11, SW12, and SW13, and OS transistors are further preferably used. Note that in the case where electrical switches are used as the switches SW1, SW6, SW11, SW12, and SW13, other than OS transistors, the transistors that can be used as the transistor M2 can be used. Specifically, Si transistors can be used. Alternatively, mechanical switches may be used as the switches SW1, SW6, SW11, SW12, and SW13, for example.

Note that each of the switches SW1, SW6, SW11, SW12, and SW13 illustrated in FIG. 1 in this specification and the like is on when a high-level potential is applied to a control terminal and off when a low-level potential is applied to the control terminal.

The light-emitting device LD in FIG. 1 is a self-luminous light-emitting device including an organic EL element, for example. Note that the structure of the light-emitting device LD that can be used for the pixel PX will be described in detail in Embodiment 4.

In the pixel PX, a first terminal of the switch SW1 is electrically connected to a first terminal of the transistor M2, an anode of the light-emitting device LD, and a first terminal of the capacitor C1; a second terminal of the switch SW1 is electrically connected to the wiring SL; and a control terminal of the switch SW1 is electrically connected to the wiring GL1. A gate of the transistor M2 is electrically connected to a second terminal of the capacitor C1 and a first terminal of the switch SW6, and a second terminal of the transistor M2 is electrically connected to a wiring VE2. A second terminal of the switch SW6 is electrically connected to a wiring VE6, and a control terminal of the switch SW6 is electrically connected to a wiring GL6. The cathode of the light-emitting device LD is electrically connected to a wiring VE0.

Note that in this embodiment, a point where the gate of the transistor M2, the second terminal of the capacitor C1, and the first terminal of the switch SW6 are electrically connected is referred to as a node N1. A point where the first terminal of the switch SW1, the first terminal of the transistor M2, the first terminal of the capacitor C1, and the anode of the light-emitting device LD are electrically connected is referred to as a node N2.

In the circuit CD, a first terminal of the capacitor C2 is electrically connected to the wiring SL and a first terminal of the switch SW13, and a second terminal of the capacitor C2 is electrically connected to a first terminal of the switch SW11 and a first terminal of the switch SW12. The first terminal of the switch SW13 is electrically connected to a wiring VE4, and a control terminal of the switch SW13 is electrically connected to a wiring SWL13. The second terminal of the switch SW11 is electrically connected to a wiring VE3, and a control terminal of the switch SW11 is electrically connected to a wiring SWL11. A second terminal of the switch SW12 is electrically connected to the driver circuit SD, and a control terminal of the switch SW12 is electrically connected to a wiring SWL12.

Note that in this embodiment, a point where the first terminal of the switch SW11, the first terminal of the switch SW12, and the second terminal of the capacitor C2 are electrically connected is referred to as a node N3.

Each of the wirings VE0, VE2, VE3, VE4, and VE6 functions as a wiring for supplying a constant potential, for example. That is, each of the wirings VE0, VE2, VE3, VE4, and VE6 may function as a power supply line. The constant potentials supplied by the wirings VE0, VE2, VE3, VE4, and VE6 may be equal to or different from one another. Alternatively, some of the potentials supplied by the wirings VE0, VE2, VE3, VE4, and VE6 may be equal and the other of the potentials may be different. One or more selected from the wirings VE0, VE2, VE3, VE4, and VE6 may serve as a wiring for supplying a pulse potential not a constant potential.

In particular, in the pixel PX in FIG. 1, the wiring VE0 preferably serves as a wiring for supplying a potential to the cathode of the light-emitting device LD. The wiring VE2 preferably serves as a wiring for supplying a potential to the anode of the light-emitting device LD.

Note that in the pixel PX in FIG. 1, the cathode of the light-emitting device LD is electrically connected to the wiring VE0, and the anode of the light-emitting device LD is electrically connected to the wiring VE2 through the transistor M2; however, the anode of the light-emitting device LD may be electrically connected to the wiring VE0, and the cathode of the light-emitting device LD may be electrically connected to the wiring VE2. That is, in the case where the former light-emitting device LD has an ordered stacked structure, the light-emitting device in the pixel of the display apparatus of one embodiment of the present invention may have an inverted stacked structure. In that case, the wiring VE0 serves as a wiring for supplying a potential to the anode of the light-emitting device LD, and the wiring VE2 serves as a wiring for supplying a potential to the cathode of the light-emitting device LD.

In the case where the light-emitting device LD is an organic EL element, for example, a hole-injection layer, a hole-transport layer, a light-emitting layer, an electron-transport layer, and an electron-injection layer, which are organic EL materials, are formed in this order over a lower electrode serving as an anode, and an upper electrode serving as a cathode is formed over the electron-injection layer, whereby the light-emitting device LD can be formed (in this specification, this stacking order of these organic EL materials is referred to as one of an ordered stacked structure and an inverted stacked structure). Note that in the case where the anode and the cathode of the light-emitting device LD are replaced with each other as described in the above paragraph, the electron-injection layer, the electron-transport layer, the light-emitting layer, the hole-transport layer, and the hole-injection layer may be formed in this order over the lower electrode, and the upper electrode may be formed over the hole-injection layer (in this specification, this stacking order of these organic EL materials is referred to as the other of the ordered stacked structure and the inverted stacked structure). In that case, the lower electrode serves as a cathode and the upper electrode serves as an anode.

The wirings GL1 and GL6 correspond to one of the wirings GL[1] to GL[m] in FIG. 2. That is, in the case of the circuit configuration of the pixel PX in FIG. 1, the number of wirings GL extended per row of the pixel array ALP is two.

The wiring SWL11 serves as a wiring for transmitting a control signal (a digital potential) that changes on/off states of the switch SW11. Similarly, the wiring SWL12 serves as a wiring for transmitting a control signal (a digital potential) that changes on/off states of the switch SW12. Similarly, the wiring SWL13 serves as a wiring for transmitting a control signal (a digital potential) that changes on/off states of the switch SW13.

Example 1 of Operation Method of Display Apparatus

Next, an example of an operation method of the display apparatus DSP3A in FIG. 1 is described.

Figure 3A:
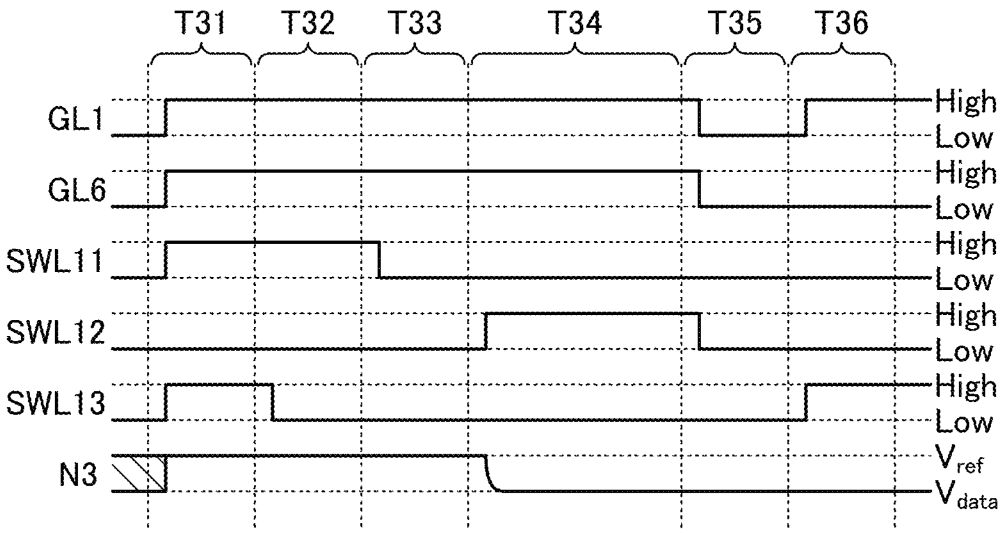
FIGS. 3A to 3C are timing charts each showing an operation method example of a display apparatus.
Figure 3B:
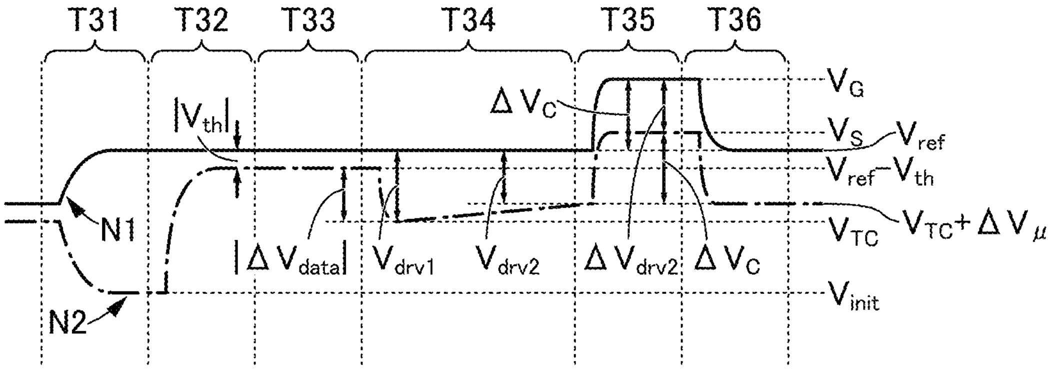
Figure 3C:
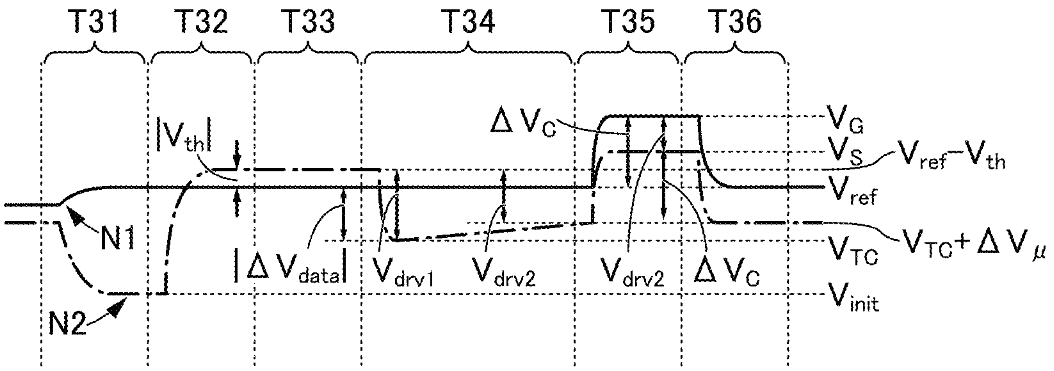

FIGS. 3A to 3C are timing charts showing an example of an operation method of the display apparatus DSP3A. Specifically, the timing chart in FIG. 3A shows potential changes of the wirings GL1, GL6, SWL11, SWL12, and SWL13 and the node N3 in periods T31 to T36. FIGS. 3B and 3C show potential changes of the nodes N1 and N2 in the periods T31 to T36. In FIGS. 3B and 3C, the change in the potential of the node N1 is indicated by a solid line, and the change in the potential of the node N2 is indicated by a dashed-dotted line. Note that the timing chart in FIG. 3B shows the case where the threshold voltage of the transistor M2 is lower than 0 V, and the timing chart in FIG. 3C shows the case where the threshold voltage of the transistor M2 is higher than 0 V.

Note that in FIG. 3A, "High" indicates a high-level potential and "Low" indicates a low-level potential.

The wiring VE3 is supplied with $V_{ref}$ as a constant potential. The wiring VE4 is supplied with $V_{init}$ as a constant potential. Note that $V_{ref}$ is preferably a potential higher than $V_{init}$. In this operation method example, description is made on the assumption that $V_{ref}$ is a potential higher than $V_{init}$ unless otherwise specified.

The wiring VE2 is supplied with $V_{AN}$ as a constant potential. The wiring VE0 is supplied with $V_{CT}$ as a constant potential. $V_{AN}$ is a potential higher than $V_{CT}$. Note that $V_{AN}$ is a potential higher than $V_{init}$.

$V_{init}-V_{CT}$ voltage is a voltage with which the light-emitting device LD does not emit light. That is, when the threshold voltage of the light-emitting device LD is $V_{the}$, $V_{init}$ and $V_{CT}$ are preferably set such that $V_{init}-V_{CT}<V_{the}$. Alternatively, $V_{init}$ and $V_{CT}$ may be set to the same potential to make the anode-cathode voltage of the light-emitting device LD 0 V. Alternatively, $V_{init}$ may be set to a lower potential than $V_{CT}$ to apply a reverse bias voltage (a state where the cathode potential is higher than the anode potential) between an anode and a cathode of the light-emitting device LD.

The threshold voltage of the transistor M2 is $V_{th}$. Note that $V_{th}$ is a voltage lower than $V_{ref}-V_{init}$.

The wiring VE6 is supplied with $V_{ref}$ as a constant potential. That is, the constant potential supplied to the wiring VE6 is preferably equal to the constant potential supplied to the wiring VE3. Therefore, the wiring VE3 and the wiring VE6 are preferably electrically connected to each other. Alternatively, the wiring VE3 and the wiring VE6 are preferably the same wiring (in that case, the references of the wiring VE3 and the wiring VE6 can be interchanged in the description). Depending on circumstances, the constant potential supplied to the wiring VE6 may differ from the constant potential supplied to the wiring VE3.

Note that $V_{ref}$ is a potential with which the light-emitting device LD does not emit light, for example. Specifically, even when the potential of the gate of the transistor M2 is $V_{ref}$ and the transistor M2 is on, the anode-cathode voltage of the light-emitting device LD is preferably lower than the threshold voltage $V_{the}$ of the light-emitting device LD.

For example, when the transistor M2 is on and the potential of the source (a first terminal) of the transistor M2 is $V_X$, the gate-source voltage $V_{ref}-V_X$ of the transistor M2 is higher than $V_{th}$. In other words, the potential $V_X$ of the source (the first terminal) of the transistor M2 satisfies $V_X<V_{ref}-V_{th}$. At this time, the anode-cathode voltage of the light-emitting device LD becomes $V_X-V_{CT}$, and the condition under which the light-emitting device LD does not emit light is $V_X-V_{CT}<V_{the}$. In other words, the potential $V_X$ of the source (the first terminal) of the transistor M2 satisfies $V_X<V_{CT}+V_{the}$.

Here, for example, when $V_{ref}$ and $V_{CT}$ are set to the same potential, $-V_{th}<V_{the}$ satisfies because $V_X<V_{ref}-V_{th}$ and $V_X < V_{CT} + V_{the}$. Thus, in the case where $V_{ref}$ and $V_{CT}$ are equal to each other and $-V_{th} < V_{the}$ satisfies, $V_{ref}$ can be a potential with which the light-emitting device LD does not emit light. Note that in this operation method example, $V_{ref}$ and $V_{CT}$ are the same potential unless otherwise specified.

[Before Period T31]

In a period before a period T31, each of the wirings GL1, GL6, SWL11, SWL12, and SWL13 is supplied with a low-level potential. Accordingly, the control terminals of the switches SW1, SW6, SW11, SW12, and SW13 are supplied with a low-level potential, whereby these switches are off.

The potentials of the nodes N1 and N2 before the period T31 are not particularly limited. For example, although FIGS. 3B and 3C each show an example where the potential of the node N1 in the period T31 to be described later is increasing, the potential of the node N1 before the period T31 may be high so that the potential of the node N1 in the period T31 is decreasing. In addition, for example, although FIGS. 3B and 3C each show an example where the potential of the node N2 in the period T31 to be described later is decreasing, the potential of the node N2 before the period T31 may be low so that the potential of the node N2 in the period T31 is increasing.

Before the period T31, the potential of the node N3 is undefined. Thus, the potential of the node N3 before the period T31 is hatched in the timing chart in FIG. 3A.

[Period T31]

In the period T31, each of the wirings GL1, GL6, SWL11, and SWL13 is supplied with a high-level potential. Accordingly, each of the control terminals of the switches SW1, SW6, SW11, and SW13 is supplied with a high-level potential, whereby these switches are on.

Since the switches SW1 and SW13 are on, electrical continuity is established between the wiring VE4 and each of the first terminal of the transistor M2, the first terminal of the capacitor C1, and the anode of the light-emitting device LD. Thus, the first terminal of the transistor M2, the first terminal of the capacitor C1, and the anode (the node N2) of the light-emitting device LD are supplied with the potential $V_{init}$ from the wiring VE4 (see FIGS. 3B and 3C).

Since the switch SW6 is on, electrical continuity is established between the wiring VE6 and each of the gate of the transistor M2 and the second terminal (the node N1) of the capacitor C1. Thus, the gate of the transistor M2 and the second terminal (the node N1) of the capacitor C1 are supplied with the potential $V_{ref}$ from the wiring VE6 (see FIGS. 3B and 3C).

At this time, the anode-cathode voltage of the light-emitting device LD becomes $V_{init} - V_{CT}$. As described above, when the anode-cathode voltage of the light-emitting device LD is $V_{init} - V_{CT}$, the light-emitting device LD does not emit light (a current does not flow between the anode and the cathode of the light-emitting device LD).

Since the potential of the gate of the transistor M2 is $V_{ref}$, the potential of the first terminal of the transistor M2 is $V_{init}$, and the potential of the second terminal of the transistor M2 is $V_{ANO}$, the gate-source voltage of the transistor M2 becomes $V_{ref} - V_{init}$. Since the gate-source voltage $V_{ref} - V_{init}$ is a voltage higher than $V_{th}$, the transistor M2 is turned on. When a current does not flow between the anode and the cathode of the light-emitting device LD, a current flows between the wiring VE4 and the wiring VE2 with the transistor M2, the switch SW1, and the switch SW13 provided therebetween.

Since the switch SW13 is on, electrical continuity is established between the first terminal of the capacitor C2 and the wiring VE4. Thus, the first terminal of the capacitor C2 is supplied with the potential $V_{init}$ from the wiring VE4.

Since the switch SW11 is on, electrical continuity is established between the wiring VE3 and each of the second terminal of the capacitor C2 and the first terminal of the switch SW12. Thus, the second terminal of the capacitor C2 and the first terminal (the node N3) of the switch SW12 are supplied with the potential $V_{ref}$ from the wiring VE3 (see FIG. 3A).

At this time, voltage between the first terminal and the second terminal of the capacitor C2 becomes $V_{ref} - V_{init}$.

Note that in the period T31 in the timing chart of FIG. 3A, a high-level potential is input to each of the wirings GL1, GL6, SWL11, and SWL13 at the same timing; however, the timings for inputting a high-level potential to the wirings GL1, GL6, SWL11, and SWL13 may be different within the period T31.

[Period T32]

In a period T32, a low-level potential is supplied to the wiring SWL13. Thus, a low-level potential is supplied to the control terminal of the switch SW13, whereby the switch SW13 is turned off. Thus, the first terminal of the transistor M2 and the wiring VE4 are brought out of conduction.

Immediately before the switch SW13 is turned off, the gate-source voltage $V_{ref} - V_{init}$ of the transistor M2 is larger than the threshold voltage $V_{th}$ of the transistor M2, and thus the transistor M2 is on. When the switch SW13 is turned off, the potential $V_{init}$ is not applied to the first terminal of the transistor M2 from the wiring VE4, and negative electric charge supplied to the node N2 is discharged to the wiring VE2 passing between the first terminal and the second terminal of the transistor M2. In other words, when the switch SW13 is off, a current does not flow between the wiring VE2 and the wiring VE4 with the transistor M2, the switch SW1, and the switch SW13 provided therebetween, and thus positive electric charge is supplied to the node N2 from the wiring VE2. Accordingly, the potential of the node N2 is increased.

The increase in the potential of the node N2 decreases the gate-source voltage of the transistor M2. When the gate-source voltage of the transistor M2 decreases to the threshold voltage $V_{th}$ of the transistor M2, the transistor M2 is turned off, and supply of positive electric charge from the wiring VE2 to the node N2 is stopped. That is, when the potential of the node N2 reaches $V_{ref} - V_{th}$ from $V_{init}$, the transistor M2 is turned off. Since the transistor M2 is off, the potential of the node N2 does not change from $V_{ref} - V_{th}$ (see FIGS. 3B and 3C).

At this time, the anode-cathode voltage of the light-emitting device LD becomes $(V_{ref} - V_{th}) - V_{CT}$. Since $V_{ref} = V_{CT}$, the anode-cathode voltage of the light-emitting device LD becomes $-V_{th}$. When $-V_{th}$ is lower than the threshold voltage $V_{the}$ of the light-emitting device LD ($-V_{th} < V_{the}$), the light-emitting device LD does not emit light.

When the anode-cathode voltage $-V_{th}$ of the light-emitting device LD is lower than the threshold voltage $V_{the}$ of the light-emitting device LD, a current does not flow between the anode and the cathode of the light-emitting device LD. In addition to this, since the transistor M2 and the switch SW13 are off, the node N2 and the wiring SL are brought into a floating state.

[Period T33]

In a period T33, a low-level potential is supplied to the wiring SWL11. Thus, a low-level potential is supplied to the control terminal of the switch SW11, whereby the switch SW11 is turned off.

Since the switch SW11 is off, the wiring VE3 and each of the second terminal of the capacitor C2 and the first terminal of the switch SW12 are brought out of conduction. At this time, the node N3 is brought into a floating state.

[Period T34]

In a period T34, a high-level potential is supplied to the wiring SWL12. Thus, a high-level potential is supplied to the control terminal of the switch SW12, whereby the switch SW12 is turned on.

In particular, when the switch SW12 is on, the driver circuit SD transmits an image data signal in accordance with an image displayed on the pixel PX to the second terminal (the node N3) of the capacitor C2 through the switch SW12. Note that the image data signal is a potential $V_{data}$, which is lower than $V_{ref}$.

Thus, the potential of the node N3 changes from $V_{ref}$ to $V_{data}$. The wiring SL and the node N2 are in a floating state, the potentials of the wiring SL and the node N2 are also changed by the capacitive coupling of the capacitor C2 in accordance with a change in potential of the node N3. The amounts of changes in the potentials of the wiring SL and the node N2 are determined by, for example, electrostatic capacitance of the capacitor C1, electrostatic capacitance of the capacitor C2, gate capacitance of the transistor M2, parasitic capacitance of the switch SW1, parasitic capacitance of the switch SW13, parasitic capacitance of the light-emitting device LD, and parasitic capacitance of the wiring SL. In this operation method example, for simplicity, the description will be made on the assumption that the amounts of changes in the potentials of the wiring SL and the node N2 are determined by the electrostatic capacitance of the capacitor C1 and the electrostatic capacitance of the capacitor C2.

When the electrostatic capacitance of the capacitor C1 is represented by $C_1$ and the electrostatic capacitance of the capacitor C2 is represented by C2, and the potential of the node N3 changes from $V_{ref}$ to $V_{data}$, $\Delta V_{data}=(V_{data}-V_{ref})\times C_2/(C_1+C_2)$ is given to the wiring SL and the node N2 as the amounts of changes in the potentials thereof. Thus, the potentials of the wiring SL and the node N2 are $V_{ref}-V_{th}+\Delta V_{data}$. Note that in FIGS. 3B and 3C, $V_{TC}=V_{ref}-V_{th}+\Delta V_{data}$. Since $V_{data}$ is a potential lower than $V_{ref}$ as described above, it should be noted that $\Delta V_{data}<0$.

The second terminal of the capacitor C1 (the node N1) is supplied with the potential $V_{ref}$ from the wiring VE6 before the period T34, and thus the potential of the second terminal of the capacitor C1 (the node N1) remains $V_{ref}$ even in a period in which the potential of the node N3 changes from $V_{ref}$ to $V_{data}$.

Accordingly, when the gate-source voltage of the transistor M2 in the period T34 is represented by $V_{drv1}$, $V_{drv1}$=(the potential of the node N1)−(the potential of the node N2)$=V_{th}-\Delta V_{data}$. Since $-\Delta V_{data}>0$, a voltage $V_{drv1}$ held between the first terminal and the second terminal of the capacitor C1 is the sum of the potential-$\Delta V_{data}$ corresponding to an image displayed on the pixel PX and the threshold voltage $V_{th}$ of the transistor M2.

The gate-source voltage $V_{drv1}$ of the transistor M2 becomes larger than the threshold voltage $V_{th}$ of the transistor M2, so that the transistor M2 is turned on and a current flows from the wiring VE2 to the node N2 through the transistor M2. Here, the case where the transistor M2 operates in a saturation region is considered. The amount of current flowing between the first terminal and the second terminal of the transistor M2 is determined in accordance with the gate-source voltage $V_{GS}$ of the transistor M2. Specifically, an amount I of current flowing between the source and the drain of the transistor operating in the saturation region is proportional to the square of a difference between the gate-source voltage $V_{GS}$ and the threshold voltage $V_{th}$ of the transistor, whereby $I=k\mu(V_{GS}-V_{th})^2$. Note that k is a proportionality constant depending on the transistor structure, and μ is a field-effect mobility of the transistor. By substituting the gate-source voltage $V_{drv1}$ of the transistor M2 into $V_{GS}$ in the above formula, $I=k\mu(-\Delta V_{data})^2=k\mu(\Delta V_{data})^2$, and the amount I of current flowing through the transistor M2 does not depend on the threshold voltage $V_{th}$ and is determined by $\Delta V_{data}$.

In the period T34, since the anode-cathode voltage of the light-emitting device LD is lower than $V_{the}$, the light-emitting device LD does not emit light (a current does not flow between the anode and the cathode of the light-emitting device LD). Thus, positive electric charge is supplied to the wiring SL and the node N2 from the wiring VE2 through the transistor M2, so that the potential of the node N2 increases. Note that in the period T34, the second terminal of the capacitor C1 and the wiring VE6 are brought into conduction and the second terminal of the capacitor C2 and the driver circuit SD are brought into conduction, so that the potentials of the node N1 and the node N3 are not changed by a change in the potential of the node N2.

By an increase in the potential of the node N2 in the period T34, the field-effect mobility of the transistor M2 is corrected. Specifically, from when the switch SW12 is turned on in the period T34 until when the switches SW1, SW6, and SW12 are turned off in a period T35 to be described later, the potential of the node N2 increases and the gate-source voltage $V_{drv1}$ of the transistor M2 decreases. FIGS. 3B and 3C each show an example where the potential of the node N2 becomes $V_{TC}=V_{ref}-V_{th}+\Delta V_{data}$ and then increases by $\Delta V\mu$ to be $V_{TC}+\Delta V\mu$, and the gate-source voltage of the transistor M2 decreases from $V_{drv1}$ to $V_{drv2}$. Note that $\Delta V_{\mu}$ is a potential that satisfies $V_{ref}-V_{th}>V_{TC}+\Delta V_{\mu}$, i.e., $-\Delta V_{data}>\Delta V_{\mu}>0$. In other words, the gate-source voltage of the transistor M2 decreases and the amount of current flowing between the source and the drain of the transistor M2 decreases, whereby the field-effect mobility of the transistor M2 is corrected.

Note that in this operation method example, a period from when the switch SW12 is turned on in the period T34 until when the switches SW1, SW6, and SW12 are turned off in the period T35 to be described later is referred to as a correction period of field-effect mobility.

Figure 4:
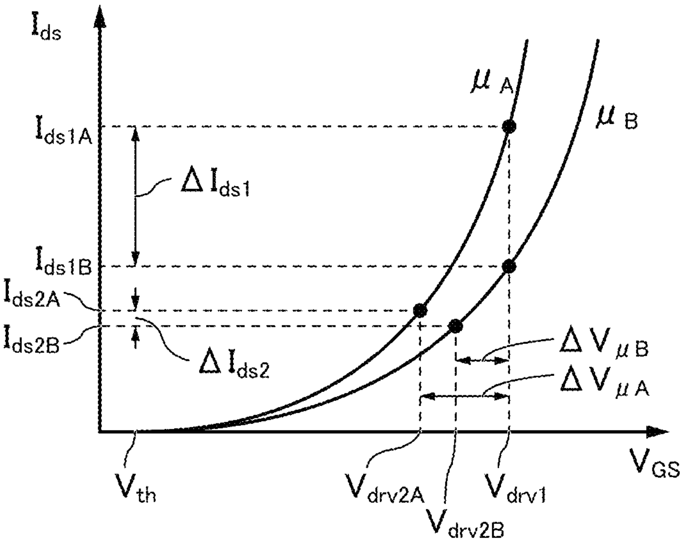
FIG. 4 is a graph showing characteristics of a source-drain current and a gate-source voltage of a transistor.

For example, the case where the field-effect mobility of the transistor M2 is $\mu_A$ and the case where the field-effect mobility of the transistor M2 is $\mu_B$ which is smaller than $\mu_A$ are considered. FIG. 4 shows characteristics of the source-drain current $I_{ds}$ and the gate-source voltage $V_{GS}$ of the transistor M2. Specifically, when having the same gate-source voltage, the transistor M2 with a field-effect mobility of $\mu_A$ has a higher source-drain current than the transistor M2 with a field-effect mobility of $\mu_B$. Note that in FIG. 4, when the gate-source voltage is $V_{drv1}$, the source-drain current of the transistor M2 with a field-effect mobility of $\mu_A$ is represented by $I_{ds1A}$, and the source-drain current of the transistor M2 with a field-effect mobility of $\mu_B$ is represented by $I_{ds1B}$.

In the correction period of the field-effect mobility, the amount of current flowing between the source and the drain of the transistor M2 with a field-effect mobility of $\mu_A$ is larger than that of the transistor M2 with a field-effect mobility of $\mu_B$. For this reason, in the correction period of the field-effect mobility, the amount of change in the potential of the node N2 in the transistor M2 with a field-effect mobility of $\mu_A$ is larger than that in the transistor M2 with a field-effect mobility of $\mu_B$. Thus, a range of decrease in the gate-source voltage of the transistor M2 with a field-effect mobility of $\mu_A$ is larger than a range of decrease in the gate-source voltage of the transistor M2 with a field-effect mobility of $\mu_B$. Note that in FIG. 4, the range of decrease in the gate-source voltage of the transistor M2 with a field-effect mobility of $\mu_A$ is represented by $\Delta V_{\mu A}$, and the range of decrease in the transistor M2 with a field-effect mobility of $\mu_B$ is represented by $\Delta V_{\mu B}$.

In the transistor M2 with a field-effect mobility of $\mu_A$, the gate-source voltage decreases from $V_{drv1}$ to $V_{drv2A}$. In the transistor M2 with a field-effect mobility of $\mu_B$, the gate-source voltage decreases from $V_{drv1}$ to $V_{drv2B}$. That is, $V_{drv1}-\Delta_{\mu A}=V_{drv2A}$ and $V_{drv1}-\Delta V_{\mu B}=V_{drv2B}$. As shown in FIG. 4, in the transistor M2 with a field-effect mobility of $\mu_A$, the source-drain current is represented by $I_{ds2A}$ when the gate-source voltage is $V_{drv2A}$. In the transistor M2 with a field-effect mobility of $\mu_B$, the source-drain current is represented by $I_{ds2B}$ when the gate-source voltage is $V_{drv2B}$.

The range $\Delta V_{\mu A}$ of decrease in the gate-source voltage of the transistor M2 with a field-effect mobility of $\mu_A$ is larger than the range $\Delta V_{\mu B}$ of decrease in the gate-source voltage of the transistor M2 with a field-effect mobility of $\mu_B$. Thus, a difference $\Delta I_{ds1}$ in the amount of current between $I_{ds2A}$ and $I_{ds}\mathbf{2}_B$ when the gate-source voltage is $V_{drv2}$ is smaller than a difference $\Delta_{ds}\mathbf{2}$ in the amount of current between $I_{ds1A}$ and $I_{ds1B}$ when the gate-source voltage is $V_{drv1}$.

Even though the transistors M2 included in the plurality of pixels PX have variations in field-effect mobility, providing the correction period of the field-effect mobility in the above manner can inhibit variations in the amounts of source-drain currents of the transistors M2 due to the variations in field-effect mobility.

[Period T35]

In the period T35, a low-level potential is supplied to the wirings GL1, GL6, and SWL12. Thus, a low-level potential is supplied to control terminals of the switches SW1, SW6, and SW12, whereby the switches SW1, SW6, and SW12 are turned off.

Since the switch SW1 is off, the wiring SL and the node N2 (each of the first terminal of the transistor M2, the first terminal of the capacitor C1, and the anode of the light-emitting device LD) are brought out of conduction. Since the switch SW6 is off, the wiring VE6 and each of the gate of the transistor M2 and the second terminal of the capacitor C1 are brought out of conduction. Since the switch SW12 is off, the driver circuit SD and each of the second terminal of the capacitor C2 and the first terminal of the switch SW11 are brought out of conduction.

The gate-source voltage of the transistor M2 is represented by the formula $V_{drv2}=V_{ref}-V_{TC}-\Delta V_{\mu}=V_{th}-\Delta V_{data}-\Delta V_{\mu}$. Since $-\Delta V_{data}>\Delta V_{\mu}>0$, $V_{drv2}$ is larger than the threshold voltage $V_{th}$ of the transistor M2 and the transistor M2 is on.

Thus, a current flows between the wiring VE2 and the wiring VE0 through the transistor M2 and the light-emitting device LD.

At this time, a voltage $V_{AN}-V_{CT}$ between the wiring VE2 and the wiring VE0 is divided by the transistor M2 and the light-emitting device LD. In this operation method example, the potential of the first terminal of the transistor M2 (the node N2) is increased from $V_{TC}+\Delta V_{\mu}$ to $V_S$ by the operation in the period T35 (see FIGS. 3B and 3C).

Since the potential of the first terminal of the transistor M2 (the node N2) is increased from $V_{TC}+\Delta V_{\mu}$ to $V_S$, the potential of the gate of the transistor M2 (the node N1) also changes due to capacitive coupling of the capacitor C1. In this operation method example, the potential of the gate of the transistor M2 (the node N1) is increased from $V_{ref}$ to $V_G$ by the operation in the period T35 (see FIGS. 3B and 3C).

Note that the amount of change in the potential of the node N1 due to the above-described capacitive coupling of the capacitor C1 is determined by the electrostatic capacitance of the capacitor C1, the gate capacitance of the transistor M2, and the parasitic capacitance of the switch SW6. Note that in this operation method example, for simplicity, the description will be made on the assumption that the amount of change in the potential of the node N1 is equal to the amount of change in the potential of the node N2. That is, when the amount of change in the potential of the node N2 is $\Delta V_C(=V_S-(V_{TC}+\Delta V\mu))$, the amount of change in the potential of the node N1 also becomes $\Delta V_C$. This corresponds to the case where the capacitive coupling coefficient in the periphery of the node N1 is 1.

Since $\Delta V_C=V_G-V_{ref}$ at the node N1, when the amount of change in the potential of the node N2, $\Delta V_C=V_S-V_{TC}-\Delta V_{\mu}$, is substituted into this formula, $V_G-V_S=V_{ref}-V_{TC}-\Delta V_{\mu}=V_{th}-\Delta V_{data}-\Delta V_{\mu}=V_{drv2}$ is obtained. That is, the gate-source voltage of the transistor M2 is the same immediately before and after turning off the witches SW1, SW6, and SW12 in the period T35.

Accordingly, the operation from the period T31 to the period T35 inclusive allows the threshold voltage $V_{th}$ of the transistor M2 to be corrected and the transistor M2 to generate a current with a corrected field-effect mobility of the transistor M2.

Since the potential of the anode of the light-emitting device LD is $V_S$, the anode-cathode voltage of the light-emitting device LD is $V_S-V_{CT}$. Furthermore, a current flowing between the source and the drain of the transistor M2 ($I=k\mu(V_G-V_S-V_{th})^2=k\mu(\Delta V_{data}+\Delta V_{\mu})^2$) flows between the anode and the cathode of the light-emitting device LD, whereby the light-emitting device LD emits light. In the case where the light-emitting device LD is an organic EL element, emission luminance of the light-emitting device LD is determined by the amount of current flowing between the anode and the cathode of the light-emitting device LD. In other words, the emission luminance of the light-emitting device LD is determined by the image data signal $V_{data}$ input from the driver circuit SD.

The image data signal $V_{data}$ output from the driver circuit SD changes to $V_{init}+K\times(V_{data}-V_{ref})$ through the circuit CD. That is, $V_{init}+K\times(V_{data}-V_{ref})$ is input to the pixel PX. Note that $K=C_2/(C_1+C_2)$. Here, the case where the minimum value of the gray level of the pixel is $V_{data\_min}$, the maximum value of the gray level of the pixel is $V_{data\_max}$, and an image data signal $V_{data}$ has any one of potentials $V_{data\_min}$ to $V_{data\_max}$ is considered. The plurality of potentials $V_{data\_min}$ to $V_{data\_max}$ are input to the pixels PX through the circuit CD, and thus change to $V_{init}+K\times(V_{data\_min}-V_{ref})$ to $V_{init}+K\times(V_{data\_max}-V_{ref})$. Note that in this specification, changing an image data signal to another potential through the circuit CD is referred to as potential change (level shifting).

Figure 5A:
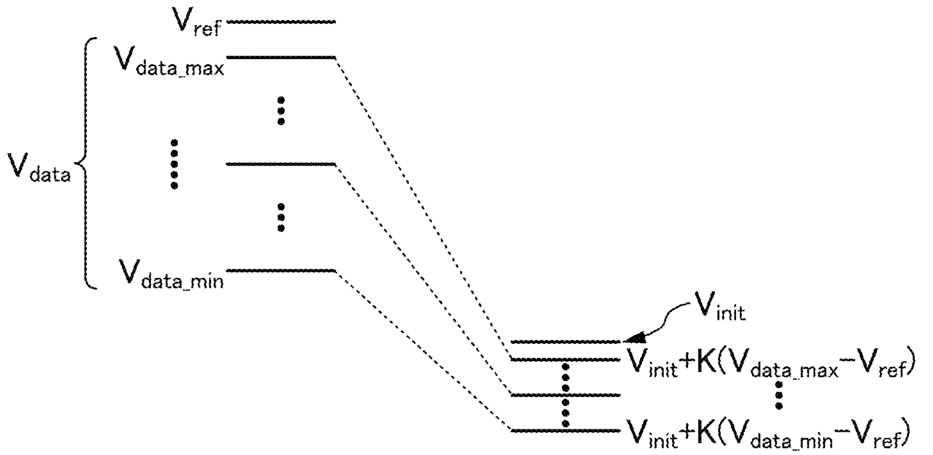
FIGS. 5A to 5C are diagrams each showing a relation between a potential of an image data signal input to a circuit and a potential of the image data signal output from the circuit.

In the case where $V_{ref}$ is higher than $V_{init}$, the relation between image data signals $V_{data\_min}$ to $V_{data\_max}$ output from the driver circuit SD and $V_{init}+K\times(V_{data\_min}-V_{ref})$ to $V_{init}+K\times(V_{data\_max}-V_{ref})$ input to the pixels PX through the circuit CD are shown in FIG. 5A. That is, the image data signals output from the driver circuit SD are input to the pixels PX through the circuit CD, whereby the potential range of the image data signals is narrowed and the potential step size of the image data signal becomes small. Accordingly, potentials of the image data signals input to the pixels PX can be changed finely, and thus the amount of current flowing between the source and the drain of the transistor M2 can be changed finely.

Figure 5B:
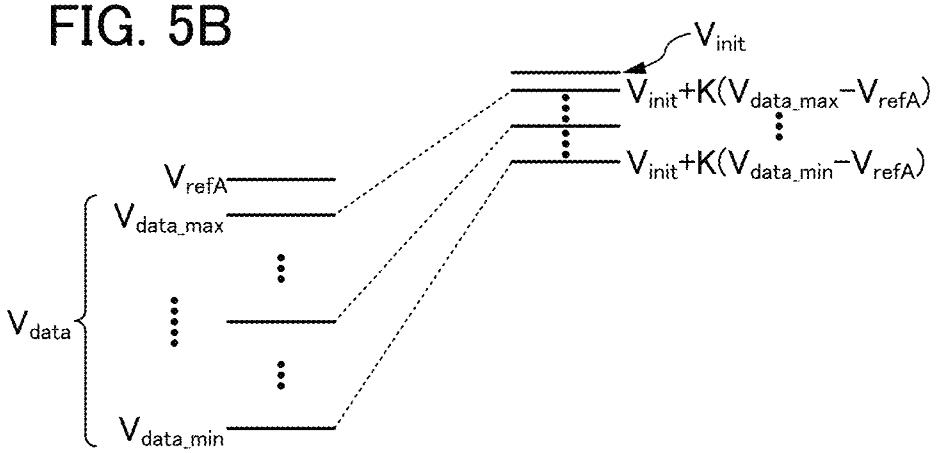

In the case where a potential supplied by the wiring VE6 is $V_{ref}$, a potential supplied by the wiring VE3 is $V_{refA}$, $V_{refA}$ is lower than $V_{init}$, and $V_{ref}$ is higher than $V_{init}$, the relation between image data signals $V_{data\_min}$ to $V_{data\_max}$ output from the driver circuit SD and $V_{init}$+K×($V_{data\_min}$−$V_{refA}$) to $V_{init}$+K×($V_{data\_max}$−$V_{refA}$) input to the pixels PX through the circuit CD are shown in FIG. 5B. The amount of current flowing between the source and the drain of the transistor M2 can be changed finely by decreasing the potential step size of the image data signal, which is the same as the relation shown in FIG. 5A.

Figure 5C:
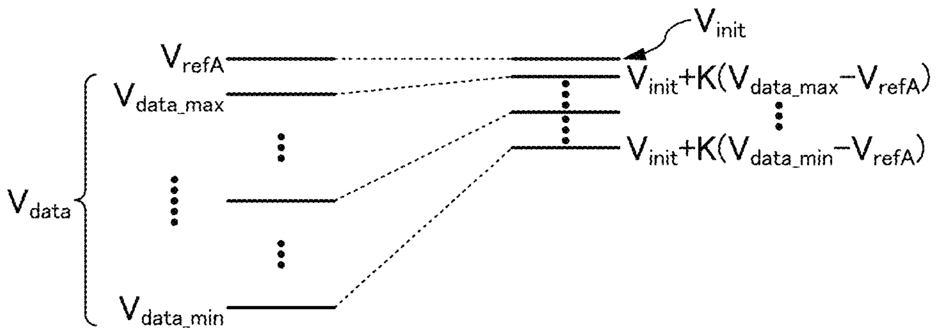

In the case where a potential supplied by the wiring VE6 is $V_{ref}$, a potential supplied by the wiring VE3 is $V_{refA}$, $V_{refA}$ and $V_{init}$ are equal to each other, and $V_{ref}$ is higher than $V_{init}$, the relation between image data signals $V_{data\_min}$ to $V_{data\_max}$ output from the driver circuit SD and $V_{init}$+K×($V_{data\_min}$−$V_{refA}$) to $V_{init}$+K×($V_{data\_max}$−$V_{refA}$) input to the pixels PX through the circuit CD are shown in FIG. 5C. The amount of current flowing between the source and the drain of the transistor M2 can be changed finely by decreasing the potential step size of the image data signal, which is the same as the relation shown in FIGS. 5A and 5B.

Note that in the period T35 in the timing chart of FIG. 3A, a low-level potential is input to each of the wiring GL1, the wiring GL6, and the wiring SWL12 at the same timing; however, the timings for inputting potentials to the wirings GL1, GL6, and SWL12 may be different within the period T35.

[Period T36]

In the period T36, a high-level potential is supplied to each of the wirings GL1 and SWL13. Thus, a high-level potential is supplied to each of control terminals of the switches SW1 and SW13, so that the switches SW1 and SW13 are turned on.

Since the switch SW1 is on, the wiring SL and each of the first terminal of the transistor M2, the first terminal of the capacitor C1, and the anode of the light-emitting device LD are brought into conduction. Since the switch SW13 is on, the wiring VE4 and each of the wiring SL and the first terminal of the capacitor C2 are brought into conduction. Thus, the first terminal of the capacitor C1, the first terminal of the transistor M2, and the anode of the light-emitting device LD (the node N2) are supplied with the potential $V_{init}$ from the wiring VE4.

At this time, the anode-cathode voltage of the light-emitting device LD becomes $V_{init}$−$V_{CT}$. As described above, when the anode-cathode voltage of the light-emitting device LD is $V_{init}$−$V_{CT}$, the light-emitting device LD does not emit light (a current does not flow between the anode and the cathode of the light-emitting device LD).

In other words, by the operation in the period T36, light emission by the light-emitting device LD can be stopped.

By performing the above-described operations in the periods T31 to T36, the transistor M2 included in the pixel PX can output a current with a corrected field-effect mobility of the transistor M2 without depending on the threshold voltage $V_{th}$ of the transistor M2, and can supply the current to the light-emitting device LD.

The threshold voltages and field-effect mobility of driving transistors in the plurality of pixels included in a pixel array of the display apparatus might vary depending on the process and environment of manufacturing the display apparatus. Specifically, although the same image data signal is supplied to different pixels, when the threshold voltages and/or the field-effect mobility of transistors in the pixels vary, the amounts of currents flowing through the transistors are also different, resulting in different emission luminances of light-emitting devices in the pixels in some cases. As a result, unevenness in emission luminance of the light-emitting devices is caused, which decreases the display quality of an image of the display apparatus.

The use of the display apparatus DSP3A as one embodiment of the present invention enables the transistor M2 in the pixel PX to generate a current with a corrected field-effect mobility without depending on the threshold voltage $V_{th}$ of the transistor M2, which can inhibit unevenness in emission luminance between the light-emitting devices in pixels PX in the pixel array ALP. Thus, the display apparatus DSP3A can have increased display quality than the conventional display apparatuses.

Through the above-described operations in the periods T31 to T36, the amount of current flowing through the light-emitting device LD in the pixel PX of the display apparatus DSP3A can be controlled more finely.

In a display apparatus with high definition, the area of a region where light-emitting devices of pixels in a pixel array are formed (a light-emitting surface) is small. When the area of the region of light-emitting devices (the light-emitting surface) is small, the amount of current needed for light emission of the light-emitting device is small, but the allowable current amount is also small. Therefore, fine current control is necessary in order to precisely control the emission luminance of the light-emitting device.

The use of the display apparatus DSP3A as one embodiment of the present invention can finely control the amount of current flowing through the light-emitting device LD, whereby the emission luminance of the light-emitting device LD in the pixel PX can be adjusted minutely. Accordingly, the use of the display apparatus DSP3A allows the gray levels of an image to be set minutely, whereby the display apparatus DSP3A can have improved display quality than the conventional display apparatuses. In the circuit configuration of the display apparatus DSP3A, the amount of current flowing through the light-emitting device LD can be small, which can inhibit the light-emitting device LD from being broken due to overcurrent.

Example 2 of Operation Method of Display Apparatus

FIGS. 3A to 3C illustrate operation of one of the pixels PX included in the pixel array ALP of the display apparatus DSP3A. Here, operation of the whole pixel array ALP in the display apparatus DSP3A is described.

Note that since the display apparatus DSP0 employs the configuration of the display apparatus DSP3A, the circuit CD illustrated in FIG. 1 is employed as each of the circuits CD[1] to CD[n] in the display apparatus DSP0. Furthermore, the pixel PX in FIG. 1 is employed as each of the pixels PX[1,1] to PX[m,n].

Figure 6:
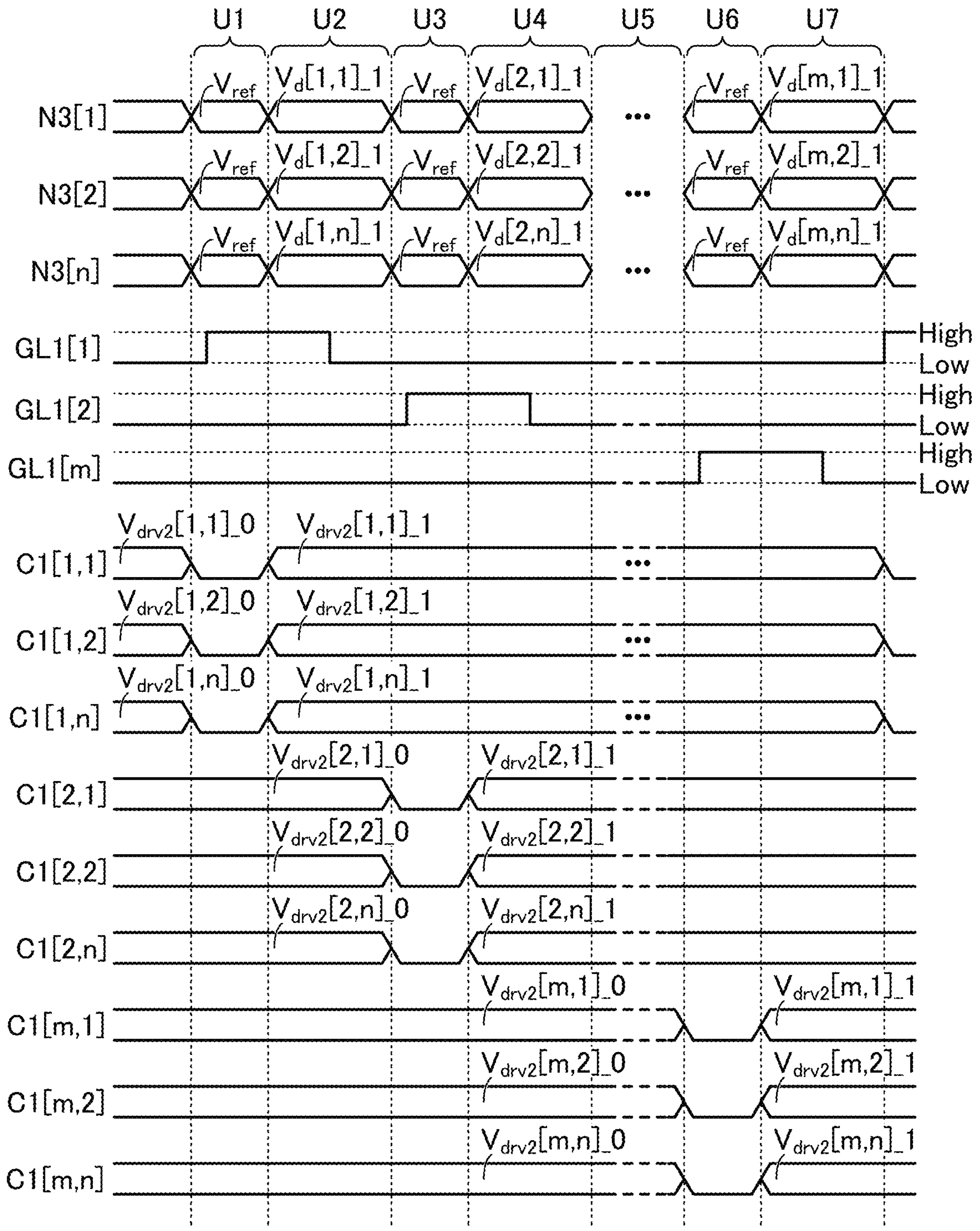
FIG. 6 is a timing chart showing an operation method example of a display apparatus.

FIG. 6 is a timing chart showing an example of a method of writing image data to the plurality of pixels PX included in the pixel array ALP of the display apparatus DSP0.

The timing chart of FIG. 6 shows changes in potentials of a node N3[1], a node N3[2], a node N3[n], a wiring GL1[1], a wiring GL1[2], and a wiring GL1[m] and changes in image data held between first terminals and second terminals of a capacitor C1[1,1], a capacitor C1[1,2], a capacitor C1[1,n], a capacitor C1[2,1], a capacitor C1[2,2], a capacitor C1[2,n], a capacitor C1[m,1], a capacitor C1[m,2], and a capacitor C1[m,n] from a period U1 to a period U7 inclusive and the vicinity thereof.

Note that the node N3[1] corresponds to the node N3 included in the circuit CD[1] in the display apparatus DSP0. Similarly, a node N3[2] corresponds to the node N3 included in a circuit CD[2] (not illustrated in FIG. 2) in the display apparatus DSP0, and the node N3[n] corresponds to the node N3 included in the circuit CD[n] in the display apparatus DSP0.

The wiring GL1[1] corresponds to the wiring GL1 in FIG. 1 extended in the first row in the pixel array ALP of the display apparatus DSP0. Similarly, the wiring GL1[2] corresponds to the wiring GL1 in FIG. 1 extended in the second row in the pixel array ALP of the display apparatus DSP0, and the wiring GL1[m] corresponds to the wiring GL1 in FIG. 1 extended in the m-th row in the pixel array ALP of the display apparatus DSP0.

The capacitor C1[1,1] corresponds to the capacitor C1 in FIG. 1 in the pixel PX[1,1] included in the pixel array ALP of the display apparatus DSP0. Similarly, the capacitor C1[1,2] corresponds to the capacitor C1 in FIG. 1 in the pixel PX[1,2] (not illustrated in FIG. 2) included in the pixel array ALP of the display apparatus DSP0, and the capacitor C1[1,n] corresponds to the capacitor C1 in FIG. 1 in the pixel PX[1,n] included in the pixel array ALP of the display apparatus DSP0. A capacitor C1[i,j] hereinafter corresponds to the capacitor C1 in FIG. 1 in the pixel PX[i,j] included in the pixel array ALP of the display apparatus DSP0.

In each of the periods U1, U3, and U6 in the timing chart of FIG. 6, operation in the periods T31 to T33 in the timing chart of FIG. 3A is performed on the pixels PX positioned in a certain row. In each of the periods U2, U4, and U7 in the timing chart of FIG. 6, operation in the periods T34 to T36 in the timing chart of FIG. 3A is performed on the pixels PX positioned in a certain row.

Before the period U1, voltage $V_{drv2}$[1,1]_0 is held in the capacitor C1[1,1], voltage $V_{drv2}$[1,2]_0 is held in the capacitor C1[1,2], voltage $V_{drv2}$[1,n]_0 is held in the capacitor C1[1,n], voltage $V_{drv2}$[2,1]_0 is held in the capacitor C1[2,1], voltage $V_{drv2}$[2,2]_0 is held in the capacitor C1[2,2], voltage $V_{drv2}$[2,n]_0 is held in the capacitor C1[2,n], voltage $V_{drv2}$[m,1]_0 is held in the capacitor C1[m,1], voltage $V_{drv2}$[m,2]_0 is held in the capacitor C1[m,2], and voltage $V_{drv2}$[m,n]_0 is held in the capacitor C1[m,n]. Note that $V_{drv2}$[i,j] corresponds to $V_{drv2}$ in the pixel PX[i,j] in the timing chart of FIG. 3B.

Before the period U1, a low-level potential is input to each of the wirings GL1[1] to GL1[m]. Thus, a low-level potential is supplied to each of the control terminals of the switches SW1 in all the pixels PX in the pixel array ALP, whereby the switches SW1 in all the pixels PX are turned off. This operation makes current flow between anodes and cathodes of the light-emitting devices LD in all the pixels PX in the pixel array ALP, whereby the light-emitting devices LD emit light.

In the period U1, the operation in the periods T31 to T33 in the timing chart of FIG. 3A is performed on the pixels PX[1,1] to PX[1,n] positioned in the first row in the pixel array ALP. Thus, the potentials of the nodes N3[1] to N3[n] become $V_{ref}$.

In the period U1, a high-level potential is input to the wiring GL1[1]. Thus, a high-level potential is supplied to each of the control terminals of the switches SW1 in the pixels PX[1,1] to PX[1,n] positioned in the first row in the pixel array ALP, whereby the switches SW1 in the pixels PX[1,1] to PX[1,n] are turned on. Through this operation, a current does not flow between the anodes and the cathodes of the light-emitting devices LD in the pixels PX[1,1] to PX[1,n], whereby the light-emitting devices LD do not emit light.

The operation in the periods T31 to T33 in the timing chart of FIG. 3A initializes, before the period U1, the voltages $V_{drv2}$[1,1]_0 to $V_{drv2}$[1,n]_0 held in the capacitors C1[1,1] to C1[1,n] included in the pixels PX[1,1] to PX[1,n], and a voltage for correcting the threshold voltage of the transistor M2 is written to each of the capacitors C1[1,1] to C1[1,n]. Note that the voltage for correcting is not shown in the capacitors C1[1,1], C1[1,2], and C1[1,n] in the period U1 in FIG. 6.

In the period U2, the operation in the periods T34 to T36 in the timing chart of FIG. 3A is performed on the pixels PX[1,1] to PX[1,n] positioned in the first row in the pixel array ALP. At this time, for example, potentials $V_d$[1,1]_1 to $V_d$[1,n]_1 are input to the nodes N3[1] to N3[n] as signals corresponding to image data written to the pixels PX[1,1] to PX[1,n]. Note that $V_d$[1,1]_1 to $V_d$[1,n]_1 correspond to $V_{data}$ in the description of FIGS. 3A to 3C.

Through the operation in the periods T34 to T36 in the timing chart of FIG. 3A, potentials obtained by level-shifting $V_d$[1,1]_1 to $V_d$[1,n]_1 are input to first terminals of the capacitors C1[1,1] to C1[1,n] included in the pixels PX[1,1] to PX[1,n], respectively. Thus, $V_{drv2}$[1,1]_1 to $V_{drv2}$[1,n]_1 are held in the capacitors C1[1,1] to C1[1,n], respectively, as the potentials corresponding to the image data.

After that, a low-level potential is input to the wiring GL1[1]. Thus, a low-level potential is supplied to each of the control terminals of the switches SW1 in the pixels PX[1,1] to PX[1,n] positioned in the first row in the pixel array ALP, whereby the switches SW1 in the pixels PX[1,1] to PX[1,n] are turned off. Through this operation, a current flows between the anodes and the cathodes of the light-emitting devices LD in the pixels PX[1,1] to PX[1,n], whereby the light-emitting devices LD emit light with luminance depending on the current amount. Note that the current amount is determined in accordance with the gate-source voltage of the transistor M2, i.e., voltage held in the capacitor C1, as described in FIGS. 3A to 3C. Specifically, the light-emitting device LD in the pixel PX[1,1] emits light with luminance depending on the voltage $V_{drv2}$[1,1]_1, the light-emitting device LD in the pixel PX[1,2] emits light with luminance depending on a voltage $V_{drv2}$[1,2]_1, and the light-emitting device LD in the pixel PX[1,n] emits light with luminance depending on a voltage $V_{drv2}$[1,n]_1.

In the period U3, the operation in the periods T31 to T33 in the timing chart of FIG. 3A is performed on the pixels PX[2,1] to PX[2,n] positioned in the second row in the pixel array ALP. Thus, the potentials of the nodes N3[1] to N3[n] become $V_{ref}$.

In the period U3, a high-level potential is input to the wiring GL1[2]. Thus, a high-level potential is supplied to each of the control terminals of the switches SW1 in the pixels PX[2,1] to PX[2,n] positioned in the second row in the pixel array ALP, whereby the switches SW1 in the pixels PX[2,1] to PX[2,n] are turned on. Through this operation, a current does not flow between the anodes and the cathodes of the light-emitting devices LD in the pixels PX[2,1] to PX[2,n], whereby the light-emitting devices LD do not emit light.

The operation in the periods T31 to T33 in the timing chart of FIG. 3A initializes, before the period U3, the voltages $V_{drv2}$[2,1]_0 to $V_{drv2}$[2,n]_0 held in the capacitors C1[2,1] to C1[2,n] included in the pixels PX[2,1] to PX[2,n], and a voltage for correcting the threshold voltage of the transistor M2 is written to each of the capacitors C1[2,1] to C1[2,n]. Note that the voltage for correcting is not shown in the capacitors C1[2,1], C1[2,2], and C1[2,n] in the period U3 in FIG. 6.

In the period U4, the operation in the periods T34 to T36 in the timing chart of FIG. 3A is performed on the pixels PX[2,1] to PX[2,n] positioned in the second row in the pixel array ALP. At this time, for example, potentials $V_d$[2,1]_1 to $V_d$[2,n]_1 are input to the nodes N3[1] to N3[n] as signals corresponding to image data written to the pixels PX[2,1] to PX[2,n]. Note that $V_d$[2,1]_1 to $V_d$[2,n]_1 correspond to $V_{data}$ in the description of FIGS. 3A to 3C.

Through the operation in the periods T34 to T36 in the timing chart of FIG. 3A, potentials obtained by level-shifting $V_d$[2,1]_1 to $V_d$[2,n]_1 are input to first terminals of the capacitors C1[2,1] to C1[2,n] included in the pixels PX[2,1] to PX[2,n], respectively. Thus, $V_{drv2}$[2,1]_1 to $V_{drv2}$[2,n]_1 are held in the capacitors C1[2,1] to C1[2,n], respectively, as the potentials corresponding to the image data.

After that, a low-level potential is input to the wiring GL1[2]. Thus, a low-level potential is supplied to each of the control terminals of the switches SW1 in the pixels PX[2,1] to PX[2,n] positioned in the second row in the pixel array ALP, whereby the switches SW1 in the pixels PX[2,1] to PX[2,n] are turned off. Through this operation, a current flows between the anodes and the cathodes of the light-emitting devices LD in the pixels PX[2,1] to PX[2,n], whereby the light-emitting devices LD emit light with luminance depending on the current amount. Note that the current amount is determined in accordance with the gate-source voltage of the transistor M2, i.e., voltage held in the capacitor C1, as described in FIGS. 3A to 3C. Specifically, the light-emitting device LD in the pixel PX[2,1] emits light with luminance depending on the voltage $V_{drv2}$[2,1]_1, the light-emitting device LD in the pixel PX[2,2] emits light with luminance depending on a voltage $V_{drv2}$[2,2]_1, and the light-emitting device LD in the pixel PX[2,n] emits light with luminance depending on a voltage $V_{drv2}$[2,n]_1.

In the period U5, image data is written to the pixels PX in the third row to the (m−1)th row as in the periods U1 and U2 (the periods U3 and U4). Note that writing of image data to the pixels PX in the period U5 is sequentially performed per row.

In the period U6, the operation in the periods T31 to T33 in the timing chart of FIG. 3A is performed on the pixels PX[m, 1] to PX[m,n] positioned in the m-th row in the pixel array ALP. Thus, the potentials of the nodes N3[1] to N3[n] become $V_{ref}$.

In the period U6, a high-level potential is input to the wiring GL1[m]. Thus, a high-level potential is supplied to each of the control terminals of the switches SW1 in the pixels PX[m,1] to PX[m,n] positioned in the m-th row in the pixel array ALP, whereby the switches SW1 in the pixels PX[m, 1] to PX[m,n] are turned on. Through this operation, a current does not flow between the anodes and the cathodes of the light-emitting devices LD in the pixels PX[m,1] to PX[m,n], whereby the light-emitting devices LD do not emit light.

The operation in the periods T31 to T33 in the timing chart of FIG. 3A initializes, before the period U6, the voltages $V_{drv2}$[m, 1]_0 to $V_{drv2}$[m,n]_0 held in the capacitors C1[m,1] to C1[m,n] included in the pixels PX[m,1] to PX[m,n], and a voltage for correcting the threshold voltage of the transistor M2 is written to each of the capacitors C1[1,1] to C1[1,n]. Note that the voltage for correcting is not shown in the capacitors C1[m, 1], C1[m,2], and C1[m,n] in the period U6 in FIG. 6.

In the period U7, the operation in the periods T34 to T36 in the timing chart of FIG. 3A is performed on the pixels PX[m, 1] to PX[m,n] positioned in the m-th row in the pixel array ALP. At this time, for example, potentials $V_d$[m,1]_1 to $V_d$[m,n]_1 are input to the nodes N3[1] to N3[n] as signals corresponding to image data written to the pixels PX[m,1] to PX[m,n]. Note that $V_d$[m,1]_1 to $V_d$[m,n]_1 correspond to $V_{data}$ in the description of FIGS. 3A to 3C.

Through the operation in the periods T34 to T36 in the timing chart of FIG. 3A, potentials obtained by level-shifting $V_d$[m,1]_1 to $V_d$[m,n]_1 are input to first terminals of the capacitors C1[m,1] to C1[m,n] included in the pixels PX[m, 1] to PX[m,n], respectively. Thus, $V_{drv2}$[m, 1]_1 to $V_{drv2}$[m,n]_1 are held in the capacitors C1[m, 1] to C1[m,n], respectively, as the potentials corresponding to the image data.

After that, a low-level potential is input to the wiring GL1[m]. Thus, a low-level potential is supplied to each of the control terminals of the switches SW1 in the pixels PX[m, 1] to PX[m,n] positioned in the m-th row in the pixel array ALP, whereby the switches SW1 in the pixels PX[m,1] to PX[m,n] are turned off. Through this operation, a current flows between the anodes and the cathodes of the light-emitting devices LD in the pixels PX[m,1] to PX[m,n], whereby the light-emitting devices LD emit light with luminance depending on the current amount. Note that the current amount is determined in accordance with the gate-source voltage of the transistor M2, i.e., voltage held in the capacitor C1, as described in FIGS. 3A to 3C. Specifically, the light-emitting device LD in the pixel PX[m,1] emits light with luminance depending on the voltage $V_{drv2}$[m,1]_1, the light-emitting device LD in the pixel PX[m,2] emits light with luminance depending on a voltage $V_{drv2}$[m,2]_1, and the light-emitting device LD in the pixel PX[m,n] emits light with luminance depending on a voltage $V_{drv2}$[m,n]_1.

As described above, by performing the operation in the periods U1 to U7, the display apparatus DSP0 employing the configuration of the display apparatus DSP3A can display an image. The image displayed on the display apparatus DSP0 can be updated every time the operation in the periods U1 to U7 is repeated.

The operation method of the above-described display apparatus DSP0 is not limited to the operation method of the display apparatus of one embodiment of the present invention. For example, the operation method of the display apparatus of one embodiment of the present invention may employ an image displaying method in which the display apparatus DSP0 in FIG. 2 makes a light-emitting device in the pixel PX emit light in a pulsed manner in one frame by control of on/off states of a switch included in the pixel PX, control of voltage supplied to the pixel PX, or both. Conversely, the display apparatus DSP0 in FIG. 2 can make the light-emitting device in the pixel PX not emit light in periods other than the period in which the light-emitting device in the pixel PX emits light, in one frame period. That is, the display apparatus DSP0 can perform image display and operation of displaying black (referred to as Duty driving) in one frame period.

In the case where the display apparatus DSP0 in FIG. 2 displays moving images, the frame frequency of the display apparatus DSP0 may be greater than or equal to 30 Hz, greater than or equal to 60 Hz, greater than or equal to 120 Hz, greater than or equal to 165 Hz, or greater than or equal to 240 Hz. In the case where the display apparatus DSP0 in FIG. 2 displays a still image, the frame frequency of the display apparatus DSP0 may be less than or equal to 10 Hz, less than or equal to 5 Hz, less than or equal to 1 Hz, less than or equal to 0.5 Hz, or less than or equal to 0.1 Hz.

Layout Example of Display Apparatus

Figure 7A:
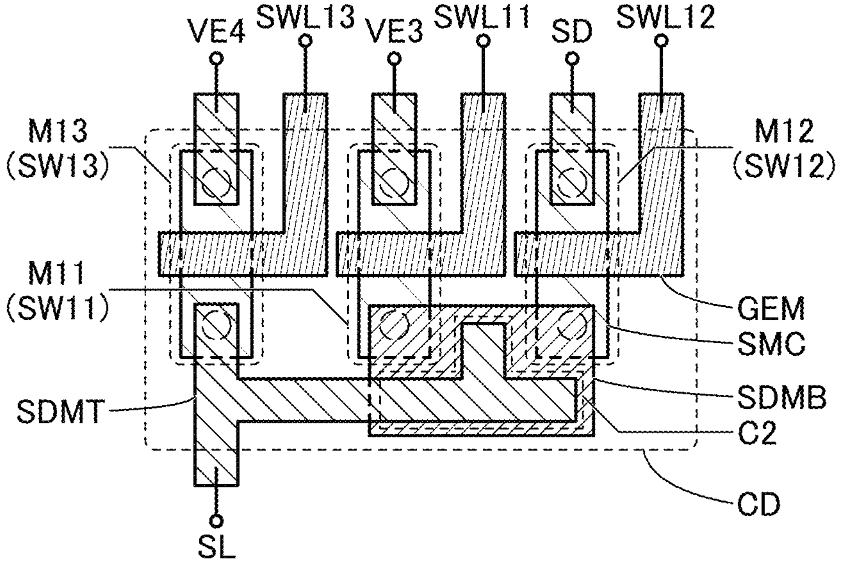
FIGS. 7A and 7B are plan views each illustrating a layout example of a circuit.
Figure 7B:
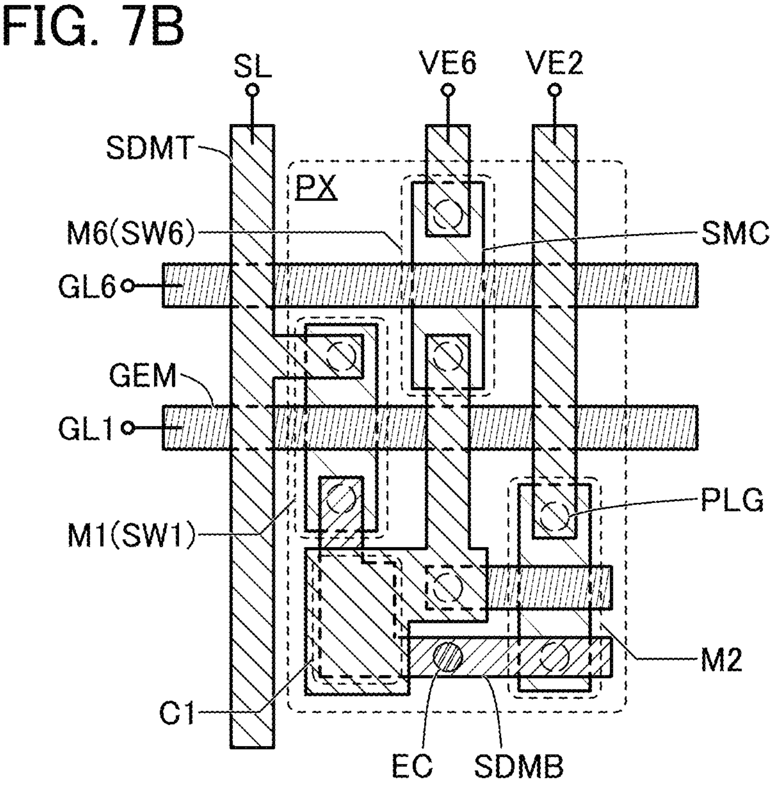

FIGS. 7A and 7B are layouts (plan views) each illustrating a circuit configuration example of part of the display apparatus DSP3A in FIG. 1. FIG. 7A illustrates a layout of the circuit CD and FIG. 7B illustrates a layout of the pixel PX.

In the layout in FIG. 7A, a transistor M11, a transistor M12, and a transistor M13 are used as the switch SW11, the switch SW12, and the switch SW13, respectively, included in the circuit CD in FIG. 1. In the layout in FIG. 7B, a transistor M1 and a transistor M6 are used as the switch SW1 and the switch SW6, respectively, included in the pixel PX in FIG. 1.

The circuit CD and the pixel PX in FIGS. 7A and 7B each include a conductor GEM, a conductor SDMB, a conductor SDMT, a semiconductor SMC, and a conductor PLG. Note that insulators included in the circuit CD and the pixel PX are not illustrated in FIGS. 7A and 7B.

The semiconductor SMC is positioned below the conductor GEM, for example. The conductor GEM is positioned below the conductor SDMB, for example. The conductor SDMB is positioned below the conductor SDMT, for example. That is, in the circuit CD and the pixel PX in FIGS. 7A and 7B, the semiconductor SMC, the conductor GEM, the conductor SDMB, and the conductor SDMT are formed in this order.

Part of the conductor GEM serves as gates (sometimes referred to as first gates) of the transistors M1, M2, M6, M11, M12, and M13.

The semiconductor SMC, the conductor GEM, the conductor SDMB, and the conductor SDMT can be formed through photolithography, for example. Specifically, for example, in the case where the conductor GEM is formed, a conductive material to be the conductor GEM is deposited by one or more methods selected from a sputtering method, a chemical vapor deposition (CVD) method, a pulsed laser deposition (PLD) method, and an atomic layer deposition (ALD) method, and then a desired pattern is formed through photolithography. The semiconductor SMC, the conductor SDMB, and the conductor SDMT can also be formed in a manner similar to that of the conductor GEM.

Furthermore, insulators may be provided between the semiconductor SMC and the conductor GEM, between the conductor GEM and the conductor SDMB, and between the conductor SDMB and the conductor SDMT. In particular, an insulator provided between the semiconductor SMC and the conductor GEM serves as a gate insulating film (sometimes referred to as a first gate insulating film or a front gate insulating film) in some cases.

The conductor PLG serving as a wiring or a plug is provided each between the semiconductor SMC and the conductor SDMB, between the semiconductor SMC and the conductor SDMT, and between the conductor GEM and the conductor SDMT. The conductor PLG is formed, for example, in such a manner that an opening is formed in the insulator, and the opening is filled with a conductive material to be the conductor PLG. Note that after the formation of the conductor PLG, planarization using chemical mechanical polishing or the like may be performed to align the levels of film surfaces of the conductor PLG and peripheral insulators.

Each of the transistors M1, M2, M6, M11, M12, and M13 illustrated in FIGS. 7A and 7B includes part of the semiconductor SMC, part of the conductor GEM, part of the insulator, and part of the conductor PLG, for example.

The capacitor C2 in FIG. 7A and the capacitor C1 in FIG. 7B each include part of the conductor SDMB and part of the conductor SDMT. Specifically, each of the capacitor C1 and the capacitor C2 has a region where part of the conductor SDMB and part of the conductor SDMT overlap with each other. That is, in each of the capacitor C1 and the capacitor C2, the part of the conductor SDMB serves as one of a pair of electrodes, and the part of the conductor SDMT serves as the other of the pair of electrodes. Note that an insulator with high dielectric constant is preferably provided between the conductor SDMB and the conductor SDMT which are included in the capacitors C1 and C2.

A conductor EC illustrated in FIG. 7B is formed over the conductor SDMB, for example. The conductor EC serves as a wiring or a plug for electrically connecting the conductor SDMB and the anode of the light-emitting device LD (not illustrated in FIG. 7B) positioned above the conductor SDMT.

Note that the layouts of the display apparatus of one embodiment of the present invention are not limited to FIGS. 7A and 7B. The layout of the display apparatus of one embodiment of the present invention may be FIG. 7A or FIG. 7B on which some modification is performed as appropriate.

Modification Example of Display Apparatus

Note that the pixel in the above-described display apparatus of one embodiment of the present invention is not limited to the pixel PX illustrated in FIG. 1. The display apparatus of one embodiment of the present invention may include the pixel PX in FIG. 1 on which some modification is performed as appropriate.

Figure 8A:
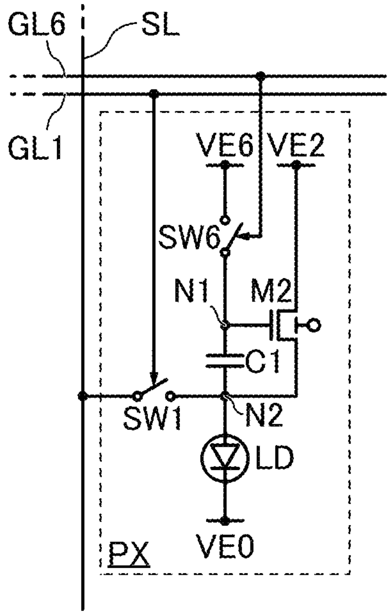
FIGS. 8A to 8C are circuit diagrams each illustrating a structure example of a pixel included in a display apparatus.

FIG. 8A illustrates a modification example of the pixel PX in FIG. 1. The pixel PX in FIG. 8A is different from the pixel PX in FIG. 1 in that the transistor M2 has a back gate.

Specifically, the transistor M2 illustrated in FIG. 8A is a transistor including gates over and under a channel; the transistor M2 includes a first gate and a second gate. For convenience, the first gate is referred to as a gate (sometimes referred to as a front gate) and the second gate is referred to as a back gate, but the first gate and the second gate can be interchanged; thus, the term "gate" can be replaced with the term "back gate". Similarly, the term "back gate" can be replaced with the term "gate". As a specific example, a connection structure in which "a gate is electrically connected to a first wiring and a back gate is electrically connected to a second wiring" can be replaced with a connection structure in which "a back gate is electrically connected to a first wiring and a gate is electrically connected to a second wiring".

The pixel PX of the display apparatus of one embodiment of the present invention does not depend on the connection structure of a back gate of a transistor. In FIG. 8A, the back gate of the transistor M2 is illustrated. The connection of the back gate is not illustrated, and the destination to which the back gate is electrically connected can be determined at the design stage. For example, in a transistor including a back gate, a gate and the back gate may be electrically connected to each other to increase the on-state current of the transistor. In other words, the gate and the back gate of the transistor M2 may be electrically connected to each other. Alternatively, for example, in a transistor including a back gate, a wiring electrically connected to an external circuit or the like may be provided and a fixed potential or a variable potential may be supplied to the back gate of the transistor with the external circuit to change the threshold voltage of the transistor or to reduce the off-state current of the transistor. Note that the same applies to a transistor described in other parts of the specification and a transistor illustrated in other drawings than FIG. 8A.

Figure 8B:
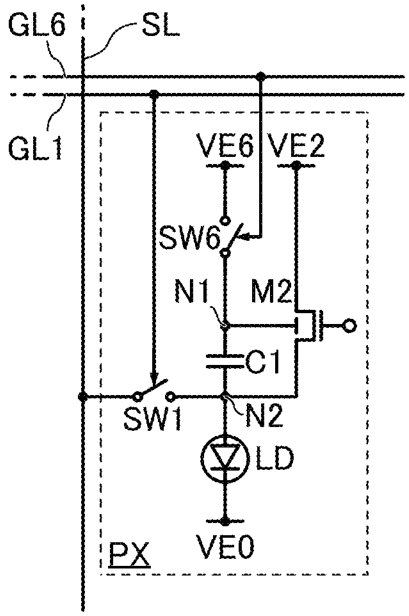

Although the pixel PX in FIG. 8A has a structure in which the gate of the transistor M2 is electrically connected to the first terminal of the switch SW6 and the second terminal of the capacitor C1, the pixel PX may have a structure in which not the gate of the transistor M2 but the back gate of the transistor M2 is electrically connected to the first terminal of the switch SW6 and the second terminal of the capacitor C1, as illustrated in FIG. 8B.

Figure 8C:
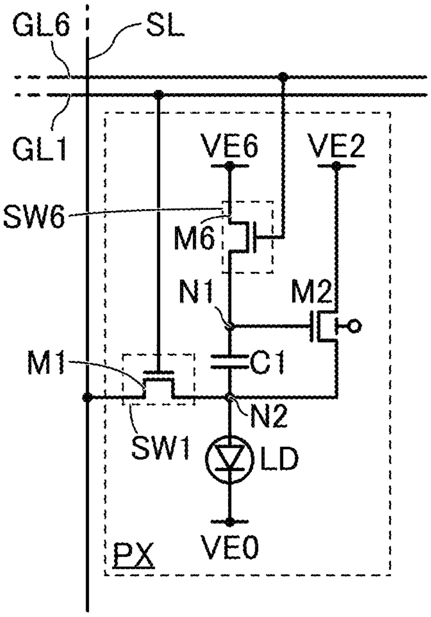

As described above, an electrical switch such as a transistor can be used as each of the switches SW1 and SW6 included in the pixel PX in FIG. 1. Specifically, the pixel PX can have a structure in which the switch SW1 includes the transistor M1 and the switch SW6 includes the transistor M6, as illustrated in FIG. 8C. Note that as each of the transistor M1 and the transistor M6, a transistor usable as the transistor M2 can be used.

As described above, in the display apparatus DSP3A in FIG. 1, the potential of the image data signal is changed by the capacitor C1 in the pixel PX and the capacitor C2 outside the pixel PX. For example, in the case where voltage for correcting the threshold voltage of the transistor M2 is written to the capacitor C1, due to a change in the potential of the node N1, a potential obtained by multiplying the change in the potential of the node N1 by $C_1/(C_1+C_2)$ is added to the potential of the node N2; as a result, the voltage for correcting the threshold voltage of the transistor M2 written to the capacitor C1 is shifted in some cases (in the case where the change in the potential of the node N1 is the same as the change in the potential of the node N2, the voltage for correcting the threshold voltage of the transistor M2 written to the capacitor C1 is not shifted). In the display apparatus DSP3A in FIG. 1, however, according to the timing charts of FIGS. 3B and 3C, the potential of the node N1 is not changed in periods other than the periods T31, T35, and T36, and the first terminal of the capacitor C2 (the wiring SL) and the first terminal of the capacitor C1 are brought out of conduction in the periods T35 and T36; therefore, the change in the potential of the node N1 due to the change in the potential of the node N2 is not influenced by the capacitor C1. That is, in the case where the potential of the node N2 changes, the amount of change in the potential of the node N1 is almost equal to the amount of change in the potential of the node N2.

Structure Example 2 of Display Apparatus

Figure 9:
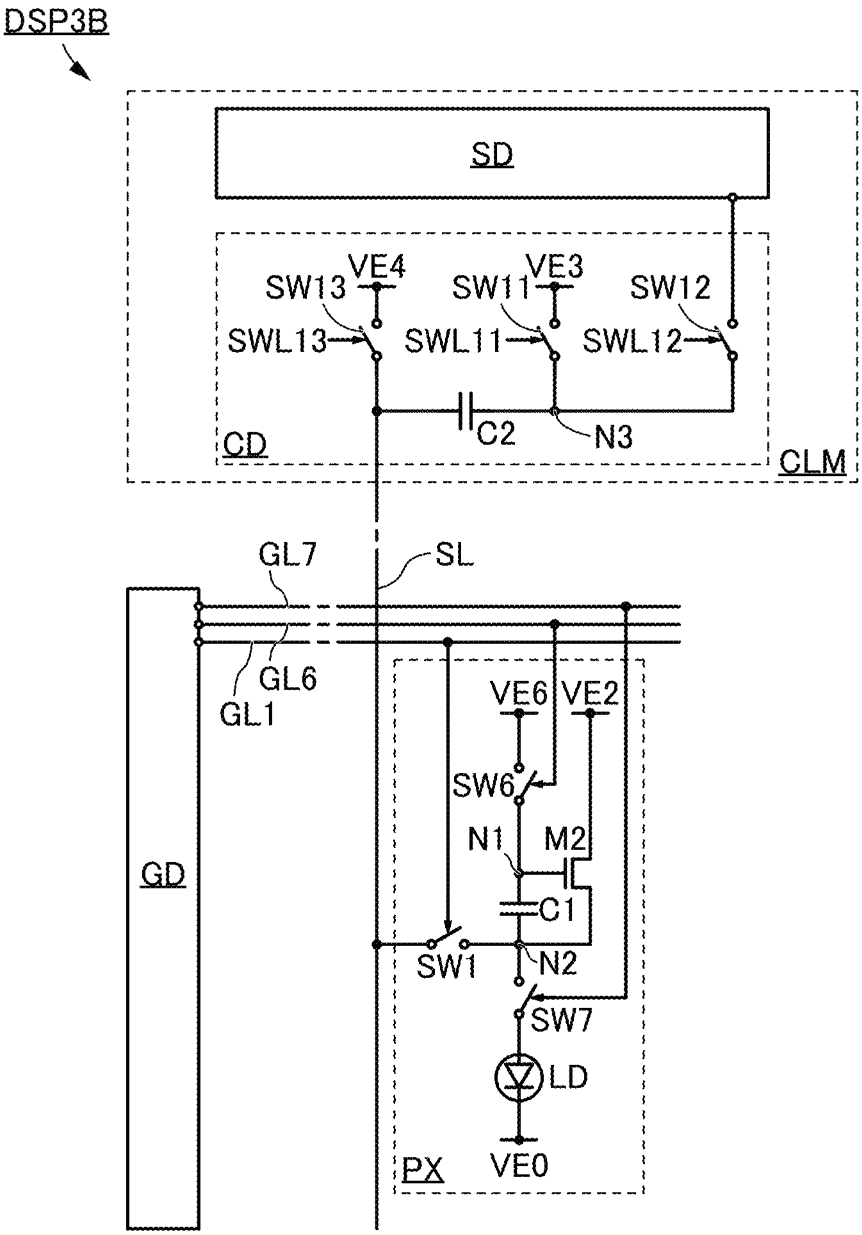
FIG. 9 is a circuit diagram illustrating a structure example of a display apparatus.

Next, FIG. 9 illustrates an example of the display apparatus DSP0 in FIG. 2, which is different from the display apparatus DSP3A in FIG. 1. A display apparatus DSP3B in FIG. 9 is a modification example of the display apparatus DSP3A in FIG. 1, and is different from the display apparatus DSP3A in FIG. 1 in that a switch SW7 is provided between the anode of the light-emitting device LD and each of the first terminal of the transistor M2, the first terminal of the capacitor C1, and the first terminal of the switch SW1.

A first terminal of the switch SW7 is electrically connected to the first terminal of the switch SW1, the first terminal of the capacitor C1, and the first terminal of the transistor M2. A second terminal of the switch SW7 is electrically connected to the anode of the light-emitting device LD. A control terminal of the switch SW7 is electrically connected to a wiring GL7.

In the display apparatus DSP3B in FIG. 9, the wiring GL7 together with the wirings GL1 and GL6 correspond to one of the wirings GL[1] to GL[m] in FIG. 2. That is, in the case of the circuit configuration of the pixel PX in FIG. 9, the number of wirings GL extended per row of the pixel array ALP is three.

Example 3 of Operation Method of Display Apparatus

Next, an example of an operation method of the display apparatus DSP3B in FIG. 9 is described.

Figure 10:
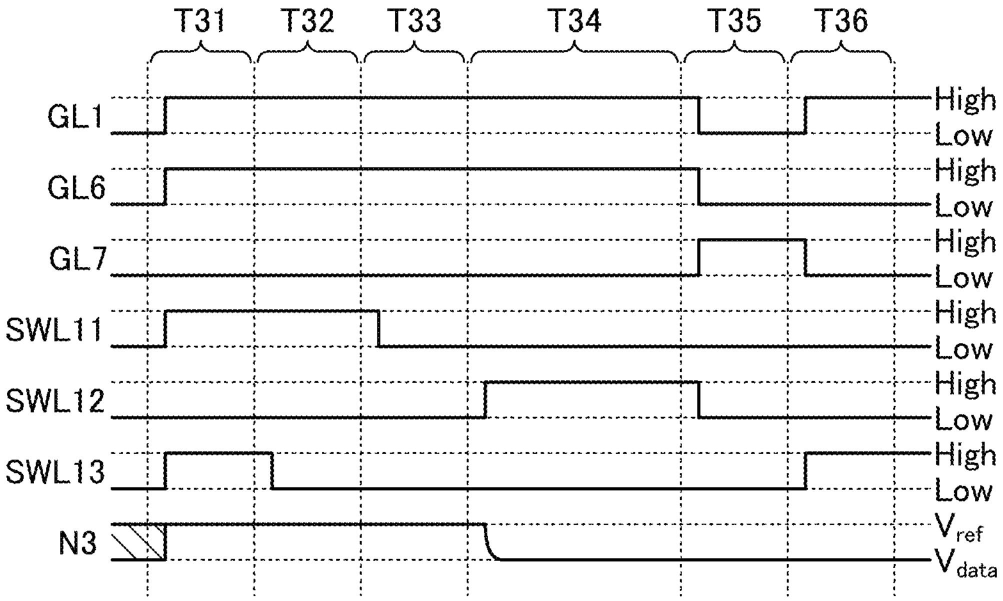
FIG. 10 is a timing chart showing an operation method example of a display apparatus.

FIG. 10 is a timing chart showing an example of an operation method of the display apparatus DSP3B. Specifically, the timing chart in FIG. 10 is a modification example of the timing chart of FIG. 3A, and corresponds to a timing chart obtained by adding a change in the potential of the wiring GL7 to the timing chart of FIG. 3A. Therefore, for operations in the display apparatus DSP3B other than the change in the potential of the wiring GL7, description of the timing charts in FIGS. 3A to 3C can be referred to.

In the periods T31 to T34 and T36, a low-level potential is supplied to the wiring GL7. Thus, a low-level potential is supplied to the control terminal of the switch SW7, whereby the switch SW7 is turned off.

That is, since the anode of the light-emitting device LD and each of the first terminal of the switch SW1, the first terminal of the capacitor C1, and the first terminal of the transistor M2 (the node N2) are brought out of conduction in the periods T31 to T34 and T36, the potential of the node N2 is not supplied to the anode of the light-emitting device LD. In addition, current is not supplied from the wiring VE2 to the anode of the light-emitting device LD through the transistor M2 because the switch SW7 is off. Therefore, the light-emitting device LD does not emit light.

In the period T35, a high-level potential is supplied to the wiring GL7. Thus, a high-level potential is supplied to the control terminal of the switch SW7, whereby the switch SW7 is turned on.

That is, in the period T35, the first terminal of the transistor M2 and the anode of the light-emitting device LD are brought into conduction, so that current is supplied from the wiring VE2 to the anode of the light-emitting device LD through the transistor M2. Thus, the light-emitting device LD emits light. Note that the current is determined in accordance with the gate-source voltage of the transistor M2 as described in FIGS. 3A to 3C.

As described above, whether or not current is supplied to the light-emitting device LD can be selected with the use of the display apparatus DSP3B. Accordingly, for example, when both the threshold voltage and the field-effect mobility of the transistor M2 are corrected in the periods T31 to T34, even with operation or conditions in which a difference between the potential of the node N2 and a potential supplied by the wiring VE0 is higher than the threshold voltage $V_{the}$ of the light-emitting device LD, turning off the switch SW7 can prevent current from flowing between the anode and the cathode of the light-emitting device LD. That is, in the periods T31 to T34 in which the threshold voltage and the field-effect mobility of the transistor M2 in the display apparatus DSP3B are corrected, the change in the potential of the node N2 which is caused by current flowing between the anode and the cathode of the light-emitting device LD can be prevented and light emission from the light-emitting device LD can be prevented.

Structure Example 3 of Display Apparatus

Figure 11:
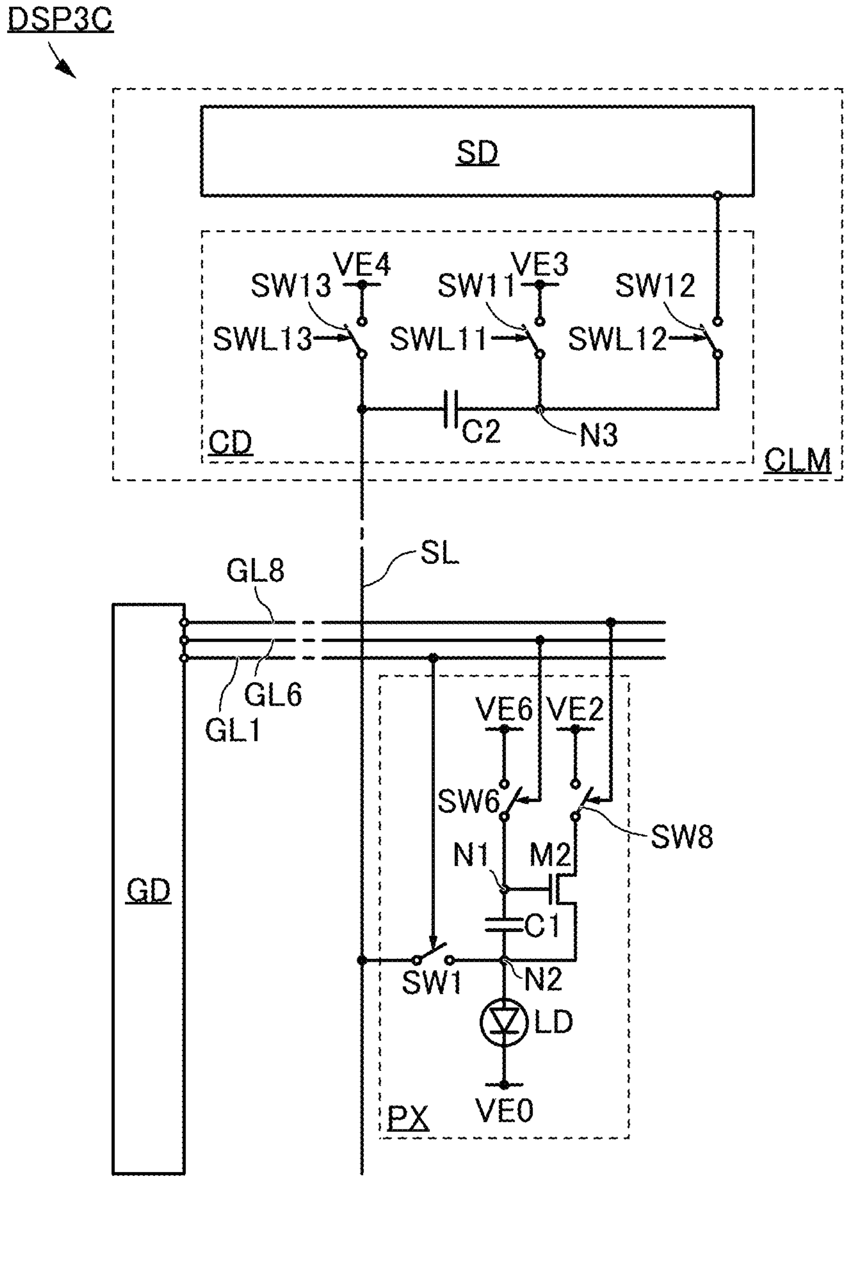
FIG. 11 is a circuit diagram illustrating a structure example of a display apparatus.

Next, FIG. 11 illustrates an example of the display apparatus DSP0 in FIG. 2, which is different from the display apparatus DSP3A in FIG. 1 and the display apparatus DSP3B in FIG. 9. A display apparatus DSP3C in FIG. 11 is a modification example of the display apparatus DSP3A in FIG. 1, and is different from the display apparatus DSP3A in FIG. 1 in that a switch SW8 is provided between the second terminal of the transistor M2 and the wiring VE2.

A first terminal of the switch SW8 is electrically connected to the second terminal of the transistor M2. A second terminal of the switch SW8 is electrically connected to the wiring VE2. A control terminal of the switch SW8 is electrically connected to a wiring GL8.

In the display apparatus DSP3C in FIG. 11, the wiring GL8 together with the wirings GL1 and GL6 correspond to one of the wirings GL[1] to GL[m] in FIG. 2. That is, in the case of the circuit configuration of the pixel PX in FIG. 11, the number of wirings GL extended per row of the pixel array ALP is three.

Figure 12:
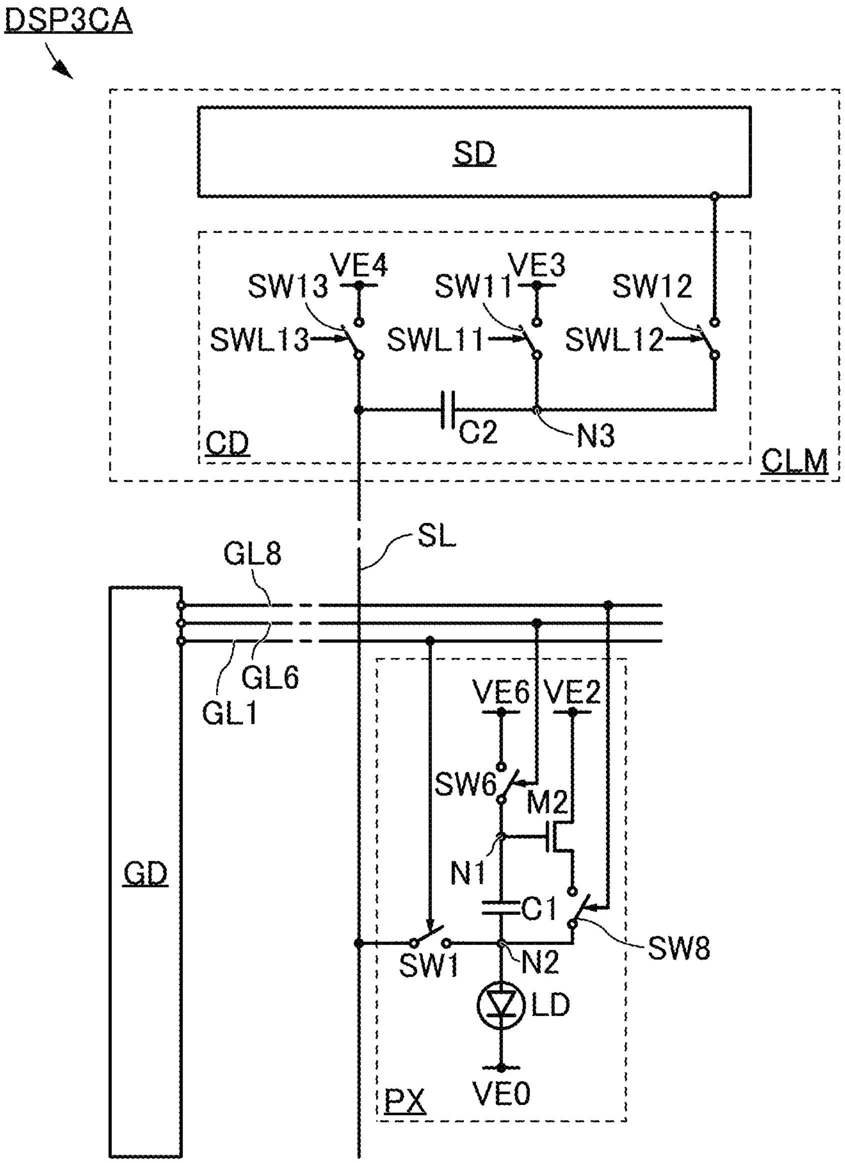
FIG. 12 is a circuit diagram illustrating a structure example of a display apparatus.

Note that the display apparatus of one embodiment of the present invention is not limited to the structure of the display apparatus DSP3C in FIG. 11. The structure of the display apparatus of one embodiment of the present invention may be changed as appropriate. For example, the structure of the display apparatus DSP3C in FIG. 11 can be changed to the structure of the display apparatus DSP3CA in FIG. 12. The display apparatus DSP3CA in FIG. 12 is a modification example of the display apparatus DSP3C in FIG. 11, and is different from the display apparatus DSP3C in that the switch SW8 is provided between the first terminal of the transistor M2 and each of the first terminal of the switch SW1, the first terminal of the capacitor C1, and the anode of the light-emitting device LD.

Example 4 of Operation Method of Display Apparatus

Next, an example of an operation method of the display apparatus DSP3C in FIG. 11 is described. Note that the operation method can be the operation method of the display apparatus DSP3CA in FIG. 12.

Figure 13A:
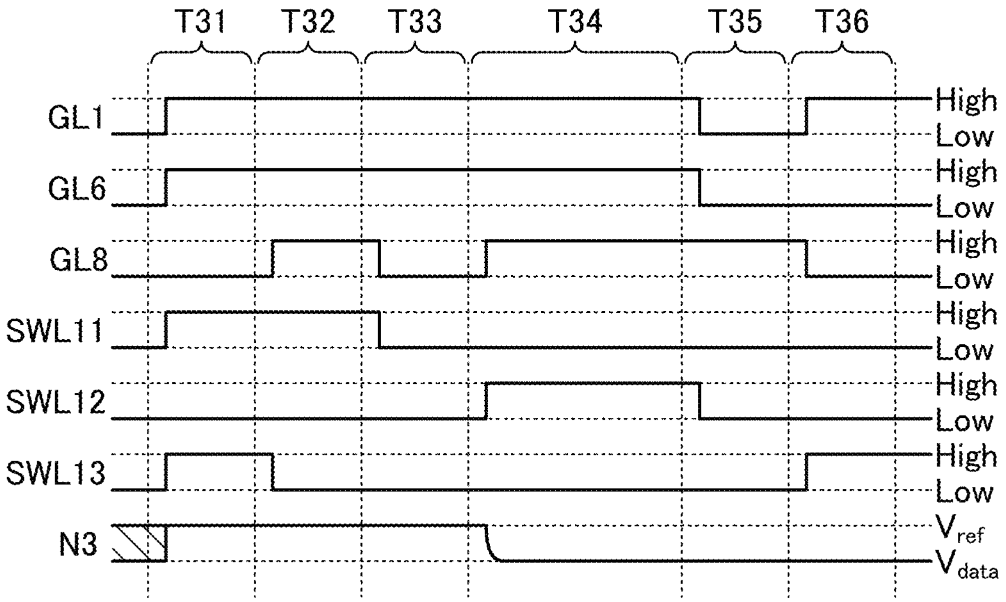
FIGS. 13A and 13B are timing charts each showing an operation method example of a display apparatus.

FIG. 13A is a timing chart showing an example of an operation method of the display apparatus DSP3C. Specifically, the timing chart in FIG. 13A is a modification example of the timing chart of FIG. 3A, and corresponds to a timing chart obtained by adding a change in the potential of the wiring GL8 to the timing chart of FIG. 3A. Therefore, for operations in the display apparatus DSP3C other than the change in the potential of the wiring GL8, description of the timing charts in FIGS. 3A to 3C can be referred to.

In the periods T31, T33, T34, and T36, a low-level potential is supplied to the wiring GL8. Thus, a low-level potential is supplied to the control terminal of the switch SW8, whereby the switch SW8 is turned off.

That is, in the periods T31, T33, and T36, the wiring VE2 and the second terminal of the transistor M2 are brought out of conduction, so that the potential $V_{ANO}$ of the wiring VE2 is not supplied to the second terminal of the transistor M2.

In the periods T32, T34, and T35, a high-level potential is supplied to the wiring GL8. Thus, a high-level potential is supplied to the control terminal of the switch SW8, whereby the switch SW8 is turned on.

That is, in the periods T32, T34, and T35, the wiring VE2 and the second terminal of the transistor M2 are brought into conduction, so that the potential $V_{ANO}$ of the wiring VE2 is supplied to the second terminal of the transistor M2.

As described above, in the display apparatus DSP3C, supply of the potential $V_{ANO}$ from the wiring VE2 to the second terminal of the transistor M2 can be prevented in periods other than the period T32 in which the threshold voltage $V_{th}$ of the transistor M2 is held in the capacitor C1, the period T34 in which the field-effect mobility of the transistor M2 is corrected, and the period T35 in which the light-emitting device LD emits light. Thus, for example, leakage current from the wiring VE2 to the second terminal of the transistor M2 can be reduced in the periods T31, T33, and T36.

Figure 13B:
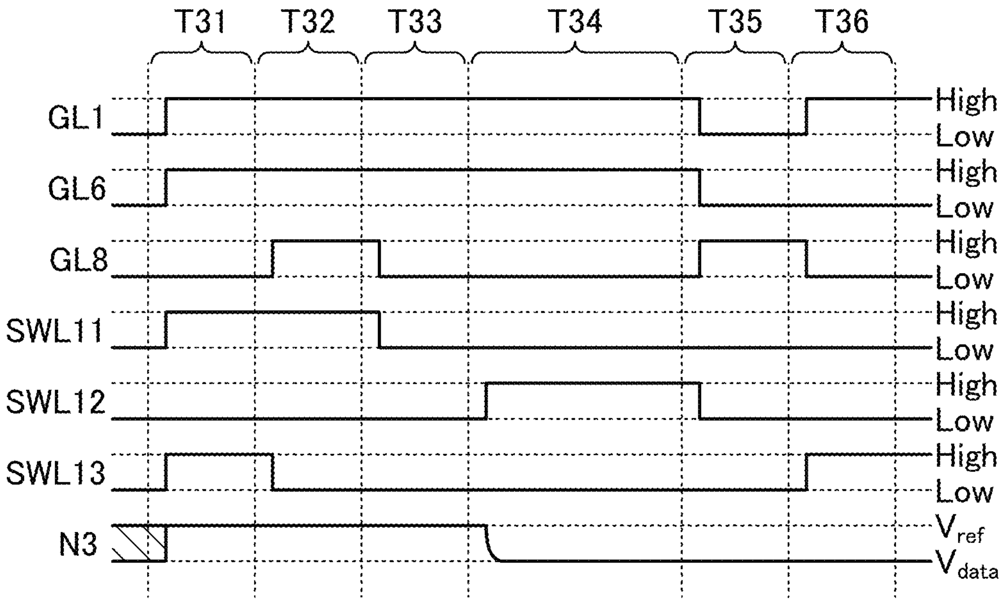

As the operation method of the display apparatus DSP3C, not the timing chart in FIG. 13A but the timing chart in FIG. 13B may be employed. The timing chart in FIG. 13B is a modification example of the timing chart in FIG. 13A, and different from FIG. 13A in that a low-level potential is supplied to the wiring GL8 in the period T34.

As shown in FIG. 13B, in the period T34, a low-level potential is supplied to the wiring GL8, whereby the switch SW8 is turned off. In the period T34, when voltage between the first terminal and the second terminal of the capacitor C1 in the pixel PX is $V_{drv1}$ (when an image data signal is supplied from the driver circuit SD to the pixel PX), the transistor M2 is turned on and the switch SW8 is turned off, whereby current does not flow between the first terminal and the second terminal of the transistor M2. That is, in the case where the field-effect mobility of the transistor M2 in the pixel PX is not corrected, the configuration of the display apparatus DSP3C may be employed for the display apparatus DSP0 and the operation of the timing chart in FIG. 13B may be performed.

As the operation method of the display apparatus DSP3CA, not the timing chart in FIG. 13A but the timing chart in FIG. 13B may be employed, like the operation method of the display apparatus DSP3C. Thus, even in the case where the configuration of the display apparatus DSP3CA is employed for the display apparatus DSP0, operation in which the field-effect mobility of the transistor M2 in the pixel PX is not corrected can be selected.

Structure Example 4 of Display Apparatus

Figure 14:
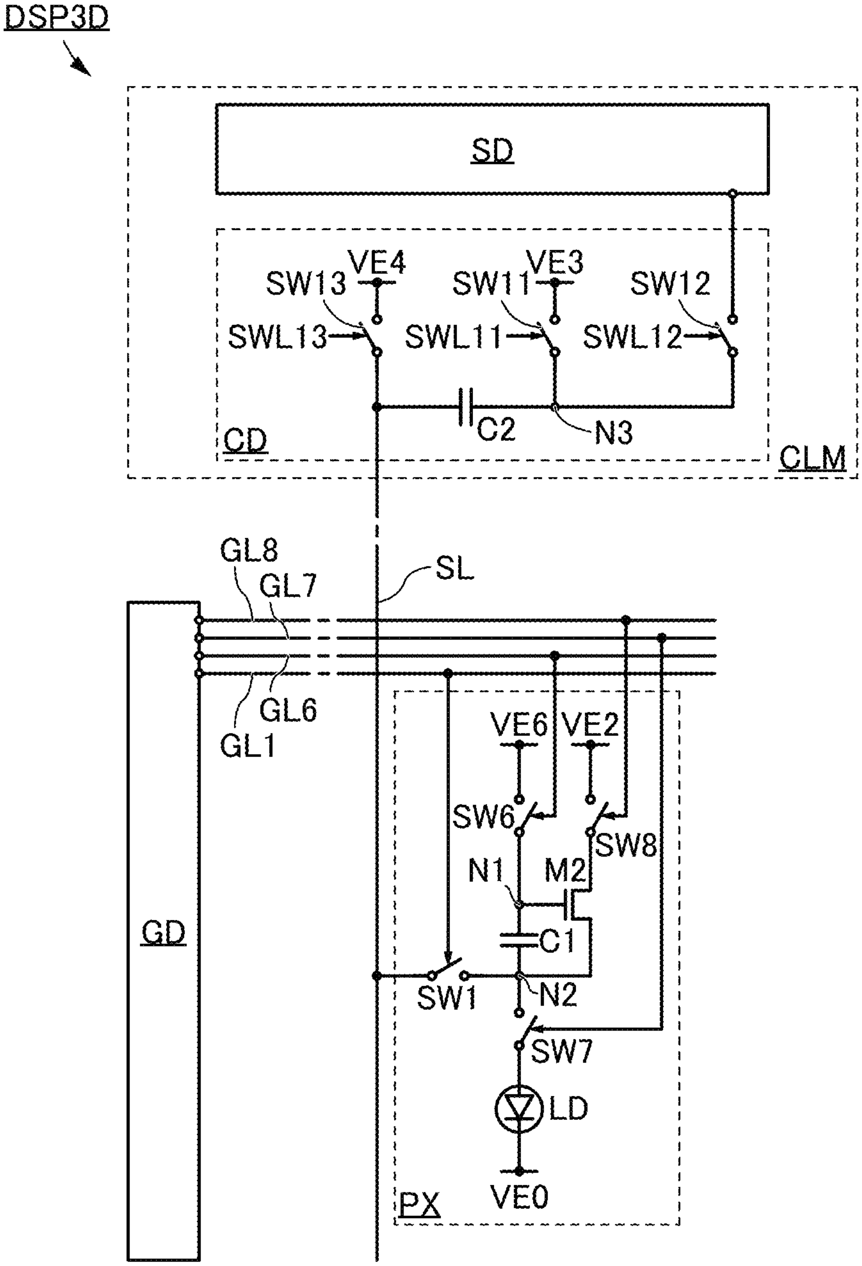
FIG. 14 is a circuit diagram illustrating a structure example of a display apparatus.

Next, FIG. 14 illustrates an example of the display apparatus DSP0 in FIG. 2 which is different from the display apparatuses DSP3A, DSP3B, DSP3C, and DSP3CA. A display apparatus DSP3D in FIG. 14 is a modification example of the display apparatus DSP3A in FIG. 1, and is different from the display apparatus DSP3A in FIG. 1 in that a switch SW7 is provided between the anode of the light-emitting device LD and each of the first terminal of the transistor M2, the first terminal of the capacitor C1, and the first terminal of the switch SW1, and that the switch SW8 is provided between the second terminal of the transistor M2 and the wiring VE2.

For the switch SW7 provided between the anode of the light-emitting device LD and each of the first terminal of the transistor M2, the first terminal of the capacitor C1, and the first terminal of the switch SW1, the description of the display apparatus DSP3B in FIG. 9 can be referred to. For the switch SW8 provided between the second terminal of the transistor M2 and the wiring VE2, the description of the display apparatus DSP3C in FIG. 11 can be referred to.

That is, thanks to the switch SW7 provided in the pixel PX as illustrated in FIG. 14, like the display apparatus DSP3B in FIG. 9, the display apparatus DSP3D can prevent the light-emitting device LD from emitting light in the period in which the threshold voltage and the field-effect mobility of the transistor M2 are corrected. In addition, thanks to the switch SW8 provided in the pixel PX as illustrated in FIG. 14, like the display apparatus DSP3C in FIG. 11, the display apparatus DSP3D can prevent supply of a potential from the wiring VE2 to the second terminal of the transistor M2 in periods other than the period in which the threshold voltage $V_{th}$ of the transistor M2 is held in the capacitor C1, the period in which the field-effect mobility of the transistor M2 is corrected, and the period in which the light-emitting device LD emits light. Like the display apparatus DSP3C, the display apparatus DSP3D can select operation in which the field-effect mobility of the transistor M2 in the pixel PX is not corrected.

Note that the display apparatus of one embodiment of the present invention is not limited to the structure of the display apparatus DSP3D in FIG. 14. The structure of the display apparatus of one embodiment of the present invention may be changed as appropriate. For example, the structure of the display apparatus DSP3D in FIG. 14 can be changed to the structure of a display apparatus DSP3DA in FIG. 15. The display apparatus DSP3DA in FIG. 15 is a modification example of the display apparatus DSP3D in FIG. 14, and is different from the display apparatus DSP3D in that the switch SW8 is provided between the first terminal of the transistor M2 and each of the first terminal of the switch SW1 and the first terminal of the capacitor C1.

Figure 15:
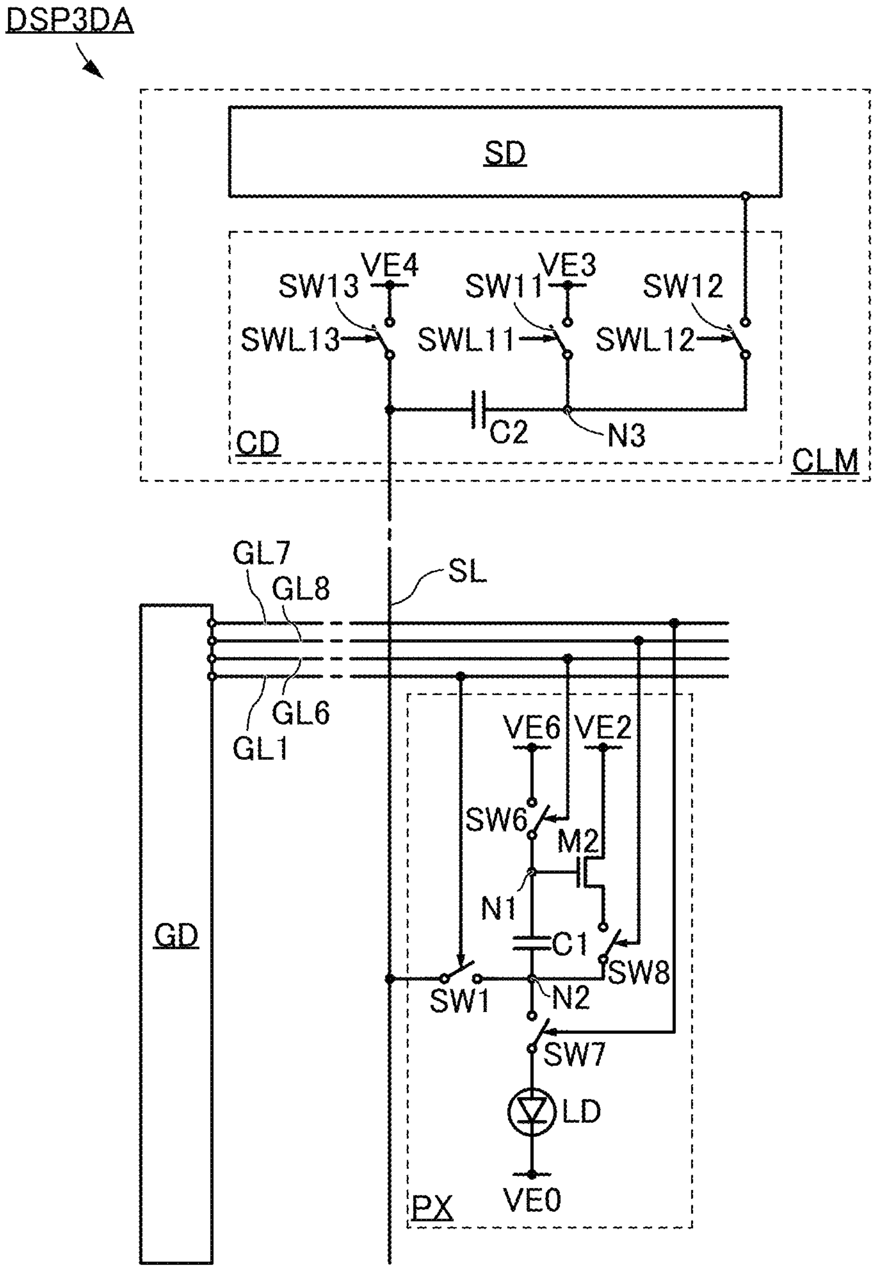
FIG. 15 is a circuit diagram illustrating a structure example of a display apparatus.

In the display apparatus DSP3DA in FIG. 15, the first terminal of the switch SW8 is electrically connected to the first terminal of the switch SW1, the second terminal of the capacitor C1, and the first terminal of the switch SW7, and the second terminal of the switch SW8 is electrically connected to the first terminal of the transistor M2.

Example 5 of Operation Method of Display Apparatus

Next, an example of an operation method of the display apparatus DSP3D in FIG. 14 is described. Note that the operation method can be the operation method of the display apparatus DSP3DA in FIG. 15.

Figure 16A:
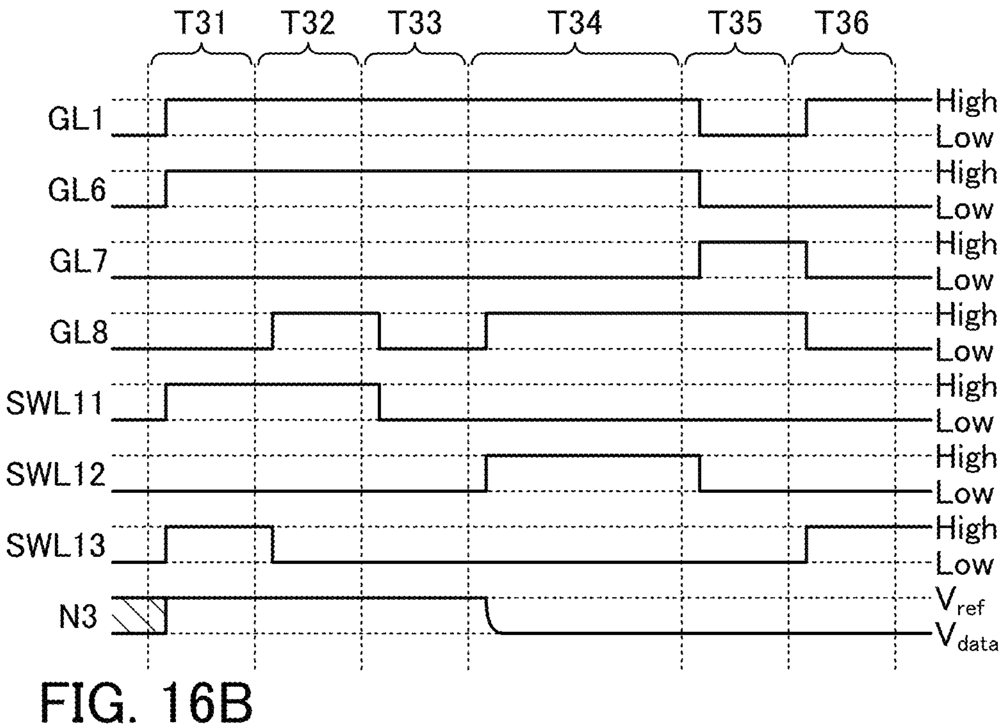
FIGS. 16A and 16B are timing charts each showing an operation method example of a display apparatus.

FIG. 16A is a timing chart showing an example of an operation method of the display apparatus DSP3D. Specifically, the timing chart in FIG. 16A is a modification example of the timing chart of FIG. 3A, and corresponds to a timing chart obtained by adding changes in the potentials of the wiring GL7 and the wiring GL8 to the timing chart of FIG. 3A. Therefore, for operations in the display apparatus DSP3D other than the changes in the potentials of the wiring GL7 and the wiring GL8, description of the timing charts in FIGS. 3A to 3C can be referred to. For a change in the potential of the wiring GL7, the description of the timing chart in FIG. 10 can be referred to. In addition, for a change in the potential of the wiring GL8, the description of the timing charts in FIGS. 13A and 13B can be referred to.

By performing the operation method example shown in the timing chart in FIG. 16A, the display apparatuses DSP3D and DSP3DA can prevent the light-emitting device LD from emitting light in the period in which the threshold voltage and the field-effect mobility of the transistor M2 are corrected, and can prevent supply of a potential from the wiring VE2 to the second terminal of the transistor M2 in periods other than the period in which the threshold voltage $V_{th}$ of the transistor M2 is held in the capacitor C1, the period in which the field-effect mobility of the transistor M2 is corrected, and the period in which the light-emitting device LD emits light.

Figure 16B:
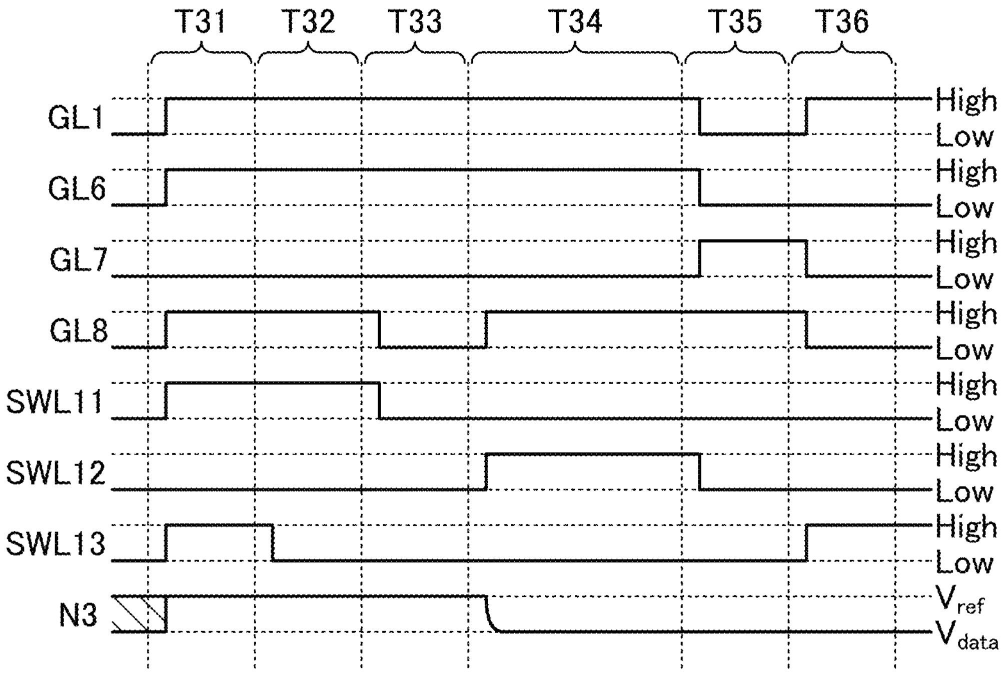

As the operation method of the display apparatus DSP3D and the display apparatus DSP3DA, not the timing chart in FIG. 16A but the timing chart in FIG. 16B may be employed. The timing chart in FIG. 16B is a modification example of the timing chart in FIG. 16A, and different from FIG. 16A in that a high-level potential is supplied to the wiring GL8 in the period T31.

As shown in FIG. 16B, in the period T31, a high-level potential is supplied to the wiring GL8, whereby the switch SW8 is turned on. In the period T31, the gate-source voltage of the transistor M2 becomes $V_{ref}-V_{init}$, and $V_{ref}-V_{init}$ is higher than the threshold voltage $V_{th}$ of the transistor M2 in some cases. In other words, the transistor M2 is turned on in some cases. In the period T31, however, current does not flow between the anode and the cathode of the light-emitting device LD even when the switch SW8 and the transistor M2 are on because the switch SW7 is off; as a result, the light-emitting device LD does not emit light.

As compared with the display apparatuses DSP3C and DSP3CA, the display apparatuses DSP3C and DSP3CA do not include the switch SW7; accordingly, if the switch SW8 is not off in the period T31, current might flow between the anode and the cathode of the light-emitting device LD through the transistor M2, resulting in light emission of the light-emitting device LD.

In the case where the switch SW7 and the switch SW8 are provided as in the display apparatus DSP3D in FIG. 14 and the display apparatus DSP3DA in FIG. 15, the switch SW8 may be on or off in the period T31 in the timing charts of FIGS. 16A and 16B.

Structure Example 5 of Display Apparatus

Figure 17:
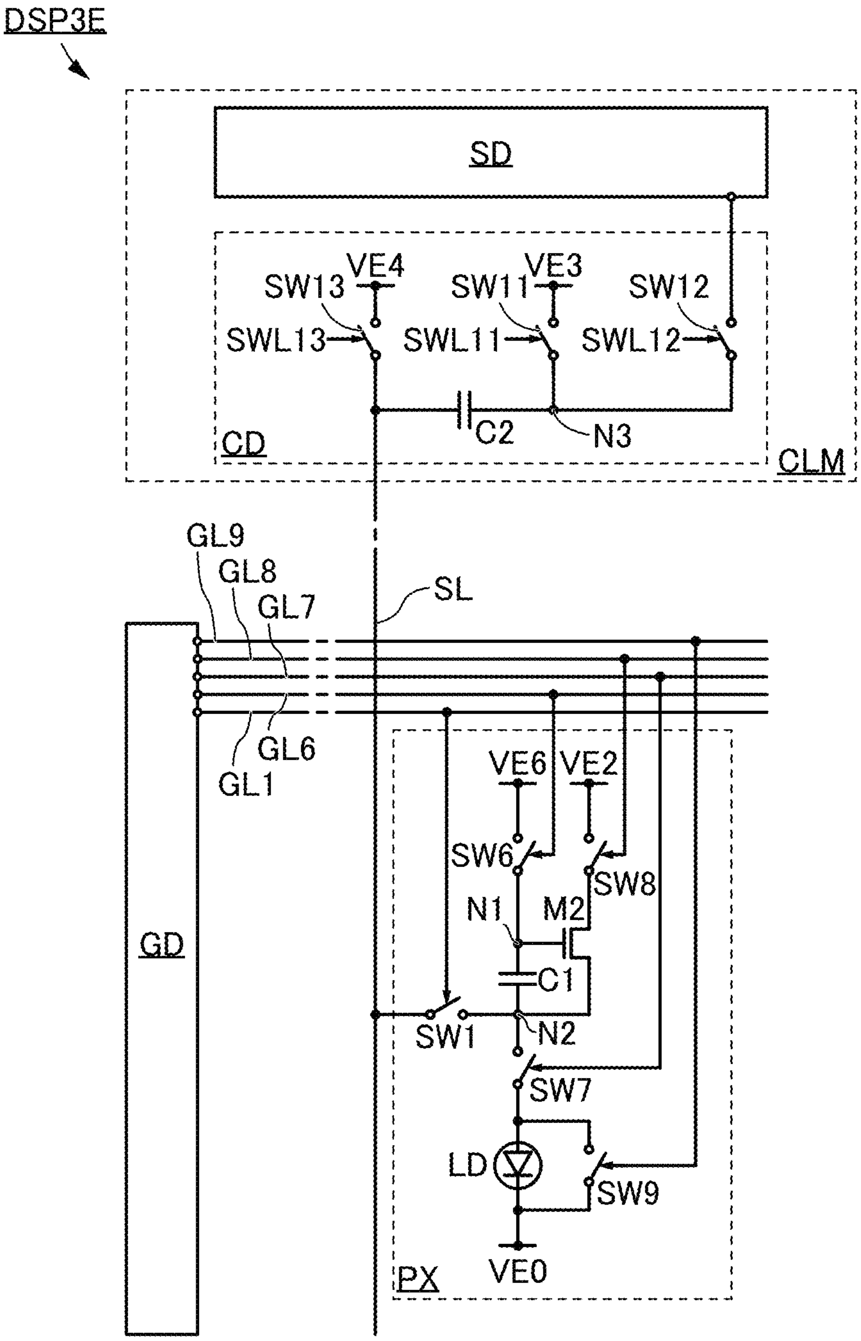
FIG. 17 is a circuit diagram illustrating a structure example of a display apparatus.

Next, FIG. 17 illustrates an example of the display apparatus DSP0 in FIG. 2 which is different from the display apparatuses DSP3A, DSP3B, DSP3C, DSP3D, DSP3CA, and DSP3DA. A display apparatus DSP3E illustrated in FIG. 17 is a modification example of the display apparatus DSP3D in FIG. 14, and different from the display apparatus DSP3D in that a switch SW9 is provided to be electrically connected to the light-emitting device LD in parallel.

A first terminal of the switch SW9 is electrically connected to the anode of the light-emitting device LD and the second terminal of the switch SW7. A second terminal of the switch SW9 is electrically connected to the anode of the light-emitting device LD and the wiring VE0. A control terminal of the switch SW9 is electrically connected to a wiring GL9.

In the display apparatus DSP3E in FIG. 17, the wiring GL9 together with the wirings GL1, GL6, GL7, and GL8 correspond to one of the wirings GL[1] to GL[m] in FIG. 2. That is, in the case of the circuit configuration of the pixel PX in FIG. 17, the number of wirings GL extended per row of the pixel array ALP is five.

Figure 18:
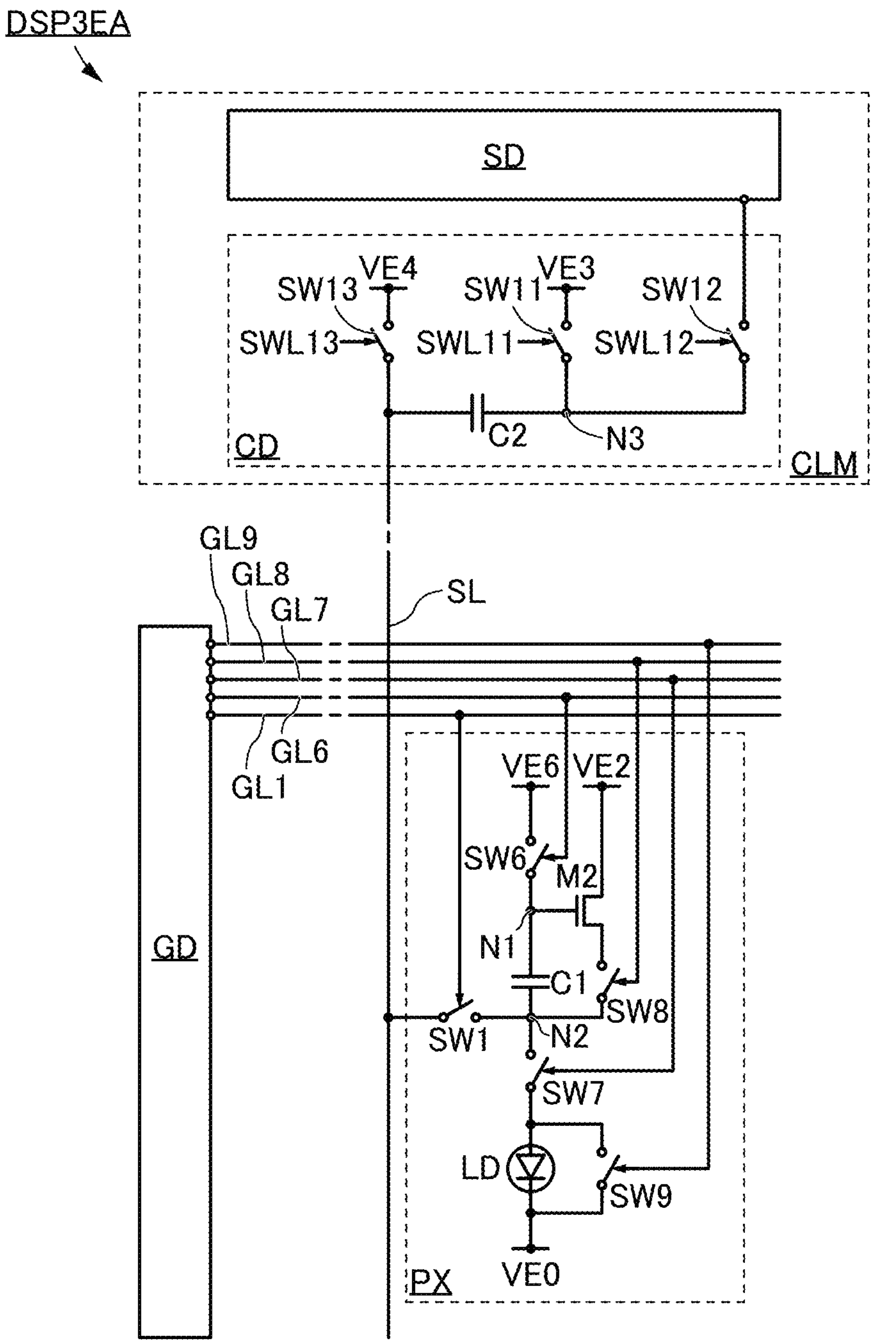
FIG. 18 is a circuit diagram illustrating a structure example of a display apparatus.

Note that the display apparatus of one embodiment of the present invention is not limited to the structure of the display apparatus DSP3E in FIG. 17. The structure of the display apparatus of one embodiment of the present invention may be changed as appropriate. For example, the structure of the display apparatus DSP3E in FIG. 17 can be changed to the structure of a display apparatus DSP3EA in FIG. 18. The display apparatus DSP3EA in FIG. 18 is a modification example of the display apparatus DSP3E in FIG. 17, and is different from the display apparatus DSP3E in that the switch SW8 is provided between the first terminal of the transistor M2 and each of the first terminal of the switch SW1, the first terminal of the capacitor C1, and the first terminal of the switch SW7.

Example 6 of Operation Method of Display Apparatus

Next, an example of an operation method of the display apparatus DSP3E in FIG. 17 is described. Note that the operation method can be the operation method of the display apparatus DSP3EA in FIG. 18.

Figure 19:
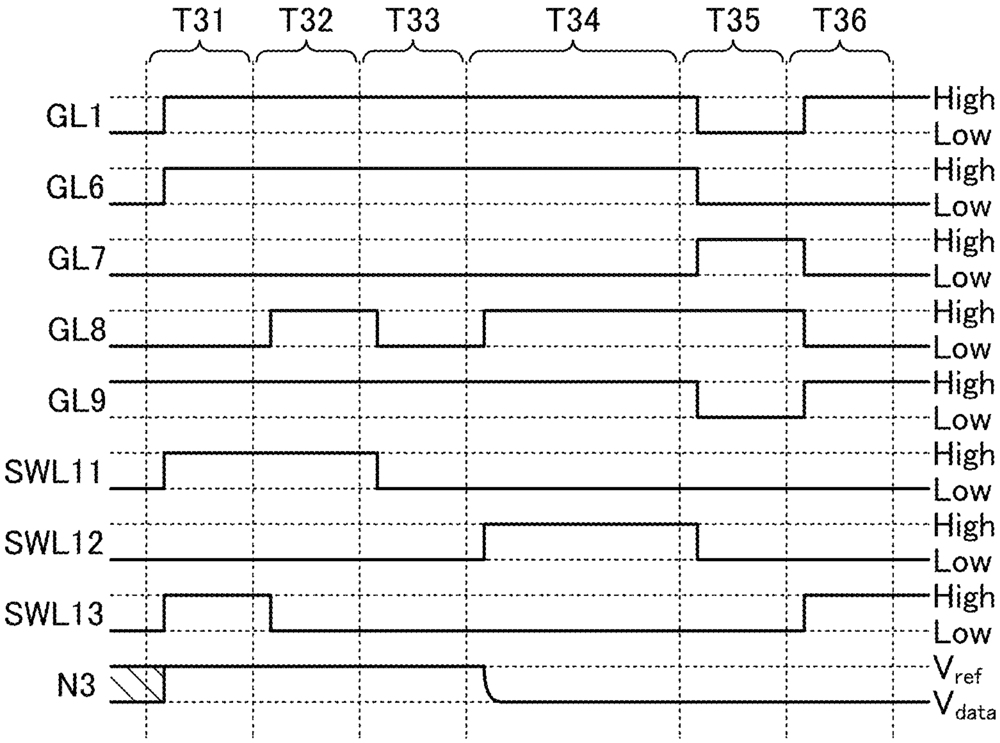
FIG. 19 is a timing chart showing an operation method example of a display apparatus.

FIG. 19 is a timing chart showing an example of an operation method of the display apparatus DSP3E. Specifically, the timing chart in FIG. 19 is a modification example of the timing chart of FIG. 16A, and corresponds to a timing chart obtained by adding a change in the potential of the wiring GL9 to the timing chart of FIG. 16A. Therefore, for operations in the display apparatus DSP3E other than the change in the potential of the wiring GL9, description of the timing chart in FIG. 16A can be referred to.

In the period T35, a low-level potential is supplied to the wiring GL9. Thus, a low-level potential is supplied to the control terminal of the switch SW9, whereby the switch SW9 is turned off.

That is, in the period T35, the anode of the light-emitting device LD and each of the wiring VE0 and the cathode of the light-emitting device LD are brought out of conduction, so that a potential $V_{CT}$ is not supplied from the wiring VE0 to the anode of the light-emitting device LD through the switch SW9. In contrast, in the period T35, since the switch SW7 and the switch SW8 are on, current from the wiring VE2 flows through the anode of the light-emitting device LD. Thus, the light-emitting device LD emits light.

In the periods T31 to T34 and T36, a high-level potential is supplied to the wiring GL9. Thus, a high-level potential is supplied to the control terminal of the switch SW9, whereby the switch SW9 is turned on.

That is, in the periods T31 to T34 and T36, the anode of the light-emitting device LD and each of the wiring VE0 and the cathode of the light-emitting device LD are brought into conduction, and thus the anode-cathode voltage of the light-emitting device LD becomes 0 V. Since the switch SW7 is off, current does not flow between the node N2 and the anode of the light-emitting device LD through the switch SW7.

In particular, although the periods T31 to T34 and T36 are originally periods in which the light-emitting device LD does not emit light, by turning on the switch SW9 in these periods, electric charge accumulated in the anode of the light-emitting device LD can be discharged to the wiring VE0 through the switch SW9. That is, in the period in which the light-emitting device LD does not emit light, the display apparatuses DSP3E and DSP3EA can discharge electric charges accumulated in the anode of the light-emitting device LD at a higher speed than the display apparatuses not including the switch SW9 (e.g., the display apparatuses DSP3A, DSP3B, DSP3C, DSP3D, DSP3CA, and DSP3DA). This can shift the emission state of the light-emitting device LD to the quenching state.

Structure Example 6 of Display Apparatus

Figure 20:
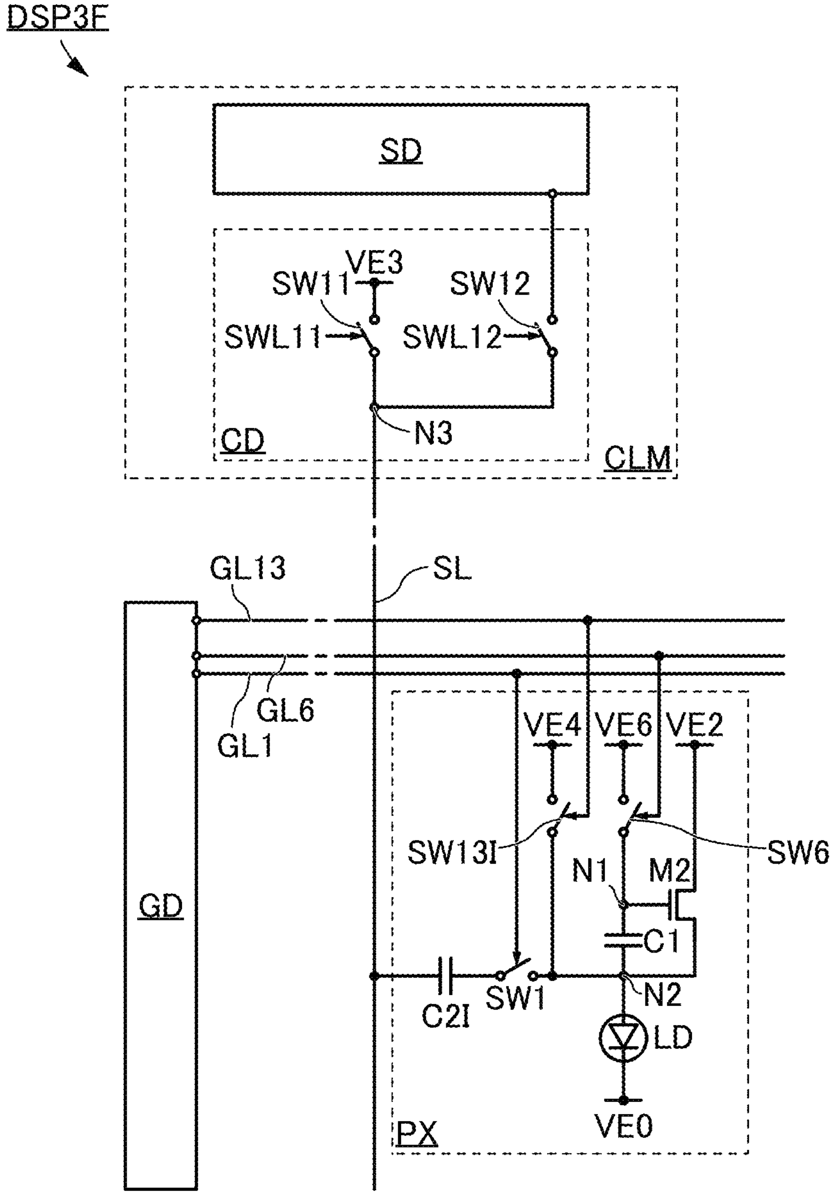
FIG. 20 is a circuit diagram illustrating a structure example of a display apparatus.

Next, FIG. 20 illustrates an example of the display apparatus DSP0 in FIG. 2 which is different from the display apparatuses DSP3A, DSP3B, DSP3C, DSP3D, DSP3E, DSP3CA, DSP3DA, and DSP3EA. A display apparatus DSP3F illustrated in FIG. 20 is a modification example of the display apparatus DSP3A in FIG. 1, and different from the display apparatus DSP3A in that a switch SW13I and a capacitor C2I are provided in the pixel PX and the switch SW13 and the capacitor C2 are not provided in the circuit CD.

Thus, for portions in the display apparatus DSP3F in common with the display apparatus DSP3A, the description of the display apparatus DSP3A can be referred to.

In the display apparatus DSP3F, a first terminal of the switch SW13I is electrically connected to the first terminal of the switch SW1, the first terminal of the capacitor C1, the first terminal of the transistor M2, and the anode of the light-emitting device LD. A second terminal of the switch SW13I is electrically connected to the wiring VE4. A control terminal of the switch SW13I is electrically connected to a wiring GL13.

A first terminal of the capacitor C2I is electrically connected to the second terminal of the switch SW1. A second terminal of the capacitor C2I is electrically connected to the wiring SL.

The first terminal of the switch SW11 is electrically connected to the wiring SL and the first terminal of the switch SW12.

The wiring GL13 together with the wirings GL1 and GL6 correspond to one of the wirings GL[1] to GL[m] in FIG. 2. That is, in the case of the circuit configuration of the pixel PX in FIG. 20, the number of wirings GL extended per row of the pixel array ALP is three.

Note that in the display apparatus DSP3F, a point where the first terminal of the switch SW1, the first terminal of the switch SW13I, the first terminal of the capacitor C1, the first terminal of the transistor M2, and the anode of the light-emitting device LD are electrically connected is referred to as the node N2. A point where the first terminal of the switch SW11, the first terminal of the switch SW12, and the second terminal of the capacitor C2I are electrically connected is referred to as the node N3. Note that in the description of this structure example of the display apparatus DSP3F, the node N3 can be replaced with the wiring SL in some cases.

In the display apparatus DSP3F, the switch SW13I and the capacitor C2I correspond to the switch SW13 and the capacitor C2, respectively, in the display apparatus DSP3A. The wiring GL13 corresponds to the wiring SWL13. In other words, the display apparatus DSP3F has a structure in which the switch SW13 and the capacitor C2 included in the circuit CD in the display apparatus DSP3A are provided in the pixel PX as the switch SW13I and the capacitor C2I. For this reason, the operation method of the display apparatus DSP3F can be described in some cases in such a manner that the switch SW13, the capacitor C2, and the wiring SWL13 in the operation method of the display apparatus DSP3A are replaced with the switch SW13I, the capacitor C2I, and the wiring GL13, respectively.

The display apparatus DSP3F can correct the threshold voltage and the field-effect mobility of the transistor M2 in the pixel PX to display an image on the pixel PX by employing the operation method similar to that of the display apparatus DSP3A.

Note that the structure of the display apparatus of one embodiment of the present invention is not limited to the structure of the display apparatus DSP3F. The structure of the display apparatus of one embodiment of the present invention may be the structure of the display apparatus DSP3F in FIG. 20 on which some modification is performed as appropriate.

Figure 21:
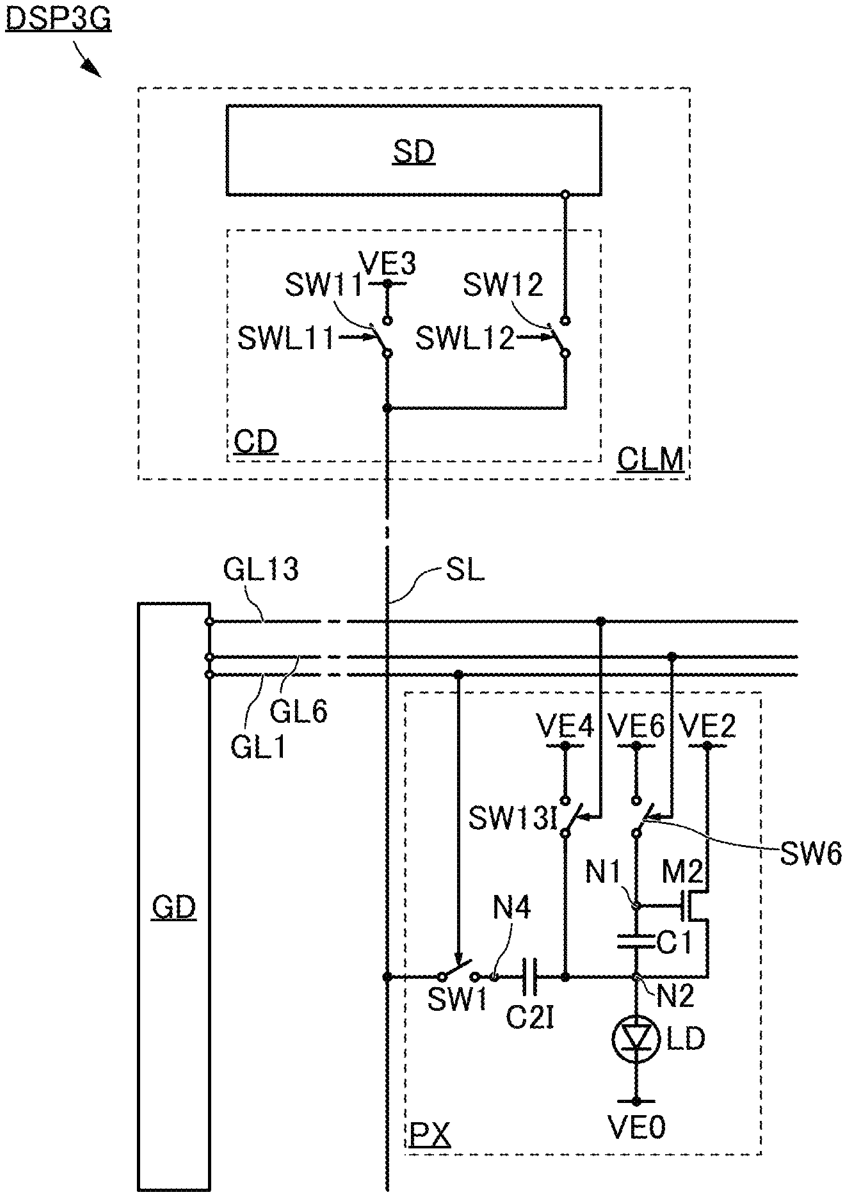
FIG. 21 is a circuit diagram illustrating a structure example of a display apparatus.

FIG. 21 illustrates a modification example of the display apparatus DSP3F in FIG. 20. A display apparatus DSP3G illustrated in FIG. 21 is different from the display apparatus DSP3F in FIG. 20 in that the second terminal of the switch SW1 is electrically connected not to the first terminal of the capacitor C2I but to the wiring SL, the first terminal of the switch SW1 is electrically connected not to the anode of the light-emitting device LD but to the second terminal of the capacitor C2I, and the first terminal of the capacitor C2I is electrically connected to the anode of the light-emitting device LD.

In other words, in an electrical path between the wiring SL and the wiring VE0 in the display apparatus DSP3F, the capacitor C2I, the switch SW1, and the light-emitting device LD are provided in this order, whereas, in an electrical path between the wiring SL and the wiring VE0 in the display apparatus DSP3G, the switch SW1, the capacitor C2I, and the light-emitting device LD are provided in this order.

Note that in this embodiment, a point where the first terminal of the switch SW1 and the second terminal of the capacitor C2I are electrically connected is referred to as a node N4 in the display apparatus DSP3F in FIG. 20.

In the display apparatus DSP3G, the switch SW13I and the capacitor C2I correspond to the switch SW13 and the capacitor C2, respectively, in the display apparatus DSP3A. The wiring GL13 corresponds to the wiring SWL13. The node N4 corresponds to the node N3 in the display apparatus DSP3A. In other words, a display apparatus DSP3GA has a structure in which the switch SW13 and the capacitor C2 included in the circuit CD in the display apparatus DSP3A are provided in the pixel PX as the switch SW13I and the capacitor C2I. For this reason, the operation method of the display apparatus DSP3GA can be described in some cases in such a manner that the switch SW13, the capacitor C2, the node N4, and the wiring SWL13 in the operation method of the display apparatus DSP3A are replaced with the switch SW13I, the capacitor C2I, the node N3, and the wiring GL13, respectively.

The display apparatus DSP3G can correct the threshold voltage and the field-effect mobility of the transistor M2 in the pixel PX to display an image on the pixel PX by employing the operation method similar to that of the display apparatus DSP3A.

Figure 22:
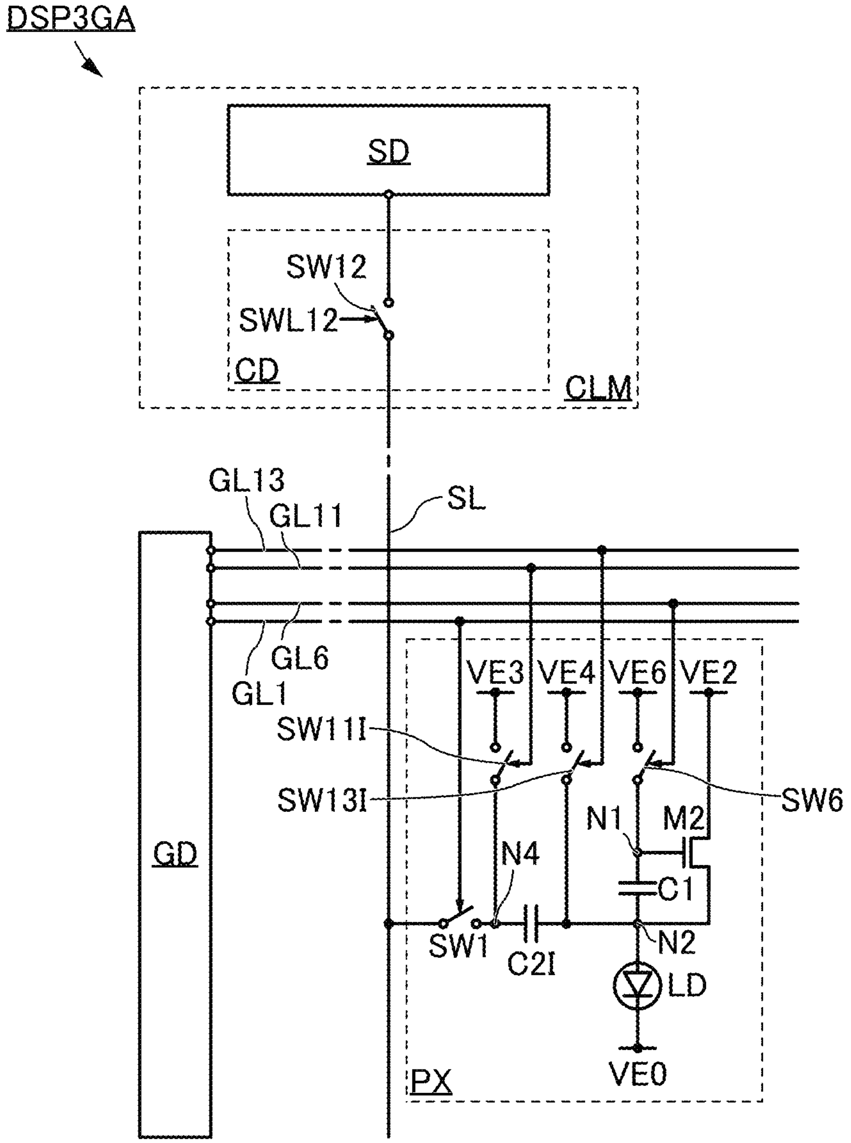
FIG. 22 is a circuit diagram illustrating a structure example of a display apparatus.

FIG. 22 illustrates a modification example of the display apparatus DSP3G in FIG. 21. The display apparatus DSP3GA in FIG. 22 is different from the display apparatus DSP3G in that a switch SW11I is provided in the pixel PX and the switch SW11 is not provided in the circuit CD. That is, the display apparatus DSP3GA in FIG. 22 is different from the display apparatus DSP3A in that the switch SW11I, the switch SW13I, and the capacitor C2I are provided in the pixel PX and the switch SW11, the switch SW13, and the capacitor C2 are not provided in the circuit CD.

In the display apparatus DSP3GA, a first terminal of the switch SW11I is electrically connected to the first terminal of the switch SW1 and the second terminal of the capacitor C2I. A second terminal of the switch SW11I is electrically connected to the wiring VE3. A control terminal of the switch SW11I is electrically connected to a wiring GL11.

The first terminal of the capacitor C2I is electrically connected to the first terminal of the switch SW13I, the first terminal of the capacitor C1, the first terminal of the transistor M2, and the anode of the light-emitting device LD. The second terminal of the switch SW1 is electrically connected to the wiring SL.

The first terminal of the switch SW12 is electrically connected to the wiring SL.

The wiring GL11 together with the wirings GL1, GL6, and GL13 correspond to one of the wirings GL[1] to GL[m] in FIG. 2. That is, in the case of the circuit configuration of the pixel PX in FIG. 22, the number of wirings GL extended per row of the pixel array ALP is four.

In the display apparatus DSP3GA, the switch SW13I and the capacitor C2I correspond to the switch SW13 and the capacitor C2, respectively, in the display apparatus DSP3A. The wiring GL13 corresponds to the wiring SWL13. The switch SW11I corresponds to the switch SW11 in the display apparatus DSP3A. The wiring GL11 corresponds to the wiring SWL11. The node N4 corresponds to the node N3 in the display apparatus DSP3A. In other words, the display apparatus DSP3GA has a structure in which the switch SW11, the switch SW13, and the capacitor C2 included in the circuit CD in the display apparatus DSP3A are provided in the pixel PX as the switch SW11I, the switch SW13I and the capacitor C2I. For this reason, the operation method of the display apparatus DSP3GA can be described in some cases in such a manner that the switch SW11, the switch SW13, the capacitor C2, the node N3, the wiring SWL13, and the wiring SWL11 in the operation method of the display apparatus DSP3A are replaced with the switch SW11I, the switch SW13I, the capacitor C2I, the node N4, the wiring GL13, and the wiring GL11, respectively.

The display apparatus DSP3GA can correct the threshold voltage and the field-effect mobility of the transistor M2 in the pixel PX to display an image on the pixel PX by employing the operation method similar to that of the display apparatus DSP3A.

As described in the operation method example of the display apparatus DSP3A, a potential supplied by the wiring VE3 and a potential supplied by the wiring VE6 can be equal to each other. In that case, the wiring VE3 and the wiring VE6 may be one wiring. As an example, FIG. 23 illustrates a display apparatus DSP3GB in which the wiring VE3 serves as the wiring VE3 and the wiring VE6 in the display apparatus DSP3GA.

Figure 23:
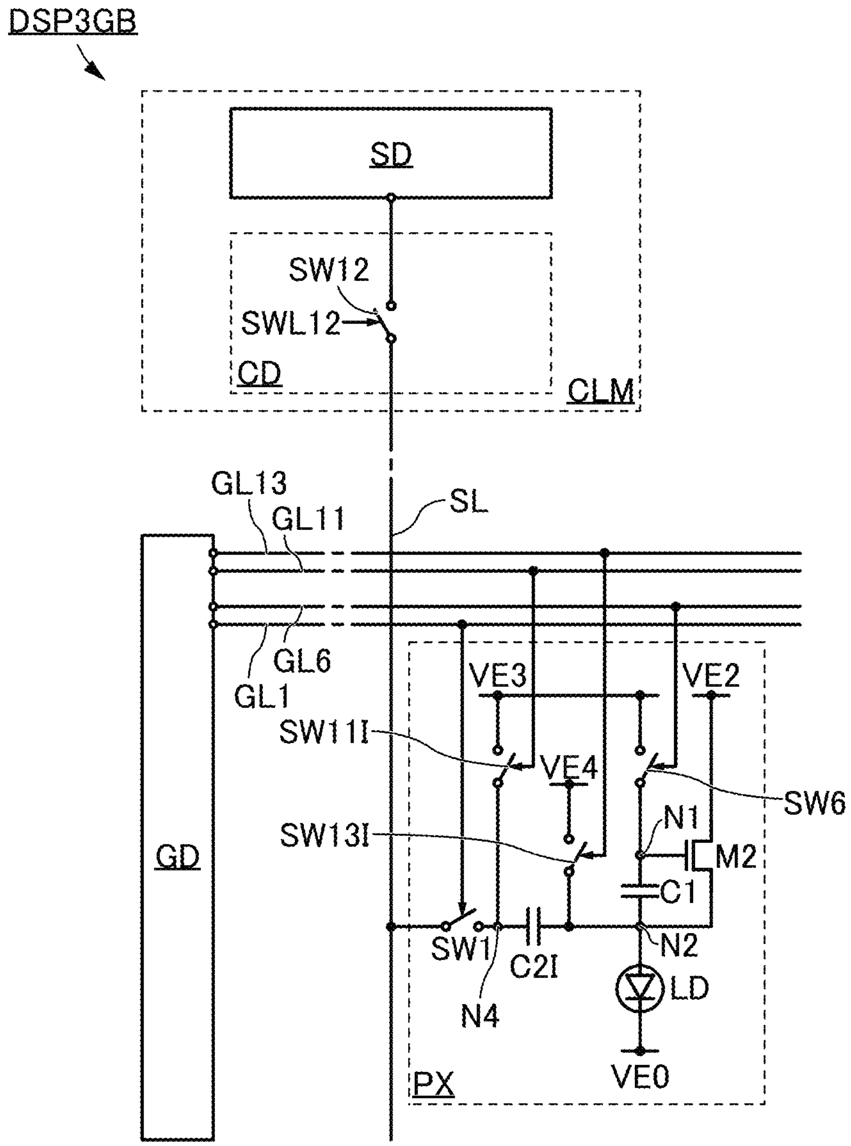
FIG. 23 is a circuit diagram illustrating a structure example of a display apparatus.
Figure 24:
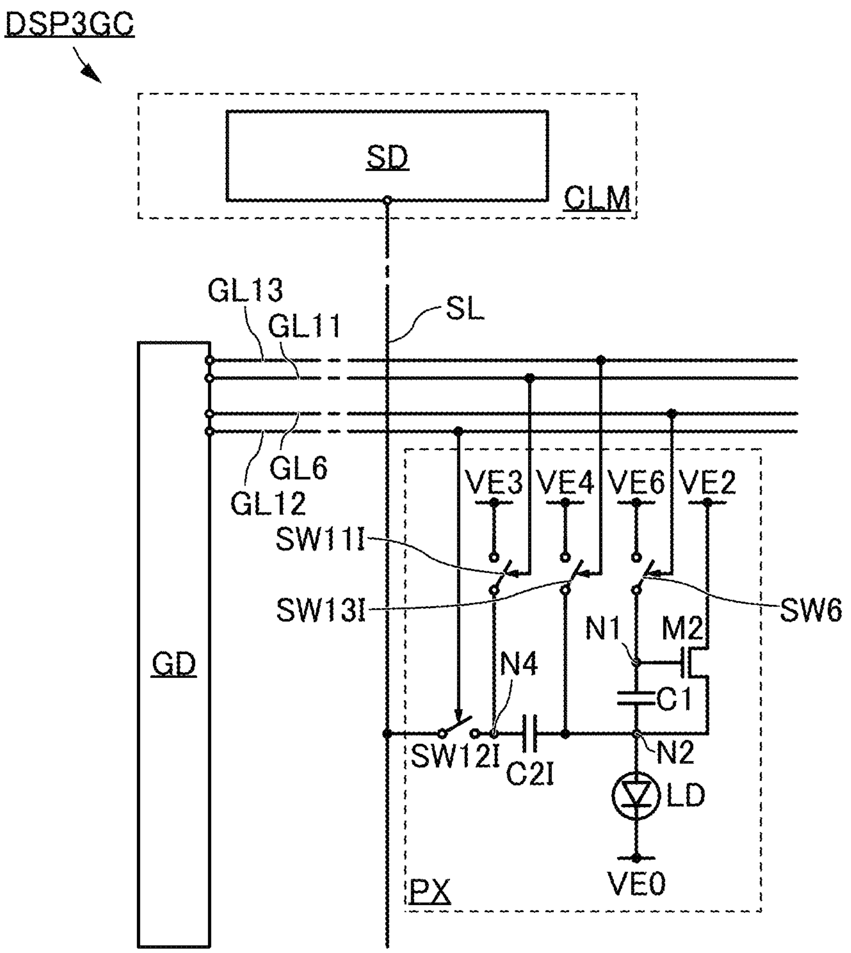
FIG. 24 is a circuit diagram illustrating a structure example of a display apparatus.

FIG. 24 illustrates another modification example of the display apparatus DSP3G, which is different from the display apparatus DSP3GA in FIG. 22 and the display apparatus DSP3GB in FIG. 23. The display apparatus DSP3GC in FIG. 24 is another modification example of the display apparatus DSP3GB in FIG. 22, and is different from display apparatus DSP3GB in that the switch SW12 is not provided in the circuit CD. That is, the display apparatus DSP3GC in FIG. 24 is different from the display apparatus DSP3A in that the switch SW11I, the switch SW12I, the switch SW13I, and the capacitor C2I are provided in the pixel PX and the circuit CD is not provided in the column driver circuit CLM.

Note that in the display apparatus DSP3GC, for convenience, the switch SW1 in the display apparatus DSP3GA is denoted by a switch SW12I, and the wiring GL1 in the display apparatus DSP3GA is denoted by a wiring GL12.

In the display apparatus DSP3GC, the driver circuit SD is electrically connected to the wiring SL, and the wiring SL is electrically connected to a second terminal of the switch SW12I.

The display apparatus DSP3GC has a structure in which the switch SW12I serves as the switch SW12 provided in the circuit CD and the switch SW1 provided in the pixel PX in the display apparatus DSP3GA. Accordingly, the structure of the display apparatus DSP3GA can be changed to a structure in which the switch SW12 is not provided in the circuit CD as in the display apparatus DSP3GC in FIG. 24.

The operation method of the display apparatus DSP3GC can be described in some cases in such a manner that the switch SW11, the switch SW13, the capacitor C2, the node N3, the wiring SWL13, the wiring SWL11, and the wiring SWL12 in the operation method of the display apparatus DSP3A are replaced with the switch SW11I, the switch SW13I, the capacitor C2I, the node N4, the wiring GL13, the wiring GL11, and the wiring GL12, respectively. Note that the signal supplied by the wiring GL1 in the display apparatus DSP3A is not necessarily considered in the display apparatus DSP3GC.

As described in this embodiment, in the display apparatus DSP3A in FIG. 1 and the modification examples thereof, the potential of the image data signal is changed by the capacitor C1 in the pixel PX and the capacitor C2 outside the pixel PX. Accordingly, the amount of current flowing through the light-emitting device LD can be controlled precisely. The precise control of the current amount can reduce a region (a light-emitting surface) of the light-emitting device, resulting in high definition of the display apparatus. Furthermore, the display apparatus DSP3A in FIG. 1 and the modification examples thereof can correct the threshold voltage of the transistor M2 before writing of image data to the pixel PX and correct the field-effect mobility of the transistor M2 after the writing of image data. Since the emission luminance of the light-emitting device LD is determined by the amount of current flowing between the anode and the cathode, the above-described correction can make current with an appropriate amount flow through the light-emitting device LD, increasing the display quality of the display apparatus.

Note that this embodiment can be combined with any of the other embodiments in this specification as appropriate.

Embodiment 2

In this embodiment, a display apparatus of one embodiment of the present invention that is different from the display apparatus DSP3A in Embodiment 1 will be described.

Structure Example 1 of Display Apparatus

Figure 25:
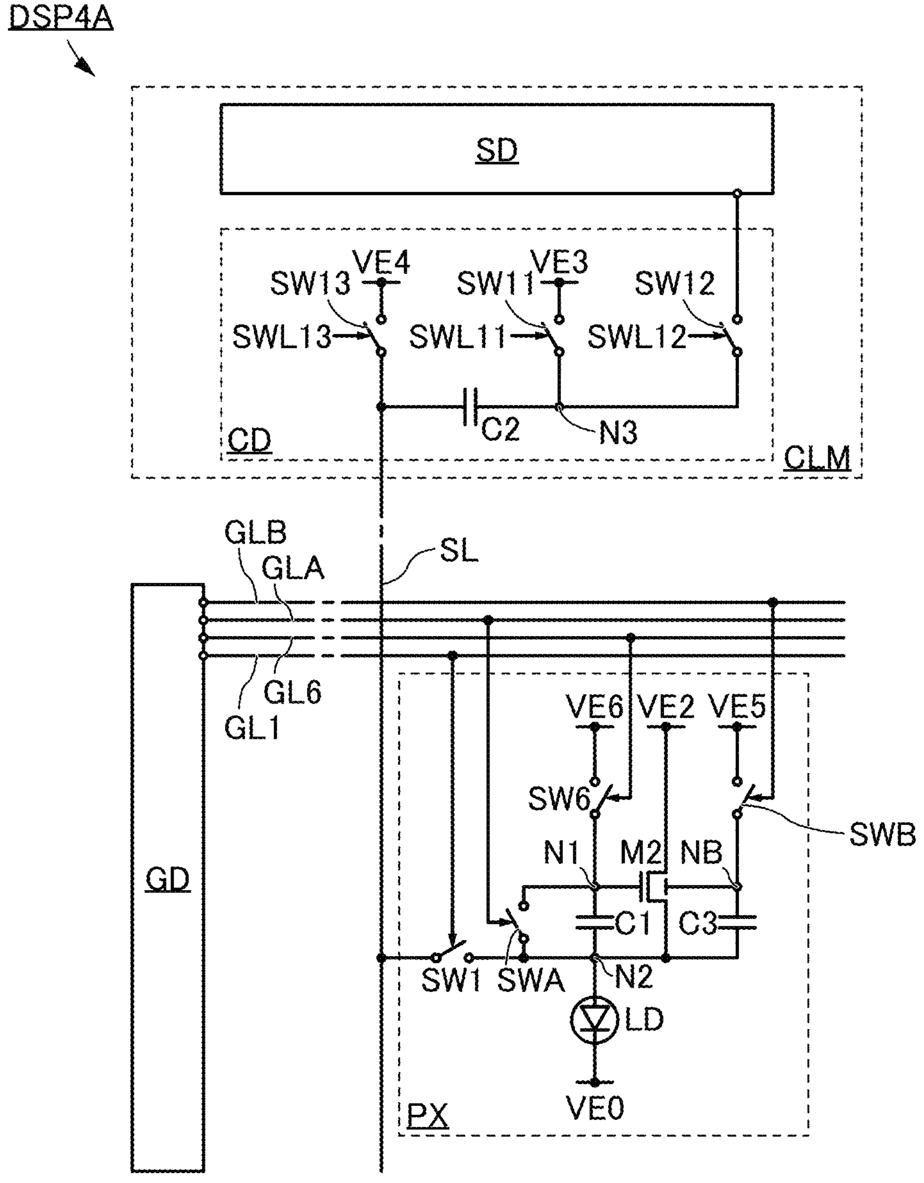
FIG. 25 is a circuit diagram illustrating a structure example of a display apparatus.

FIG. 25 illustrates structure examples of the pixel PX and the circuit CD which can be used for the display apparatus DSP0 in FIG. 2 described in Embodiment 1. FIG. 25 illustrates a display apparatus DSP4A. Like FIG. 1, FIG. 25 selectively illustrates one of the plurality of pixels PX included in the pixel array ALP, the driver circuit GD of the row driver circuit RWD to which the pixel PX is electrically connected, and the circuit CD and the driver circuit SD in the column driver circuit CLM.

The pixel PX in the display apparatus DSP4A in FIG. 25 includes the transistor M2, the switch SW1, the switch SW6, a switch SWA, a switch SWB, the capacitor C1, a capacitor C3, and the light-emitting device LD, for example. The circuit CD includes the switch SW11, the switch SW12, the switch SW13, and the capacitor C2.

Note that as the transistor M2 illustrated in FIG. 25, a transistor usable as the transistor M2 illustrated in FIG. 1 can be used. Note that the transistor M2 in FIG. 25 is different from the transistor M2 in FIG. 1 in including a back gate.

As the switches SW1, SW6, SWA, SWB, SW11, SW12, and SW13 illustrated in FIG. 25, switches usable as the switches SW1, SW6, SW11, SW12, and SW13 illustrated in FIG. 1 can be used.

Note that each of the switches SW1, SW6, SWA, SWB, SW11, SW12, and SW13 illustrated in FIG. 25 in this specification and the like is on when a high-level potential is applied to a control terminal and off when a low-level potential is applied to the control terminal.

For the light-emitting device LD, the description of the light-emitting device LD in Embodiment 1 can be referred to.

In the pixel PX, the first terminal of the switch SW1 is electrically connected to a first terminal of the switch SWA, the first terminal of the transistor M2, the first terminal of the capacitor C1, a first terminal of the capacitor C3, and the anode of the light-emitting device LD; the second terminal of the switch SW1 is electrically connected to the wiring SL; and the control terminal of the switch SW1 is electrically connected to the wiring GL1. A second terminal of the switch SWA is electrically connected to the first terminal of the switch SW6, the gate of the transistor M2, and the second terminal of the capacitor C1, and a control terminal of the switch SWA is electrically connected to the wiring GLA. The second terminal of the switch SW6 is electrically connected to the wiring VE6, and the control terminal of the switch SW6 is electrically connected to the wiring GL6. The second terminal of the transistor M2 is electrically connected to the wiring VE2, and the back gate of the transistor M2 is electrically connected to a second terminal of the capacitor C3 and a first terminal of the switch SWB. A second terminal of the switch SWB is electrically connected to a wiring VE5, and a control terminal of the switch SWB is electrically connected to the wiring GLB. The cathode of the light-emitting device LD is electrically connected to a wiring VE0.

Note that in this embodiment, a point where the first terminal of the switch SW1, the first terminal of the switch SWA, the first terminal of the transistor M2, the first terminal of the capacitor C1, the first terminal of the capacitor C3, and the anode of the light-emitting device LD are electrically connected is referred to as the node N2. A point where the gate of the transistor M2, the second terminal of the capacitor C1, the second terminal of the switch SWA, and the first terminal of the switch SW6 are electrically connected is referred to as the node N1. A point where the back gate of the transistor M2, the second terminal of the capacitor C3, and the first terminal of the switch SWB are electrically connected is referred to as a node NB.

In the circuit CD, the first terminal of the capacitor C2 is electrically connected to the wiring SL and the first terminal of the switch SW13, and the second terminal of the capacitor C2 is electrically connected to the first terminal of the switch SW11 and the first terminal of the switch SW12. The second terminal of the switch SW11 is electrically connected to the wiring VE3, and the control terminal of the switch SW11 is electrically connected to the wiring SWL11. The second terminal of the switch SW12 is electrically connected to the driver circuit SD, and the control terminal of the switch SW12 is electrically connected to the wiring SWL12. The second terminal of the switch SW13 is electrically connected to the wiring VE4, and the control terminal of the switch SW13 is electrically connected to the wiring SWL13.

Note that in this embodiment, the point where the first terminal of the switch SW11, the first terminal of the switch SW12, and the second terminal of the capacitor C2 are electrically connected is referred to as the node N3.

Each of the wirings VE0 and VE2 to VE6 functions as a wiring for supplying a constant potential, for example. That is, each of the wirings VE0 and VE2 to VE6 may function as a power supply line. The constant potentials supplied by the wirings VE0 and VE2 to VE6 may be equal to or different from one another. Alternatively, some of the potentials supplied by the wirings VE0 and VE2 to VE6 may be equal and the other of the potentials may be different. The wirings VE0 and VE2 to VE6 may serve as a wiring for supplying a pulse potential not a constant potential.

In particular, in the pixel PX in FIG. 25, the wiring VE0 preferably serves as a wiring for supplying a potential to the cathode of the light-emitting device LD. The wiring VE2 preferably serves as a wiring for supplying a potential to the anode of the light-emitting device LD.

Note that in the light-emitting device LD in the pixel PX in FIG. 25, the anode is electrically connected to the first terminal of the transistor M2, the first terminal of the switch SW1, the first terminal of the switch SWA, the first terminal of the capacitor C1, and the first terminal of the capacitor C3, and the cathode is electrically connected to the wiring VE0; however, the anode may be electrically connected to the wiring VE0, and the cathode may be electrically connected to the first terminal of the transistor M2, the first terminal of the switch SW1, the first terminal of the switch SWA, the first terminal of the capacitor C1, and the first terminal of the capacitor C3. In that case, the wiring VE0 serves as a wiring for supplying a potential to the anode of the light-emitting device LD, and the wiring VE2 serves as a wiring for supplying a potential to the cathode of the light-emitting device LD.

The wirings GL1, GL6, GLA, and GLB correspond to one of the wirings GL[1] to GL[m] in FIG. 2. That is, in the case of the circuit configuration of the pixel PX in FIG. 25, the number of wirings GL extended per row of the pixel array ALP is four.

For the wirings SWL11, SWL12, and SWL13, the description of the wirings SWL11, SWL12, and SWL13 in FIG. 1 can be referred to.

Example 1 of Operation Method of Display Apparatus

Next, an example of an operation method of the display apparatus DSP4A in FIG. 25 is described.

Figure 26A:
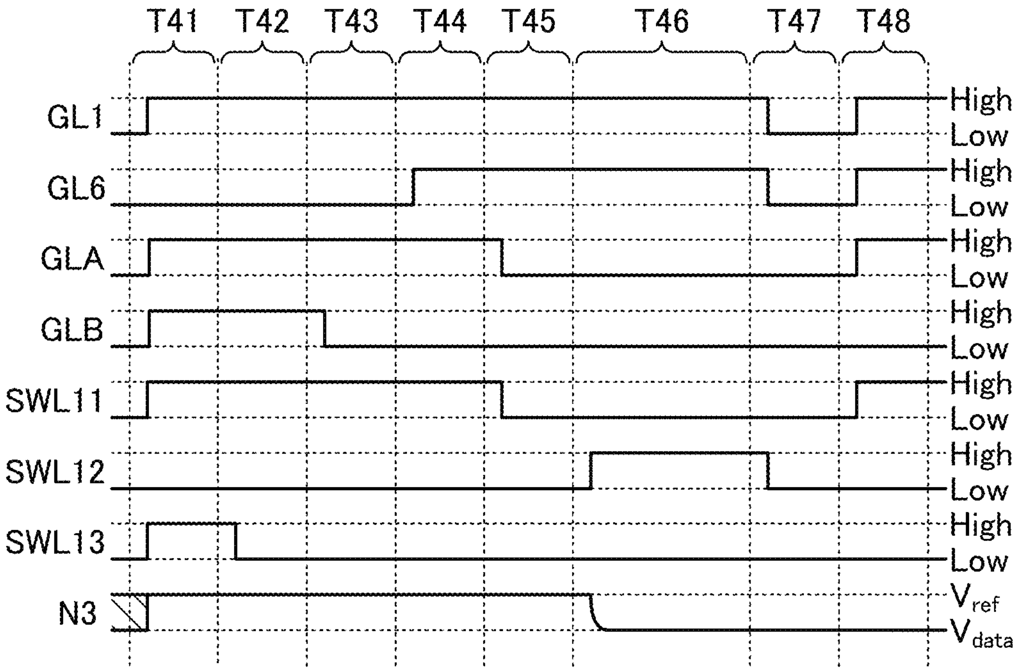
FIGS. 26A to 26C are timing charts showing an operation method example of a display apparatus.
Figure 26B:
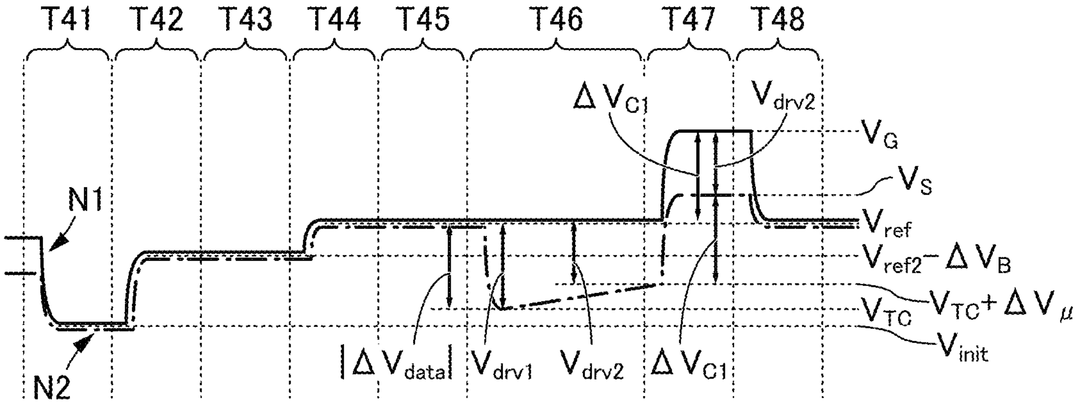
Figure 26C:
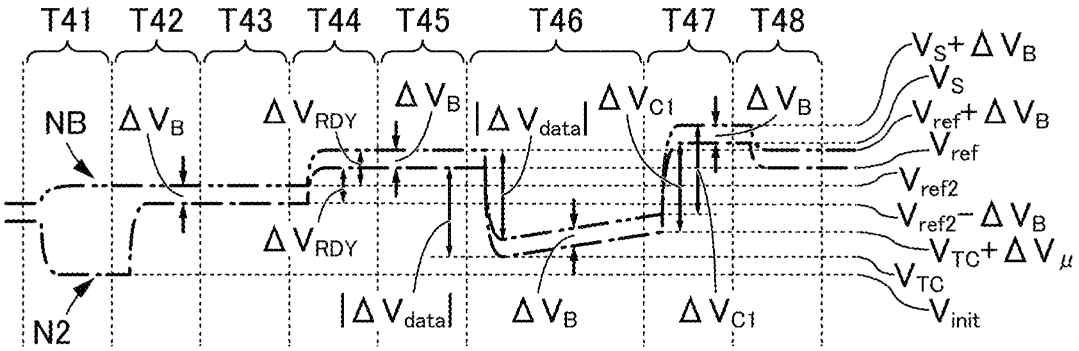

FIGS. 26A to 26C are timing charts showing an example of an operation method of the display apparatus DSP4A. Specifically, the timing chart in FIG. 26A shows potential changes of the wirings GL1, GL6, GLA, GLB, SWL11, SWL12, and SWL13, and the node N3 in periods T41 to T48. FIG. 26B shows potential changes of the nodes N1 and N2 in the periods T41 to T48. FIG. 26C shows potential changes of the nodes N2 and NB in the periods T41 to T48. In FIGS. 26B and 26C, the change in the potential of the node N1 is indicated by a solid line, the change in the potential of the node N2 is indicated by a dashed-dotted line, and the change in the potential of the node NB is indicated by a dashed-double dotted line.

Note that in FIG. 26A, "High" indicates a high-level potential and "Low" indicates a low-level potential.

The wiring VE3 is supplied with $V_{ref}$ as a constant potential. The wiring VE4 is supplied with $V_{init}$ as a constant potential. Note that $V_{ref}$ is preferably a potential higher than $V_{init}$. In this operation method example, description is made on the assumption that $V_{ref}$ is a potential higher than $V_{init}$ unless otherwise specified.

The wiring VE2 is supplied with $V_{AN}$ as a constant potential. The wiring VE0 is supplied with $V_{CT}$ as a constant potential. $V_{AN}$ is a potential higher than $V_{CT}$. Note that $V_{AN}$ is a potential higher than $V_{init}$.

$V_{init}-V_{CT}$ voltage is a voltage with which the light-emitting device LD does not emit light. That is, when the threshold voltage of the light-emitting device LD is $V_{the}$, $V_{init}$ and $V_{CT}$ are preferably set such that $V_{init}-V_{CT}<V_{the}$.

Alternatively, $V_{init}$ and $V_{CT}$ may be set to the same potential to make the anode-cathode voltage of the light-emitting device LD 0 V. Alternatively, $V_{init}$ may be set to a lower potential than $V_{CT}$ to apply a reverse bias voltage (a state where the cathode potential is higher than the anode potential) between an anode and a cathode of the light-emitting device LD.

The threshold voltage of the transistor M2 is $V_{th}$. Note that $V_{th}$ is a voltage lower than $V_{ref}-V_{init}$.

The wiring VE5 is supplied with $V_{ref2}$ as a constant potential. Note that $V_{ref2}$ is preferably a potential with which the threshold voltage of the transistor M2 becomes lower than 0 V when the back gate-source voltage of the transistor M2 is $V_{ref2}-V_{init}$. Note that in this operation method example, $V_{ref2}$ is a potential with which the threshold voltage of the transistor M2 becomes lower than 0 V when the back gate-source voltage of the transistor M2 is $V_{ref2}-V_{init}$ unless otherwise specified.

The wiring VE6 is supplied with $V_{ref}$ as a constant potential. That is, the constant potential supplied to the wiring VE6 is preferably equal to the constant potential supplied to the wiring VE3. Therefore, the wiring VE3 and the wiring VE6 are preferably electrically connected to each other. Alternatively, the wiring VE3 and the wiring VE6 are preferably the same wiring (in that case, the references of the wiring VE3 and the wiring VE6 can be interchanged in the description). Depending on circumstances, the constant potential supplied to the wiring VE6 may differ from the constant potential supplied to the wiring VE3.

Note that $V_{ref}$ is a potential with which the light-emitting device LD does not emit light, for example. Specifically, even when the potential of the gate of the transistor M2 is $V_{ref}$ and the transistor M2 is on, the anode-cathode voltage of the light-emitting device LD is preferably lower than the threshold voltage $V_{the}$ of the light-emitting device LD.

For example, when the transistor M2 is on and the potential of the source (a first terminal) of the transistor M2 is $V_X$, the gate-source voltage $V_{ref}-V_X$ of the transistor M2 is higher than $V_{th}$. In other words, the potential $V_X$ of the source (the first terminal) of the transistor M2 satisfies $V_X<V_{ref}-V_{th}$. At this time, the anode-cathode voltage of the light-emitting device LD becomes $V_X-V_{CT}$, and the condition under which the light-emitting device LD does not emit light is $V_X-V_{CT}<V_{the}$. In other words, the potential $V_X$ of the source (the first terminal) of the transistor M2 satisfies $V_X<V_{CT}+V_{the}$.

Here, for example, when $V_{ref}$ and $V_{CT}$ are set to the same potential, $-V_{th}<V_{the}$ satisfies because $V_X<V_{ref}-V_{th}$ and $V_X<V_{CT}+V_{the}$. Thus, in the case where $V_{ref}$ and $V_{CT}$ are equal to each other and $-V_{th}<V_{the}$ satisfies, $V_{ref}$ can be a potential with which the light-emitting device LD does not emit light. Note that in this operation method example, $V_{ref}$ and $V_{CT}$ are the same potential unless otherwise specified.

The wiring VE5 is supplied with $V_{ref2}$ as a constant potential. Note that $V_{ref2}$ is preferably a potential with which the threshold voltage $V_{th}$ of the transistor M2 becomes lower than 0 V when the back gate-source voltage of the transistor M2 is $V_{ref2}-V_{init}$.

Note that $V_{ref2}$ is a potential with which the light-emitting device LD does not emit light, for example. Specifically, even when the potential of the back gate of the transistor M2 is $V_{ref2}$ and the threshold voltage $V_{th}$ of the transistor M2 is lower than 0 V, the anode-cathode voltage of the light-emitting device LD is preferably lower than the threshold voltage $V_{the}$ of the light-emitting device LD.

For example, $V_{ref2}$ and $V_{CT}$ may be the same potential. Alternatively, $V_{ref2}$, $V_{ref}$, and $V_{CT}$ may be the same potential.

[Before Period T41]

In a period before a period T41, each of the wirings GL1, GL6, GLA, GLB, SWL11, SWL12, and SWL13 is supplied with a low-level potential. Accordingly, the control terminals of the switches SW1, SW6, SWA, SWB, SW11, SW12, and SW13 are supplied with a low-level potential, whereby these switches are off.

Before the period T41, the potential of the node N3 is undefined. Thus, the potential of the node N3 before the period T41 is hatched in the timing chart in FIG. 26A.

In the case where the gate-source voltage of the transistor M2 is higher than the threshold voltage $V_{th}$ of the transistor M2, a current flows between the wiring VE2 and the wiring VE0 through the transistor M2 and the light-emitting device LD. Therefore, the light-emitting device LD emits light in some cases before the period T41.

[Period T41]

In the period T41, each of the wirings GL1, GLA, GLB, SWL11, and SWL13 is supplied with a high-level potential. Accordingly, each of the control terminals of the switches SW1, SWA, SWB, SW11, and SW13 is supplied with a high-level potential, whereby these switches are on.

Since the switches SW1, SW13, and SWA are on, electrical continuity is established between the wiring VE4 and each of the first terminal of the transistor M2, the gate of the transistor M2, the first terminal of the capacitor C1, the second terminal of the capacitor C1, the first terminal of the capacitor C3, and the anode of the light-emitting device LD. Thus, the gate of the transistor M2, the second terminal of the capacitor C1 (the node N1), the first terminal of the transistor M2, the first terminal of the capacitor C1, the first terminal of the capacitor C3, and the anode of the light-emitting device LD (the node N2) are supplied with the potential $V_{init}$ from the wiring VE4 (see FIGS. 26B and 26C).

Since the switch SWB is on, electrical continuity is established between the wiring VE5 and each of the back gate of the transistor M2 and the second terminal of the capacitor C3. Thus, the back gate of the transistor M2 and the second terminal (the node NB) of the capacitor C3 are supplied with the potential $V_{ref2}$ from the wiring VE5 (see FIG. 26C).

At this time, since the anode of the light-emitting device LD is supplied with the potential $V_{init}$ from the wiring VE4, the anode-cathode voltage of the light-emitting device LD becomes $V_{init}-V_{CT}$. As described above, when the anode-cathode voltage of the light-emitting device LD is $V_{init}-V_{CT}$, the light-emitting device LD does not emit light (a current does not flow between the anode and the cathode of the light-emitting device LD).

Since the switch SWA is on, the first terminal of the transistor M2 and the gate of the transistor M2 are brought into conduction. Accordingly, the gate-source voltage of the transistor M2 is 0 V. Since the back gate-source voltage of the transistor M2 is $V_{ref2}-V_{init}$, the threshold voltage $V_{th}$ of the transistor M2 becomes lower than 0 V. Thus, the transistor M2 is turned on. When the transistor M2 is on, a current flows between the wiring VE2 and the wiring VE4 with the transistor M2, the switch SW1, and the switch SW13 positioned therebetween.

Since the switch SW11 is on, electrical continuity is established between the wiring VE3 and each of the second terminal of the capacitor C2 and the first terminal of the switch SW12. Thus, the second terminal of the capacitor C2 and the first terminal (the node N3) of the switch SW12 are supplied with the potential $V_{ref}$ from the wiring VE3 (see FIG. 26A).

At this time, voltage between the first terminal and the second terminal of the capacitor C2 becomes $V_{ref}-V_{init}$.

Note that in the period T41 in the timing chart of FIG. 26A, a high-level potential is input to each of the wirings GL1, GLA, GLB, SWL11, and SWL13 at the same timing; however, the timings for inputting a high-level potential to the wirings GL1, GLA, GLB, SWL11, and SWL13 may be different within the period T41.

[Period T42]

In a period T42, a low-level potential is supplied to the wiring SWL13. Thus, a low-level potential is supplied to the control terminal of the switch SW13, whereby the switch SW13 is turned off. Therefore, electrical continuity is broken between the wiring VE4 and each of the first terminal of the transistor M2, the gate of the transistor M2, the first terminal of the capacitor C1, the second terminal of the capacitor C1, the first terminal of the capacitor C3, and the anode of the light-emitting device LD (the node N2).

Since the potential of the gate of the transistor M2 and the potential of the first terminal of the transistor M2 are $V_{init}$ immediately before the switch SW13 is turned off as described above, the gate-source voltage of the transistor M2 becomes 0 V. Furthermore, since the threshold voltage $V_{th}$ of the transistor M2 is lower than 0 V, the transistor M2 is turned on.

In the period T42, when the switch SW13 is turned off, the potential $V_{init}$ is not applied to the first terminal of the transistor M2 and the gate of the transistor M2 from the wiring VE4, and negative electric charge supplied to the nodes N1 and N2 is discharged to the wiring VE2 passing between the first terminal and the second terminal of the transistor M2. In other words, when the switch SW13 is off, a current does not flow between the wiring VE2 and the wiring VE4 with the transistor M2, the switch SW1, and the switch SW13 provided therebetween, and thus positive electric charge is supplied to the nodes N1 and N2 from the wiring VE2. Accordingly, the potentials of the nodes N1 and N2 are increased.

The increases in the potentials of the node N1 and the node N2 lower the back gate-source voltage of the transistor M2. Due to the decrease in the back gate-source voltage of the transistor M2, when the threshold voltage $V_{th}$ of the transistor M2 reaches 0 V, which is the gate-source voltage of the transistor M2, the transistor M2 is turned off, so that charging of positive electric charge from the wiring VE2 (discharging of negative electric charge to the wiring VE2) is stopped. The back gate-source voltage at this time is referred to as $\Delta V_B$. Since the switch SWB is on and the potential of the node NB is $V_{ref2}$, each of the potentials of the node N1 and the node N2 at this time becomes $V_{ref2}-\Delta V_B$. When the transistor M2 is turned off, charging of positive electric charge from the wiring VE2 to the nodes N1 and N2 (discharging of negative electric charge from the nodes N1 and N2 to the wiring VE2) is stopped, so that the potentials of the nodes N1 and N2 do not change from $V_{ref2}-\Delta V_B$ (FIGS. 26B and 26C). When the transistor M2 is turned off, the nodes N1 and N2 are brought into a floating state.

[Period T43]

In a period T43, a low-level potential is supplied to the wiring GLB. Thus, a low-level potential is supplied to the control terminal of the switch SWB, whereby the switch SWB is turned off.

Since the switch SWB is off, the wiring VE5 and each of the second terminal of the capacitor C3 and the back gate of the transistor M2 are brought out of conduction. At this time, the node NB is brought into a floating state. Thus, the voltage $\Delta V_B$ between the first terminal and the second terminal of the capacitor C3 can be held.

[Period T44]

In a period T44, a high-level potential is supplied to the wiring GL6. Thus, a high-level potential is supplied to the control terminal of the switch SW6, whereby the switch SW6 is turned on.

Since the switch SW6 is on, electrical continuity is established between the wiring VE6 and each of the first terminal of the transistor M2, the gate of the transistor M2, the first terminal of the capacitor C1, the second terminal of the capacitor C1, the first terminal of the capacitor C3, and the anode of the light-emitting device LD (the node N1 and the node N2). Thus, the potential $V_{ref}$ is supplied from the wiring VE6 to the gate of the transistor M2, the second terminal of the capacitor C1 (the node N1), the first terminal of the transistor M2, the first terminal of the capacitor C1, the first terminal of the capacitor C3, and the anode of the light-emitting device LD (the node N2) (see FIGS. 26B and 26C). That is, each of the potentials of the nodes N1 and N2 and the wiring SL is changed from $V_{ref2}-\Delta V_B$ to $V_{ref}$.

Since each of the back gate of the transistor M2 and the second terminal of the capacitor C3 (the node NB) is in a floating state, capacitive coupling of the capacitor C3 changes the potential of the node NB in accordance with the potential change of the node N2. Note that the amount of change in the potential of the node NB caused by the capacitive coupling of the capacitor C3 is determined by electrostatic capacitance of the capacitor C3, gate capacitance of the transistor M2, and parasitic capacitance of the switch SWB. Note that for simplicity, the amount of change in the potential of the node NB is regarded as being equal to the amount of change in the potential of the node N2 in this operation method example. That is, since the amount of change in the potential of the node N2 is $V_{ref}$-($V_{ref2}-\Delta V_B$), the amount of change in the potential of the node NB is also $V_{ref}$-($V_{ref2}-\Delta V_B$). This corresponds to the case where the capacitive coupling coefficient in the vicinity of the node NB is 1. In FIGS. 26B and 26C, $\Delta V_{RDY}=V_{ref}-(V_{ref2}-\Delta V_B)$. Accordingly, the potential of the node NB changes from $V_{ref2}$ to $V_{ref}+\Delta V_B$.

Since the amount of change in the potential of the node NB is equal to the amount of change in the potential of the node N2 as described above, the back gate-source voltage of the transistor M2 remains unchanged at $\Delta V_B$ before and after the changes in the potentials of the node NB and node N2. In other words, in the period T44, the threshold voltage $V_{th}$ of the transistor M2 is not changed by the changes in the potentials of the nodes NB and N2.

Since the switches SW1 and SW6 are on in the period T44, electrical continuity is established between the first terminal of the capacitor C2 and the wiring VE6. Thus, the potential $V_{ref}$ is supplied from the wiring VE6 to the wiring SL and the first terminal of the capacitor C2. That is, the potentials of the wiring SL and the first terminal of the capacitor C2 change from $V_{ref2}-\Delta V_B$ to $V_{ref}$. On the other hand, the potential $V_{ref}$ is supplied from the wiring VE3 to the second terminal of the capacitor C2 (the node N3) before the period T44; accordingly, even in the period in which potentials of the wiring SL and the first terminal of the capacitor C2 change from $V_{ref2}-\Delta V_B$ to $V_{ref}$, the potential of the second terminal of the capacitor C2 (the node N3) remains unchanged at $V_{ref}$. Thus, the voltage between the first terminal and the second terminal of the capacitor C3 becomes 0 V.

Note that in the period T44, the first terminal of the transistor M2 and the gate of the transistor M2 are brought into conduction, and thus, the gate-source voltage has been 0 V since the period T43. Since the threshold voltage $V_{th}$ of the transistor M2 is 0 V, the transistor M2 is off in the period T44.

[Period T45]

In a period T45, a low-level potential is supplied to each of the wiring GLA and the wiring SWL11. Thus, a low-level potential is supplied to each of control terminals of the switch SWA and the switch SW11, so that the switch SWA and the switch SW11 are turned off.

Since the switch SWA is off, the node N1 (each of the gate of the transistor M2 and the second terminal of the capacitor C1) and the node N2 (each of the first terminal of the transistor M2, the first terminal of the capacitor C1, the first terminal of the capacitor C3, and the anode of the light-emitting device LD) are brought out of conduction. At this time, the switch SW6 is on, and thus the potential $V_{ref}$ has been supplied from the wiring VE6 to each of the gate of the transistor M2 and the second terminal of the capacitor C1 (the node N1) since the period T44.

The switch SW13 is off in the period T45. Since the anode-cathode voltage of the light-emitting device LD is $V_{ref}-V_{CT}$ (=0), a current does not flow between the anode and the cathode of the light-emitting device LD (the light-emitting device LD does not emit light). Thus, each of the first terminal of the transistor M2, the first terminal of the capacitor C1, the first terminal of the capacitor C3, and the anode of the light-emitting device LD (the node N2) and the wiring SL are brought into a floating state.

Since the switch SW11 is off, the wiring VE3 and each of the second terminal of the capacitor C2 and the first terminal of the switch SW12 are brought out of conduction. At this time, the node N3 is brought into a floating state.

[Period T46]

In a period T46, a high-level potential is supplied to the wiring GL12. Thus, a high-level potential is supplied to the control terminal of the switch SW12, whereby the switch SW12 is turned on.

In particular, when the switch SW12 is on, the driver circuit SD transmits an image data signal in accordance with an image displayed on the pixel PX to the second terminal (the node N3) of the capacitor C2 through the switch SW12. Note that the image data signal is a potential $V_{data}$, which is lower than $V_{ref}$.

Thus, the potential of the node N3 changes from $V_{ref}$ to $V_{data}$. The wiring SL and the node N2 are in a floating state, the potentials of the wiring SL and the node N2 are also changed by the capacitive coupling of the capacitor C2 in accordance with a change in potential of the node N3. The amounts of changes in the potentials of the wiring SL and the node N2 are determined by, for example, electrostatic capacitance of the capacitor C1, electrostatic capacitance of the capacitor C2, electrostatic capacitance of the capacitor C3, gate capacitance of the transistor M2, parasitic capacitance of the switch SW1, parasitic capacitance of the switch SWB, parasitic capacitance of the switch SW13, parasitic capacitance of the light-emitting device LD, and parasitic capacitance of the wiring SL. In this operation method example, for simplicity, the description will be made on the assumption that the amounts of changes in the potentials of the wiring SL and the node N2 are determined by the electrostatic capacitance of the capacitor C1, capacitance of the capacitor C2, and the electrostatic capacitance of the capacitor C3.

When the potential of the node N3 changes from $V_{ref}$ to $V_{data}$, $\Delta V_{data}=J\times(V_{data}-V_{ref})$ as the change amount is given to the potentials of the wiring SL and the node N2. Note that J is a constant determined depending on electrostatic capacitance $C_1$ of the capacitor C1, electrostatic capacitance $C_2$ of the capacitor C2, and electrostatic capacitance $C_3$ of the capacitor C3; for example, when the node N1, the node N3, and the node NB are not in a floating state, $J=C_2/(C_1+C_2+C_3)$. For another example, when only the node NB is in a floating state, $J=C_2/(C_1+C_2)$. Thus, the potentials of the wiring SL and the node N2 are $V_{ref}+\Delta V_{data}$. Note that in FIGS. 26B and 26C, $V_{TC}=V_{ref}+\Delta V_{data}$. Since $V_{data}$ is a potential lower than $V_{ref}$ as described above, it should be noted that $\Delta V_{data}<0$.

The second terminal of the capacitor C1 (the node N1) is supplied with the potential $V_{ref}$ from the wiring VE6 before the period T46, and thus the potential of the second terminal of the capacitor C1 (the node N1) remains $V_{ref}$ even in a period in which the potential of the node N3 changes from $V_{ref}$ to $V_{data}$.

Accordingly, when the gate-source voltage of the transistor M2 in the period T46 is represented by $V_{drv1}$, $V_{drv1}$=(the potential of the node N1)−(the potential of the node N2)=$-\Delta V_{data}$. Since $-\Delta V_{data}>0$, $V_{drv1}>0$.

Since each of the back gate of the transistor M2 and the second terminal of the capacitor C3 (the node NB) is in a floating state, when the potential of the node N2 changes, the potential of the node NB also changes due to the capacitive coupling of the capacitor C3. Note that since the amount of change in the potential of the node NB is equal to the amount of change in the potential of the node N2 (the capacitive coupling coefficient in the vicinity of the node NB is 1) as in the description of the period T44, so that the back gate-source voltage of the transistor M2 remains unchanged at $\Delta V_B$ (the threshold voltage $V_{th}$ of the transistor M2 is not changed from 0 V). Specifically, when the potential of the node N2 is changed from $V_{ref}$ to $V_{ref}+\Delta V_{data}$, the potential of the node NB is changed from $V_{ref}+\Delta V_B$ to $V_{ref}+\Delta V_B+\Delta V_{data}$.

Since the gate-source voltage of the transistor M2 is $V_{drv1}$ and the threshold voltage $V_{th}$ of the transistor M2 is 0 V, $V_{drv1}>V_{th}$ and the transistor M2 is turned on. Thus, a current flows from the wiring VE2 to the node N2 through the transistor M2. Here, the case where the transistor M2 operates in a saturation region is considered. The amount of current flowing between the first terminal and the second terminal of the transistor M2 is determined in accordance with the gate-source voltage $V_{GS}$ of the transistor M2. Specifically, an amount I of current flowing between the source and the drain of the transistor operating in the saturation region is proportional to the square of a difference between the gate-source voltage $V_{GS}$ and the threshold voltage $V_{th}$ of the transistor, whereby $I=k\mu(V_{GS}-V_{th})^2$. Note that k is a proportionality constant depending on the transistor structure, and μ is a field-effect mobility of the transistor. By substituting the gate-source voltage $V_{drv1}$ of the transistor M2 into $V_{GS}$ and substituting 0 V into $V_{th}$ in the above formula, $I=k\mu(-\Delta V_{data})\ 2=k\mu(\Delta V_{data})^2$, and the amount I of current flowing through the transistor M2 does not depend on the threshold voltage $V_{th}$ and is determined by $\Delta V_{data}$.

In the period T46, since the anode-cathode voltage of the light-emitting device LD is lower than $V_{the}$, the light-emitting device LD does not emit light (a current does not flow between the anode and the cathode of the light-emitting device LD). Thus, positive electric charge is supplied to the wiring SL and the node N2 from the wiring VE2 through the transistor M2, so that the potential of the node N2 increases.

Note that in the period T46, the second terminal of the capacitor C1 and the wiring VE6 are brought into conduction and the second terminal of the capacitor C2 and the driver circuit SD are brought into conduction, so that the potentials of the node N1 and the node N3 are not changed by a change in the potential of the node N2.

By an increase in the potential of the node N2 in the period T46, the field-effect mobility of the transistor M2 is corrected. Specifically, from when the switch SW12 is turned on in the period T46 until when the switches SW1, SW6, and SW12 are turned off in a period T47 to be described later, the potential of the node N2 increases and the gate-source voltage $V_{drv1}$ of the transistor M2 decreases. FIGS. 26B and 26C each show an example where the potential of the node N2 becomes $V_{TC}=V_{ref}+\Delta V_{data}$ and then increases by $\Delta V_\mu$ to be $V_{TC}+\Delta V_\mu$, and the gate-source voltage of the transistor M2 decreases from $V_{drv1}$ to $V_{drv2}$. Note that $\Delta V_\mu$ is a potential that satisfies $V_{ref}>V_{TC}+\Delta V_\mu$, i.e., $-\Delta V_{data}>\Delta V_\mu>0$. In other words, the gate-source voltage of the transistor M2 decreases and the amount of current flowing between the source and the drain of the transistor M2 decreases, whereby the field-effect mobility of the transistor M2 is corrected.

Note that in this operation method example, a period from when the switch SW12 is turned on in the period T46 until when the switches SW1, SW6, and SW12 are turned off in the period T47 to be described later is referred to as a correction period of field-effect mobility.

For the correction of the field-effect mobility, the description of FIG. 4 in Embodiment 1 can be referred to.

Even though the transistors M2 included in the plurality of pixels PX have variations in field-effect mobility, providing the correction period of the field-effect mobility in the above manner can inhibit variations in the amounts of source-drain currents of the transistors M2 due to the variations in field-effect mobility.

Since in the correction period of the field-effect mobility, each of the back gate of the transistor M2 and the second terminal of the capacitor C3 (the node NB) is in a floating state, when the potential of the node N2 changes, the potential of the node NB also changes due to the capacitive coupling of the capacitor C3. Note that since the amount of change in the potential of the node NB is equal to the amount of change in the potential of the node N2 (the capacitive coupling coefficient in the vicinity of the node NB is 1) as in the description of the period T44, so that the back gate-source voltage of the transistor M2 remains unchanged at $\Delta V_B$ (the threshold voltage $V_{th}$ of the transistor M2 is not changed from 0 V). Specifically, when the potential of the node N2 is changed from $V_{TC}$ to $V_{TC}+\Delta V_\mu$, the potential of the node NB is changed from $V_{ref}+\Delta V_B+\Delta V_{data}=V_{TC}+\Delta V_B$ to $V_{ref}+\Delta V_B+\Delta V_{data}+\Delta V_\mu=V_{TC}+\Delta V_B+\Delta V_\mu$.

[Period T47]

In the period T47, a low-level potential is supplied to the wirings GL1, GL6, and SWL12. Thus, a low-level potential is supplied to control terminals of the switches SW1, SW6, and SW12, whereby the switches SW1, SW6, and SW12 are turned off.

Since the switch SW1 is off, the wiring SL and the node N2 (each of the first terminal of the transistor M2, the first terminal of the capacitor C1, the first terminal of the capacitor C3, and the anode of the light-emitting device LD) are brought out of conduction. Since the switch SW6 is off, the wiring VE6 and each of the gate of the transistor M2 and the second terminal of the capacitor C1 are brought out of conduction. Since the switch SW12 is off, the driver circuit SD and each of the second terminal of the capacitor C2 and the first terminal of the switch SW11 are brought out of conduction.

The gate-source voltage of the transistor M2 is represented by the formula $V_{drv2}=V_{ref}-V_{TC}-\Delta V_{\mu}=-\Delta V_{data}-\Delta V_{\mu}$. Since $-\Delta V_{data}>\Delta V_{\mu}>0$ and the threshold voltage $V_{th}$ of the transistor M2 is 0 V, the transistor M2 is on.

Thus, a current flows between the wiring VE2 and the wiring VE0 through the transistor M2 and the light-emitting device LD.

At this time, a voltage $V_{AN}-V_{CT}$ between the wiring VE2 and the wiring VE0 is divided by the transistor M2 and the light-emitting device LD. In this operation method example, the potential of the first terminal of the transistor M2 (the node N2) is increased from $V_{TC}+\Delta V_{\mu}$ to $V_S$ by the operation in the period T47 (see FIGS. 26B and 26C).

Since the potential of the first terminal of the transistor M2 (the node N2) is increased from $V_{TC}+\Delta V_{\mu}$ to $V_S$, the potential of the gate of the transistor M2 (the node N1) also changes due to capacitive coupling of the capacitor C1. In this operation method example, the potential of the gate of the transistor M2 (the node N1) is increased from $V_{ref}$ to $V_G$ by the operation in the period T47 (see FIGS. 26B and 26C).

Note that the amount of change in the potential of the node N1 due to the above-described capacitive coupling of the capacitor C1 is determined by the electrostatic capacitance of the capacitor C1, the gate capacitance of the transistor M2, the electrostatic capacitance of the switch SWA, and the parasitic capacitance of the switch SW6. Note that in this operation method example, for simplicity, the description will be made on the assumption that the amount of change in the potential of the node N1 is equal to the amount of change in the potential of the node N2. That is, when the amount of change in the potential of the node N2 is $\Delta V_{C1}(=V_S-(V_{TC}+\Delta V_{\mu}))$, the amount of change in the potential of the node N1 also becomes $\Delta V_{C1}$. This corresponds to the case where the capacitive coupling coefficient in the periphery of the node N1 is 1.

Since $\Delta V_{C1}=V_G-V_{ref}$ at the node N1, when the amount of change in the potential of the node N2, $\Delta V_C=V_S-(V_{TC}+\Delta V_{\mu})$, is substituted into this formula, $V_G-V_S=V_{ref}-V_{TC}-\Delta V_{\mu}=\Delta V_{data}-\Delta V_{\mu}=V_{drv2}$ is obtained. That is, the gate-source voltage of the transistor M2 is the same immediately before and after turning off the witches SW1, SW6, and SW12 in the period T47.

Since each of the back gate of the transistor M2 and the second terminal of the capacitor C3 (the node NB) is in a floating state, when the potential of the node N2 changes, the potential of the node NB also changes due to the capacitive coupling of the capacitor C3. Note that since the amount of change in the potential of the node NB is equal to the amount of change in the potential of the node N2 (the capacitive coupling coefficient in the vicinity of the node NB is 1) as in the description of the period T44, so that the back gate-source voltage of the transistor M2 remains unchanged at $\Delta V_B$ (the threshold voltage $V_{th}$ of the transistor M2 is not changed from 0 V). Specifically, when the potential of the node N2 is changed from $V_{TC}+\Delta V_{\mu}$ to $V_{TC}+\Delta V_{\mu}+\Delta V_{C1}$, the potential of the node NB is changed from $V_{TC}+\Delta V_B+\Delta V_{\mu}$ to $V_{TC}+\Delta V_B+\Delta V_{\mu}+\Delta V_{C1}$.

Accordingly, the operation from the period T41 to the period T47 inclusive allows the threshold voltage $V_{th}$ of the transistor M2 to be corrected to 0 V and the transistor M2 to generate a current with a corrected field-effect mobility of the transistor M2.

Since the potential of the anode of the light-emitting device LD is $V_S$, the anode-cathode voltage of the light-emitting device LD is $V_S-V_{CT}$. Furthermore, a current flowing between the source and the drain of the transistor M2 ($I=k\mu(V_G-V_S-V_{th})^2=k\mu(\Delta V_{data}+\Delta V_{\mu})^2$) flows between the anode and the cathode of the light-emitting device LD, whereby the light-emitting device LD emits light. In the case where the light-emitting device LD is an organic EL element, emission luminance of the light-emitting device LD is determined by the amount of current flowing between the anode and the cathode of the light-emitting device LD. In other words, the emission luminance of the light-emitting device LD is determined by the image data signal $V_{data}$ input from the driver circuit SD.

The image data signal $V_{data}$ output from the driver circuit SD changes to $V_{ref}+J\times(V_{data}-V_{ref})$ through the circuit CD. That is, $V_{ref}+J\times(V_{data}-V_{ref})$ is input to the pixel PX. Here, the case where the minimum value of the gray level of the pixel is $V_{data\_min}$, the maximum value of the gray level of the pixel is $V_{data\_max}$, and an image data signal $V_{data}$ has any one of potentials $V_{data\_min}$ to $V_{data\_max}$ is considered. The plurality of potentials $V_{data\_min}$ to $V_{data\_max}$ are input to the pixels PX through the circuit CD, and thus change to $V_{ref}+J\times(V_{data\_min}-V_{ref})$ to $V_{ref}+J\times(V_{data\_max}-V_{ref})$.

Figure 28A:
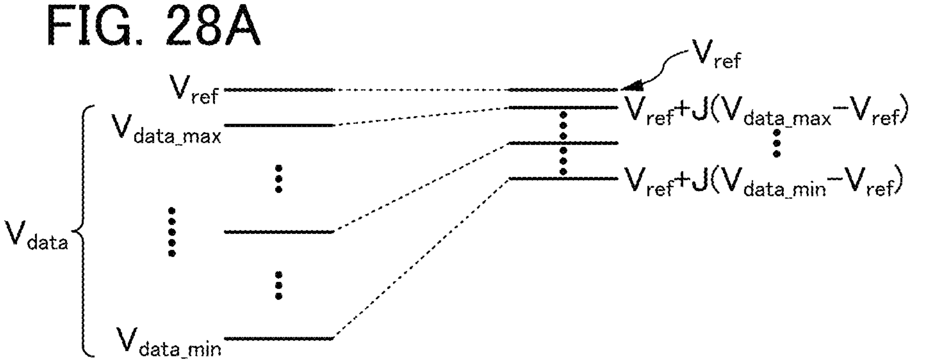
FIGS. 28A to 28C are diagrams each showing a relation between a potential of an image data signal input to a circuit and a potential of the image data signal output from the circuit.

The relation between image data signals $V_{data\_min}$ to $V_{data\_max}$ output from the driver circuit SD and $V_{ref}+J\times(V_{data\_min}-V_{ref})$ to $V_{ref}+J\times(V_{data\_max}-V_{ref})$ input to the pixels PX through the circuit CD are shown in FIG. 28A. That is, the image data signals output from the driver circuit SD are input to the pixels PX through the circuit CD, whereby the potential range of the image data signals is narrowed and the potential step size of the image data signal becomes small. Accordingly, potentials of the image data signals input to the pixels PX can be changed finely, and thus the amount of current flowing between the source and the drain of the transistor M2 can be changed finely.

Figure 28B:
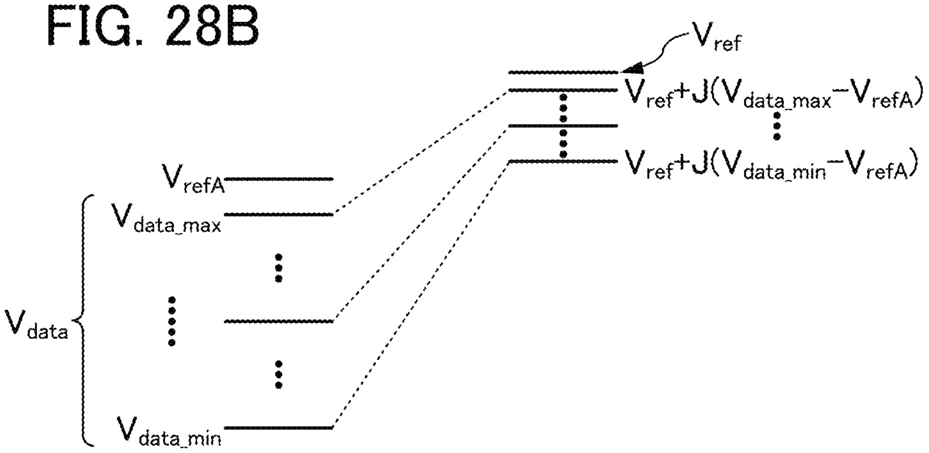

In the case where a potential supplied by the wiring VE6 is $V_{ref}$, a potential supplied by the wiring VE3 is $V_{refA}$, $V_{refA}$ is higher than $V_{ref}$, the relation between image data signals $V_{data\_min}$ $V_{data\_max}$ output from the driver circuit SD and $V_{ref}+J\times(V_{data\_min}-V_{refA})$ to $V_{ref}+J\times(V_{data\_max}-V_{refA})$ input to the pixels PX through the circuit CD are shown in FIG. 28B. The amount of current flowing between the source and the drain of the transistor M2 can be changed finely by decreasing the potential step size of the image data signal, which is the same as the relation shown in FIG. 28A.

Figure 28C:
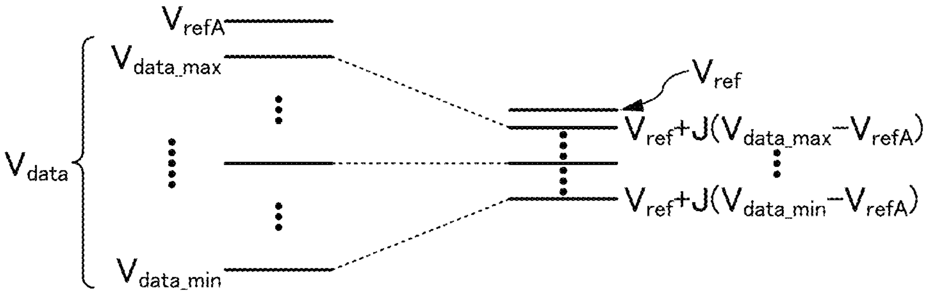

In the case where a potential supplied by the wiring VE6 is $V_{ref}$, a potential supplied by the wiring VE3 is $V_{refA}$, $V_{refA}$ is lower than $V_{ref}$, the relation between image data signals $V_{data\_min}$ to $V_{data\_max}$ output from the driver circuit SD and $V_{ref}+J\times(V_{data\_min}-V_{refA})$ to $V_{ref}+J\times(V_{data\_max}-V_{refA})$ input to the pixels PX through the circuit CD are shown in FIG. 28C. The amount of current flowing between the source and the drain of the transistor M2 can be changed finely by decreasing the potential step size of the image data signal, which is the same as the relation shown in FIGS. 28A and 28B.

Note that in the period T47 in the timing chart of FIG. 26A, a low-level potential is input to each of the wiring GL1, the wiring GL6, and the wiring SWL12 at the same timing; however, the timings for inputting potentials to the wirings GL1, GL6, and SWL12 may be different within the period T35.

[Period T48]

In the period T48, a high-level potential is supplied to the wirings GL1, GL6, GLA, and SWL11. Thus, a high-level potential is supplied to control terminals of the switches SW1, SW6, SWA, and SW11, whereby the switches SW1, SW6, SWA, and SW11 are turned on.

Since the switch SW1 is on, the wiring SL and the node N2 (each of the first terminal of the transistor M2, the first terminal of the capacitor C1, the first terminal of the capacitor C3, and the anode of the light-emitting device LD) are brought out of conduction. Since the switch SW6 is on, the wiring VE6 and the node N1 (each of the gate of the transistor M2 and the second terminal of the capacitor C1) are brought out of conduction. Furthermore, since the switch SWA is on, electrical continuity is established between the node N2 (each of the first terminal of the transistor M2, the first terminal of the capacitor C1, the first terminal of the capacitor C3, and the anode of the light-emitting device LD) and the node N1 (each of the gate of the transistor M2 and the second terminal of the capacitor C1). Thus, the potential $V_{ref}$ is supplied from the wiring VE6 to the wiring SL, the node N1 (the gate of the transistor M2, the second terminal of the capacitor C1) and the node N2 (the first terminal of the transistor M2, the first terminal of the capacitor C1, the first terminal of the capacitor C3, and the anode of the light-emitting device LD) (see FIGS. 26B and 26C).

Since each of the back gate of the transistor M2 and the second terminal of the capacitor C3 (the node NB) is in a floating state, when the potential of the node N2 changes, the potential of the node NB also changes due to the capacitive coupling of the capacitor C3. Note that since the amount of change in the potential of the node NB is equal to the amount of change in the potential of the node N2 (the capacitive coupling coefficient in the vicinity of the node NB is 1) as in the description of the period T44, so that the back gate-source voltage of the transistor M2 remains unchanged at $\Delta V_B$ (the threshold voltage $V_{th}$ of the transistor M2 is not changed from 0 V). Specifically, when the potential of the node N2 is changed from $V_{TC}+\Delta V_{\mu}+\Delta V_{C1}$ to $V_{ref}$, the potential of the node NB is changed from $V_{TC}+\Delta V_B+\Delta V_{\mu}+\Delta V_{C1}$ to $V_{ref}+\Delta V_B$.

At this time, the anode-cathode voltage of the light-emitting device LD becomes $V_{ref}-V_{CT}$. As described above, when the anode-cathode voltage of the light-emitting device LD is $V_{ref}-V_{CT}$, the light-emitting device LD does not emit light (a current does not flow between the anode and the cathode of the light-emitting device LD).

In other words, by the operation in the period T48, light emission by the light-emitting device LD can be stopped.

Since the switch SW11 is on, electrical continuity is established between the wiring VE3 and each of the second terminal of the capacitor C2 and the first terminal of the switch SW12. Thus, the second terminal of the capacitor C2 and the first terminal (the node N3) of the switch SW12 are supplied with the potential $V_{ref}$ from the wiring VE3 (see FIG. 26A).

By the operation in the period T48, $\Delta V_{data}$ held between the first terminal and the second terminal of the capacitor C1 is erased. Specifically, the potentials of the nodes N1, N2, N3, and NB in the period T48 become equal to the potentials of the nodes N1, N2, N3, and NB in the period T44 where the switch SW6 is turned on. The on/off states of the switches SW1, SW6, SWA, SWB, SW11, SW12, and SW13 in the period T48 are the same as those in the period T44. That is, by performing the operation in the period T48, operation can be shifted to the operation in the period T44 where the switch SW6 is turned on.

Accordingly, other image data can be written to the pixel PX by performing, for example, the operations in the periods T45 and T46 after the operation in the period T48; furthermore, the light-emitting device LD can emit light with luminance based on the image data by performing the operation in the period T47 after the operation in the period T48. That is, the display apparatus DSP4A can continue displaying an image (e.g., a still image or moving images) by repeating the operations in the periods T45 to T47 after the operation in the period T48.

In the display apparatus DSP4A, the potential $\Delta V_B$ for setting the threshold voltage $V_{th}$ of the transistor M2 to 0 V is held between the first terminal and the second terminal of the capacitor C3 included in the pixel PX; therefore, there is no need to correct the threshold voltage of the transistor M2 in the periods T41 to T43 every time when image data is written to the pixel PX. Also in this respect, the display apparatus DSP4A can continue displaying an image (e.g., a still image or moving images) by repeating the operations in the periods T45 to T47 after the operation in the period T48.

Although the example in which operation is shifted from the period T48 to the period T44 is described in the above, in the case where the threshold voltage $V_{th}$ of the transistor M2 needs to be corrected again, a low-level potential is supplied to each of the wirings GL6 and SWL12 and a high-level potential is supplied to each of the wirings GL1, GLA, GLB, SWL11, and SWL13 in the period T48. In such a case, the potentials of the nodes N1, N2, N3, and NB in the period T48 become equal to those in the period T41 where the switches SW1, SWA, SWB, SW11, and SW13 are turned on and the switches SW6 and SW12 are turned off, which enables the shift of operation from the period T48 to the period T41. After the shift to the period T41, the operations in the periods T42 and T43 are performed, whereby the threshold voltage $V_{th}$ of the transistor M2 can be corrected again.

In the above-described shift of operation from the period T48 to the period T41, the frequency of correcting the threshold voltage $V_{th}$ of the transistor M2 can be determined freely. For example, in the case where the display apparatus DSP4A operates at a frame frequency of 60 Hz, the frequency of correcting the threshold voltage can be once or more and 60 times or less per second. For another example, in the case where the display apparatus DSP4A operates at a frame frequency of 120 Hz, the frequency of correcting the threshold voltage can be once or more and 120 times or less per second. Accordingly, the threshold voltage $V_{th}$ of the transistor M2 can be corrected once for each writing of an image to the pixel PX, or once per second during the driving of the display apparatus DSP4A.

In the display apparatus DSP4A, as in the display apparatus DSP3A, by performing the above-described operations in the periods T41 to T48, the transistor M2 included in the pixel PX can output a current with a corrected field-effect mobility of the transistor M2 without depending on the threshold voltage $V_{th}$ of the transistor M2, and can supply the current to the light-emitting device LD.

Through the above-described operations in the periods T41 to T48, the amount of current flowing through the light-emitting device LD in the pixel PX of the display apparatus DSP4A can be controlled more finely as in the display apparatus DSP3A.

Note that the operation method of the display apparatus of one embodiment of the present invention is not limited to the above operations in the periods T41 to T48 in FIGS. 26A to 26C. The operation method of the display apparatus of one embodiment of the present invention may have appropriate modification from the operations in the periods T41 to T48 in FIGS. 26A to 26C.

Figure 27:
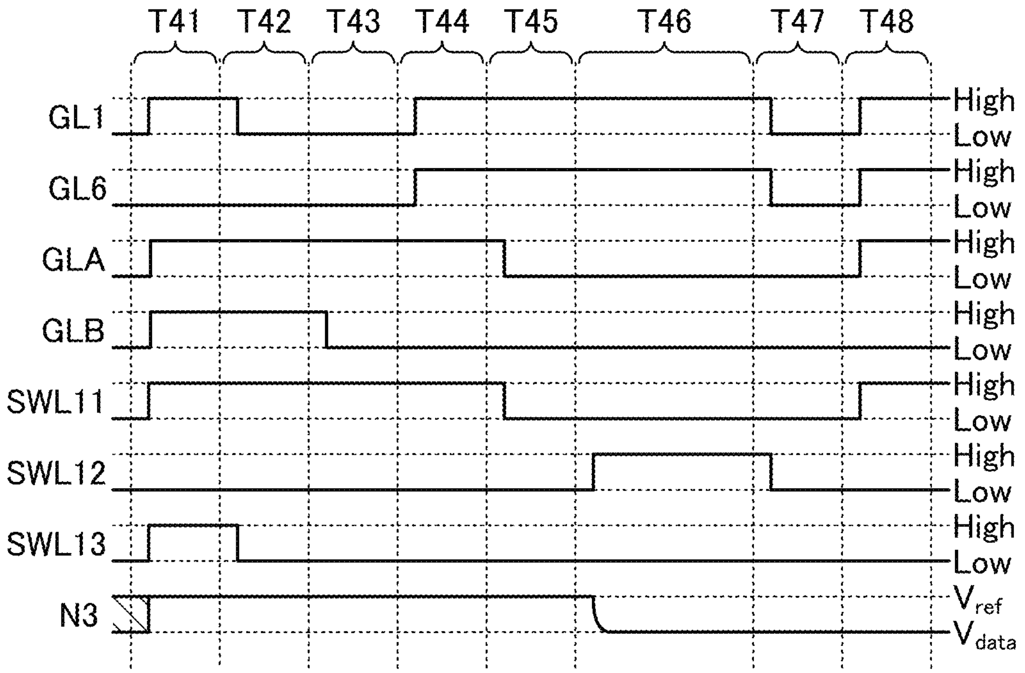
FIG. 27 is a timing chart showing an operation method example of a display apparatus.

For example, the timing chart in FIG. 26A, which illustrates an operation method of the display apparatus DSP4A in FIG. 25, may be changed to the timing chart in FIG. 27. The timing chart in FIG. 27 is different from the timing chart in FIG. 26A in that a low-level potential is input to the wiring GL1 in the periods T42 to T44.

In the period T42 in FIG. 26A, a high-level potential is input from the wiring GL1 to the control terminal of the switch SW1, whereby the switch SW1 is on. Thus, in accordance with changes in the potentials of the nodes N1 and N2 in the period T42 in FIG. 26A, the potential of the wiring SL also changes.

In contrast, in the period T42 in FIG. 27, a low-level potential is input to the control terminal of the switch SW1, whereby the switch SW1 is off. Thus, in accordance with changes in the potentials of the nodes N1 and N2 in the period T42 in FIG. 27, the potential of the wiring SL does not change. In other words, electric charge is not supplied to the wiring SL and the first terminal of the capacitor C2 in the period T42 in FIG. 27; the changes in the potentials of the nodes N1 and N2 occur earlier than those in the period T42 in FIG. 26B in some cases. Therefore, the voltage $\Delta V_B$ can be written to the capacitor C3 earlier.

In the period T43 in FIG. 27, a low-level potential is input to the control terminal of the switch SW1, whereby the switch SW1 is off. In the period T43, a low-level potential is supplied to the switch SWB from the wiring GLB, whereby the switch SWB is turned off. Thus, the voltage $\Delta V_B$ written in the capacitor C3 is held.

In the period T44 in FIG. 27, a high-level potential is input from the wiring GL1 to the control terminal of the switch SW1, whereby the switch SW1 is on. A high-level potential is input to the control terminal of the switch SW6 from the wiring GL6, whereby the switch SW6 is turned on. Thus, the potential $V_{ref}$ is supplied to the node N1, the node N2, and the first terminal of the capacitor C2 from the wiring VE6. That is, the operation in the period T44 in FIG. 27 makes the potentials of the node N1, the node N2, and the first terminal of the capacitor C2 the same as those in the period T44 in FIG. 26B.

Therefore, for the operation in and after the period T44 in FIG. 27, the operation in and after the period T44 in FIG. 26A is referred to.

As described above, when the display apparatus DSP4A operates in accordance with the timing chart in FIG. 27, the display apparatus DSP4A can generate a current with a corrected field-effect mobility of the transistor M2 and supply the current to the light-emitting device LD without depending on the threshold voltage $V_{th}$ of the transistor M2, as in the operation in accordance with the timing chart in FIGS. 26A to 26C. Furthermore, the display apparatus DSP4A can minutely control the amount of current flowing through the light-emitting device LD in the pixel PX by operating in accordance with the timing chart in FIG. 27, as in the operation in accordance with the timing chart in FIG. 26A.

Example 2 of Operation Method of Display Apparatus

FIGS. 26A to 26C illustrate operation of one of the pixels PX included in the pixel array ALP of the display apparatus DSP4A. Here, operation of the whole pixel array ALP in the display apparatus DSP0 employing the structure of the display apparatus DSP4A is described.

The overall operation of the pixel array ALP of the display apparatus DSP0 employing the structure of the display apparatus DSP4A can be the same as the overall operation of the pixel array ALP of the display apparatus DSP0 employing the structure of the display apparatus DSP3A described in Embodiment 1. That is, the timing chart of FIG. 6 can be employed as an example of the overall operation of the pixel array ALP of the display apparatus DSP0 employing the structure of the display apparatus DSP4A. Portions different from the overall operation of the pixel array ALP of the display apparatus DSP0 employing the structure of the display apparatus DSP3A described in Embodiment 1 are described below, and for the other portions, description in Embodiment 1 can be referred to.

The node N3[1] corresponds to the node N3 included in the circuit CD[1] in the display apparatus DSP0. Similarly, a node N3[2] corresponds to the node N3 included in a circuit CD[2] (not illustrated in FIG. 2) in the display apparatus DSP0, and the node N3[n] corresponds to the node N3 included in the circuit CD[n] in the display apparatus DSP0.

The wiring GL1[1] corresponds to the wiring GL1 in FIG. 25 extended in the first row in the pixel array ALP of the display apparatus DSP0. Similarly, the wiring GL1[2] corresponds to the wiring GL1 in FIG. 25 extended in the second row in the pixel array ALP of the display apparatus DSP0, and the wiring GL1[m] corresponds to the wiring GL1 in FIG. 25 extended in the m-th row in the pixel array ALP of the display apparatus DSP0.

The capacitor C1[1,1] corresponds to the capacitor C1 in FIG. 25 in the pixel PX[1,1] included in the pixel array ALP of the display apparatus DSP0. Similarly, the capacitor C1[1,2] corresponds to the capacitor C1 in FIG. 25 in the pixel PX[1,2] (not illustrated in FIG. 2) included in the pixel array ALP of the display apparatus DSP0, and the capacitor C1[1,n] corresponds to the capacitor C1 in FIG. 25 in the pixel PX[1,n] included in the pixel array ALP of the display apparatus DSP0. A capacitor C1[i,j] hereinafter corresponds to the capacitor C1 in FIG. 25 in the pixel PX[i,j] included in the pixel array ALP of the display apparatus DSP0.

In each of the periods U1, U3, and U6 in the timing chart of FIG. 6, operation in the periods T41 to T45 in the timing chart of FIG. 26A is performed on the pixels PX positioned in a certain row. In each of the periods U2, U4, and U7 in the timing chart of FIG. 6, operation in the periods T46 to T48 in the timing chart of FIG. 26A is performed on the pixels PX positioned in a certain row.

As described above, by performing the operation in the periods U1 to U7, the display apparatus DSP0 employing the configuration of the display apparatus DSP4A can display an image. The image displayed on the display apparatus DSP0 can be updated every time the operation in the periods U1 to U7 is repeated.

Layout Example of Display Apparatus

Figure 29:
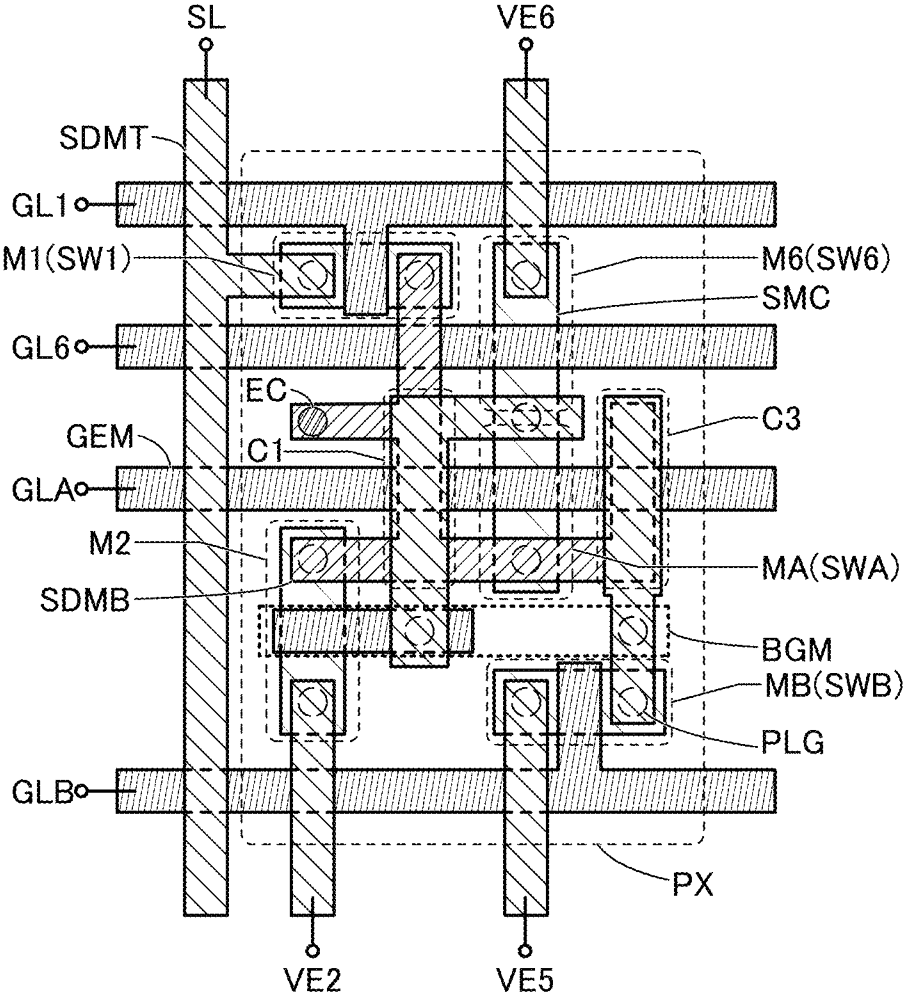
FIG. 29 is a plan view illustrating a layout example of a circuit.

FIG. 29 is a layout (a plan view) illustrating a circuit configuration example of part of the display apparatus DSP4A in FIG. 25. Specifically, FIG. 29 illustrates a layout of the pixel PX. For the layout of the circuit CD in the display apparatus DSP4A, the layout in FIG. 7A can be referred to, for example.

In the layout in FIG. 29, the transistor M1, the transistor M6, a transistor MA, and a transistor MB are used respectively as the switch SW1, the switch SW6, the switch SWA, and the switch SWB included in the pixel PX in FIG. 25.

The pixel PX in FIG. 29 includes a conductor BGM, the conductor GEM, the conductor SDMB, the conductor SDMT, the semiconductor SMC, and the conductor PLG. Note that an insulator included in the pixel PX is not illustrated in FIG. 29.

The conductor BGM is positioned below the semiconductor SMC, for example. The semiconductor SMC is positioned below the conductor GEM, for example. The conductor GEM is positioned below the conductor SDMB, for example. The conductor SDMB is positioned below the conductor SDMT, for example. That is, in the circuit CD and the pixel PX in FIG. 29, the conductor BGM, the semiconductor SMC, the conductor GEM, the conductor SDMB, and the conductor SDMT are formed in this order.

Part of the conductor GEM serves as gates (sometimes referred to as first gates) of the transistors M1, M2, M6, MA, and MB, for example. Part of the conductor BGM serves as a back gate (sometimes referred to as a second gate) of the transistor M2, for example.

The conductor BGM, the semiconductor SMC, the conductor GEM, the conductor SDMB, and the conductor SDMT can be formed through photolithography, for example. Specifically, for example, in the case where the conductor GEM is formed, a conductive material to be the conductor GEM is deposited by one or more methods selected from a sputtering method, a CVD method, a PLD method, and an ALD method, and then a desired pattern is formed through photolithography. The conductor BGM, the semiconductor SMC, the conductor SDMB, and the conductor SDMT can also be formed in a manner similar to that of the conductor GEM.

Furthermore, insulators may be provided between the conductor BGM and the semiconductor SMC, between the semiconductor SMC and the conductor GEM, between the conductor GEM and the conductor SDMB, and between the conductor SDMB and the conductor SDMT. In particular, an insulator provided between the semiconductor SMC and the conductor GEM serves as a gate insulating film (sometimes referred to as a first gate insulating film or a front gate insulating film) in some cases. An insulator provided between the conductor BGM and the semiconductor SMC serves as a second gate insulating film (sometimes referred to as a back gate insulating film) in some cases.

The conductor PLG serving as a wiring or a plug is provided each between the conductor BGM and the conductor SDMT, between the semiconductor SMC and the conductor SDMB, between the semiconductor SMC and the conductor SDMT, and between the conductor GEM and the conductor SDMT. The conductor PLG is formed, for example, in such a manner that an opening is formed in the insulator, and the opening is filled with a conductive material to be the conductor PLG. Note that after the formation of the conductor PLG, planarization using chemical mechanical polishing or the like may be performed to align the levels of film surfaces of the conductor PLG and peripheral insulators.

Each of the transistors M1, M2, M6, MA, and MB illustrated in FIG. 29 includes part of the semiconductor SMC, part of the conductor GEM, part of the insulator, and part of the conductor PLG, for example. Furthermore, the transistor M2 includes part of the conductor BGM, for example.

The capacitors C1 and C3 in FIG. 29 each include part of the conductor SDMB and part of the conductor SDMT. Specifically, each of the capacitor C1 and the capacitor C3 has a region where part of the conductor SDMB and part of the conductor SDMT overlap with each other. That is, in each of the capacitor C1 and the capacitor C3, the part of the conductor SDMB serves as one of a pair of electrodes, and the part of the conductor SDMT serves as the other of the pair of electrodes. Note that an insulator with high dielectric constant is preferably provided between the conductor SDMB and the conductor SDMT which are included in the capacitors C1 and C3.

A conductor EC illustrated in FIG. 29 is formed over the conductor SDMB, for example. The conductor EC serves as a wiring or a plug for electrically connecting the conductor SDMB and the anode of the light-emitting device LD (not illustrated in FIG. 29) positioned above the conductor SDMT.

Modification Example 1 of Display Apparatus

Note that the circuit CD in the above-described display apparatus of one embodiment of the present invention is not limited to the circuit CD illustrated in FIG. 25. Some modification may be performed as appropriate on the circuit CD in FIG. 25 of one embodiment of the present invention.

For example, a capacitor may be added to the circuit CD in FIG. 25. Specifically, as in the circuit CD illustrated in FIG. 30A, a capacitor C4 may be provided in the circuit CD, and a first terminal of the capacitor C4 may be electrically connected to the first terminal of the switch SW13, the first terminal of the capacitor C2, and the wiring SL. A second terminal of the capacitor C4 is electrically connected to a wiring VE7.

The wiring VE7 serves as a wiring supplying a constant potential, for example. That is, the wiring VE7 may serve as a power supply line. Note that the constant potential supplied by the wiring VE7 may be the same as or different from a constant potential supplied by any of the wirings VE0, VE2, and VE3 to VE6.

Figure 30A:
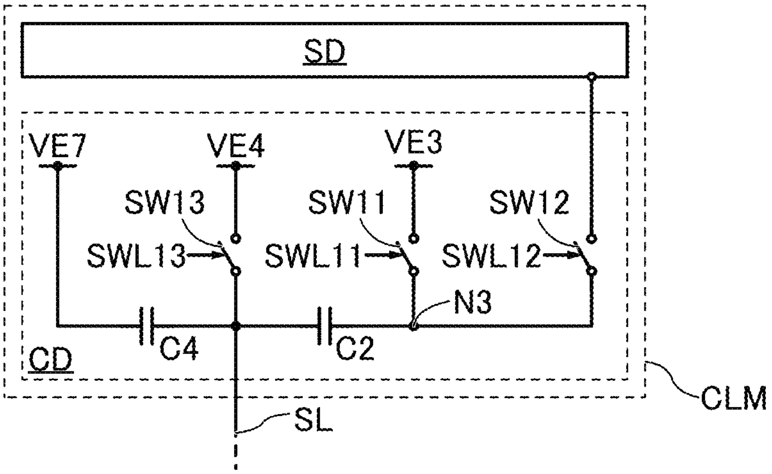
FIGS. 30A and 30B are circuit diagrams each illustrating a structure example of a circuit included in a display apparatus.

Adding the capacitor C4 to the circuit CD as illustrated in FIG. 30A can further reduce the amounts of changes in the potentials of the wiring SL and the node N2 due to the change in the potential of the node N3 in the period T46 in the timing chart of FIG. 26A. Specifically, when the electrostatic capacitance of the capacitor C4 is represented by C4, the amounts of changes in the potentials of the wiring SL and the node N2 due to the change in the potential of the node N3 is a value obtained by multiplying the change in the potential of the node N3 by $C_2/(C_1+C_2+C_3+C_4)$ in some cases. Note that in the case where the node NB is in a floating state, the amounts of changes in the potentials of the wiring SL and the node N2 due to the change in the potential of the node N3 is a value obtained by multiplying the change in the potential of the node N3 by $C_2/(C_1+C_2+C_4)$ in some cases.

Although the capacitor C4 is provided inside the circuit CD in FIG. 30A, the capacitor C4 may be provided outside the circuit CD. Specifically, for example, the wiring SL may be electrically connected to the first terminal of the capacitor C4, and the wiring VE7 may be electrically connected to the second terminal of the capacitor C4 as in a display apparatus DSP4AA illustrated in FIG. 31.

Figure 31:
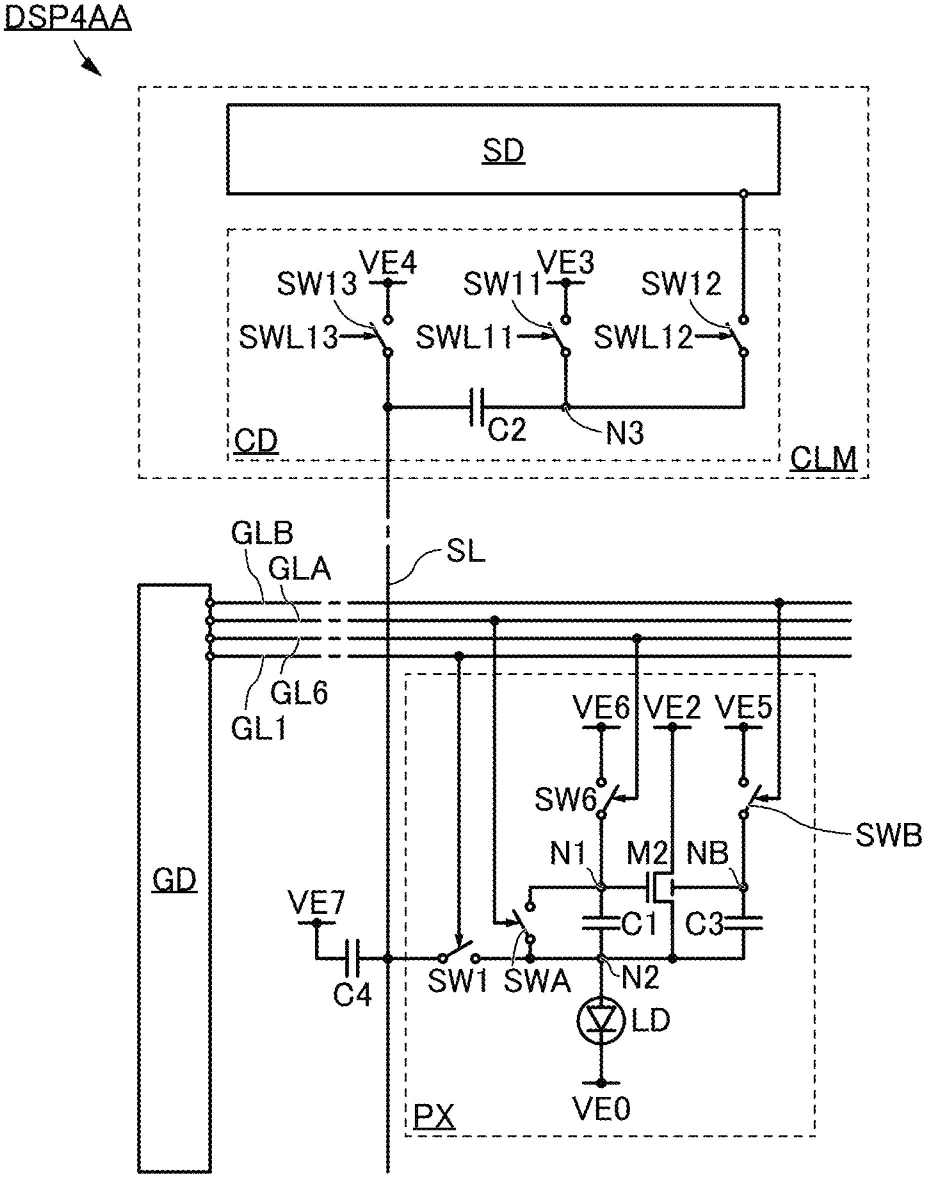
FIG. 31 is a circuit diagram illustrating a structure example of a display apparatus.

Although not illustrated, some of the capacitor and the plurality of switches included in any of all the circuits CD described in this specification, the drawings, and the like may be provided outside the circuit CD, like the capacitor C4 and the wiring VE7 illustrated in FIG. 31. That is, the configuration of the circuit CD of one embodiment of the present invention is not limited to that shown in this specification, the drawings, and the like; for example, some of circuit elements included in any of the circuits CD shown in this specification, the drawings, and the like can be provided outside the circuit CD.

Figure 30B:
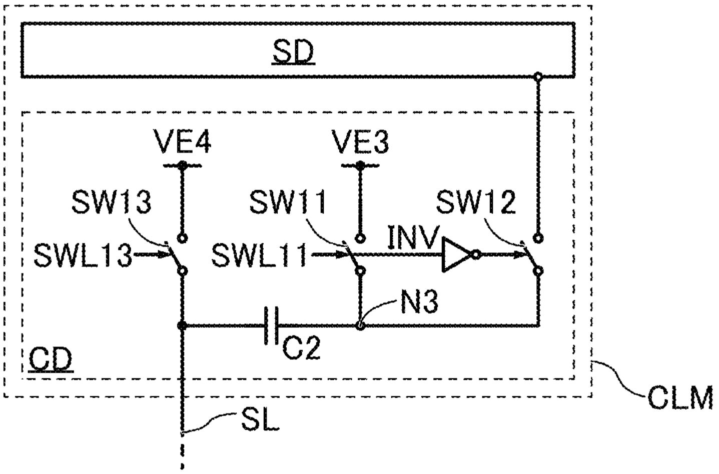

For example, the circuit CD in the display apparatus DSP4A in FIG. 25 can be changed to the circuit CD in FIG. 30B. The circuit CD in FIG. 30B is different from the circuit CD in FIG. 25 in that an inverter circuit INV is included and the control terminal of the switch SW12 is electrically connected not to the wiring SWL12 but to the wiring SWL11.

When the display apparatus DSP4A in FIG. 25 employs the configuration of the circuit CD in FIG. 30B, the wiring SWL12 does not need to be provided, which can reduce the circuit area of the display apparatus DSP4A in some cases.

Although not illustrated, in the case where a switch that is turned off when a high-level potential is supplied to its control terminal and turned on when a low-level potential is supplied to its control terminal is used as the switch SW12, the control terminal of the switch SW12 may be electrically connected to the wiring SWL11 not through the inverter circuit INV.

Modification Example 2 of Display Apparatus

Note that the structure of the above-described display apparatus of one embodiment of the present invention is not limited to the structure of the display apparatus DSP4A in FIG. 25. The structure of the display apparatus of one embodiment of the present invention may be the structure of the display apparatus DSP4A in FIG. 25 on which some modification is performed as appropriate.

Figure 32:
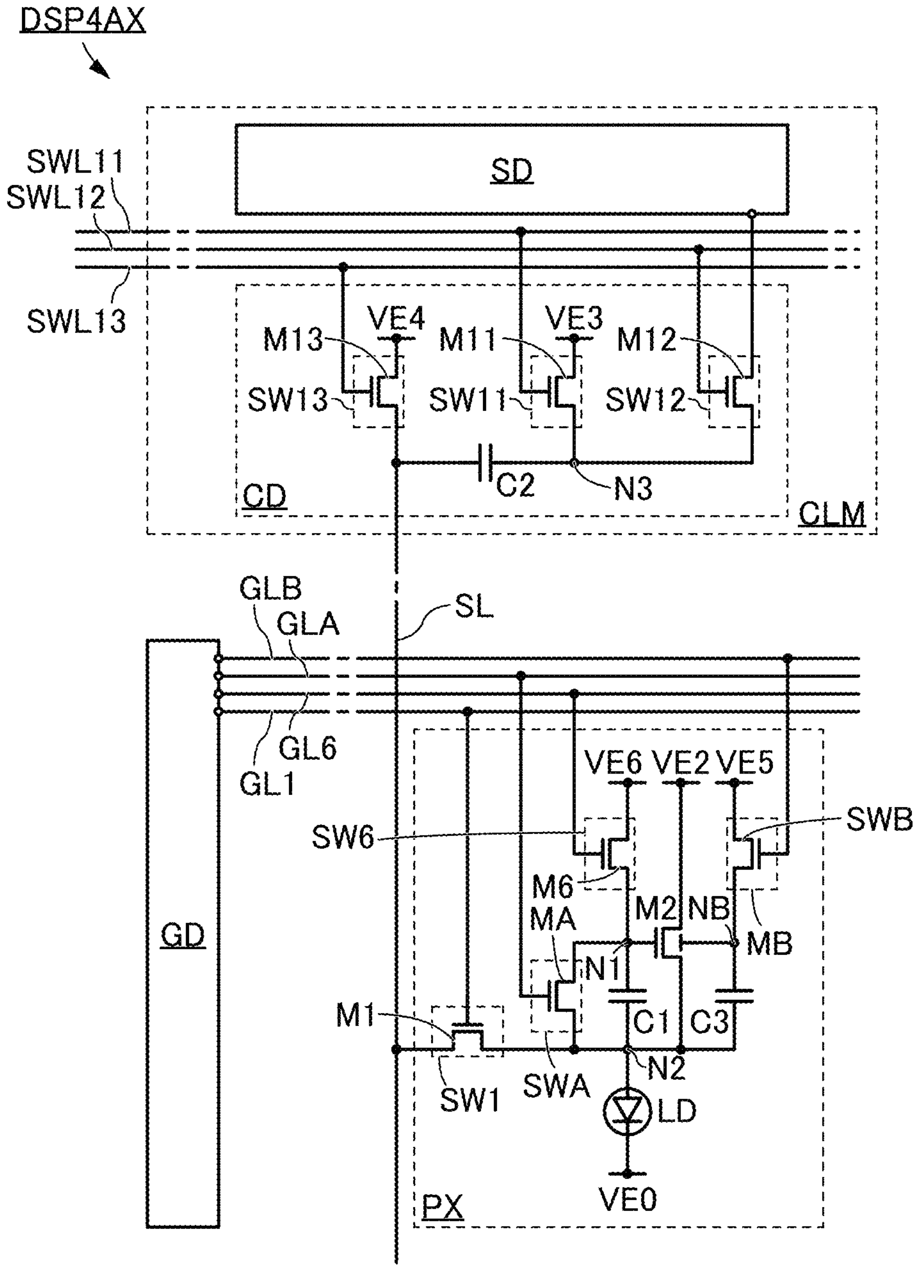
FIG. 32 is a circuit diagram illustrating a structure example of a display apparatus.

For example, each of the switches included in the display apparatus DSP4A may include a transistor as in a display apparatus DSP4AX in FIG. 32. Specifically, the pixel PX of the display apparatus DSP4AX in FIG. 32 has a structure in which the switch SW1 includes the transistor M1, the switch SW6 includes the transistor M6, the switch SWA includes the transistor MA, and the switch SWB includes the transistor MB. The circuit CD of the display apparatus DSP4AX in FIG. 32 has a structure in which the switch SW11 includes the transistor M11, the switch SW12 includes the transistor M12, and the switch SW13 includes the transistor M13.

Note that one or more selected from the transistors M1, M6, MA, MB, and M11 to M13 included in the display apparatus DSP4AX may have a back gate like the transistor M2 in FIG. 8A. Although the transistors M1, M2, M6, MA, MB, and M11 to M13 are n-channel transistors in FIG. 32, one or more selected from the transistors M1, M2, M6, MA, MB, and M11 to M13 may be p-channel transistors.

One or more selected from the transistors M1, M2, M6, MA, MB, and M11 to M13 included in the display apparatus DSP4AX may be transistors including a metal oxide in a channel formation region (OS transistors). The transistors other than the selected transistors may be transistors including a semiconductor material other than a metal oxide in a channel formation region. The semiconductor material other than a metal oxide can be silicon, for example. As the silicon, single crystal silicon, amorphous silicon (sometimes referred to as hydrogenated amorphous silicon), microcrystalline silicon, or polycrystalline silicon (including low-temperature polycrystalline silicon) can be used. As an example, OS transistors can be used as the transistors M1, M2, M6, MA, and MB, and transistors including silicon in a channel formation region can be used as the transistors M11 to M13. Alternatively, one or more selected from the transistors M1, M2, M6, MA, MB, and M11 to M13 may be Si transistors.

In the display apparatus DSP4AX in FIG. 32, each of the switches SW1, SW6, SWA, SWB, and SW11 to SW13 includes one transistor, but one or more selected from the switches SW1, SW6, SWA, SWB, and SW11 to SW13 may include two or more transistors. As an example of the switch including two or more transistors is an analog switch.

In the case where each of the switches SW1, SW6, SWA, SWB, and SW11 to SW13 included in the display apparatus DSP4AX includes two or more transistors, the semiconductor material included in the channel formation region is different between the two or more transistors included in each switch. For example, one switch may include a transistor including a metal oxide in a channel formation region and a transistor including silicon in a channel formation region.

The above description of the switches can apply not only to the switches included in the display apparatus DSP4A and the display apparatus DSP4AX, but also to the switches in the other parts in this specification and the drawings. The above description of the transistor applies to not only the transistors included in the display apparatuses DSP4A and DSP4AX but also transistors described in other parts of the specification and transistors illustrated in the drawings.

Modification Example 3 of Display Apparatus

Figure 33:
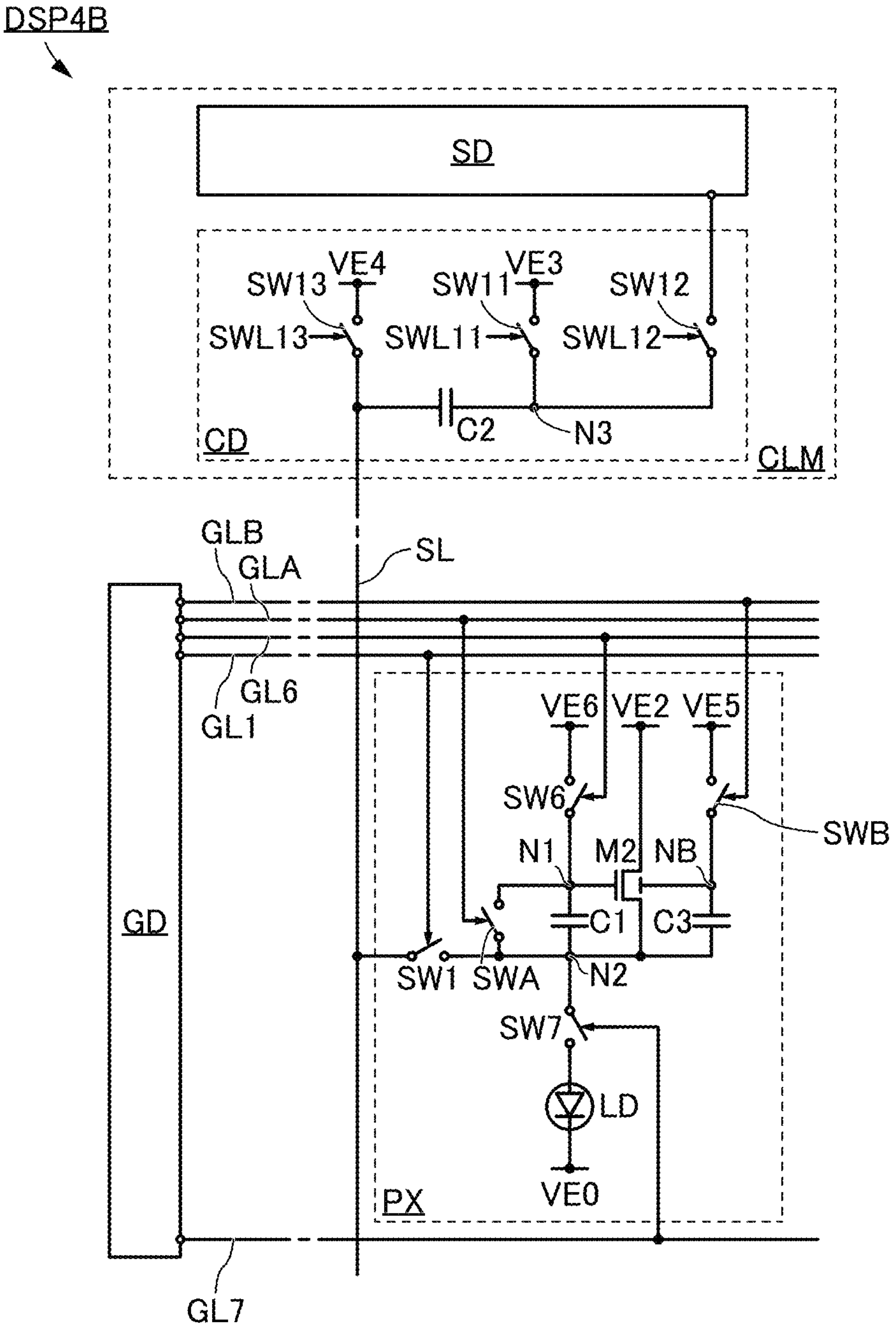
FIG. 33 is a circuit diagram illustrating a structure example of a display apparatus.

Next, FIG. 33 illustrates an example of the display apparatus DSP0 in FIG. 2, which is different from the display apparatus DSP4A. A display apparatus DSP4B in FIG. 33 is a modification example of the display apparatus DSP4A in FIG. 25, and is different from the display apparatus DSP4A in FIG. 25 in that the switch SW7 is provided between the anode of the light-emitting device LD and each of the first terminal of the transistor M2, the first terminal of the capacitor C1, the first terminal of the capacitor C3, the first terminal of the switch SW1, and the first terminal of the switch SWA.

Therefore, for portions of the display apparatus DSP4B in common with the display apparatus DSP4A, the description of the display apparatus DSP4A can be referred to.

In the display apparatus DSP4B, the first terminal of the switch SW7 is electrically connected to the first terminal of the switch SW1, the first terminal of the switch SWA, the first terminal of the capacitor C1, the first terminal of the capacitor C3, and the first terminal of the transistor M2. The second terminal of the switch SW7 is electrically connected to the anode of the light-emitting device LD. The control terminal of the switch SW7 is electrically connected to the wiring GL7.

In the display apparatus DSP4B in FIG. 33, the wiring GL7 together with the wirings GL1, GL6, GLA, and GLB correspond to one of the wirings GL[1] to GL[m] in FIG. 2. That is, in the case of the circuit configuration of the pixel PX in FIG. 33, the number of wirings GL extended per row of the pixel array ALP is five.

Next, an example of an operation method of the display apparatus DSP4B in FIG. 33 is described.

Figure 34:
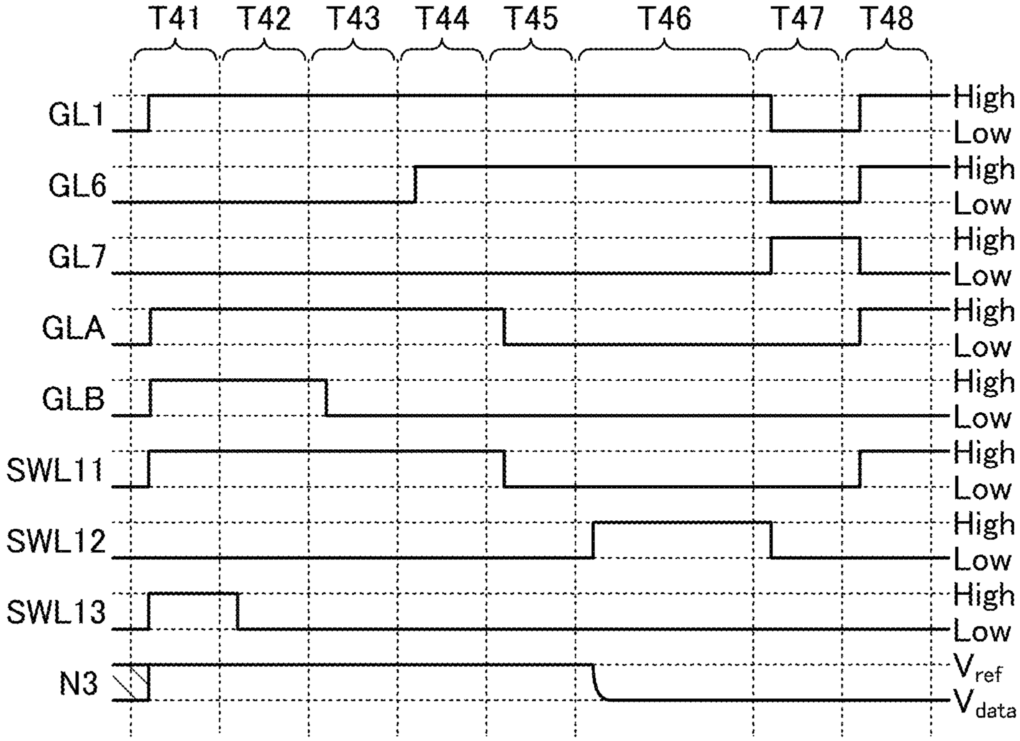
FIG. 34 is a timing chart showing an operation method example of a display apparatus.

FIG. 34 is a timing chart showing an example of an operation method of the display apparatus DSP4B. Specifically, the timing chart in FIG. 34 is a modification example of the timing chart of FIG. 26A, and corresponds to a timing chart obtained by adding a change in the potential of the wiring GL7 to the timing chart of FIG. 26A. Therefore, for operations in the display apparatus DSP4B other than the change in the potential of the wiring GL7, description of the timing charts in FIGS. 26A to 26C can be referred to.

In the periods T41 to T46 and T48, a low-level potential is supplied to the wiring GL7. Thus, a low-level potential is supplied to the control terminal of the switch SW7, whereby the switch SW7 is turned off.

That is, since the anode of the light-emitting device LD and each of the first terminal of the switch SW1, the first terminal of the switch SWA, the first terminal of the capacitor C1, the first terminal of the capacitor C3, and the first terminal of the transistor M2 (the node N2) are brought out of conduction in the periods T41 to T46 and T48, the potential of the node N2 is not supplied to the anode of the light-emitting device LD. In addition, current is not supplied from the wiring VE2 to the anode of the light-emitting device LD through the transistor M2 because the switch SW7 is off. Therefore, the light-emitting device LD does not emit light.

In the period T47, a high-level potential is supplied to the wiring GL7. Thus, a high-level potential is supplied to the control terminal of the switch SW7, whereby the switch SW7 is turned on.

That is, in the period T47, the first terminal of the transistor M2 and the anode of the light-emitting device LD are brought into conduction, so that current is supplied from the wiring VE2 to the anode of the light-emitting device LD through the transistor M2. Thus, the light-emitting device LD emits light. Note that the current is determined in accordance with the gate-source voltage of the transistor M2 as described in FIGS. 26A to 26C.

As described above, whether or not current is supplied to the light-emitting device LD can be selected with the use of the display apparatus DSP4B. Accordingly, for example, when both the threshold voltage and the field-effect mobility of the transistor M2 are corrected in the periods T41 to T46, even with operation or conditions in which a difference between the potential of the node N2 and a potential supplied by the wiring VE0 is higher than the threshold voltage $V_{the}$ of the light-emitting device LD, turning off the switch SW7 can prevent current from flowing between the anode and the cathode of the light-emitting device LD. That is, in the periods T41 to T46 in which the threshold voltage and the field-effect mobility of the transistor M2 in the display apparatus DSP4B are corrected, the change in the potential of the node N2 which is caused by current flowing between the anode and the cathode of the light-emitting device LD can be prevented and light emission from the light-emitting device LD can be prevented.

Note that the structure of the display apparatus of one embodiment of the present invention is not limited to the structure of the display apparatus DSP4B. The structure of the display apparatus of one embodiment of the present invention may be the structure of the display apparatus DSP4B in FIG. 33 on which some modification is performed as appropriate.

Figure 35:
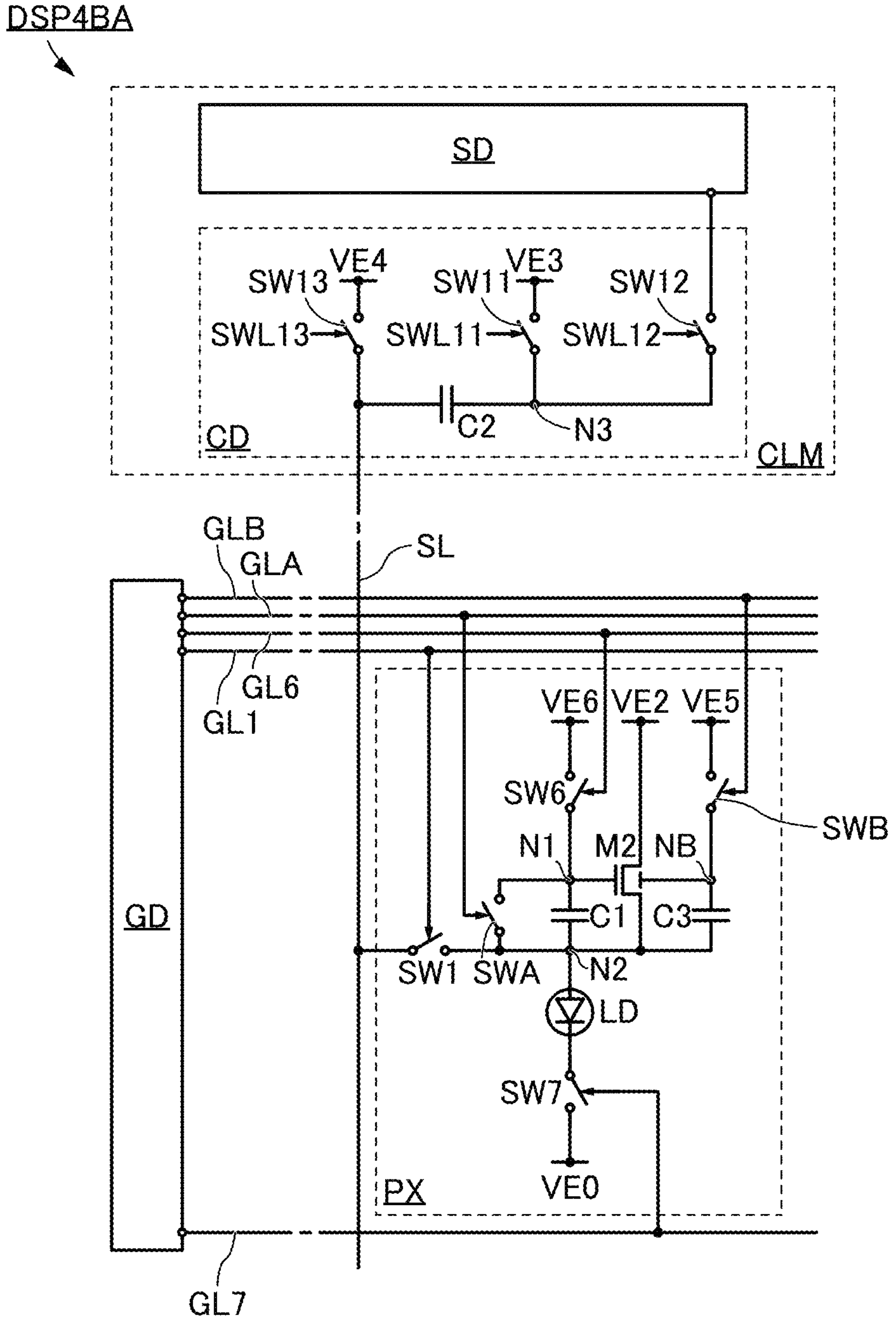
FIG. 35 is a circuit diagram illustrating a structure example of a display apparatus.

FIG. 35 illustrates a modification example of the display apparatus DSP4B in FIG. 33. A display apparatus DSP4BA illustrated in FIG. 35 is different from the display apparatus DSP4B in FIG. 33 in that the first terminal of the switch SW7 is not electrically connected to the first terminal of the transistor M2 and is directly and electrically connected to the cathode of the light-emitting device LD and the second terminal of the switch SW7 is electrically connected to the wiring VE0.

That is, the display apparatus DSP4B has a configuration in which the switch SW1, the switch SW7, and the light-emitting device LD are provided in this order in an electrical path between the wiring SL and the wiring VE0, and the display apparatus DSP4BA has a configuration in which the switch SW1, the light-emitting device LD, and the switch SW7 are provided in this order in the electrical path between the wiring SL and the wiring VE0.

By performing the same operation method as the display apparatus DSP4B, the display apparatus DSP4BA can also prevent a change in the potential of the node N2 caused by a current flowing between the anode and the cathode of the light-emitting device LD and prevent light emission of the light-emitting device LD in the periods T41 to T46 in which the threshold voltage and the field-effect mobility of the transistor M2 in the pixel PX are corrected.

Figure 36:
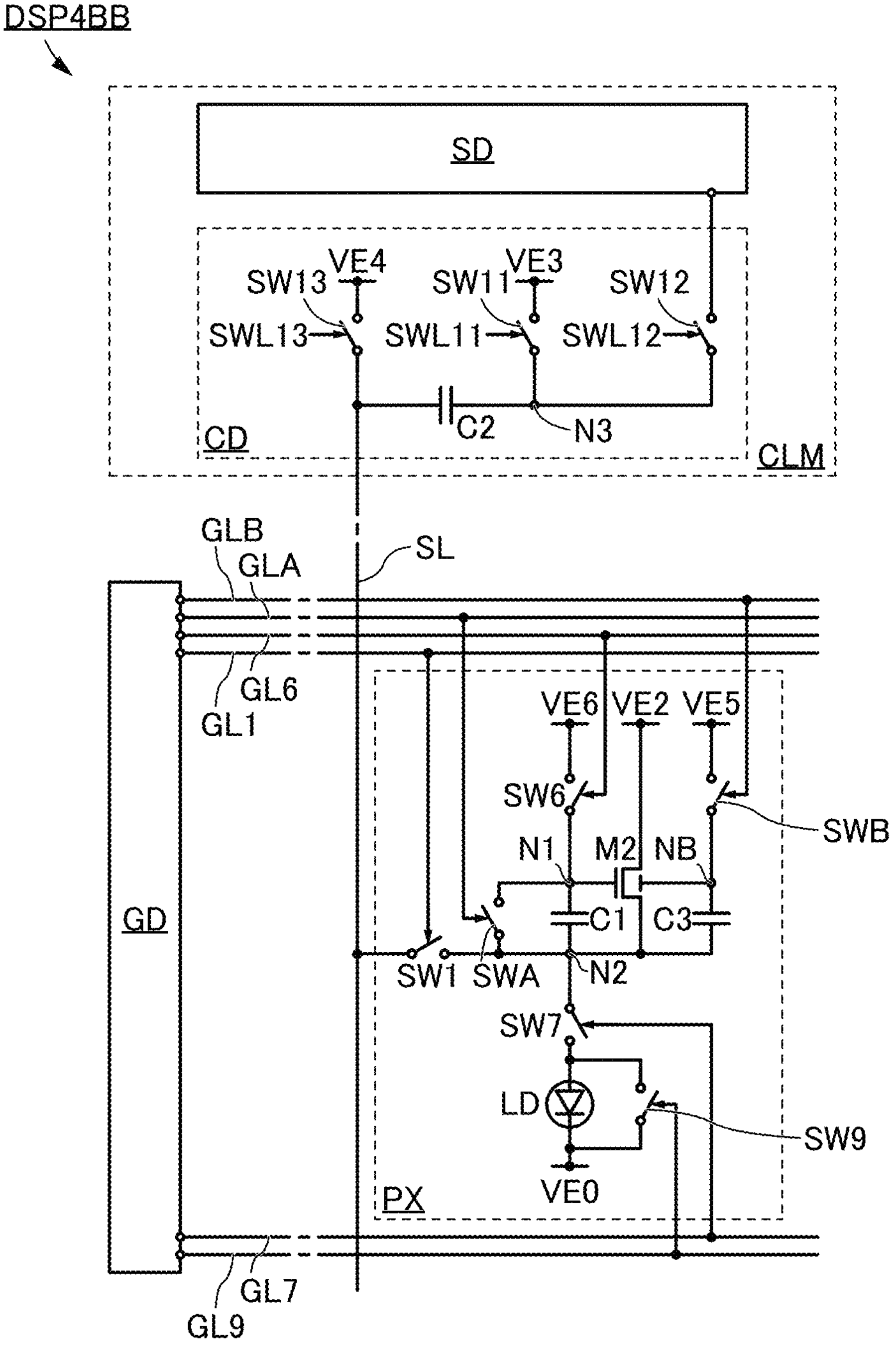
FIG. 36 is a circuit diagram illustrating a structure example of a display apparatus.

FIG. 36 illustrates another modification example of the display apparatus DSP4B, which is different from the display apparatus DSP4BA in FIG. 35. A display apparatus DSP4BB illustrated in FIG. 36 is a modification example of the display apparatus DSP4B in FIG. 33, and different from the display apparatus DSP4B in that the switch SW9 is provided to be electrically connected to the light-emitting device LD in parallel.

The first terminal of the switch SW9 is electrically connected to the anode of the light-emitting device LD and the second terminal of the switch SW7. The second terminal of the switch SW9 is electrically connected to the anode of the light-emitting device LD and the wiring VE0. The control terminal of the switch SW9 is electrically connected to the wiring GL9.

In the display apparatus DSP4BB in FIG. 36, the wiring GL9 together with the wirings GL1, GL6, GL7, GLA, and GLB correspond to one of the wirings GL[1] to GL[m] in FIG. 2. That is, in the case of the circuit configuration of the pixel PX in FIG. 36, the number of wirings GL extended per row of the pixel array ALP is six.

For an operation method example of the display apparatus DSP4BB in FIG. 36, the timing chart in FIG. 34 can be referred to. In the timing chart in FIG. 34, a signal whose logic is inverted from the logic of a signal supplied to the wiring GL7 is input to the wiring GL9, for example.

That is, the display apparatus DSP4BA in FIG. 36 can discharge electric charge accumulated in the anode of the light-emitting device LD to the wiring VE0 through the switch SW9 in the period (e.g., in the periods T41 to T46 or in the period T48) in which the light-emitting device LD does not emit light, like the display apparatus DSP3E in FIG. 17 and the display apparatus DSP3EA in FIG. 18 described in Embodiment 1.

Accordingly, the display apparatus DSP4BA can discharge electric charges accumulated in the anode of the light-emitting device LD at a higher speed than the display apparatuses not including the switch SW9 (e.g., the display apparatuses DSP4A, DSP4AA, DSP4B, and DSP4BA). This can shift the emission state of the light-emitting device LD to the quenching state.

Modification Example 4 of Display Apparatus

Figure 37:
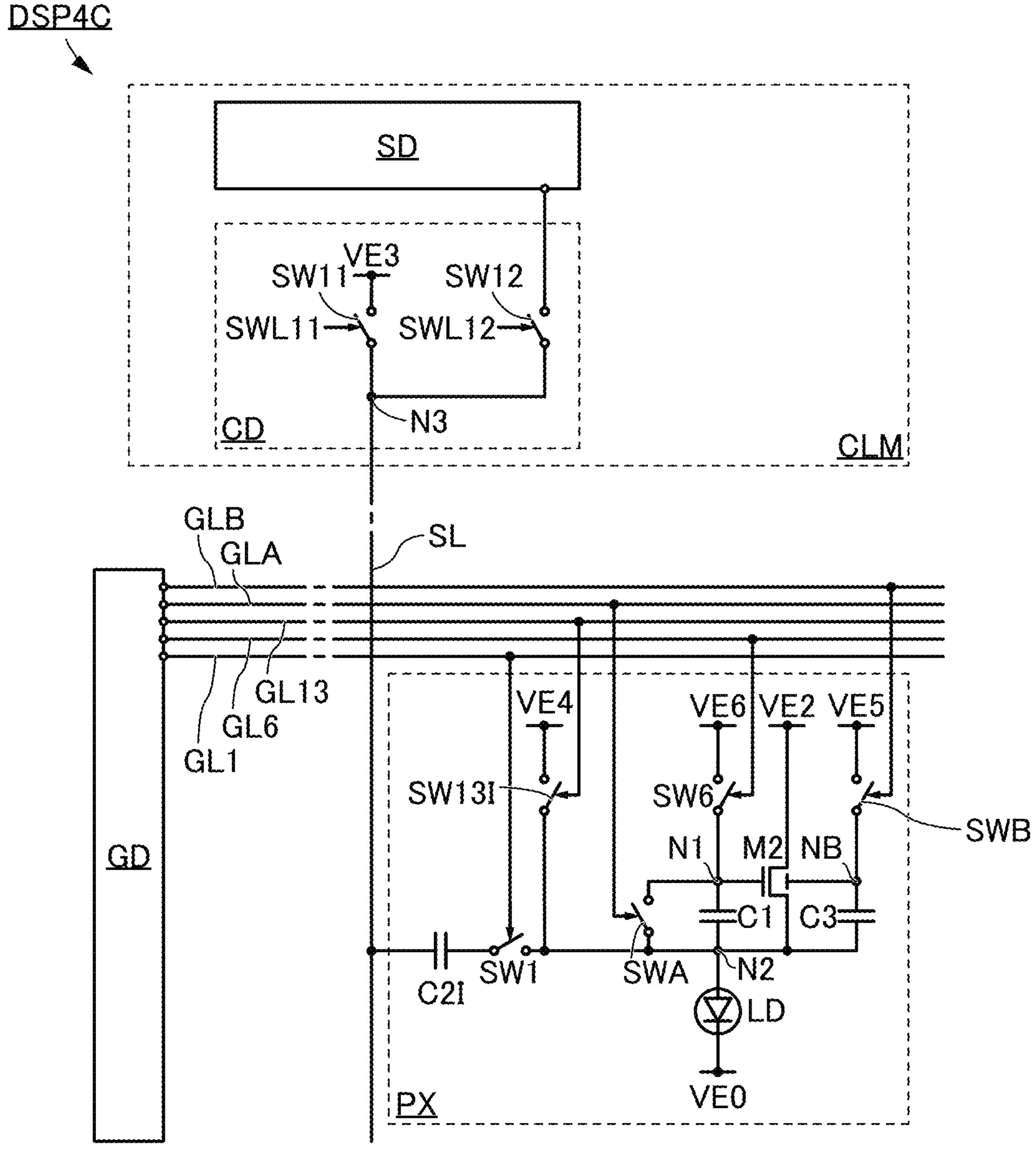
FIG. 37 is a circuit diagram illustrating a structure example of a display apparatus.

Next, FIG. 37 illustrates an example of the display apparatus DSP0 in FIG. 2 which is different from the display apparatuses DSP4A, DSP4AA, DSP4AX, DSP4B, DSP4BA, and DSP4BB. A display apparatus DSP4C illustrated in FIG. 37 is a modification example of the display apparatus DSP4A in FIG. 25, and different from the display apparatus DSP4A in that the switch SW13I and the capacitor C2I are provided in the pixel PX and the switch SW13 and the capacitor C2 are not provided in the circuit CD.

Therefore, for portions of the display apparatus DSP4C in common with the display apparatus DSP4A, the description of the display apparatus DSP4A can be referred to.

In the display apparatus DSP4C, a first terminal of the switch SW13I is electrically connected to the first terminal of the switch SW1, the first terminal of the switch SWA, the first terminal of the transistor M2, the first terminal of the capacitor C1, the first terminal of the capacitor C3, and the anode of the light-emitting device LD. The second terminal of the switch SW13I is electrically connected to the wiring VE4. The control terminal of the switch SW13I is electrically connected to the wiring GL13.

The first terminal of the capacitor C2I is electrically connected to the second terminal of the switch SW1. The second terminal of the capacitor C2I is electrically connected to the wiring SL.

The first terminal of the switch SW11 is electrically connected to the wiring SL and the first terminal of the switch SW12.

The wiring GL13 together with the wirings GL1, GL6, GLA, and GLB correspond to one of the wirings GL[1] to GL[m] in FIG. 2. That is, in the case of the circuit configuration of the pixel PX in FIG. 37, the number of wirings GL extended per row of the pixel array ALP is five.

Note that in the display apparatus DSP4C, a point where the first terminal of the switch SW1, the first terminal of the switch SW13I, the first terminal of the capacitor C1, the first terminal of the transistor M2, and the anode of the light-emitting device LD are electrically connected is referred to as the node N2. A point where the first terminal of the switch SW11, the first terminal of the switch SW12, and the second terminal of the capacitor C2I are electrically connected is referred to as the node N3. Note that in the description of this structure example of the display apparatus DSP4C, the node N3 can be replaced with the wiring SL in some cases.

In the display apparatus DSP4C, the switch SW13I and the capacitor C2I correspond to the switch SW13 and the capacitor C2, respectively, in the display apparatus DSP4A. The wiring GL13 corresponds to the wiring SWL13. In other words, the display apparatus DSP4C has a structure in which the switch SW13 and the capacitor C2 included in the circuit CD in the display apparatus DSP4A are provided in the pixel PX as the switch SW13I and the capacitor C2I. For this reason, the operation method of the display apparatus DSP4C can be described in some cases in such a manner that the switch SW13, the capacitor C2, and the wiring SWL13 in the operation method of the display apparatus DSP4A are replaced with the switch SW13I, the capacitor C2I, and the wiring GL13, respectively.

The display apparatus DSP4C can correct the threshold voltage and the field-effect mobility of the transistor M2 in the pixel PX to display an image on the pixel PX by employing the operation method similar to that of the display apparatus DSP4A.

Figure 38:
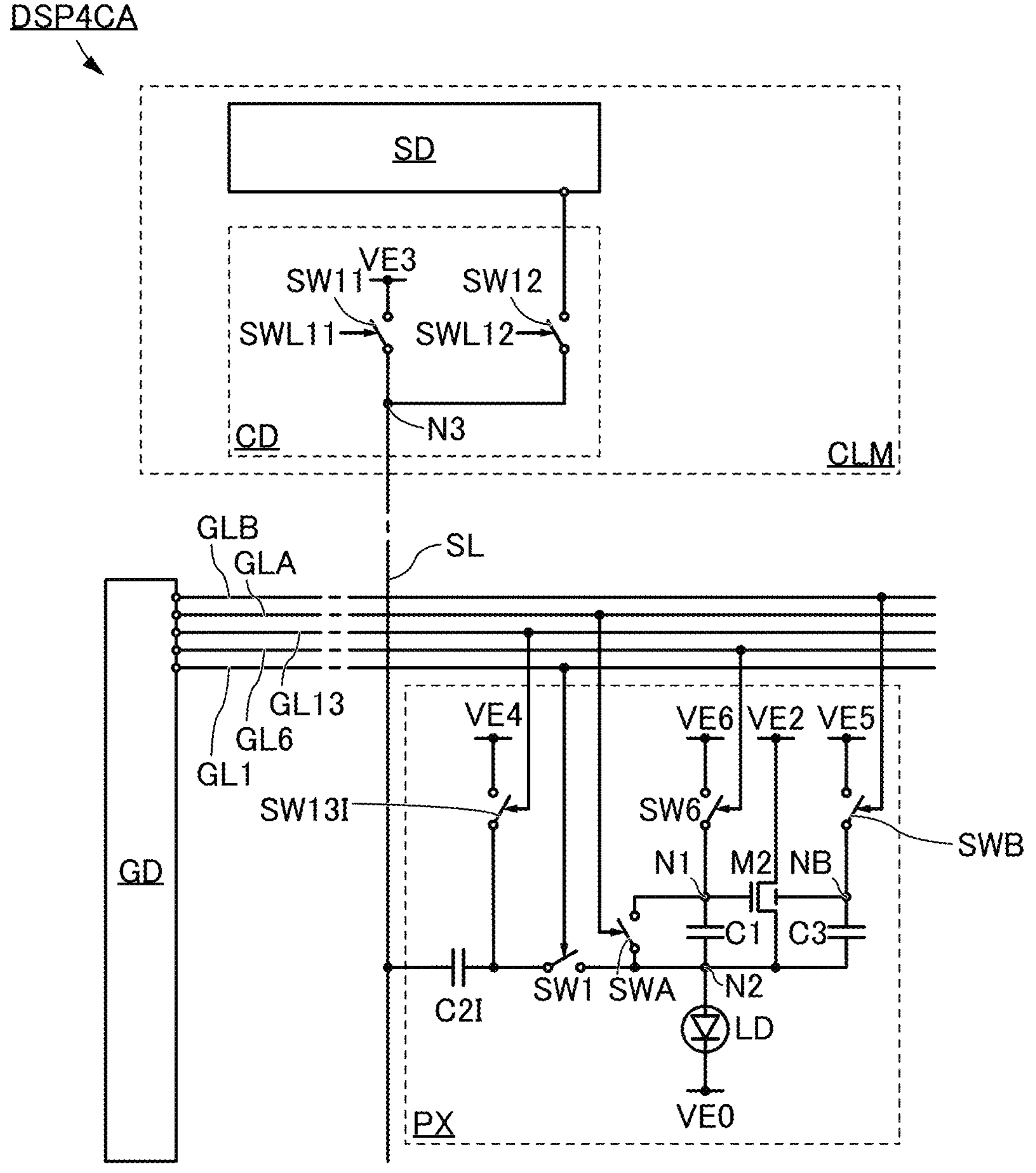
FIG. 38 is a circuit diagram illustrating a structure example of a display apparatus.

FIG. 38 illustrates a modification example of the display apparatus DSP4C in FIG. 37. The display apparatus DSP4CA in FIG. 38 is different from the display apparatus DSP4C in that the first terminal of the switch SW13I is electrically connected not to the first terminal of the switch SW1 but to the second terminal of the switch SW1 and the first terminal of the capacitor C2I.

Figure 39:
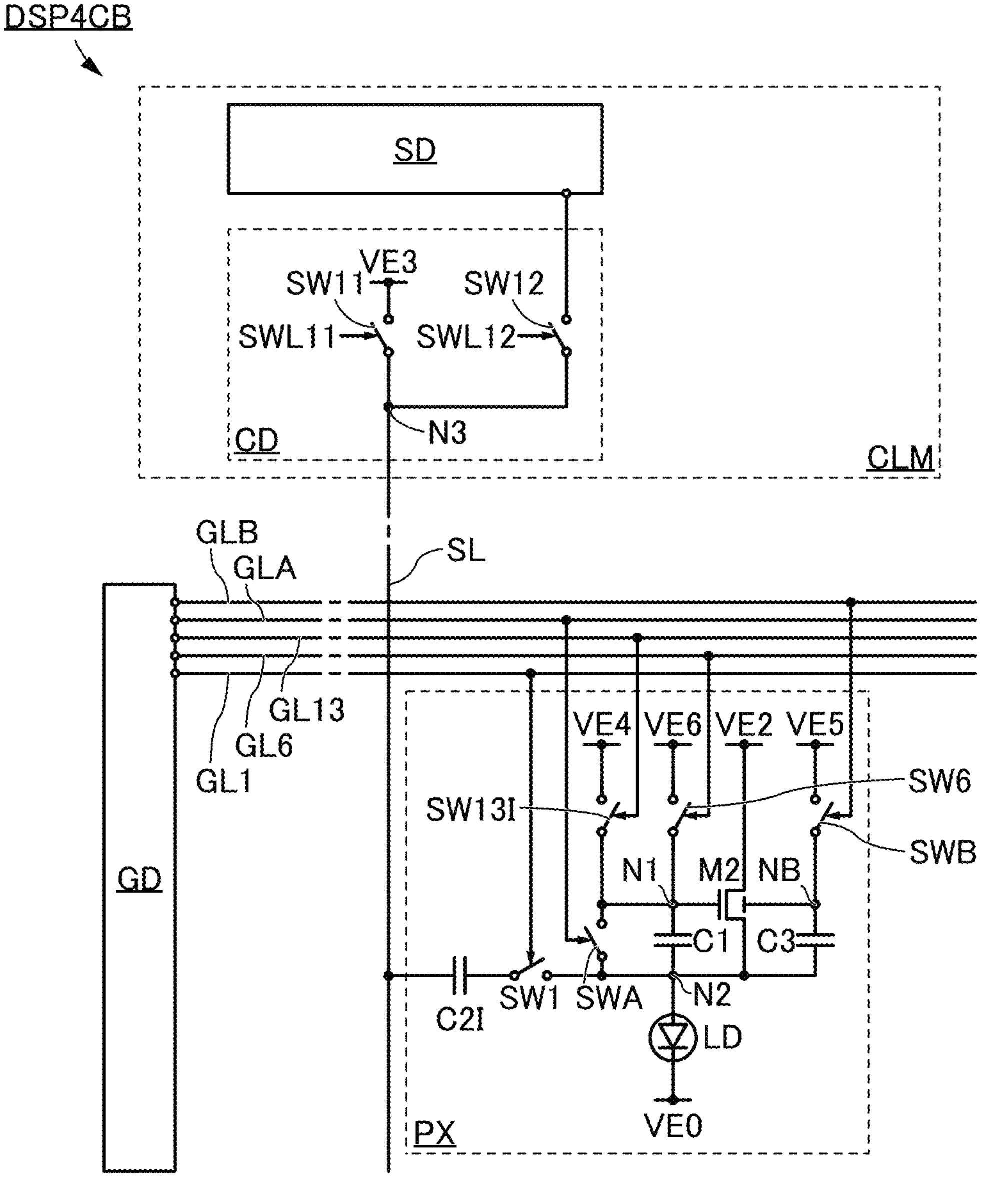
FIG. 39 is a circuit diagram illustrating a structure example of a display apparatus.

FIG. 39 illustrates another modification example of the display apparatus DSP4C, which is different from the display apparatus DSP4CA in FIG. 38. A display apparatus DSP4CB illustrated in FIG. 39 is different from the display apparatus DSP4C and the display apparatus DSP4CA in that the first terminal of the switch SW13I is electrically connected not to the first terminal and the second terminal of the switch SW1 but to the second terminal of the switch SWA, the second terminal of the capacitor C1, the first terminal of the switch SW6, and the gate of the transistor M2.

The display apparatuses DSP4CA and DSP4CB can correct the threshold voltage and the field-effect mobility of the transistor M2 in the pixel PX to display an image on the pixel PX by employing the operation method similar to that of the display apparatus DSP4C.

Note that the structure of the display apparatus of one embodiment of the present invention is not limited to the structures of the display apparatuses DSP4C, DSP4CA, and DSP4CB. The structure of the display apparatus of one embodiment of the present invention may be the structure of the display apparatus DSP4C in FIG. 37 on which some modification is performed as appropriate.

Figure 40:
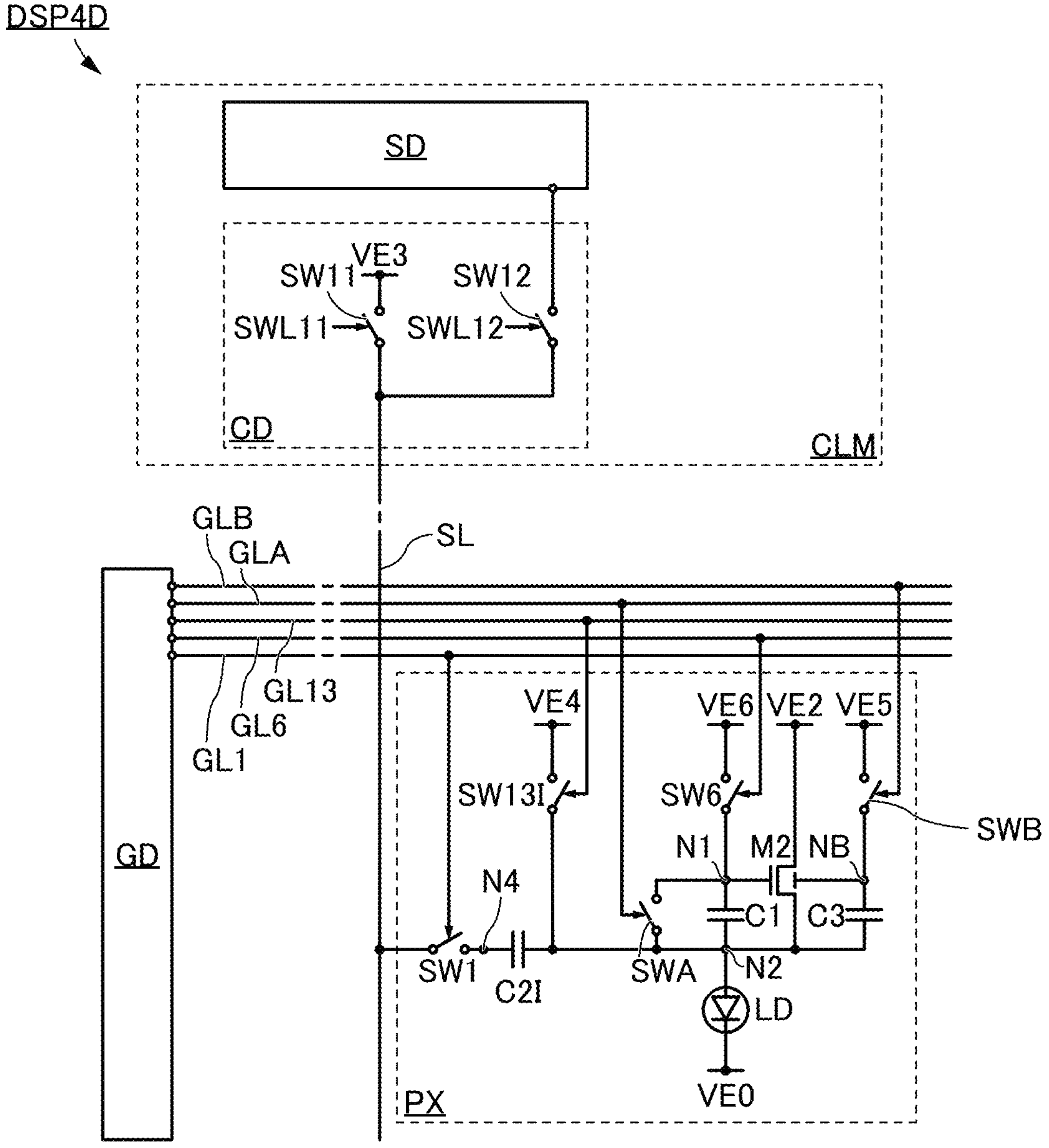
FIG. 40 is a circuit diagram illustrating a structure example of a display apparatus.

FIG. 40 illustrates a modification example of the display apparatus DSP4C in FIG. 37. A display apparatus DSP4D illustrated in FIG. 40 is different from the display apparatus DSP4C in FIG. 37 in that the second terminal of the switch SW1 is electrically connected not to the first terminal of the capacitor C2I but to the wiring SL, the first terminal of the switch SW1 is electrically connected not to the anode of the light-emitting device LD but to the second terminal of the capacitor C2I, and the first terminal of the capacitor C2I is electrically connected to the anode of the light-emitting device LD.

In other words, in an electrical path between the wiring SL and the wiring VE0 in the display apparatus DSP4C, the capacitor C2I, the switch SW1, and the light-emitting device LD are provided in this order, whereas, in an electrical path between the wiring SL and the wiring VE0 in the display apparatus DSP4D, the switch SW1, the capacitor C2I, and the light-emitting device LD are provided in this order.

Note that in this embodiment, a point where the first terminal of the switch SW1 and the second terminal of the capacitor C2I are electrically connected is referred to as a node N4 in the display apparatus DSP4D in FIG. 40.

In the display apparatus DSP4D, the switch SW13I and the capacitor C2I correspond to the switch SW13 and the capacitor C2, respectively, in the display apparatus DSP4C. The wiring GL13 corresponds to the wiring SWL13. The node N4 corresponds to the node N3 in the display apparatus DSP4C. In other words, a display apparatus DSP4D has a structure in which the switch SW13 and the capacitor C2 included in the circuit CD in the display apparatus DSP4C are provided in the pixel PX as the switch SW13I and the capacitor C2I. For this reason, the operation method of the display apparatus DSP4D can be described in some cases in such a manner that the switch SW13, the capacitor C2, the node N4, and the wiring SWL13 in the operation method of the display apparatus DSP4C are replaced with the switch SW13I, the capacitor C2I, the node N3, and the wiring GL13, respectively.

The display apparatus DSP4D can correct the threshold voltage and the field-effect mobility of the transistor M2 in the pixel PX to display an image on the pixel PX by employing the operation method similar to that of the display apparatus DSP4C.

Figure 41:
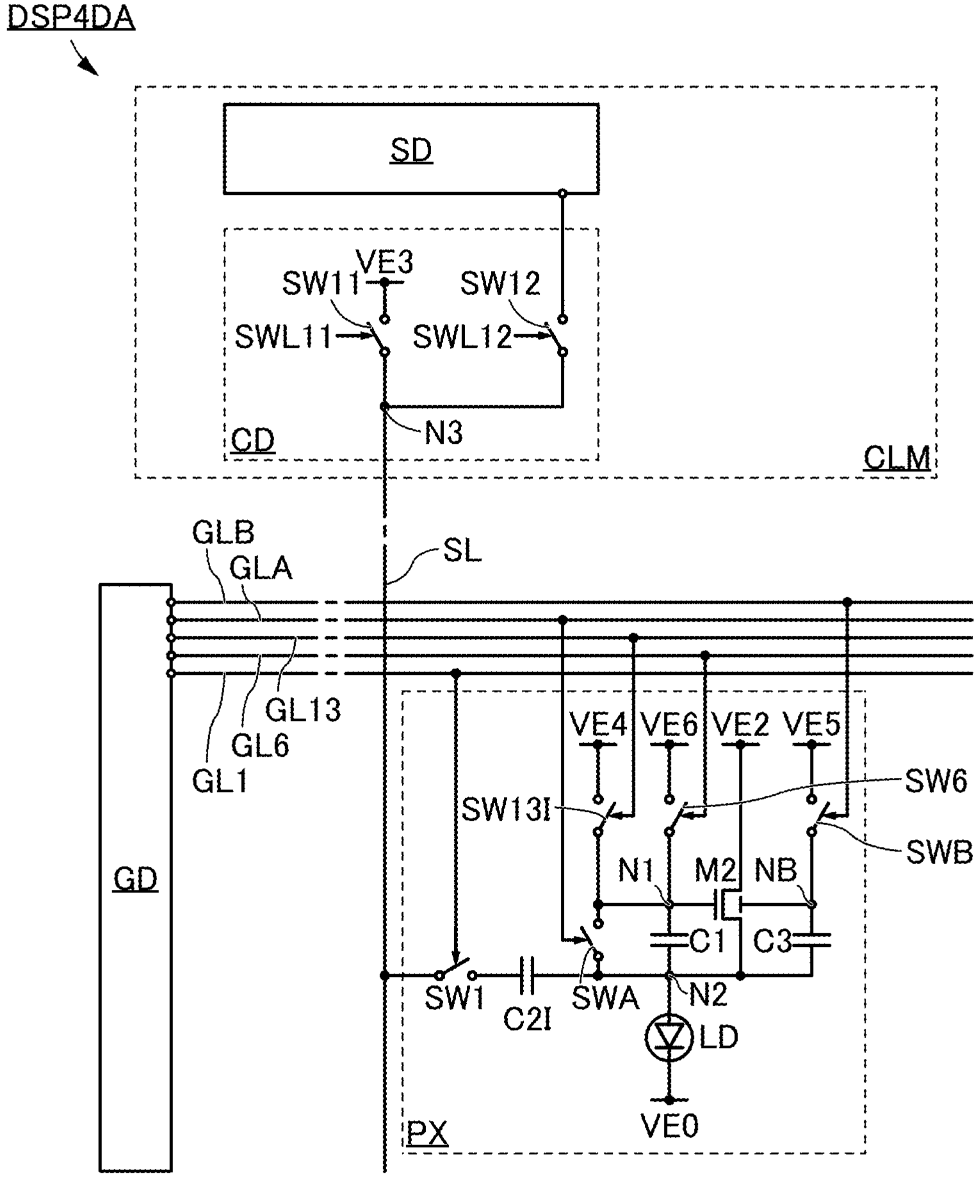
FIG. 41 is a circuit diagram illustrating a structure example of a display apparatus.

FIG. 41 illustrates a modification example of the display apparatus DSP4D in FIG. 40. A display apparatus DSP4DA illustrated in FIG. 41 is different from the display apparatus DSP4D in that the first terminal of the switch SW13I is electrically connected not to the first terminal of the capacitor C2I but to the second terminal of the switch SWA, the second terminal of the capacitor C1, the first terminal of the switch SW6, and the gate of the transistor M2.

The display apparatus DSP4DA can correct the threshold voltage and the field-effect mobility of the transistor M2 in the pixel PX to display an image on the pixel PX by employing the operation method similar to that of the display apparatus DSP4D.

Figure 42:
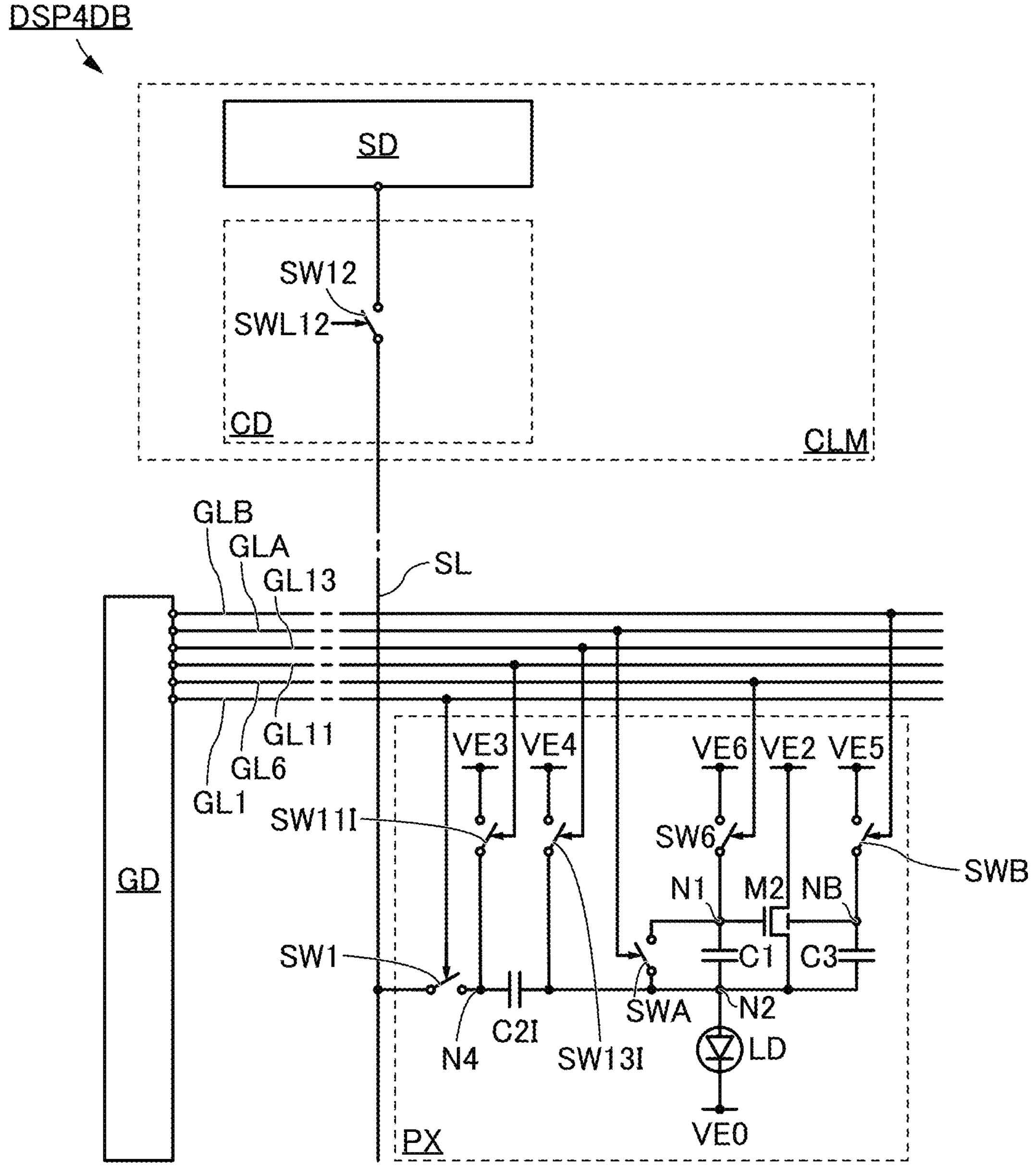
FIG. 42 is a circuit diagram illustrating a structure example of a display apparatus.

FIG. 42 illustrates a modification example of the display apparatus DSP4D in FIG. 40 which is different from the display apparatus DSP4DA in FIG. 41. The display apparatus DSP4DB in FIG. 42 is different from the display apparatus DSP4D in that the switch SW11I is provided in the pixel PX and the switch SW11 is not provided in the circuit CD. That is, the display apparatus DSP4DB in FIG. 42 is different from the display apparatus DSP4D in that the switch SW11I, the switch SW13I, and the capacitor C2I are provided in the pixel PX and the switch SW11, the switch SW13, and the capacitor C2 are not provided in the circuit CD.

In the display apparatus DSP4DB, the first terminal of the switch SW11I is electrically connected to the first terminal of the switch SW1 and the second terminal of the capacitor C2I. The second terminal of the switch SW11I is electrically connected to the wiring VE3. The control terminal of the switch SW11I is electrically connected to the wiring GL11.

The first terminal of the capacitor C2I is electrically connected to the first terminal of the switch SW13I, the first terminal of the capacitor C1, the first terminal of the capacitor C3, the first terminal of the transistor M2, and the anode of the light-emitting device LD. The second terminal of the switch SW1 is electrically connected to the wiring SL.

The first terminal of the switch SW12 is electrically connected to the wiring SL.

The wiring GL11 together with the wirings GL1, GL6, GL13, GLA, and GLB correspond to one of the wirings GL[1] to GL[m] in FIG. 2. That is, in the case of the circuit configuration of the pixel PX in FIG. 42, the number of wirings GL extended per row of the pixel array ALP is six.

In the display apparatus DSP4DB, the switch SW13I and the capacitor C2I correspond to the switch SW13 and the capacitor C2, respectively, in the display apparatus DSP4C. The wiring GL13 corresponds to the wiring SWL13. The switch SW11I corresponds to the switch SW11 in the display apparatus DSP4C. The wiring GL11 corresponds to the wiring SWL11. The node N4 corresponds to the node N3 in the display apparatus DSP4C. In other words, the display apparatus DSP4DB has a structure in which the switch SW11, the switch SW13, and the capacitor C2 included in the circuit CD in the display apparatus DSP4C are provided in the pixel PX as the switch SW11I, the switch SW13I and the capacitor C2I. For this reason, the operation method of the display apparatus DSP4DB can be described in some cases in such a manner that the switch SW11, the switch SW13, the capacitor C2, the node N3, the wiring SWL13, and the wiring SWL11 in the operation method of the display apparatus DSP4C are replaced with the switch SW11I, the switch SW13I, the capacitor C2I, the node N4, the wiring GL13, and the wiring GL11, respectively.

Figure 43:
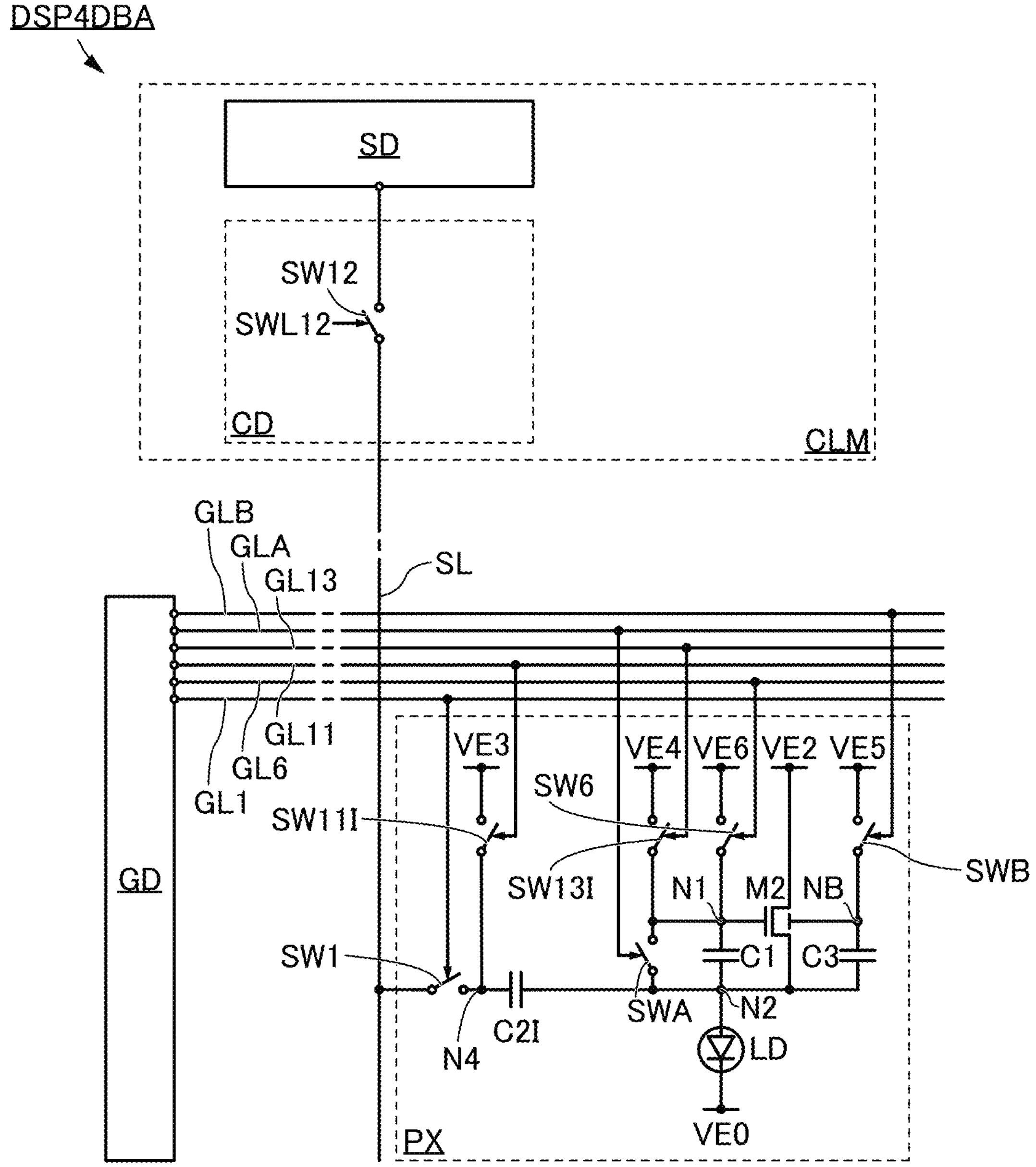
FIG. 43 is a circuit diagram illustrating a structure example of a display apparatus.

As in the display apparatus DSP4DA in FIG. 41, in the display apparatus DSP4DB, the first terminal of the switch SW13I may be electrically connected not to the first terminal of the capacitor C2I but to the second terminal of the switch SWA, the second terminal of the capacitor C1, the first terminal of the switch SW6, and the gate of the transistor M2. That is, the configuration of the display apparatus DSP4DB may be changed to that of a display apparatus DSP4DBA illustrated in FIG. 43 in which the switch SW13I, the switch SWA, and the capacitor C2I are provided in this order in an electrical path between the wiring VE4 to the node N4.

The display apparatuses DSP4DB and DSP4DBA can correct the threshold voltage and the field-effect mobility of the transistor M2 in the pixel PX to display an image on the pixel PX by employing the operation method similar to that of the display apparatus DSP4C.

Figure 44:
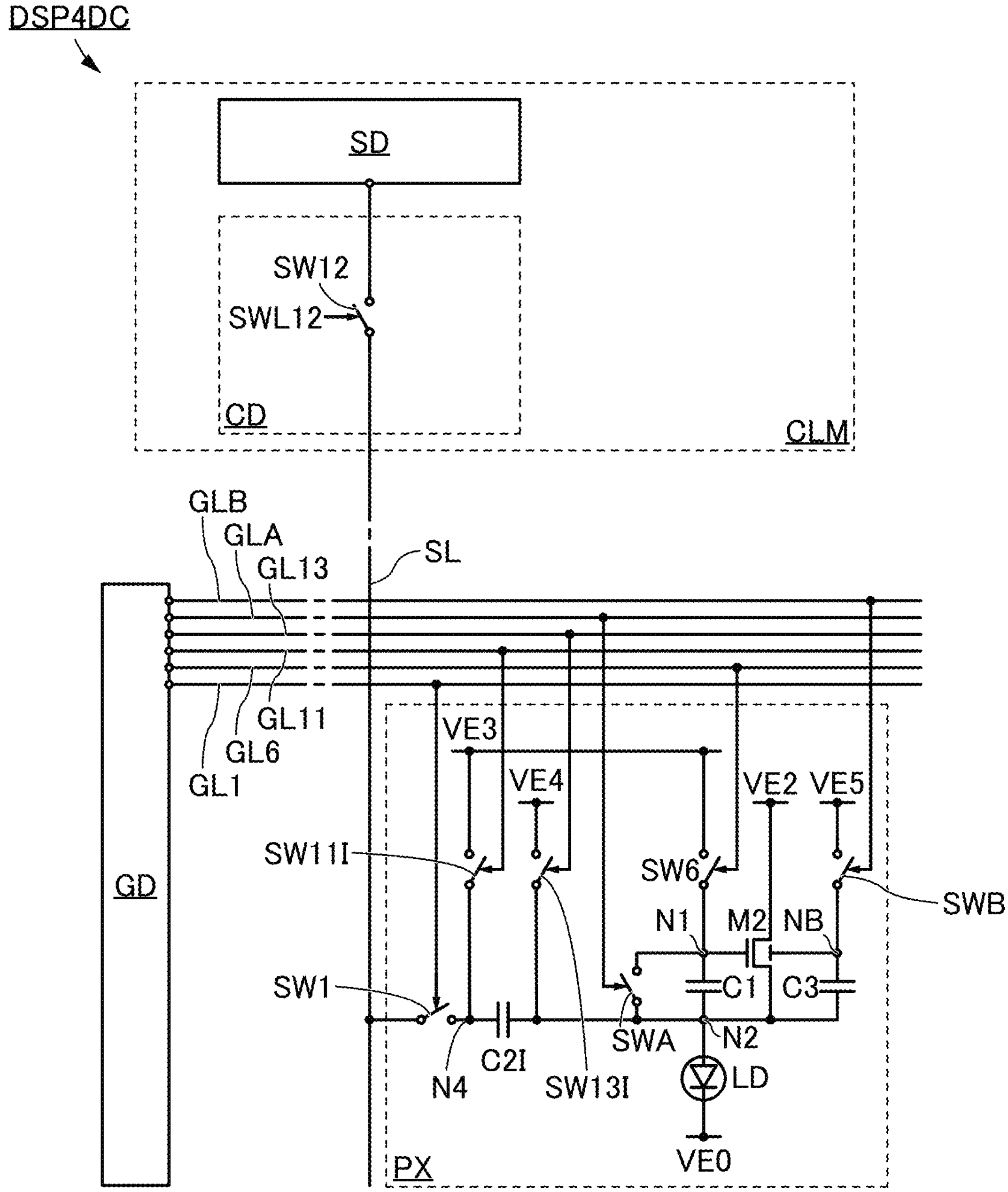
FIG. 44 is a circuit diagram illustrating a structure example of a display apparatus.

As described in the operation method example of the display apparatus DSP4A, a potential supplied by the wiring VE3 and a potential supplied by the wiring VE6 can be equal to each other. In that case, the wiring VE3 and the wiring VE6 may be one wiring. As an example, FIG. 44 illustrates a display apparatus DSP4DC in which the wiring VE3 serves as the wiring VE3 and the wiring VE6 in the display apparatus DSP4DB.

Figure 45:
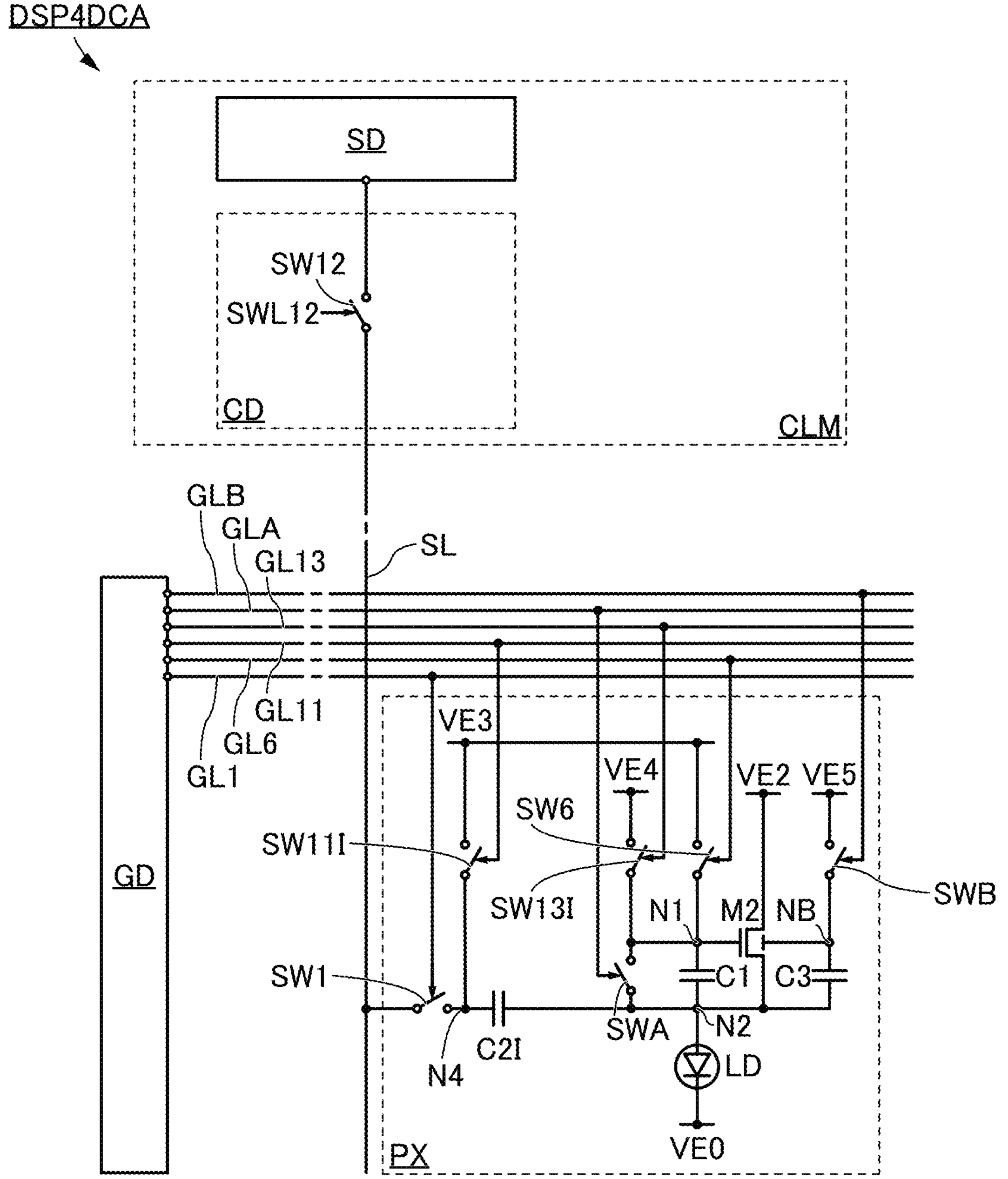
FIG. 45 is a circuit diagram illustrating a structure example of a display apparatus.

As in the display apparatus DSP4DA in FIG. 41, in the display apparatus DSP4DC, the first terminal of the switch SW13I may be electrically connected not to the first terminal of the capacitor C2I but to the second terminal of the switch SWA, the second terminal of the capacitor C1, the first terminal of the switch SW6, and the gate of the transistor M2. That is, the configuration of the display apparatus DSP4DC may be changed to that of a display apparatus DSP4DCA illustrated in FIG. 45 in which the switch SW13I, the switch SWA, and the capacitor C2I are provided in this order in an electrical path between the wiring VE4 to the node N4.

Figure 46:
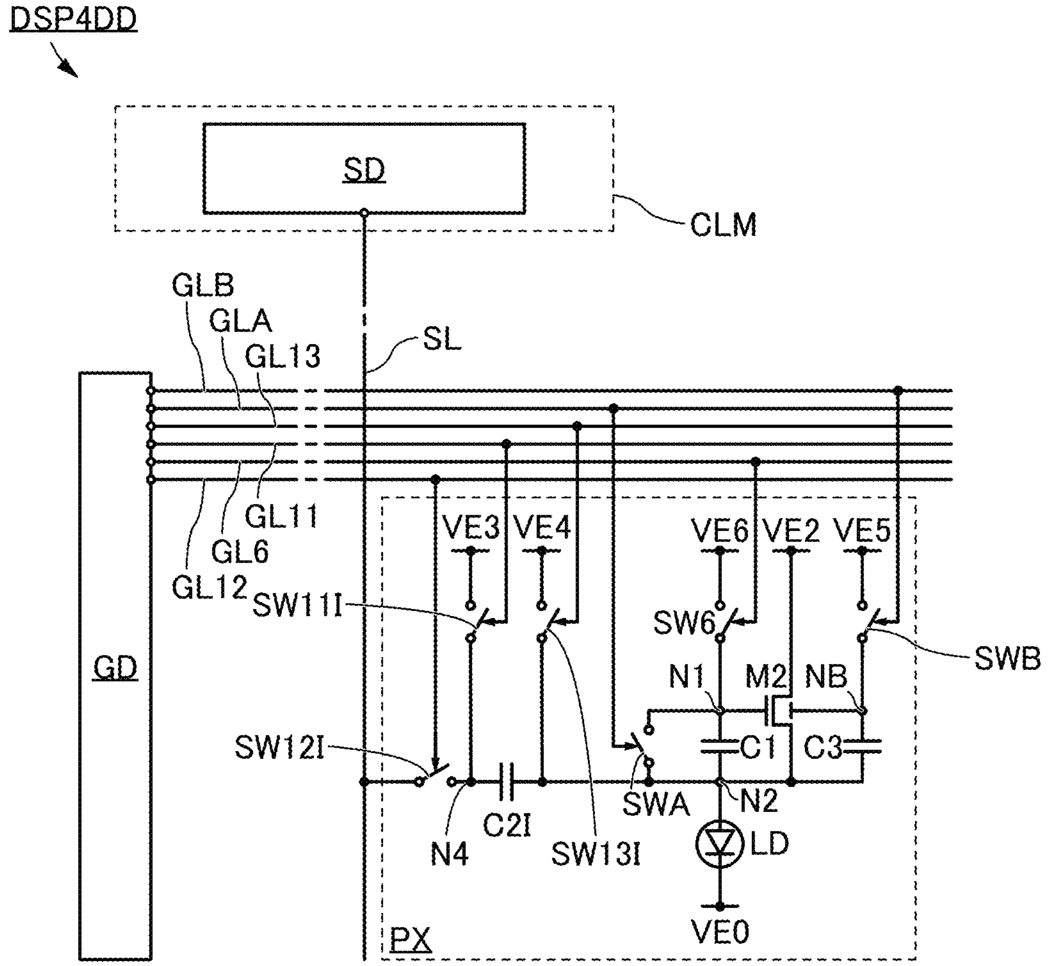
FIG. 46 is a circuit diagram illustrating a structure example of a display apparatus.

FIG. 46 illustrates another modification example of the display apparatus DSP4D, which is different from the display apparatus DSP4DB in FIG. 42. The display apparatus DSP4DD in FIG. 46 is another modification example of the display apparatus DSP4DB in FIG. 42, and is different from display apparatus DSP4DB in that the switch SW12 is not provided in the circuit CD. That is, the display apparatus DSP4DD in FIG. 46 is different from the display apparatus DSP4D in that the switch SW11I, the switch SW12I, the switch SW13I, and the capacitor C2I are provided in the pixel PX and the circuit CD is not provided in the column driver circuit CLM.

Note that in the display apparatus DSP4DD, for convenience, the switch SW1 in the display apparatus DSP4DB is denoted by the switch SW12I, and the wiring GL1 in the display apparatus DSP4DB is denoted by the wiring GL12.

In the display apparatus DSP4DD, the driver circuit SD is electrically connected to the wiring SL, and the wiring SL is electrically connected to a second terminal of the switch SW12I.

The display apparatus DSP4DD has a structure in which the switch SW12I serves as the switch SW12 provided in the circuit CD and the switch SW1 provided in the pixel PX in the display apparatus DSP4DB. Accordingly, the structure of the display apparatus DSP4DB can be changed to a structure in which the switch SW12 is not provided in the circuit CD as in the display apparatus DSP4DD in FIG. 46.

The operation method of the display apparatus DSP4DD can be described in some cases in such a manner that the switch SW11, the switch SW13, the capacitor C2, the node N3, the wiring SWL13, the wiring SWL11, and the wiring SWL12 in the operation method of the display apparatus DSP4C are replaced with the switch SW11I, the switch SW13I, the capacitor C2I, the node N4, the wiring GL13, the wiring GL11, and the wiring GL12, respectively. Note that the signal supplied by the wiring GL1 in the display apparatus DSP4C is not necessarily considered in the display apparatus DSP4DD.

Figure 47:
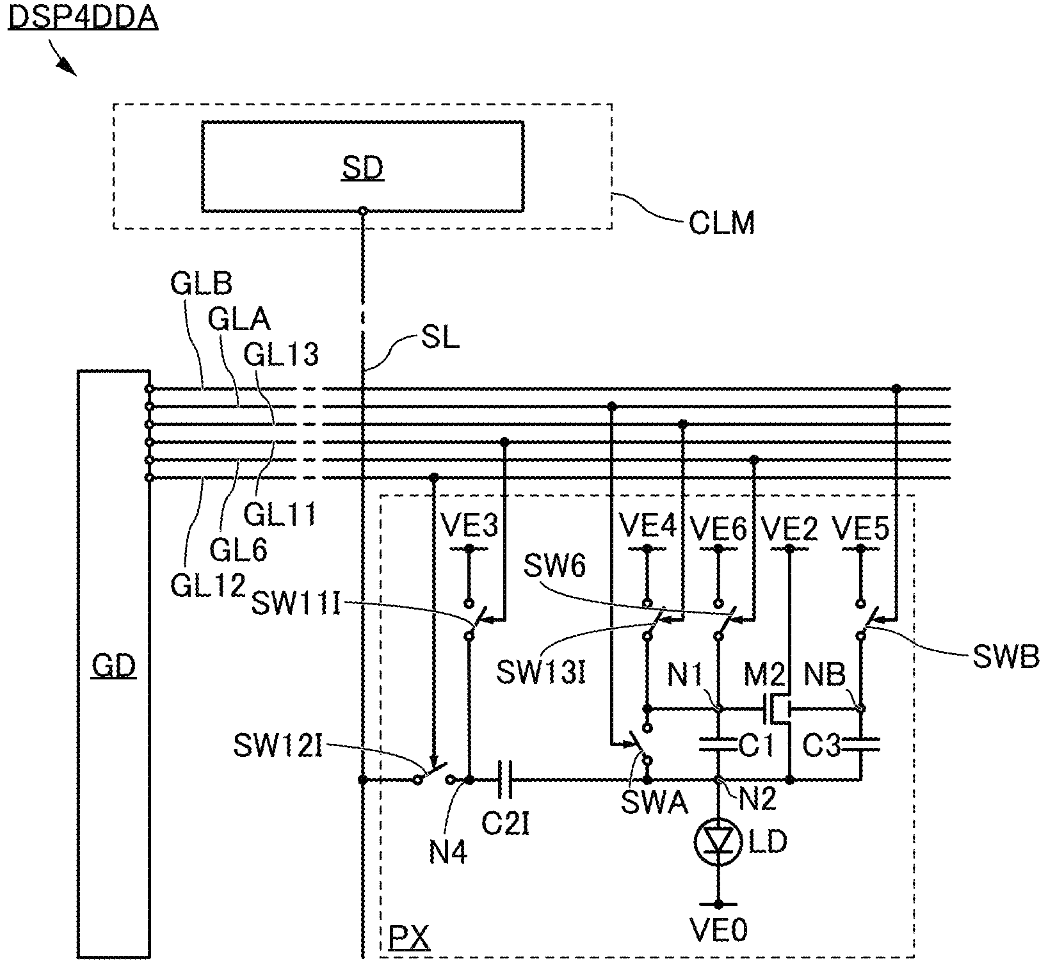
FIG. 47 is a circuit diagram illustrating a structure example of a display apparatus.

As in the display apparatus DSP4DA in FIG. 41, in the display apparatus DSP4DD, the first terminal of the switch SW13I may be electrically connected not to the first terminal of the capacitor C2I but to the second terminal of the switch SWA, the second terminal of the capacitor C1, the first terminal of the switch SW6, and the gate of the transistor M2. That is, the configuration of the display apparatus DSP4DD may be changed to that of a display apparatus DSP4DDA illustrated in FIG. 47 in which the switch SW13I, the switch SWA, and the capacitor C2I are provided in this order in an electrical path between the wiring VE4 to the node N4.

As described in this embodiment, in the display apparatus DSP4A in FIG. 25 and the modification examples thereof, the potential of the image data signal is changed by the capacitor C1 in the pixel PX and the capacitor C2 outside the pixel PX (including the capacitor C3 depending on circumstances). In the case where the voltage for correcting the threshold voltage of the transistor M2 is written to the capacitor C1, for example, the voltage for correcting the threshold voltage of the transistor M2 is also initialized at the time of rewriting image data. On the other hand, as illustrated in the display apparatus DSP4A in FIG. 25 and the modification example thereof, in the case where the voltage for correcting the threshold voltage of the transistor M2 is written to the capacitor C3, voltage for correcting the threshold voltage held in the capacitor C3 does not need to be initialized at the time of rewriting image data, whereby the speed of writing image data can be increased.

In this embodiment, the structure examples of the display apparatus DSP4A and the modification examples thereof, which are different from the display apparatuses described in Embodiment 1 in the structures of the pixel PX and the circuit CD, are described. As described above, the structures of the pixel PX and the circuit CD may be changed as appropriate in one embodiment of the present invention.

Note that this embodiment can be combined with any of the other embodiments in this specification as appropriate.

Embodiment 3

Figure 48A:
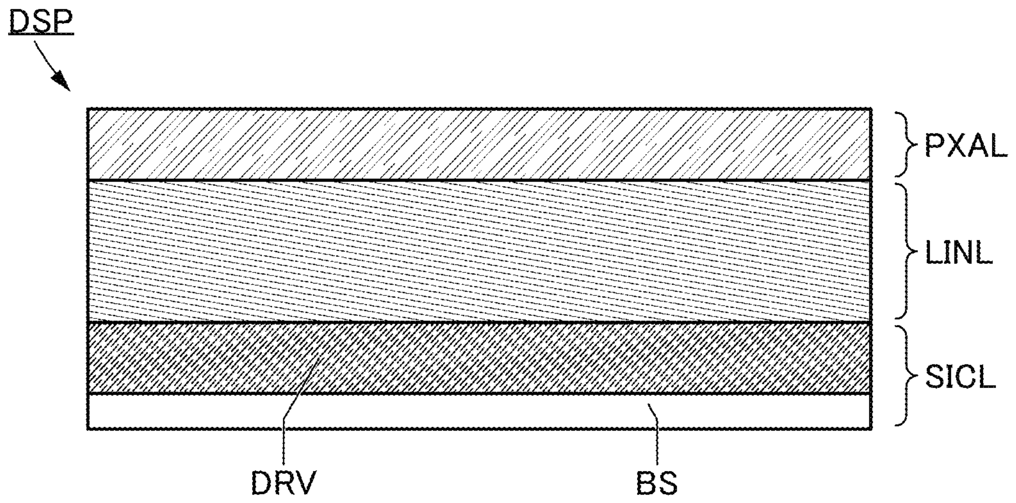
FIGS. 48A to 48C are schematic cross-sectional diagrams each illustrating a structure example of a display apparatus.

In this embodiment, another example of the structure of the display apparatus described in the above embodiment will be described. FIG. 48A is a schematic cross-sectional diagram illustrating an example of the display apparatus described in the above embodiment. A display apparatus DSP includes a pixel layer PXAL, a wiring layer LINL, and a circuit layer SICL, for example.

The wiring layer LINL is provided over the circuit layer SICL, and the pixel layer PXAL is provided over the wiring layer LINL. Note that the pixel layer PXAL overlaps with a region including a driver circuit region DRV to be described later.

The circuit layer SICL includes a substrate BS and the driver circuit region DRV.

As the substrate BS, a single crystal substrate (e.g., a semiconductor substrate formed of silicon or germanium) can be used, for example. Besides such a single crystal substrate, any of the following can be used as the substrate BS: a silicon on insulator (SOI) substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, paper including a fibrous material, and a base film. Examples of the glass substrate include a barium borosilicate glass substrate, an aluminoborosilicate glass substrate, and a soda lime glass substrate. Examples of materials for the flexible substrate, the attachment film, or the base film include plastic typified by polyethylene terephthalate (PET), polyethylene naphthalate (PEN), polyethersulfone (PES), and polytetrafluoroethylene (PTFE). Another example is a synthetic resin such as an acrylic resin. Other examples are polypropylene, polyester, polyvinyl fluoride, and polyvinyl chloride. Other examples are polyamide, polyimide, aramid, an epoxy resin, an inorganic vapor-deposited film, and paper. Note that in the case where the manufacturing process of the display apparatus DSP involves heat treatment, a highly heat-resistant material is preferably selected for the substrate BS.

In the description of this embodiment, the substrate BS is a semiconductor substrate containing silicon as a material. Therefore, a transistor included in the driver circuit region DRV can be a transistor including silicon in a channel formation region (hereinafter referred to as a Si transistor).

The driver circuit region DRV is provided over the substrate BS.

The driver circuit region DRV includes, for example, a driver circuit for driving a pixel included in the pixel layer PXAL to be described later. A specific structure example of the driver circuit region DRV will be described later.

The wiring layer LINL is provided over the circuit layer SICL.

For example, a wiring is provided in the wiring layer LINL. The wiring included in the wiring layer LINL functions as, for example, a wiring that electrically connects a driver circuit included in the driver circuit region DRV provided below the wiring layer LINL and a circuit included in the pixel layer PXAL provided above the wiring layer LINL.

The pixel layer PXAL includes a plurality of pixels (e.g., the pixels PX[1,1] to PX[m,n] in FIG. 2), for example.

Figure 49A:
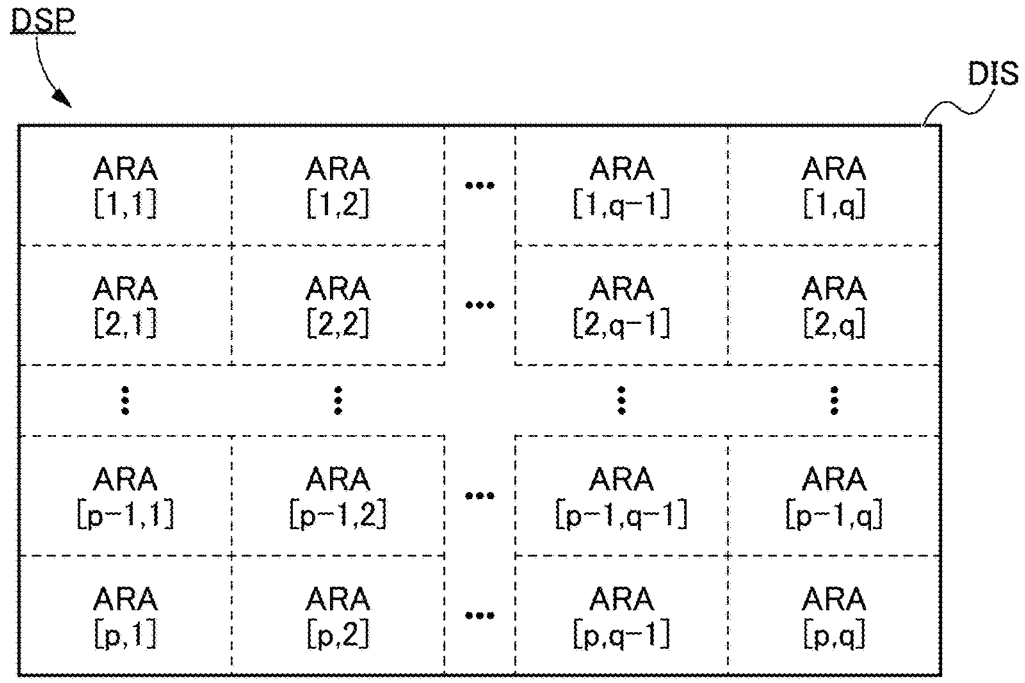
FIG. 49A is a schematic plan view illustrating an example of a display portion of a display apparatus.

FIG. 49A is an example of a plan view of the display apparatus DSP and illustrates only a display portion DIS. Note that the display portion DIS can be a plan view of the pixel layer PXAL.

In the display apparatus DSP in FIG. 49A, the display portion DIS is divided into regions in p rows and q columns (each of p and q is an integer greater than or equal to 1) as an example. Thus, the display portion DIS includes display regions ARA[1,1] to ARA[p,q]. Note that FIG. 49A selectively illustrates the display regions ARA[1,1], ARA[2,1], ARA[p−1,1], ARA[p,1], ARA[1,2], ARA[2,2], ARA[p−1,2], ARA[p,2], ARA[1,q−1], ARA[2,q−1], ARA[p−1,q−1], ARA[p,q−1], ARA[1,q], ARA[2,q], ARA[p−1,q], and ARA[p,q], as an example.

For example, in the case where the display portion DIS is divided into 32 regions, p=4 and q=8 may be substituted into FIG. 49A. In the case where the display apparatus DSP has a display resolution of 8K4K, the number of display pixels is 7680×4320. In the case where the colors of sub-pixels of the display portion DIS are three colors, red (R), green (G), and blue (B), the total number of sub-pixels is 7680×4320×3. Here, in the case where a pixel array of the display portion DIS with a display resolution of 8K4K is divided into 32 regions, the number of display pixels per region is 960×1080, and the number of sub-pixels per region is 960×1080×3 when the colors of the sub-pixels of the display apparatus DSP are three colors, red (R), green (G), and blue (B).

Here, in the case where the display portion DIS of the display apparatus DSP in FIG. 49A is divided into regions in p rows and q columns, the driver circuit region DRV included in the circuit layer SICL is considered.

Figure 49B:
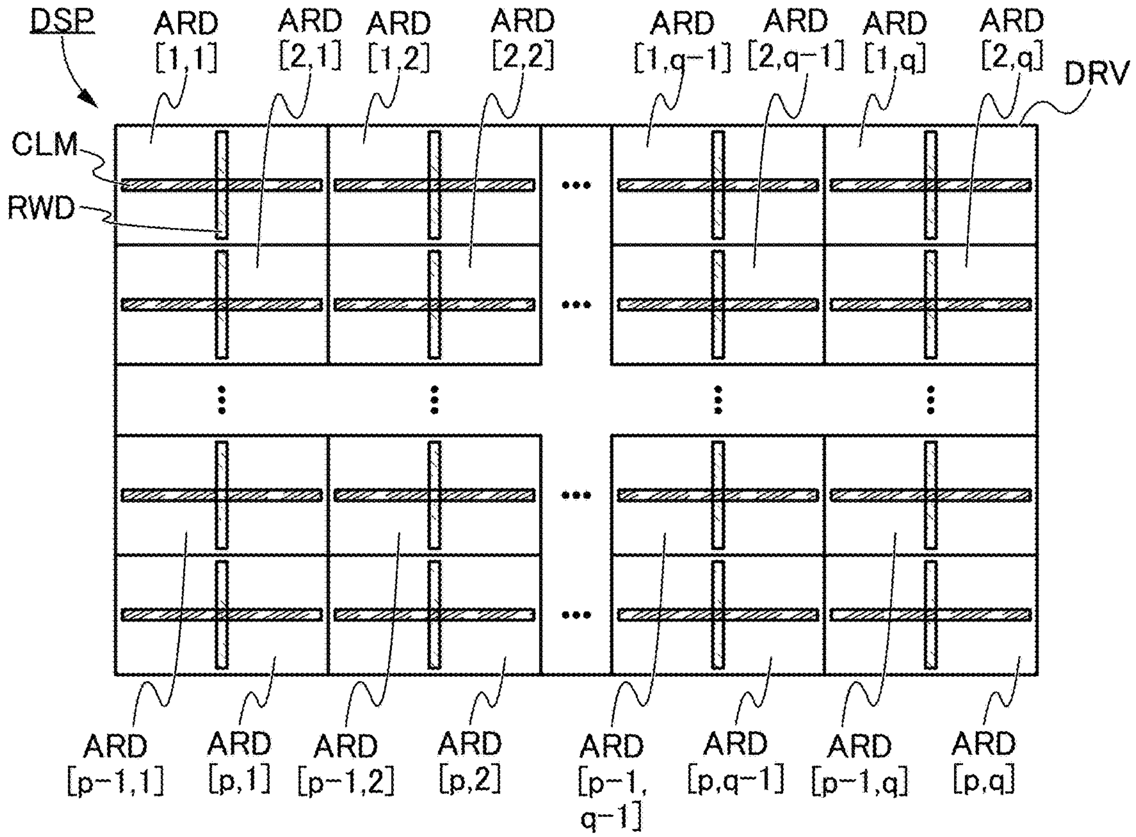
FIG. 49B is a schematic plan view illustrating an example of a driver circuit region of the display apparatus.

FIG. 49B is an example of a plan view of the display apparatus DSP, and illustrates only the driver circuit region DRV included in the circuit layer SICL.

Since the display portion DIS in the display apparatus DSP in FIG. 49A is divided into regions in p rows and q columns, each of the divided display regions ARA[1,1] to ARA[p,q] needs a corresponding driver circuit. Specifically, the driver circuit region DRV may also be divided into regions in p rows and q columns and a driver circuit may be provided in each of the divided regions.

The driver circuit region DRV in the display apparatus DSP in FIG. 49B includes regions divided into p rows and q columns. Thus, the driver circuit region DRV includes circuit regions ARD[1,1] to ARD[p,q]. Note that FIG. 49B selectively illustrates the circuit regions ARD[1,1], ARD[2, 1], ARD[p−1,1], ARD[p,1], ARD[1,2], ARD[2,2], ARD[p−1,2], ARD[p,2], ARD[1,q−1], ARD[2,q−1], ARD[p−1,q−1], ARD[p,q−1], ARD[1,q], ARD[2,q], ARD[p−1,q], and ARD [p,q], as an example.

Each of the circuit regions ARD[1,1] to ARD[p,q] includes the column driver circuit CLM and the row driver circuit RWD. For example, the column driver circuit CLM and the row driver circuit RWD included in a circuit region ARD[h,k] (not illustrated in FIG. 49B) positioned in the h-th row and the k-th column (h is an integer greater than or equal to 1 and less than or equal to p, and k is an integer greater than or equal to 1 and less than or equal to q) in the driver circuit region DRV can drive a plurality of pixels included in the display region ARA[h,k] in the display portion DIS.

The column driver circuit CLM includes, for example, a source driver circuit that transmits an image signal to the plurality of pixels included in the display region ARA. Thus, like the display apparatus DSP0 in FIG. 2, the display apparatus DSP in FIG. 48A preferably has a structure in which the column driver circuit CLM is electrically connected to the wirings SL[1] to SL[n]. The column driver circuit CLM may include a digital-analog conversion circuit that converts digital data of an image signal to analog data.

The row driver circuit RWD includes, for example, a gate driver circuit that selects a plurality of display pixels, which are destinations to which an image signal is transmitted, in the display region ARA. Thus, like the display apparatus DSP0 in FIG. 2, the display apparatus DSP in FIG. 48A or FIG. 49A preferably has a structure in which the row driver circuit RWD is electrically connected to the wirings GL[1] to GL[m].

Note that the display apparatus DSP illustrated in FIG. 48A and FIGS. 49A and 49B has a structure in which the display region ARA[h,k] in the display portion DIS and the circuit region ARD[h,k] overlap with each other, but the display apparatus of one embodiment of the present invention is not limited to this. In the structure of the display apparatus of one embodiment of the present invention, the display region ARA[h,k] and the circuit region ARD[h,k] do not necessarily overlap with each other.

Figure 48B:
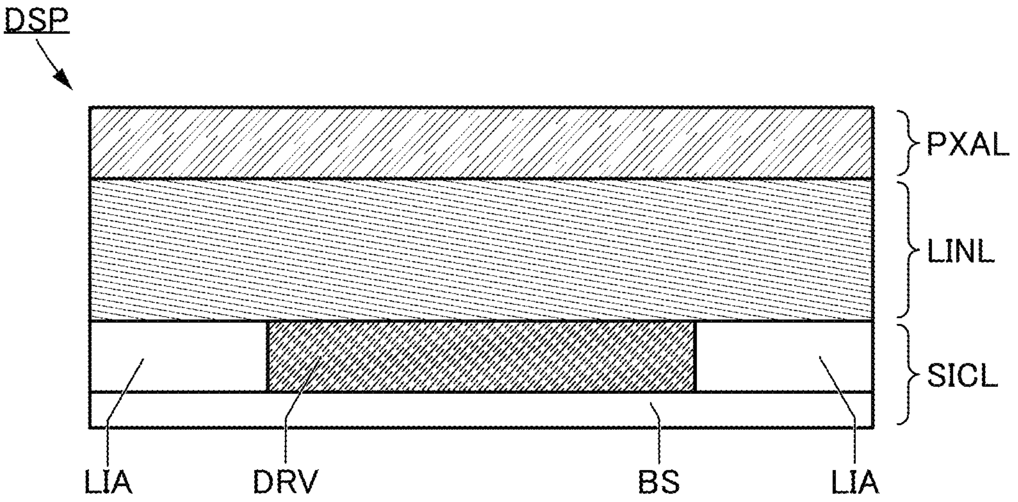

For example, as illustrated in FIG. 48B, the display apparatus DSP may have a structure in which not only the driver circuit region DRV but also a region LIA is provided over the substrate BS.

A wiring is provided in the region LIA, as an example. The wiring included in the region LIA may be electrically connected to the wiring included in the wiring layer LINL. At this time, the display apparatus DSP may have a structure in which the circuit included in the driver circuit region DRV and the circuit included in the pixel layer PXAL are electrically connected to each other through the wiring included in the region LIA and the wiring included in the wiring layer LINL. The display apparatus DSP may have a structure in which the circuit included in the driver circuit region DRV is electrically connected to the wiring or a circuit included in the region LIA through the wiring included in the wiring layer LINL.

The region LIA may include a graphics processing unit (GPU), as an example. In the case where the display apparatus DSP includes a touch panel, the region LIA may include a sensor controller for controlling a touch sensor included in the touch panel. In the case where a liquid crystal element is used as the display element of the display apparatus DSP, a gamma correction circuit may be included. The region LIA may also include a controller having a function of processing an input signal from the outside of the display apparatus DSP. The region LIA may include a voltage generation circuit for generating voltage supplied to the above-described circuit and a driver circuit included in the circuit region ARD.

In the case where a light-emitting device containing an organic EL material is used as the display element of the display apparatus DSP, an EL correction circuit may be included in the region LIA. The EL correction circuit has a function of appropriately adjusting the amount of current input to the light-emitting device containing an organic EL material. Since the emission luminance of the light-emitting device containing an organic EL material is proportional to the current, when the characteristics of a driving transistor electrically connected to the light-emitting device are not favorable, the luminance of light emitted from the light-emitting device might be lower than a desired luminance. For example, the EL correction circuit monitors the amount of current flowing through the light-emitting device and increases the amount of current when the amount of current is smaller than a desired amount, whereby the luminance of light emitted from the light-emitting device can be increased. In contrast, when the amount of current is larger than a desired amount, the amount of current flowing through the light-emitting device may be adjusted to be small.

Figure 50A:
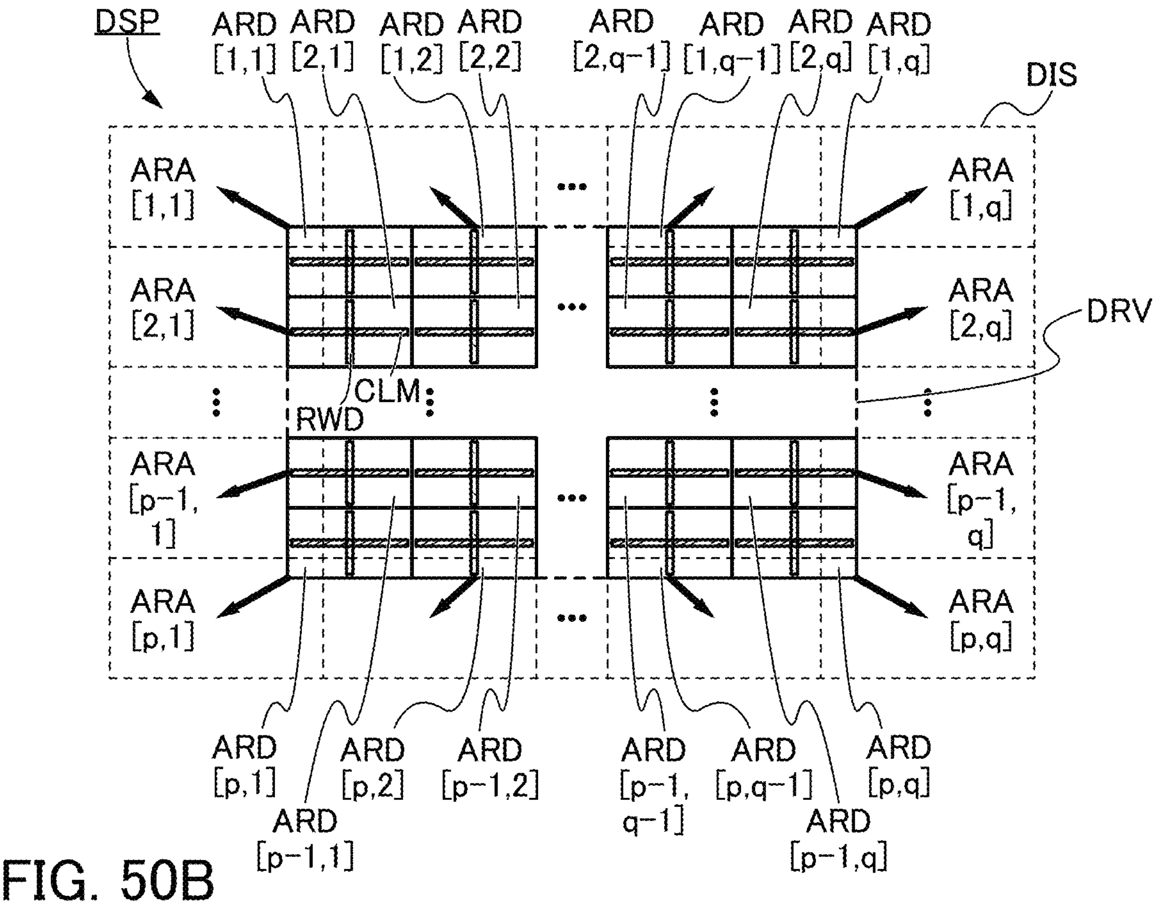
FIGS. 50A and 50B are schematic plan views each illustrating a structure example of a display apparatus.
Figure 50B:
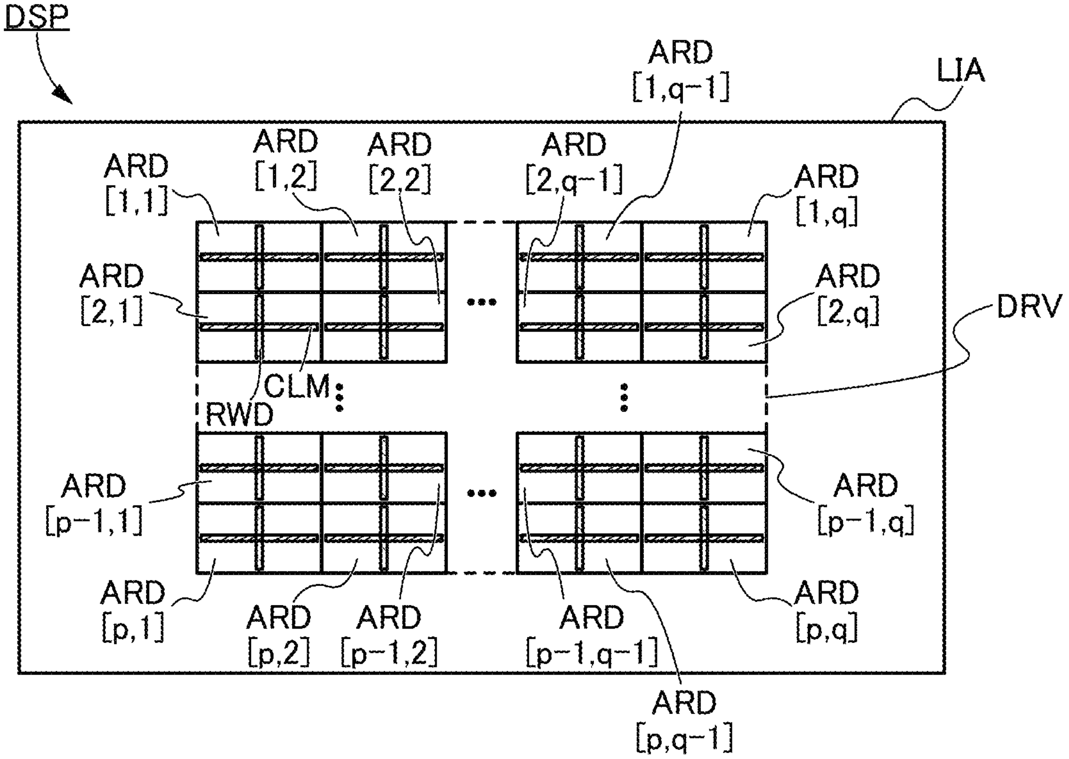

FIG. 50A is an example of a plan view of the display apparatus DSP illustrated in FIG. 48B, and illustrates the driver circuit region DRV denoted by a solid line and the display portion DIS denoted by a dotted line. In the display apparatus DSP in FIG. 50A, as an example, the driver circuit region DRV is surrounded by the region LIA (FIG. 50B is an example of a plan view of the display apparatus DSP and illustrates only the circuit layer SICL). Thus, as illustrated in FIG. 50A, the driver circuit region DRV is provided to overlap with the interior of the display portion DIS in the plan view.

In the display apparatus DSP illustrated in FIG. 50A, the display portion DIS is divided into the display regions ARA[1,1] to ARA[p,q] and the driver circuit region DRV is divided into the circuit regions ARD[1,1] to ARD[p,q] as in FIG. 49A.

As in FIG. 50A, a correspondence between the display region ARA and the circuit region ARD including a driver circuit that drives a pixel included in the display region ARA is shown by a thick arrow. Specifically, a driver circuit included in the circuit region ARD[1,1] drives a pixel included in the display region ARA[1,1], and a driver circuit included in the circuit region ARD[2,1] drives a pixel included in the display region ARA[2,1]. A driver circuit included in the circuit region ARD[p−1,1] drives a pixel included in the display region ARA[p−1,1], and a driver circuit included in the circuit region ARD[p, 1] drives a pixel included in the display region ARA[p,1]. A driver circuit included in the circuit region ARD[1,q] drives a pixel included in the display region ARA[1,q], and a driver circuit included in the circuit region ARD[2,q] drives a pixel included in the display region ARA[2,q]. A driver circuit included in the circuit region ARD[p−1,n] drives a pixel included in the display region ARA[p−1,q], and a driver circuit included in the circuit region ARD[p,q] drives a pixel included in the display region ARA[p,q]. That is, although not illustrated in FIG. 50A, a driver circuit included in the circuit region ARD[h,k] positioned in the h-th row and the k-th column drives a pixel included in the display region ARA[h,k].

In FIG. 48B, when the driver circuit included in the circuit region ARD in the circuit layer SICL and the pixel included in the display region ARA in the pixel layer PXAL are electrically connected through a wiring included in the wiring layer LINL, the display apparatus DSP can have a structure in which the display region ARA[h,k] and the circuit region ARD[h,k] do not necessarily overlap with each other. Accordingly, the positional relation between the driver circuit region DRV and the display portion DIS is not limited to the plan view of the display apparatus DSP in FIG. 50A, and the position of the driver circuit region DRV can be freely determined.

Figure 48C:
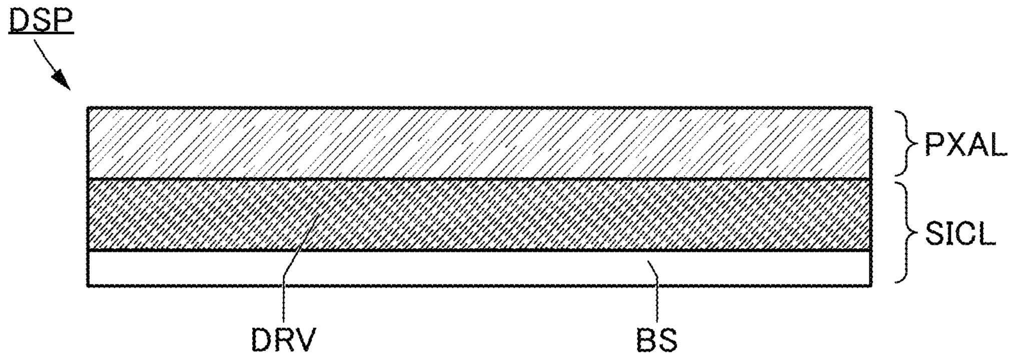

Note that the display apparatus DSP in FIG. 48A or 48B has a structure including the wiring layer LINL, but one embodiment of the present invention is not limited to this structure. The display apparatus of one embodiment of the present invention may have a structure in which the pixel layer PXAL is provided on the circuit layer SICL as illustrated in FIG. 48C, for example.

In each of the circuit regions ARD[1,1] to ARD[p,q] illustrated in FIG. 49B or FIG. 50A, the arrangement of the column driver circuit CLM and the row driver circuit RWD is not limited to the structure of the display apparatus of one embodiment of the present invention. Although the column driver circuit CLM and the row driver circuit RWD are arranged to intersect each other (to form a cross) in FIG. 49B or FIG. 50A, the column driver circuit CLM and the row driver circuit RWD may be arranged to form various shapes in each circuit region ARD.

As illustrated in FIGS. 49A and 49B and FIGS. 50A and 50B, the display portion DIS is divided into the plurality of display regions ARA and a driver circuit corresponding to each display region ARA is provided, whereby the circuits included in the plurality of display regions ARA can be driven independently. For example, for the display region ARA in which image data is often rewritten, the column driver circuit CLM and the row driver circuit RWD provided for the corresponding circuit region ARD can be driven with a high frame frequency; and for the display region ARA in which image data is not often rewritten, the column driver circuit CLM and the row driver circuit RWD provided for the corresponding circuit region ARD can be driven with a low frame frequency. Specifically, the column driver circuit CLM and the row driver circuit RWD corresponding to the display region ARA in which image data is often rewritten to display moving images or the like may be driven with a high frame frequency of higher than or equal to 60 Hz, higher than or equal to 120 Hz, higher than or equal to 165 Hz, or higher than or equal to 240 Hz. The column driver circuit CLM and the row driver circuit RWD corresponding to the display region ARA in which image data is not often rewritten to display a still image or the like may be driven with a low frame frequency of lower than or equal to 5 Hz, lower than or equal to 1 Hz, lower than or equal to 0.5 Hz, or lower than or equal to 0.1 Hz. In this manner, the display portion DIS of the display apparatus DSP is divided into the display regions ARA[1,1] to ARA[m,n], whereby the rewrite frequency (frame frequency) can be changed depending on an image displayed on the display region ARA. That is, in the display portion DIS of the display apparatus DSP, two selected from the display regions ARA[1,1] to ARA[m,n] can display images with different frame frequencies.

Figure 51B:
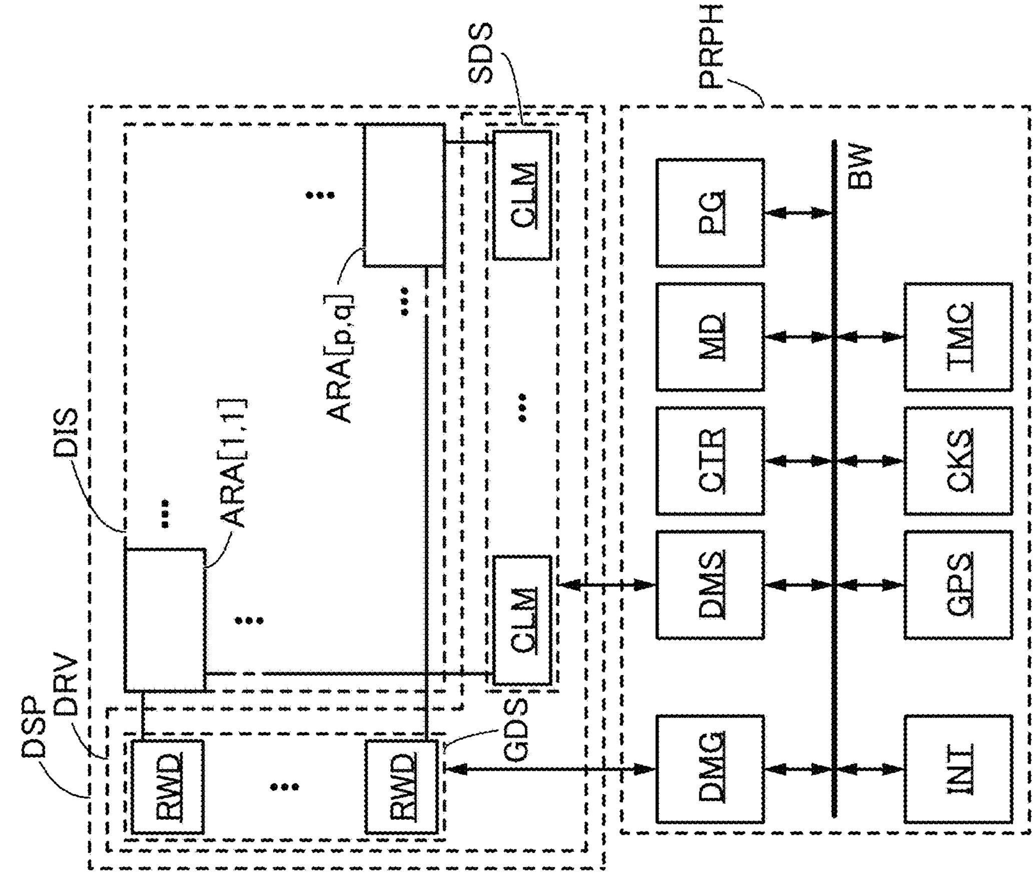
FIGS. 51A and 51B are block diagrams each illustrating a structure example of a display apparatus.
Figure 51A:
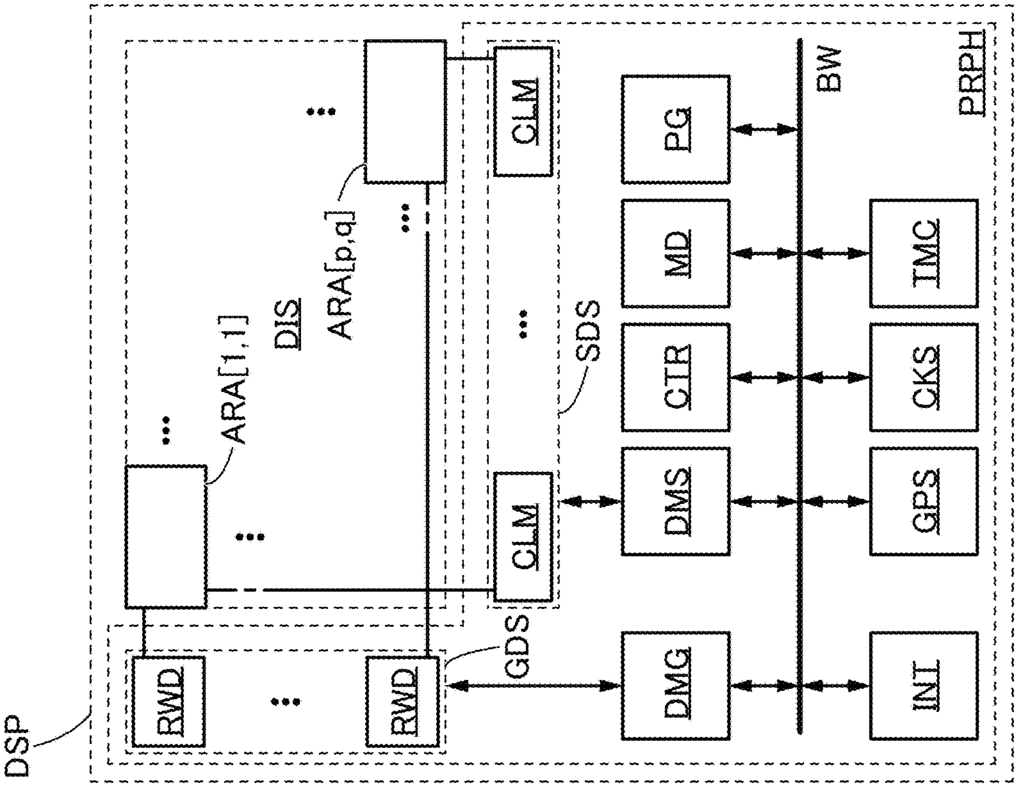

Next, examples of components included in the display apparatus DSP will be described. FIG. 51A is a block diagram illustrating an example of the display apparatus DSP in FIG. 48A or 48B. The display apparatus DSP in FIG. 51A includes the display portion DIS and a peripheral circuit PRPH.

The peripheral circuit PRPH includes a circuit GDS including the plurality of row driver circuits RWD, a circuit SDS including the plurality of column driver circuits CLM, a distribution circuit DMG, a distribution circuit DMS, a control unit CTR, a memory device MD, a voltage generation circuit PG, a timing controller TMC, a clock signal generation circuit CKS, an image processing unit GPS, and an interface INT. Note that the peripheral circuit PRPH can be a circuit included in the circuit layer SICL in FIG. 48A or 48B, for example.

Note that in the display apparatus DSP, the driver circuit region DRV including the plurality of row driver circuits RWD overlaps with the pixel layer PXAL including the plurality of display regions ARA as illustrated in FIGS. 48A to 48C, FIGS. 49A and 49B, and FIGS. 50A and 50B; however, FIG. 51A illustrates the plurality of row driver circuits RWD arranged in a column outside the display portion DIS, for convenience. Similarly, the driver circuit region DRV including the plurality of column driver circuits CLM overlaps with the pixel layer PXAL including the plurality of display regions ARA; however, FIG. 51A illustrates the plurality of column driver circuits CLM arranged in a row outside the display portion DIS, for convenience.

The peripheral circuit PRPH is included in the circuit layer SICL illustrated in FIG. 48A or 48B, for example. The circuit GDS and the circuit SDS included in the peripheral circuit PRPH are included in the driver circuit region DRV illustrated in FIG. 48A or 48B, for example.

In the case of the display apparatus DSP in FIG. 48B, one or more selected from the distribution circuit DMG, the distribution circuit DMS, the control unit CTR, the memory device MD, the voltage generation circuit PG, the timing controller TMC, the clock signal generation circuit CKS, the image processing unit GPS, and the interface INT may be included in the region LIA. Among the above-described circuits, the circuit not included in the region LIA may be connected to the circuit included in the region LIA, the circuit included in the driver circuit region DRV, or both as an external circuit.

The distribution circuit DMG, the distribution circuit DMS, the control unit CTR, the memory device MD, the voltage generation circuit PG, the timing controller TMC, the clock signal generation circuit CKS, the image processing unit GPS, and the interface INT transmit and receive signals mutually through a bus wiring BW.

The interface INT has a function of a circuit for taking image data output from an external device for displaying an image on the display apparatus DSP into the circuit in the peripheral circuit PRPH. Examples of the external device include a recording media player and a nonvolatile memory device such as a hard disk drive (HDD) or a solid state drive (SSD). The interface INT may be a circuit that outputs a signal from a circuit inside the peripheral circuit PRPH to a device outside the display apparatus DSP.

In the case where image data is input from the external device to the interface INT by wireless communication, the interface INT can include, for example, one or more selected from an antenna receiving the image data, a mixer, an amplifier circuit, and an analog-digital conversion circuit.

The control unit CTR has functions of processing control signals transmitted from the external device through the interface INT and controlling the circuits included in the peripheral circuit PRPH.

The memory device MD has a function of temporarily holding data and an image signal. In that case, the memory device MD serves as a frame memory (sometimes referred to as a frame buffer), for example. The memory device MD may have a function of temporarily holding data transmitted from the external device through the interface INT and/or data processed in the control unit CTR. Note that a static random access memory (SRAM) and/or a dynamic random access memory (DRAM) can be used as the memory device MD.

The voltage generation circuit PG has a function of generating power supply voltages supplied to a pixel circuit included in the display portion DIS and a circuit included in the peripheral circuit PRPH. Note that the voltage generation circuit PG may have a function of selecting a circuit to which a voltage is to be supplied. For example, the voltage generation circuit PG stops supply of voltage to one or more selected from the circuit GDS, the circuit SDS, the image processing unit GPS, the timing controller TMC, and the clock signal generation circuit CKS in a period in which a still image is displayed on the display portion DIS, resulting in a reduction in the total power consumption of the display apparatus DSP.

The timing controller TMC has a function of generating timing signals used in the plurality of row driver circuits RWD included in the circuit GDS and the plurality of column driver circuits CLM included in the circuit SDS. For the generation of the timing signal, a clock signal generated by the clock signal generation circuit CKS can be used.

The image processing unit GPS has a function of performing processing for drawing an image on the display portion DIS. For example, the image processing unit GPS may include a GPU. Specifically, the image processing unit GPS performs pipeline processing in parallel and thus can perform high-speed processing of the image data to be displayed on the display portion DIS. The image processing unit GPS can also have a function of a decoder for decoding an encoded image.

The image processing unit GPS may also have a function of correcting color tone of an image displayed on the display portion DIS. In that case, the image processing unit GPS is preferably provided with a dimming circuit, a toning circuit, or both. In the case where the display pixel circuit included in the display portion DIS includes an organic EL element, the image processing unit GPS may be provided with an EL correction circuit.

The above-described image correction may be performed using artificial intelligence in the following manner, for example. A current flowing in the display device included in the pixel (or a voltage applied to the display device) is monitored and acquired, an image displayed on the display portion DIS is acquired with an image sensor, the current (or voltage) and the image are used as input data in an arithmetic operation of the artificial intelligence (e.g., an artificial neural network), and the output result is used to determine whether the image should be corrected.

Such an arithmetic operation of artificial intelligence can be applied to not only image correction but also upconversion of image data. In this case, upconversion of low-display resolution image data in accordance with the display resolution of the display portion DIS allows a high-display-quality image to be displayed on the display portion DIS.

Note that for the above-described arithmetic operation of artificial intelligence, the GPU included in the image processing unit GPS can be used, for example. That is, the GPU can be used to perform arithmetic operations for various kinds of correction (e.g., color irregularity correction or upconversion).

Note that in this specification and the like, a GPU performing an arithmetic operation of the artificial intelligence is referred to as an AI accelerator. That is, the GPU may be replaced with an AI accelerator in the description in this specification and the like.

The clock signal generation circuit CKS has a function of generating a clock signal. The clock signal generation circuit CKS may be configured to change the frame frequency of a clock signal depending on an image displayed on the display portion DIS, for example.

The distribution circuit DMG has a function of transmitting a signal received from the bus wiring BW to the row driver circuit RWD which drives a pixel included in each of the plurality of display regions ARA, in accordance with the contents of the signal.

The distribution circuit DMS has a function of transmitting a signal received from the bus wiring BW to the column driver circuit CLM which drives a pixel included in each of the plurality of display regions ARA, in accordance with the contents of the signal.

Note that for the display apparatus DSP in FIG. 51A, low voltage differential signaling (LVDS) may be employed as digital signal transmission technology. Alternatively, embedded DisplayPort (eDP) or internal DisplayPort (iDP) may be employed.

Although not illustrated in FIG. 51A, a level shifter may be included in the peripheral circuit PRPH. The level shifter has a function of converting a signal input to a circuit into an appropriate level, for example.

Note that the configuration of the peripheral circuit PRPH of the display apparatus DSP illustrated in FIG. 51A is an example, and the circuit configuration included in the peripheral circuit PRPH may be changed depending on circumstances. For example, in the case where the display apparatus DSP receives driving voltages of circuits from the outside, the display apparatus DSP does not need to generate the driving voltages. In such a case, the display apparatus DSP may have a configuration without including the voltage generation circuit PG.

For example, a structure in which the above-described circuits (components) included in the display apparatus DSP in FIG. 51A (i.e., the distribution circuit DMG, the distribution circuit DMS, the control unit CTR, the memory device MD, the voltage generation circuit PG, the timing controller TMC, the clock signal generation circuit CKS, the image processing unit GPS, and the interface INT) are not included in the display apparatus DSP may be employed. Specifically, as illustrated in FIG. 51B, the peripheral circuit PRPH including the above-described circuits (components) may be provided outside the display apparatus DSP. Although FIG. 51B illustrates the state where signals are transmitted and received between the circuit GDS and the distribution circuit DMG and between the circuit SDS and the distribution circuit DMS, these transmission and reception may be performed through the interface INT. The structure of the display apparatus DSP in FIG. 51B can be employed for the display apparatus DSP in FIG. 48C, for example. Although FIG. 51B illustrates the structure in which the above-described circuits (components) are provided outside the display apparatus DSP, one or more of them may be electrically connected, as external circuits, to the other circuits included in the driver circuit region DRV.

Note that this embodiment can be combined with any of the other embodiments in this specification as appropriate.

Embodiment 4

In this embodiment, structure examples of a display apparatus of one embodiment of the present invention will be described.

Structure Example 1 of Display Apparatus

Figure 52:
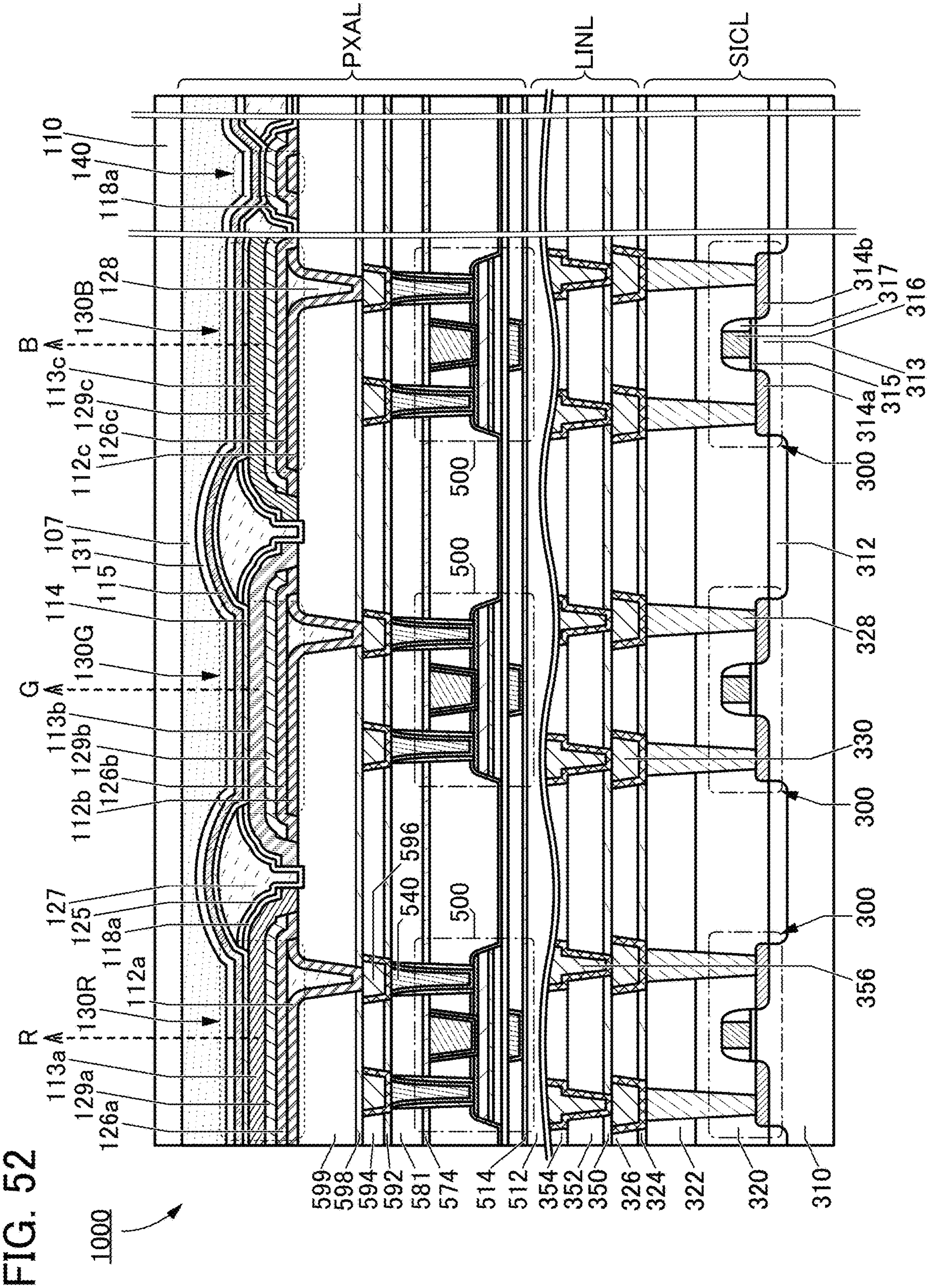
FIG. 52 is a schematic cross-sectional diagram illustrating a structure example of a display apparatus.

FIG. 52 is a cross-sectional view illustrating an example of a display apparatus of one embodiment of the present invention. A display apparatus 1000 in FIG. 52 includes a pixel circuit and a driver circuit over a substrate 310, for example. Note that the display apparatus DSP0 in FIG. 2 described in the above embodiment can have a structure of the display apparatus 1000 in FIG. 52. The pixel circuit described in this embodiment can be the display pixel circuit described in any of the above embodiments.

For example, the circuit layer SICL, the wiring layer LINL, and the pixel layer PXAL in the display apparatus DSP in FIGS. 48A and 48B can be formed as illustrated by the display apparatus 1000 in FIG. 52. For example, the circuit layer SICL includes the substrate 310 on which a transistor 300 is formed. Above the transistor 300 is provided the wiring layer LINL that includes wirings that electrically connect the transistor 300, a transistor 500 to be described later, and light-emitting devices 130R, 130G, and 130B to be described later. Above the wiring layer LINL is provided the pixel layer PXAL that includes, for example, the transistor 500 and a light-emitting device 130 (the light-emitting devices 130R, 130G, and 130B in FIG. 52).

Thus, the transistor 500 can be a transistor included in the pixel PX described in Embodiment 1 and Embodiment 2. Specifically, for example, the transistor 500 can be the transistor M2 included in the pixel PX illustrated in FIG. 1 or FIG. 25. Alternatively, for example, the transistor 500 can be a transistor included in a switch in the display apparatus DSP3A in FIG. 1 or a transistor included in a switch in the display apparatus DSP4A in FIG. 25.

The light-emitting device 130 can be the light-emitting device LD included in the pixel PX described in Embodiment 1 and Embodiment 2.

Note that the circuit CD illustrated in FIG. 1 or FIG. 25 may be included in the pixel layer PXAL, for example. That is, a transistor included in the circuit CD may have the structure of the transistor 500. The circuit CD illustrated in FIG. 1 or FIG. 25 may be included in the circuit layer SICL, for example. That is, the transistor included in the circuit CD may have the structure of the transistor 300.

As the substrate 310, a substrate that can be used as the substrate BS described in Embodiment 3 can be used, for example. Note that in the case where the manufacturing process of the display apparatus 1000 involves heat treatment, a highly heat-resistant substrate is preferably selected as the substrate 310.

The diagonal size of the display apparatus can be determined depending on the kind and the size of the substrate 310, for example. For example, in the case where a display apparatus with a diagonal size of greater than or equal to 30 inches, greater than or equal to 50 inches, greater than or equal to 70 inches, or greater than or equal to 100 inches is fabricated for a television device or an electronic device for digital signage application, a glass substrate may be used as the substrate 310. In the case where a display apparatus with a diagonal size of less than or equal to 10 inches, less than or equal to 5 inches, less than or equal to 1.5 inches, or less than or equal to 1 inch is fabricated for a device for XR or a wearable information terminal, a semiconductor substrate may be used as the substrate 310.

There is no particular limitation on the screen ratio (aspect ratio) of the display apparatus 1000. For example, the display apparatus 1000 can be compliant with any of various screen ratios such as 1:1 (square), 4:3, 16:9, 16:10, 21:9, and 32:9.

In the description of this embodiment, the substrate 310 is a semiconductor substrate containing silicon as a material.

The transistor 300 is provided over the substrate 310 and includes an element isolation layer 312, a conductor 316, an insulator 315, an insulator 317, a semiconductor region 313 that is part of the substrate 310, and low-resistance regions 314*a* and 314*b* functioning as source and drain regions. Thus, the transistor 300 is a Si transistor. Although FIG. 52 illustrates a structure in which one of a source and a drain of the transistor 300 is electrically connected to conductors 330 and 356 to be described later through a conductor 328 to be described later, the electrical connection in the display apparatus of one embodiment of the present invention is not limited thereto. In the display apparatus of one embodiment of the present invention, for example, a gate of the transistor 300 may be electrically connected to the conductors 330 and 356 through the conductor 328.

The transistor 300 can have a fin-type structure when, for example, a top surface of the semiconductor region 313 and a side surface thereof in the channel width direction are covered with the conductor 316 with the insulator 315 as a gate insulating film therebetween. The effective channel width is increased in the fin-type transistor 300, whereby the on-state characteristics of the transistor 300 can be improved. In addition, contribution of the electric field of the gate electrode can be increased, so that the off-state characteristics of the transistor 300 can be improved.

Note that the transistor 300 can be a p-channel transistor or an n-channel transistor. Alternatively, both the p-channel transistor 300 and the n-channel transistor 300 may be included.

In the transistor 300, a region of the semiconductor region 313 where a channel is formed, a region in the vicinity thereof, and the low-resistance regions 314*a* and 314*b* functioning as the source and drain regions preferably contain a semiconductor such as a silicon-based semiconductor, specifically, preferably contain single crystal silicon. Alternatively, the above-described regions may be formed with germanium, silicon germanium, gallium arsenide, aluminum gallium arsenide, or gallium nitride, for example. Alternatively, the transistor 300 may contain silicon whose effective mass is adjusted by applying stress to the crystal lattice and thereby changing the lattice spacing. Alternatively, the transistor 300 may be a high-electron-mobility transistor (HEMT) including gallium arsenide and aluminum gallium arsenide, for example.

For the conductor 316 functioning as a gate electrode, a semiconductor material such as silicon that contains an element imparting n-type conductivity (e.g., arsenic or phosphorus) or an element imparting p-type conductivity (e.g., boron or aluminum) can be used. For another example, for the conductor 316, a conductive material such as a metal material, an alloy material, or a metal oxide material can be used.

Note that a material used for a conductor determines the work function; thus, selecting the material used for the conductor can adjust the threshold voltage of a transistor. Specifically, one or both of titanium nitride and tantalum nitride is/are preferably used for the conductor. Furthermore, in order to ensure the conductivity and embeddability of the conductor, one or both of tungsten and aluminum is/are preferably stacked over the conductor. In particular, tungsten is preferable in terms of heat resistance.

The element isolation layer 312 is provided to separate a plurality of transistors on the substrate 310 from each other. The element isolation layer can be formed by a local oxidation of silicon (LOCOS) method, a shallow trench isolation (STI) method, or a mesa isolation method.

Note that the transistor 300 shown in FIG. 52 is only an example and is not limited to having the structure shown in FIG. 52; a transistor appropriate for a circuit configuration, a driving method, or the like may be used. For example, the transistor 300 may have a planar structure instead of a fin-type structure.

Over the transistor 300 shown in FIG. 52, an insulator 320, an insulator 322, an insulator 324, and an insulator 326 are stacked in this order from the substrate 310 side.

For the insulators 320, 322, 324, and 326, one or more selected from silicon oxide, silicon oxynitride, silicon nitride oxide, silicon nitride, aluminum oxide, aluminum oxynitride, aluminum nitride oxide, or aluminum nitride can be used, for example.

Note that in this specification and the like, oxynitride refers to a material in which an oxygen content is higher than a nitrogen content, and nitride oxide refers to a material in which a nitrogen content is higher than an oxygen content. For example, silicon oxynitride refers to a material in which an oxygen content is higher than a nitrogen content, and silicon nitride oxide refers to a material in which a nitrogen content is higher than an oxygen content.

The insulator 322 may function as a planarization film for eliminating a level difference caused by the transistor 300 covered with the insulators 320 and 322. For example, a top surface of the insulator 322 may be planarized by planarization treatment using a chemical mechanical polishing (CMP) method to increase the level of planarity.

For the insulator 324, it is preferable to use an insulating film having a barrier property (referred to as a barrier insulating film) which prevents diffusion of impurities such as water and hydrogen from the substrate 310, the transistor 300, or the like to a region above the insulator 324 (e.g., the region including the transistor 500, the light-emitting devices 130R, 130G, and 130B, and the like). Accordingly, the insulator 324 is preferably formed using an insulating material having a function of inhibiting diffusion of impurities such as a hydrogen atom, a hydrogen molecule, and a water molecule, that is, an insulating material which does not easily transmit the above impurities. Alternatively, depending on circumstances, the insulator 324 is preferably formed using an insulating material having a function of inhibiting diffusion of impurities such as a nitrogen atom, a nitrogen molecule, a nitrogen oxide molecule (e.g., $N_2O$, NO, and $NO_2$), and a copper atom, that is, an insulating material which does not easily transmit the above oxygen. The insulator 324 preferably has a function of inhibiting diffusion of oxygen (e.g., at least one of an oxygen atom and an oxygen molecule).

For the film having a barrier property against hydrogen, for example, silicon nitride deposited by a CVD method can be used.

The amount of released hydrogen can be measured by thermal desorption spectroscopy (TDS), for example. The amount of hydrogen released from the insulator 324 that is converted into hydrogen atoms per unit area of the insulator 324 is less than or equal to $10\times10^{15}$ atoms/cm$^2$, preferably less than or equal to $5\times10^{15}$ atoms/cm$^2$ in TDS analysis in a film-surface temperature range of 50° C. to 500° C., for example.

Note that the dielectric constant of the insulator 326 is preferably lower than that of the insulator 324. For example, the dielectric constant of the insulator 326 is preferably lower than 4, further preferably lower than 3. For example, the dielectric constant of the insulator 326 is preferably 0.7 times or less that of the insulator 324, further preferably 0.6 times or less that of the insulator 324. When a material with a low dielectric constant is used for an interlayer film, the parasitic capacitance generated between wirings can be reduced.

In addition, the conductors 328 and 330 that are connected to the light-emitting devices or the like above the insulator 326 are embedded in the insulators 320, 322, 324, and 326. Note that each of the conductors 328 and 330 functions as a plug or a wiring. A plurality of conductors functioning as plugs or wirings are collectively denoted by the same reference numeral in some cases. In this specification and the like, a wiring and a plug connected to the wiring may be a single component. That is, in some cases, part of a conductor functions as a wiring or part of a conductor functions as a plug.

As a material for each of plugs and wirings (the conductor 328 and the conductor 330), one or more conductive materials selected from a metal material, an alloy material, a metal nitride material, and a metal oxide material can be used in a single-layer structure or a stacked-layer structure. It is preferable to use a high-melting-point material that has both heat resistance and conductivity, such as tungsten or molybdenum, and it is particularly preferable to use tungsten. Alternatively, a low-resistance conductive material such as aluminum or copper is preferably used. The use of a low-resistance conductive material can reduce wiring resistance.

A wiring layer may be provided over the insulator 326 and the conductor 330. For example, in FIG. 52, an insulator 350, an insulator 352, and an insulator 354 are sequentially stacked above the insulator 326 and the conductor 330. Furthermore, the conductor 356 is formed in the insulators 350, 352, and 354. The conductor 356 functions as a plug or a wiring that is connected to the transistor 300. Note that the conductor 356 can be formed using a material similar to that for the conductor 328 and the conductor 330.

Note that for example, the insulator 350 is preferably formed using an insulator having a barrier property against at least one of hydrogen, oxygen, and water, like the insulator 324. The insulators 352 and 354 are preferably formed using an insulator having a relatively low dielectric constant to reduce the parasitic capacitance generated between wirings, like the insulator 326. The insulator 352 and the insulator 354 have functions of an interlayer insulating film and a planarization film. Furthermore, the conductor 356 preferably includes a conductor having a barrier property against at least one of hydrogen, oxygen, and water.

Note that as the conductor having a barrier property against hydrogen, for example, tantalum nitride is preferably used. A stacked structure of tantalum nitride and tungsten having high conductivity can inhibit hydrogen diffusion from the transistor 300 while the conductivity of a wiring is ensured. In this case, a tantalum nitride layer having a barrier property against hydrogen is preferably in contact with the insulator 350 having a barrier property against hydrogen.

An insulator 512 is provided above the insulator 354 and the conductor 356.

In FIG. 52, the transistor 500 is provided over the insulator 512. A substance having a barrier property against oxygen and hydrogen is preferably used for the insulator 512. Specifically, one or more selected from silicon oxide, silicon oxynitride, silicon nitride oxide, silicon nitride, aluminum oxide, aluminum oxynitride, aluminum nitride oxide, and aluminum nitride may be used, for example.

For the film having a barrier property against hydrogen, for example, silicon nitride deposited by a CVD method can be used. Here, diffusion of hydrogen into a semiconductor element including an oxide semiconductor, such as the transistor 500, degrades the characteristics of the semiconductor element in some cases. Therefore, a film that inhibits hydrogen diffusion is preferably provided between the transistor 500 and the transistor 300. Specifically, the film that inhibits hydrogen diffusion is a film from which a small amount of hydrogen is released.

The insulator 512 can be formed using a material similar to that for the insulator 320, for example. In the case in which a material with a relatively low dielectric constant is used for these insulators, the parasitic capacitance between wirings can be reduced. A silicon oxide film or a silicon oxynitride film can be used as the insulator 512, for example.

An insulator 514 is provided over the insulator 512, and the transistor 500 is provided over the insulator 514. An insulator 574 is formed over the transistor 500, and an insulator 581 is formed over the insulator 574.

The insulator 574 and the insulator 581 will be described in detail in Embodiment 5.

The insulator 514 is preferably formed using a film having a barrier property inhibiting diffusion of impurities such as hydrogen or water from the substrate 310 or the region below the insulator 512 where circuit elements are provided to the region where the transistor 500 is provided. Thus, the insulator 514 can be formed using silicon nitride deposited by a CVD method, for example.

The transistor 500 in FIG. 52 is an OS transistor that includes a metal oxide in a channel formation region, as described above. Note that the OS transistor will be described in detail in Embodiment 5.

An insulator 592 and an insulator 594 are formed in this order over the insulator 581. Furthermore, a conductor 596 is embedded in the insulator 592 and the insulator 594. The conductor 596 functions as a plug or a wiring that is connected to the transistor 300. Note that the conductor 596 can be formed using a material similar to that for the conductor 328 and the conductor 330.

Note that for example, the insulator 592 is preferably formed using an insulator having a barrier property against at least one of hydrogen, oxygen, and water, like the insulator 324. The insulator 594 is preferably formed using an insulator having a relatively low dielectric constant to reduce the parasitic capacitance generated between wirings, like the insulator 326. The insulator 594 has functions of an interlayer insulating film and a planarization film. Furthermore, the conductor 596 preferably includes a conductor having a barrier property against at least one of hydrogen, oxygen, and water.

An insulator 598 and an insulator 599 are formed over the insulator 594 and the conductor 596.

For example, the insulator 598 is preferably formed using an insulator having a barrier property against at least one of hydrogen, oxygen, and water, like the insulator 324. The insulator 599 is preferably formed using an insulator having a relatively low dielectric constant to reduce the parasitic capacitance generated between wirings, like the insulator 326. The insulator 599 has functions of an interlayer insulating film and a planarization film.

The light-emitting device 130R, the light-emitting device 130G, the light-emitting device 130B, and a connection portion 140 are formed over the insulator 599.

The connection portion 140 is referred to as a cathode contact portion in some cases, and is electrically connected to cathodes of the light-emitting device 130R, the light-emitting device 130G, and the light-emitting device 130B. The connection portion 140 in FIG. 52 includes one or more conductors selected from conductors 112*a* to 112*c* to be described later, one or more conductors selected from conductors 126*a* to 126*c* to be described later, one or more conductors selected from conductors 129*a* to 129*c* to be described later, a common layer 114 to be described later, and a common electrode 115 to be described later.

Note that the connection portion 140 may be provided to surround four sides of the display portion in a plan view or may be provided in the display portion (e.g., between adjacent light-emitting devices 130).

The light-emitting device 130R includes the conductor 112*a*, the conductor 126*a* over the conductor 112*a*, and the conductor 129*a* over the conductor 126*a*. All of the conductors 112*a*, 126*a*, and 129*a* can be referred to as a pixel electrode, or one or two of them can be referred to as a pixel electrode.

The light-emitting device 130G includes a conductor 112*b*, a conductor 126*b* over the conductor 112*b*, and a conductor 129*b* over the conductor 126*b*. As in the light-emitting device 130R, all of the conductors 112*b*, 126*b*, and 129*b* can be referred to as a pixel electrode, or one or two of them can be referred to as a pixel electrode.

The light-emitting device 130B includes a conductor 112*c*, a conductor 126*c* over the conductor 112*c*, and a conductor 129*c* over the conductor 126*c*. As in the light-emitting devices 130R and 130G, all of the conductors 112*c*, 126*c*, and 129*c* can be referred to as a pixel electrode, or one or two of them can be referred to as a pixel electrode.

For the conductors 112*a* to 112*c* and the conductors 126*a* to 126*c*, a conductive layer functioning as a reflective electrode can be used, for example. For the conductive layer functioning as a reflective electrode, a conductor with high visible-light reflectance such as silver, aluminum, or an alloy film of silver (Ag), palladium (Pd), and copper (Cu) (an Ag—Pd—Cu (APC) film) can be used. The conductors 112*a* to 112*c* and the conductors 126*a* to 126*c* can each be a stacked-layer film in which a pair of titanium films sandwich aluminum (a film in which Ti, Al, and Ti are stacked in this order), or a stacked-layer film in which a pair of indium tin oxide films (indium tin oxide is sometimes referred to as ITO) sandwich silver (a film in which ITO, Ag, and ITO are stacked in this order).

For example, a conductive layer functioning as a reflective electrode may be used for the conductors 112*a* to 112*c*, and a conductor with a high light-transmitting property may be used for the conductors 126*a* to 126*c*. Examples of the conductor with a high light-transmitting property include an alloy of silver and magnesium and indium tin oxide.

A conductive layer functioning as a transparent electrode can be used for the conductors 129*a* to 129*c*. For the conductive layer functioning as a transparent electrode, for example, the above-described conductor with a high light-transmitting property can be used.

A microcavity structure may be provided in the light-emitting device 130 to be described in detail later. The microcavity structure refers to a structure in which the distance between a bottom surface of the light-emitting layer and a top surface of a lower electrode is set to a thickness depending on a wavelength of light emitted from the light-emitting layer. In that case, a light-transmitting and light-reflective conductive material is preferably used for the conductors 129*a* to 129*c* serving as an upper electrode (a common electrode), and a light-reflective conductive material is preferably used for the conductors 112*a* to 112*c* and the conductors 126*a* to 126*c* which serve as lower electrodes (pixel electrodes).

The microcavity structure refers to a structure in which the optical distance between the lower electrode and the light-emitting layer is adjusted to be $(2n-1)\lambda/4$ (n is a natural number greater than or equal to 1, and λ is a wavelength of emitted light to be amplified). Thus, light that is reflected back by the lower electrode (reflected light) considerably interferes with light that directly enters the upper electrode from the light-emitting layer (incident light). Accordingly, the phases of the reflected light and the incident light each having the wavelength λ can be aligned with each other, and the light emitted from the light-emitting layer can be further amplified. In the case where the reflected light and the incident light have a wavelength other than the wavelength λ, their phases are not aligned with each other, resulting in attenuation without resonation.

The conductor 112*a* is connected to the conductor 596 embedded in the insulator 594 through an opening formed in the insulator 599. The end portion of the conductor 112*a* is positioned on the outer side of the end portion of the conductor 126*a*. The end portion of the conductor 126*a* and the end portion of the conductor 129*a* are aligned or substantially aligned with each other.

Since the conductors 112*b*, 126*b*, and 129*b* of the light-emitting device 130G and the conductors 112*c*, 126*c*, and 129*c* of the light-emitting device 130B are similar to the conductors 112*a*, 126*a*, and 129*a* of the light-emitting device 130R, detailed description of those layers is omitted.

Depression portions are formed in the conductors 112*a*, 112*b*, and 112*c* to cover the openings provided in the insulator 599. A layer 128 is embedded in the depression portions.

The layer 128 has a function of filling the depression portions of the conductors 112*a*, 112*b*, and 112*c*. The conductor 126*a* is provided over the conductor 112*a* and the layer 128 positioned over the conductor 112*a*. Similarly, the conductor 126*b* is provided over the conductor 112*b* and the layer 128 positioned over the conductor 112*b*. Similarly, the conductor 126*c* is provided over the conductor 112*c* and the layer 128, and the layer 128 is positioned over the conductor 112*c*. That is, the conductor 112*a* and the conductor 126*a* are electrically connected to each other, the conductor 112*b* and the conductor 126*b* are electrically connected to each other, and the conductor 112*c* and the conductor 126*c* are electrically connected to each other. With the above structure, in addition to regions above the conductors 112*a*, 112*b*, and 112*c*, regions above the layers 128 which fill depression portions over the conductors 112*a*, 112*b*, and 112*c* can be also used as emission regions, whereby the aperture ratio of the pixels can be increased. The layer 128 may be an insulating layer or a conductive layer. Any of a variety of inorganic insulating materials, organic insulating materials, and conductive materials can be used for the layer 128 as appropriate. In particular, the layer 128 is preferably formed using an insulating material.

An insulating layer including an organic material can be favorably used as the layer 128. For example, an acrylic resin, a polyimide resin, an epoxy resin, a polyamide resin, a polyimide-amide resin, a siloxane resin, a benzocyclobutene-based resin, a phenol resin, and precursors of these resins can be used for the layer 128. A photosensitive resin can also be used for the layer 128. Examples of the photosensitive resin include positive-type materials and negative-type materials.

When a photosensitive resin is used, the layer 128 can be formed through only light-exposure and development steps, reducing the influence of dry etching or wet etching, on the surfaces of the conductors 112*a*, 112*b*, and 112*c*. When the layer 128 is formed using a negative photosensitive resin, the layer 128 can sometimes be formed using the same photomask (light-exposure mask) as the photomask used for forming the opening in the insulator 599.

Figure 53A:
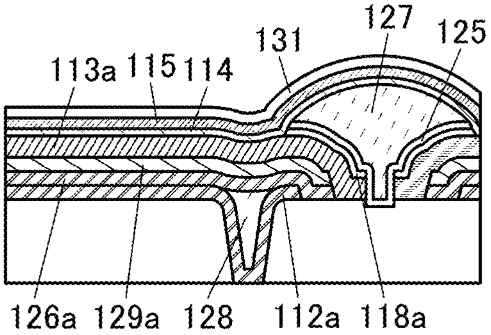
FIGS. 53A to 53C are schematic cross-sectional diagrams each illustrating a region of a structure example of a display apparatus.
Figure 53B:
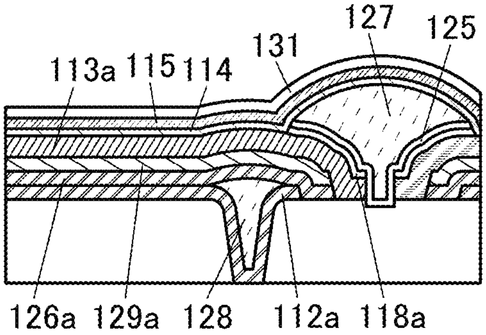
Figure 53C:
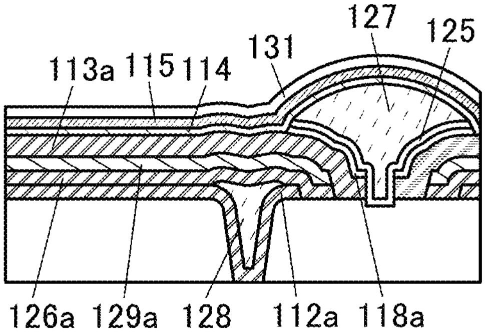

Although FIG. 52 illustrates an example in which the top surface of the layer 128 includes a flat portion, the shape of the layer 128 is not particularly limited. FIGS. 53A to 53C illustrate modification examples of the layer 128.

As illustrated in FIGS. 53A and 53C, the top surface of the layer 128 can have a shape such that its middle and the vicinity thereof are recessed (i.e., a shape including a concave surface) in the cross-sectional view.

As illustrated in FIG. 53B, the top surface of the layer 128 can have a shape in which its center and vicinity thereof rise, i.e., a shape including a convex surface, in the cross-sectional view.

The top surface of the layer 128 may include one or both of a convex surface and a concave surface. The number of convex surfaces and the number of concave surfaces included in the top surface of the layer 128 are not limited and can each be one or more.

The level of the top surface of the layer 128 and the level of the top surface of the conductor 112*a* may be the same or substantially the same, or may be different from each other. For example, the level of the top surface of the layer 128 may be either lower or higher than the level of the top surface of the conductor 112*a*.

FIG. 53A can be said as an example in which the layer 128 fits in the depression portion formed in the conductor 112*a*. By contrast, as illustrated in FIG. 53C, the layer 128 may exist also outside the depression portion formed in the conductor 112*a*, that is, the top surface of the layer 128 may extend beyond the depression portion.

The light-emitting device 130R includes a first layer 113*a*, the common layer 114 over the first layer 113*a*, and the common electrode 115 over the common layer 114. The light-emitting device 130G includes a second layer 113*b*, the common layer 114 over the second layer 113*b*, and the common electrode 115 over the common layer 114. The light-emitting device 130B includes a third layer 113*c*, the common layer 114 over the third layer 113*c*, and the common electrode 115 over the common layer 114.

The first layer 113*a* is formed to cover a top surface and a side surface of the conductor 126*a* and a top surface and a side surface of the conductor 129*a*. Similarly, the second layer 113*b* is formed to cover a top surface and a side surface of the conductor 126*b* and a top surface and a side surface of the conductor 129*b*. Similarly, the third layer 113*c* is formed to cover a top surface and a side surface of the conductor 126*c* and a top surface and a side surface of the conductor 129*c*. Accordingly, regions provided with the conductors 126*a*, 126*b*, and 126*c* can be entirely used as the light-emitting regions of the light-emitting devices 130R, 130G, and 130B, respectively, increasing the aperture ratio of the pixels.

In the light-emitting device 130R, the first layer 113*a* and the common layer 114 can be collectively referred to as an EL layer. Similarly, in the light-emitting device 130G, the second layer 113*b* and the common layer 114 can be collectively referred to as an EL layer. Similarly, in the light-emitting device 130B, the third layer 113*c* and the common layer 114 can be collectively referred to as an EL layer.

There is no particular limitation on the structure of the light-emitting device in this embodiment, and the light-emitting device can have a single structure or a tandem structure.

The first layer 113*a*, the second layer 113*b*, and the third layer 113*c* each have an island shape after being processed by a photolithography method. At each of end portions of the first layer 113*a*, the second layer 113*b*, and the third layer 113*c*, an angle between the top surface and the side surface is approximately 90°. By contrast, for example, an organic film formed using a fine metal mask (FMM) tends to have a thickness that gradually decreases with decreasing distance to an end portion, and has a top surface forming a slope in an area extending greater than or equal to 1 μm and less than or equal to 10 μm from the end portion, for example; thus, such an organic film has a shape whose top surface and side surface cannot be easily distinguished from each other.

The top surface and the side surface of each of the first layer 113*a*, the second layer 113*b*, and the third layer 113*c* are clearly distinguished from each other. Accordingly, as for the first layer 113*a* and the second layer 113*b* which are adjacent to each other, one of the side surfaces of the first layer 113*a* and one of the side surfaces of the second layer 113*b* face to each other. This applies to a combination of any two of the first layer 113*a*, the second layer 113*b*, and the third layer 113*c*.

Each of the first layer 113*a*, the second layer 113*b*, and the third layer 113*c* includes at least a light-emitting layer. Preferably, the first layer 113*a*, the second layer 113*b*, and the third layer 113*c* include a red-light-emitting layer, a green-light-emitting layer, and a blue-light-emitting layer, respectively, for example. Other than the above colors, cyan, magenta, yellow, or white can be employed as colors of light emitted from the light-emitting layers.

The first layer 113*a*, the second layer 113*b*, and the third layer 113*c* may each include one or more of a hole-injection layer, a hole-transport layer, a hole-blocking layer, a charge-generation layer, an electron-blocking layer, an electron-transport layer, and an electron-injection layer.

The first layer 113*a*, the second layer 113*b*, and the third layer 113*c* may include a hole-injection layer, a hole-transport layer, a light-emitting layer, and an electron-transport layer, for example. In addition, an electron-blocking layer may be provided between the hole-transport layer and the light-emitting layer. Furthermore, an electron-injection layer may be provided over the electron-transport layer.

The first layer 113*a*, the second layer 113*b*, and the third layer 113*c* may each include an electron-injection layer, an electron-transport layer, a light-emitting layer, and a hole-transport layer, for example. In particular, in each of the first layer 113*a*, the second layer 113*b*, and the third layer 113*c*, the electron-injection layer, the electron-transport layer, the light-emitting layer, and the hole-transport layer are preferably stacked in this order. In addition, a hole-blocking layer may be provided between the electron-transport layer and the light-emitting layer. Furthermore, a hole-injection layer may be provided over the hole-transport layer.

The first layer 113*a*, the second layer 113*b*, and the third layer 113*c* each preferably include a light-emitting layer and the carrier-transport layer (electron-transport layer or hole-transport layer) over the light-emitting layer. Since the surfaces of the first layer 113*a*, the second layer 113*b*, and the third layer 113*c* are exposed in the manufacturing process of the display apparatus in some cases, providing the carrier-transport layer over the light-emitting layer prevents the light-emitting layer from being exposed on the outermost surface, so that damage to the light-emitting layer can be reduced. Thus, the reliability of the light-emitting device can be increased.

The first layer 113*a*, the second layer 113*b*, and the third layer 113*c* may each include a first light-emitting unit, a charge generation layer, and a second light-emitting unit, for example. Preferably, the first layer 113*a*, the second layer 113*b*, and the third layer 113*c* include two or more light-emitting units that emit red light, two or more light-emitting units that emit green light, and two or more light-emitting units that emit blue light, respectively, for example.

It is preferable that the second light-emitting unit include a light-emitting layer and a carrier-transport layer (an electron-transport layer or a hole-transport layer) over the light-emitting layer. Since the surface of the second light-emitting unit is exposed in the manufacturing process of the display apparatus, providing the carrier-transport layer over the light-emitting layer prevents the light-emitting layer from being exposed on the outermost surface, so that damage to the light-emitting layer can be reduced. Thus, the reliability of the light-emitting device can be increased.

The common layer 114 includes, for example, an electron-injection layer or a hole-injection layer. Alternatively, the common layer 114 may include a stack of an electron-transport layer and an electron-injection layer, or may include a stack of a hole-transport layer and a hole-injection layer. The common layer 114 is shared between the light-emitting device 130R, the light-emitting device 130G, and the light-emitting device 130B.

The common electrode 115 is shared between the light-emitting device 130R, the light-emitting device 130G, and the light-emitting device 130B. As illustrated in FIG. 52, the common electrode 115 that is included in common in the plurality of light-emitting devices is electrically connected to the conductor included in the connection portion 140.

Side surfaces of the first layer 113*a*, the second layer 113*b*, and the third layer 113*c* are covered with the insulators 125 and 127. A mask layer 118*a* is positioned between the first layer 113*a* and the insulator 125. A mask layer 118*b* is positioned between the second layer 113*b* and the insulator 125, and a mask layer 118*c* is positioned between the third layer 113*c* and the insulator 125. The common layer 114 is provided over the first layer 113*a*, the second layer 113*b*, the third layer 113*c*, and the insulators 125 and 127. The common electrode 115 is provided over the common layer 114. The common layer 114 and the common electrode 115 are each one continuous film shared by the plurality of light-emitting devices.

The insulator 125 can be formed using an inorganic material. As the insulator 125, one or more selected from an inorganic insulating film such as an oxide insulating film, a nitride insulating film, an oxynitride insulating film, and a nitride oxide insulating film can be used, for example. The insulator 125 may have a single-layer structure or a stacked-layer structure. Examples of the oxide insulating film include a silicon oxide film, an aluminum oxide film, a magnesium oxide film, an indium-gallium-zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, an aluminum oxide film is preferably used because it has high selectivity with respect to the EL layer in the etching process and has a function of protecting the EL layer when the insulator 127 to be described later is formed. An inorganic insulating film such as an aluminum oxide film, a hafnium oxide film, or a silicon oxide film is formed by an ALD method as the insulator 125, whereby the insulator 125 can have few pinholes and an excellent function of protecting the EL layer. The insulator 125 may have a stacked-layer structure of a film formed by an ALD method and a film formed by a sputtering method. The insulator 125 may have a stacked-layer structure of an aluminum oxide film formed by an ALD method and a silicon nitride film formed by a sputtering method, for example.

The insulator 125 preferably has a function of a barrier insulating film against at least one of water and oxygen. Alternatively, the insulator 125 preferably has a function of inhibiting the diffusion of at least one of water and oxygen. Alternatively, the insulator 125 preferably has a function of capturing or fixing (also referred to as gettering) at least one of water and oxygen.

When the insulator 125 has a function of the barrier insulating layer or a gettering function, entry of impurities (typically, at least one of water and oxygen) that would diffuse into the light-emitting devices from the outside can be suppressed. In this structure, a highly reliable light-emitting device, furthermore, a highly reliable display panel can be provided.

The insulator 125 preferably has a low impurity concentration. Accordingly, degradation of the EL layer, which is caused by entry of impurities into the EL layer from the insulator 125, can be suppressed. In addition, when the impurity concentration is reduced in the insulator 125, a barrier property against at least one of water and oxygen can be increased. For example, one or both of the hydrogen concentration and the carbon concentration in the insulator 125 are preferably low.

As the insulator 127, an insulating layer containing an organic material can be suitably used. As the organic material, a photosensitive organic resin is preferably used; for example, a photosensitive resin composition containing an acrylic resin may be used. The viscosity of the material of the insulator 127 is greater than or equal to 1 cP and less than 1500 cP, and is preferably greater than or equal to 1 cP and less than or equal to 12 cP. By setting the viscosity of the material of the insulator 127 in the above range, the insulator 127 having a tapered shape, which is to be described later, can be formed relatively easily. Note that in this specification and the like, an acrylic resin refers to not only a polymethacrylic acid ester or a methacrylic resin, but also all the acrylic polymer in a broad sense.

Note that the organic material usable for the insulator 127 is not limited to the above description as long as the insulator 127 has a taper-shaped side surface as described later. For example, for the insulator 127, an acrylic resin, a polyimide resin, an epoxy resin, an imide resin, a polyamide resin, a polyimide-amide resin, a silicone resin, a siloxane resin, a benzocyclobutene-based resin, a phenol resin, precursors of these resins, or the like can be used in some cases. An organic material such as polyvinyl alcohol (PVA), polyvinylbutyral, polyvinylpyrrolidone, polyethylene glycol, polyglycerin, pullulan, water-soluble cellulose, or an alcohol-soluble polyamide resin can be used for the insulator 127 in some cases. A photoresist, which is a photosensitive resin, can be used for the insulator 127 in some cases. Examples of the photosensitive resin include positive-type materials and negative-type materials.

The insulator 127 may be formed using a material absorbing visible light. When the insulator 127 absorbs light emitted by the light-emitting device, leakage of light (stray light) from the light-emitting device to the adjacent light-emitting device through the insulator 127 can be inhibited. Thus, the display quality of the display panel can be improved. Since no polarizing plate is required to improve the display quality, the weight and thickness of the display panel can be reduced.

Examples of the material absorbing visible light include materials containing pigment of black or the like, materials containing dye, light-absorbing resin materials (e.g., polyimide), and resin materials that can be used for color filters (color filter materials). Using the resin material composed of stacked color filter materials of two or three or more colors is particularly preferred, in which case the effect of blocking visible light is enhanced. In particular, mixing color filter materials of three or more colors enables the formation of a black or nearly black resin layer.

For example, the insulator 127 can be formed by a wet film-formation method such as spin coating, dipping, spray coating, ink-jetting, dispensing, screen printing, offset printing, doctor blade coating, slit coating, roll coating, curtain coating, or knife coating. Specifically, an organic insulating film that is to be the insulator 127 is preferably formed by spin coating.

The insulator 127 is formed at a temperature lower than the allowable temperature limit of the EL layer. The typical substrate temperature in formation of the insulator 127 is lower than or equal to 200° C., preferably lower than or equal to 180° C., further preferably lower than or equal to 160° C., still further preferably lower than or equal to 150° C., yet still further preferably lower than or equal to 140° C.

A structure of the insulator 127 between the light-emitting device 130R and the light-emitting device 130G is described below. The same applies to the insulator 127 between the light-emitting device 130G and the light-emitting device 130B, the insulator 127 between the light-emitting device 130B and the light-emitting device 130R, and the like. In the description below, an end portion of the insulator 127 over the second layer 113*b* is used as an example in some cases, and the same applies to an end portion of the insulator 127 over the first layer 113*a* and an end portion of the insulator 127 over the third layer 113*c*.

In the cross-sectional view of the display apparatus, the side surface of the insulator 127 preferably has a tapered shape with a taper angle θ1. The taper angle θ1 is an angle formed by the side surface of the insulator 127 and the substrate surface. However, without limitation to the substrate surface, the taper angle θ1 may be an angle formed by the side surface of the insulator 127 and a top surface of a flat portion of the insulator 125 or a top surface of a flat portion of the second layer 113*b*. When the side surface of the insulator 127 has a tapered shape, a side surface of the insulator 125 and a side surface of the mask layer 118*a* also have a tapered shape in some cases.

The taper angle θ1 of the insulator 127 is less than 90°, preferably less than or equal to 60°, and further preferably less than or equal to 45°. Such a forward tapered shape of the end portion of the side surface of the insulator 127 can prevent disconnection, local thinning, or the like from occurring in the common layer 114 and the common electrode 115 which are provided over the end portion of the side surface of the insulator 127, leading to film formation with good coverage. The common layer 114 and the common electrode 115 can have improved in-plane uniformity in this manner, whereby the display apparatus can have improved display quality.

In the cross-sectional view of the display apparatus, a top surface of the insulator 127 preferably has a convex shape. The convex shape of the top surface of the insulator 127 is preferably a gently bulging shape toward the center. The central projecting surface of the top surface of the insulator 127 is preferably smoothly connected to the tapered end portion of the side surface. With such a shape of the insulator 127, the common layer 114 and the common electrode 115 over the entire insulator 127 can be formed with good coverage.

The insulator 127 is formed in a region between two EL layers (e.g., a region between the first layer 113*a* and the second layer 113*b*). In that case, part or the whole of the insulator 127 is positioned between an end portion of a side surface of one of the two EL layers (e.g., the first layer 113*a*) and an end portion of a side surface of the other of the two EL layers (e.g., the second layer 113*b*).

One end portion of the insulator 127 preferably overlaps with the conductor 126*a* serving as a pixel electrode, and the other end portion of the insulator 127 preferably overlaps with the conductor 126*b* serving as a pixel electrode. With such a structure, the end portion of the insulator 127 can be formed over a substantially flat region of the first layer 113*a* (the second layer 113*b*). In the above manner, the insulator 127 can be processed into a tapered shape relatively easily.

By forming the insulator 127 and the like in the above manner, a disconnected portion and a locally thinned portion can be prevented from being formed in the common layer 114 and the common electrode 115 from a substantially flat region in the first layer 113*a* to a substantially flat region in the second layer 113*b*. Thus, between the light-emitting devices, a connection defect caused by the disconnected portion and an increase in electric resistance caused by the locally thinned portion can be inhibited from occurring in the common layer 114 and the common electrode 115.

In the display apparatus of this embodiment, the distance between the light-emitting devices can be narrowed. Specifically, the distance between the light-emitting devices, the distance between the EL layers, or the distance between the pixel electrodes can be less than 10 μm, 8 μm or less, 5 μm or less, 3 μm or less, 2 μm or less, 1 μm or less, 500 nm or less, 200 nm or less, 100 nm or less, 90 nm or less, 70 nm or less, 50 nm or less, 30 nm or less, 20 nm or less, 15 nm or less, or 10 nm or less. In other words, the display apparatus in this embodiment includes a region where a distance between two adjacent island-shaped EL layers is 1 μm or less, preferably 0.5 μm (500 nm) or less, further preferably 100 nm or less. The distance between the light-emitting devices is shortened in this manner, whereby a display apparatus with high definition and a high aperture ratio can be provided.

A protective layer 131 is provided over the light-emitting devices 130R, 130G, and 130B. The protective layer 131 serves as a passivation film for protecting the light-emitting devices 130. Providing the protective layer 131 that covers the light-emitting devices can inhibit entry of impurities such as water and oxygen into the light-emitting devices, thereby increasing the reliability of the light-emitting devices 130.

For the protective layer 131, aluminum oxide, silicon nitride, or silicon nitride oxide can be used, for example.

The protective layer 131 and the substrate 110 are bonded to each other with an adhesive layer 107. A solid sealing structure, a hollow sealing structure, or the like can be employed to seal the light-emitting devices. In FIG. 52, a solid sealing structure is employed, in which a space between the substrate 310 and the substrate 110 is filled with the adhesive layer 107. Alternatively, a hollow sealing structure may be employed, in which the space is filled with an inert gas (e.g., nitrogen or argon). In this case, the adhesive layer 107 may be provided not to overlap with the light-emitting devices. Alternatively, the space may be filled with a resin other than the frame-like adhesive layer 107.

As the adhesive layer 107, any of a variety of curable adhesives such as a reactive curable adhesive, a thermosetting adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene-vinyl acetate (EVA) resin. In particular, a material with low moisture permeability, such as an epoxy resin, is preferred. A two-component-mixture-type resin may be used. An adhesive sheet may be used.

The display apparatus 1000 has a top-emission structure. Light emitted from the light-emitting device is emitted toward the substrate 110. For this reason, a material having a high visible-light-transmitting property is preferably used for the substrate 110. For example, a substrate having a high visible-light-transmitting property may be selected as the substrate 110 among substrates usable as the substrate 310 and the substrate BS. The pixel electrode contains a material that reflects visible light, and the counter electrode (the common electrode 115) contains a material that transmits visible light.

When the above structure example is applied to a display apparatus, the display apparatus can achieve high display resolution and high definition. Specifically, for example, a display apparatus with a display resolution of HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320) can be achieved in some cases. Furthermore, specifically, for example, a display apparatus with a definition of greater than or equal to 100 ppi, greater than or equal to 300 ppi, greater than or equal to 500 ppi, greater than or equal to 1000 ppi, greater than or equal to 2000 ppi, greater than or equal to 3000 ppi, or greater than or equal to 5000 ppi can be achieved in some cases.

Note that the structure of the display apparatus of one embodiment of the present invention is not limited to the structure of the display apparatus 1000 in FIG. 52. The structure of the display apparatus of one embodiment of the present invention may be the structure of the display apparatus 1000 in FIG. 52 on which some modification is performed as appropriate. A modification example of the display apparatus in FIG. 52, which is the display apparatus of one embodiment of the present invention, is described below.

Structure Example 2 of Display Apparatus

Figure 54:
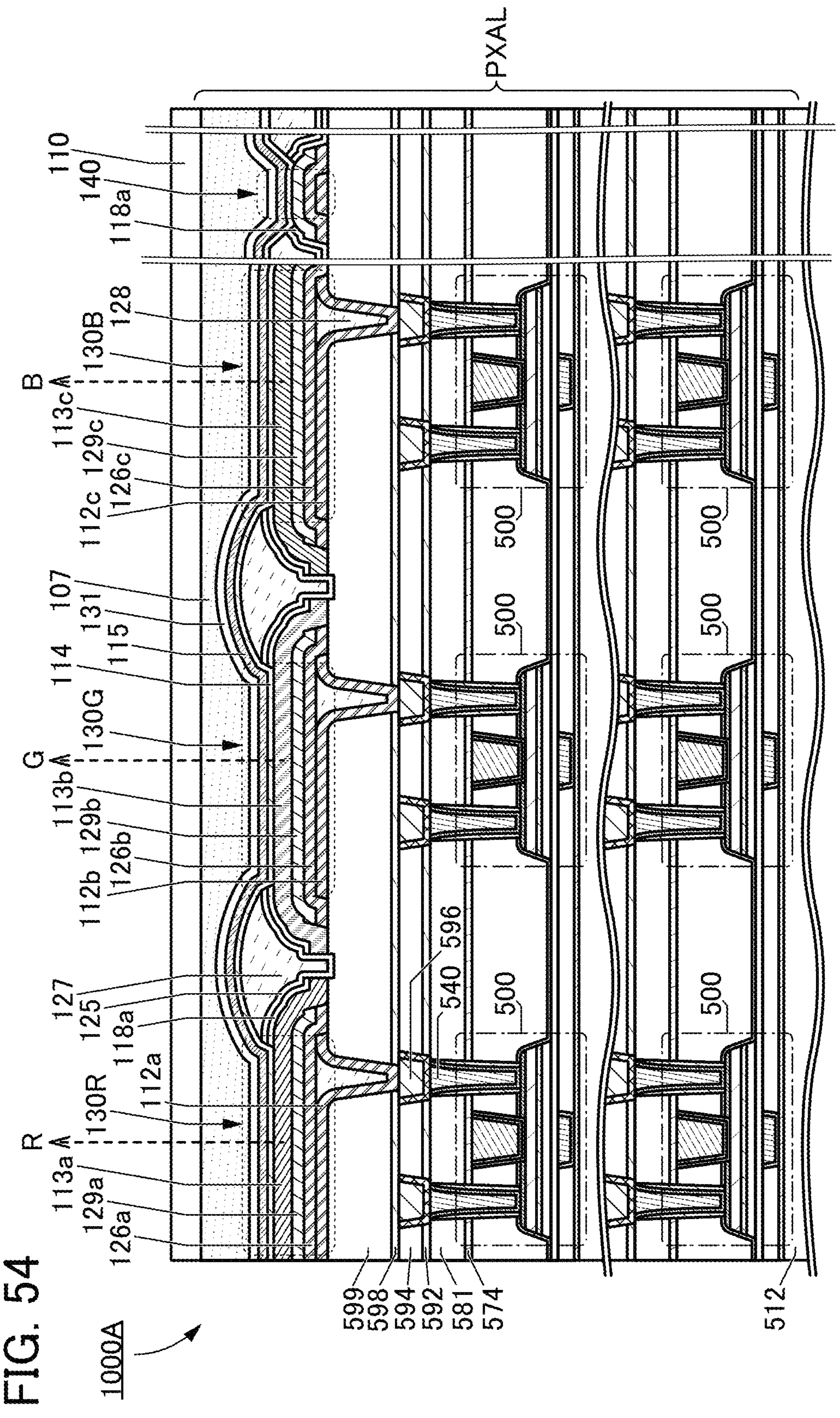
FIG. 54 is a schematic cross-sectional diagram illustrating a structure example of a display apparatus.

For example, the pixel layer PXAL in the display apparatus 1000 in FIG. 52 may have a structure in which transistors 500 are stacked in two or more layers. A display apparatus 1000A illustrated in FIG. 54 shows a structure example in which the transistors 500 included in the pixel layer PXAL of the display apparatus 1000 in FIG. 52 are stacked in two layers. Note that FIG. 54 illustrates only the pixel layer PXAL in the display apparatus 1000A, and for the circuit layer SICL and the wiring layer LINL, the structure of the display apparatus 1000 in FIG. 52 can be referred to.

In the case where the number of transistors included in a pixel is increased in the display apparatus 1000, the structure of the display apparatus 1000A in FIG. 54 can be employed.

Structure Example 3 of Display Apparatus

Figure 55:
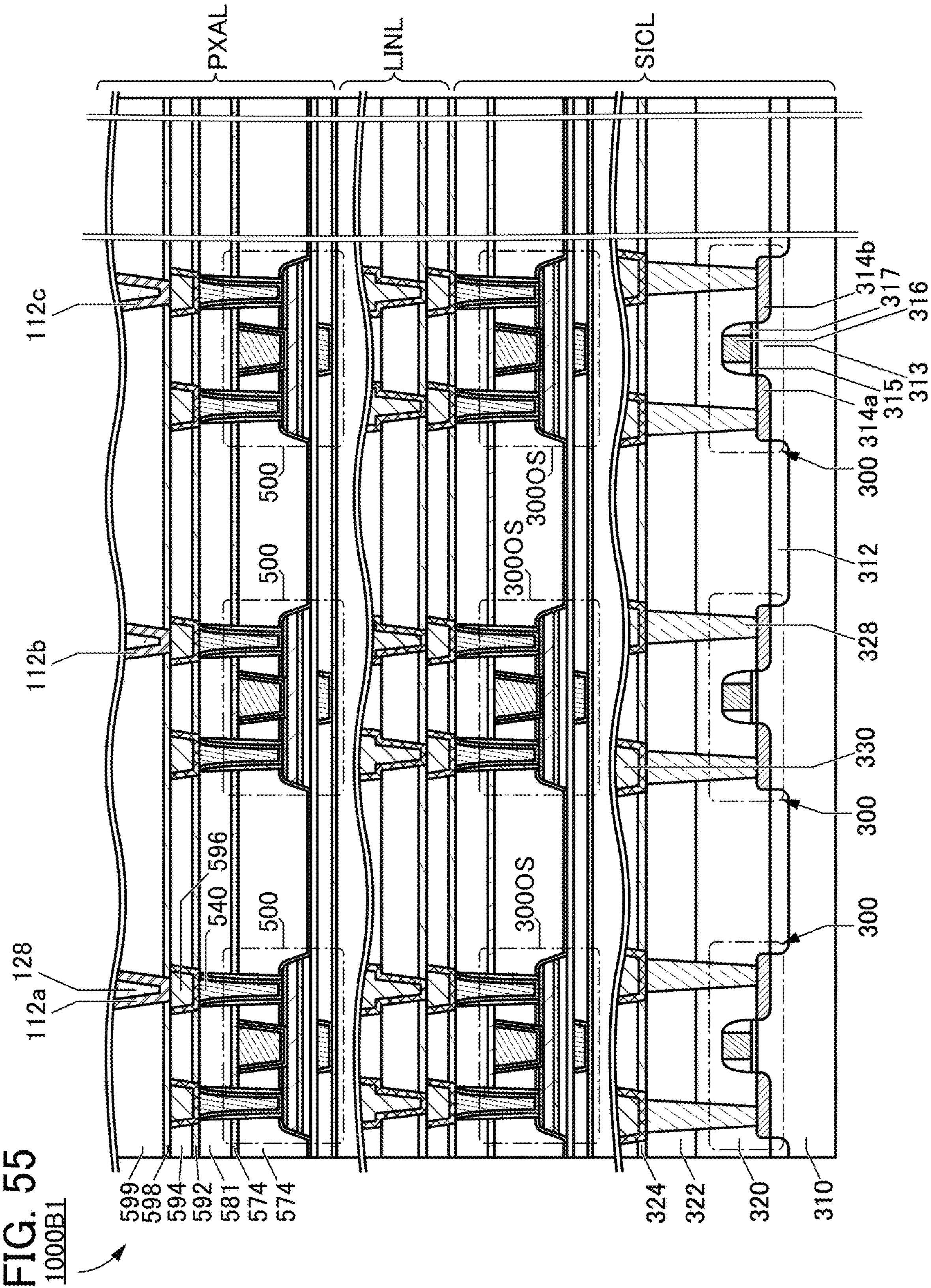
FIG. 55 is a schematic cross-sectional diagram illustrating a structure example of a display apparatus.

For example, the circuit layer SICL in the display apparatus 1000 in FIG. 52 may include OS transistors in addition to the transistors 300. A display apparatus 1000B1 in FIG. 55 shows a structure example in which transistors 300OS, which are OS transistors, are stacked over the transistors 300 in the circuit layer SICL. Note that the display apparatus 1000B1 in FIG. 55 illustrates the circuit layer SICL, the wiring layer LINL, and only the layer of the pixel layer PXAL including the transistors 500; thus, for the layer of the pixel layer PXAL including light-emitting devices, the structure of the display apparatus 1000 in FIG. 52 can be referred to.

Since a p-type semiconductor is difficult to form with use of a metal oxide in terms of mobility and reliability, a circuit formed with OS transistors becomes a single-polarity circuit with only n-channel transistors in many cases. In view of this, in the structure of the display apparatus 1000B1 in FIG. 55, an n-channel transistor is used as the transistor 300OS and a p-channel transistor is used as the transistor 300, whereby a circuit included in the circuit layer SICL in FIG. 55 can be a CMOS circuit. In particular, a circuit where an n-channel transistor is used as the OS transistor and a p-channel transistor is used as the Si transistor is referred to as LTPO in some cases.

For example, the circuit layer SICL in the display apparatus 1000 in FIG. 52 may include OS transistors instead of the transistors 300. A display apparatus 1000B2 in FIG. 56 shows a structure example in which the transistors 300OS, which are OS transistors, are formed in the circuit layer SICL in the display apparatus 1000 in FIG. 52, instead of the transistors 300.

Figure 56:
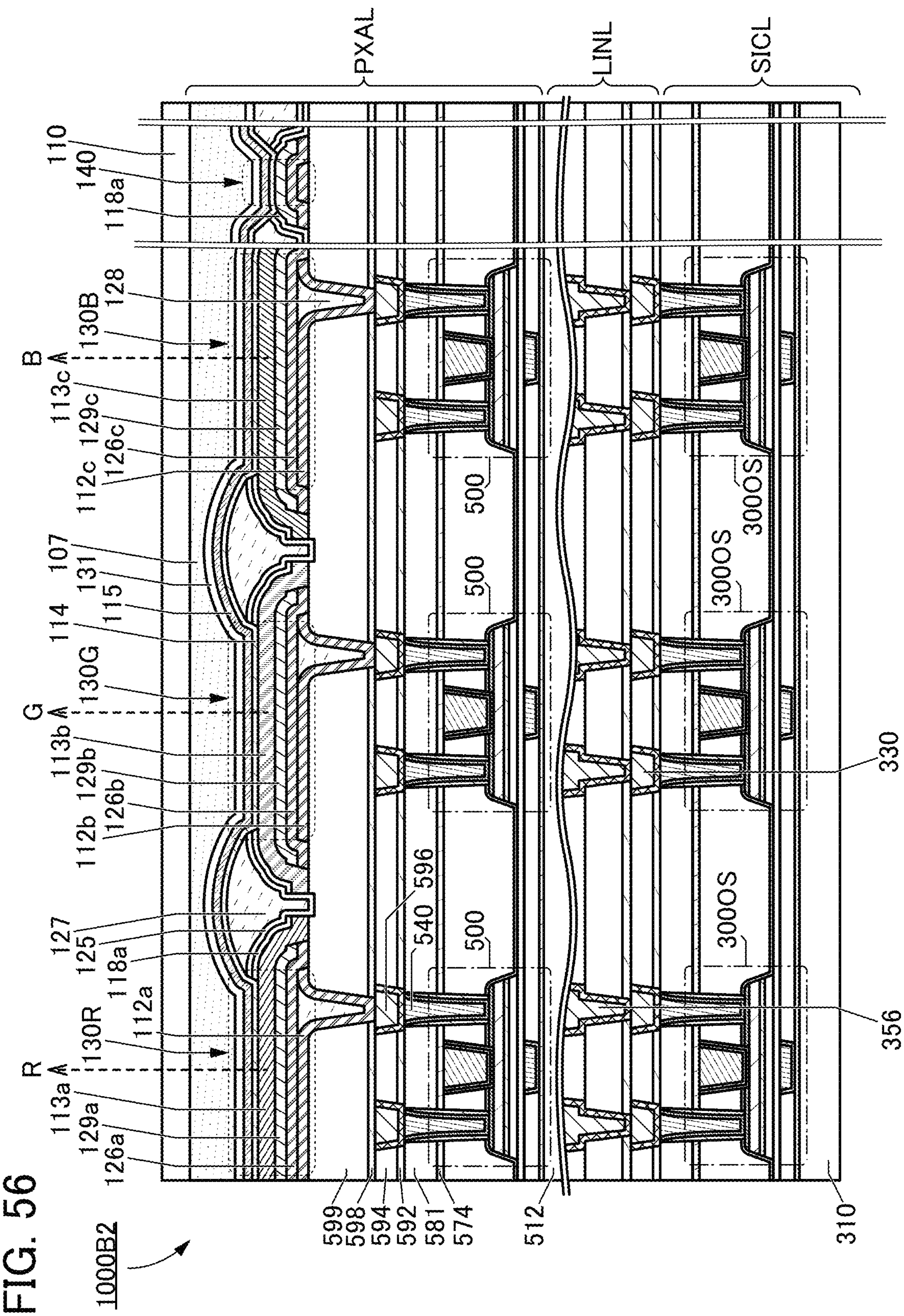
FIG. 56 is a schematic cross-sectional diagram illustrating a structure example of a display apparatus.

Note that in the display apparatus 1000B2 in FIG. 56, a substrate other than the semiconductor substrate can also be used as the substrate 310. Examples of the substrate 310 include a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, paper including a fibrous material, and a base film.

For example, the circuit layer SICL in the display apparatus 1000 in FIG. 52 may include a transistor including low-temperature polysilicon in a channel formation region (hereinafter referred to as an LTPS transistor) instead of the transistors 300. A display apparatus 1000B3 in FIG. 57 shows a structure example in which transistors 300LT, which are LTPS transistors, are formed in the circuit layer SICL in the display apparatus 1000 in FIG. 52, instead of the transistors 300.

The transistor 300LT is provided over the substrate 310. The transistor 300LT includes an insulator 361, an insulator 362, an insulator 363, an insulator 364, a conductor 366, a conductor 367, a low-resistance region 368*p*, a semiconductor region 368*i*, and a conductor 369. Here, a plurality of layers obtained by processing the same conductive film are shown with the same hatching pattern. In this specification and the like, the low-resistance region 368*p* and the semiconductor region 368*i* are collectively referred to as a semiconductor layer 368. In particular, when, for example, low-temperature polysilicon is used as a semiconductor material contained in the semiconductor layer 368, the transistor 300LT can be an LTPS transistor. The LTPS transistor has high field-effect mobility and excellent frequency characteristics.

Figure 57:
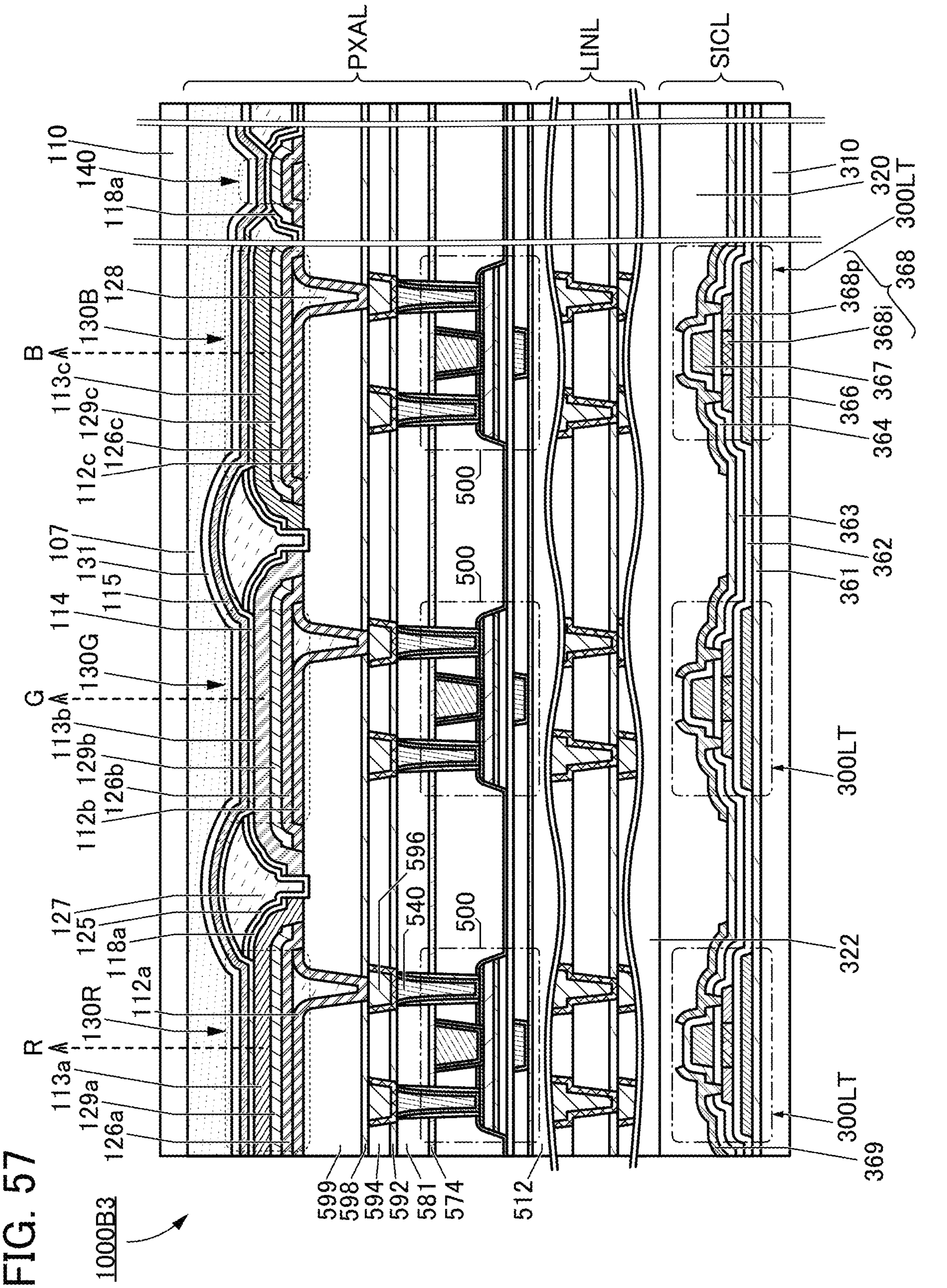
FIG. 57 is a schematic cross-sectional diagram illustrating a structure example of a display apparatus.

In FIG. 57, the conductor 367 serves as a first gate (sometimes referred to as one of a gate and a back gate) of the transistor 300LT. The conductor 366 serves as a second gate (sometimes referred to as the other of the gate and the back gate) of the transistor 300LT. One of the pair of low-resistance regions 368*p* in the semiconductor layer 368 serves as one of a source and a drain of the transistor 300LT, and the other thereof serves as the other of the source and the drain of the transistor 300LT. The insulator 363 serves as a first gate insulating film in the transistor 300LT, and the insulator 362 serves as a second gate insulating film in the transistor 300LT.

In FIG. 57, the insulator 361 is formed over the substrate 310. The conductor 366 is formed in a region over the insulator 361. The insulator 362 is formed to cover the insulator 361 and the conductor 366. The semiconductor layer 368 is formed in a region overlapping with the conductor 366 and the insulator 362 and being over the insulator 362. The insulator 363 is formed to cover the insulator 362 and the semiconductor layer 368. The conductor 367 is formed in a region overlapping with the conductor 366, the insulator 362, the semiconductor layer 368, and the insulator 363 and being over the insulator 363. The insulator 364 is formed to cover the insulator 363 and the conductor 367. An opening is formed in the insulator 363 and the insulator 364 in regions overlapping with the low-resistance region 368*p*, and the conductor 369 is formed over the insulator 364 to fill the opening.

For the insulators 361, 362, 363, and 364, one or more selected from silicon oxide, silicon oxynitride, silicon nitride oxide, silicon nitride, aluminum oxide, aluminum oxynitride, aluminum nitride oxide, or aluminum nitride may be used.

In particular, a barrier insulating film that inhibits diffusion of impurities (e.g., a metal ion, a metal atom, an oxygen atom, an oxygen molecule, a hydrogen atom, a hydrogen molecule, and a water molecule) from a region below the insulator 361 (e.g., the substrate 310) is preferably used as the insulator 361.

The low-resistance region 368*p* contains an impurity element. For example, in the case where the transistor 300LT is an n-channel transistor, phosphorus or arsenic is added to the low-resistance region 368*p*. In contrast, in the case where the transistor 300LT is a p-channel transistor, boron or aluminum is added to the low-resistance region 368*p*. In addition, in order to control the threshold voltage of the transistor 300LT, the above-described impurity may be added to the semiconductor region 368*i*.

Note that the transistor 300LT can be a p-channel transistor or an n-channel transistor. Alternatively, both the p-channel transistor 300LT and the n-channel transistor 300LT may be included in the circuit layer SICL.

For the conductors 366 and 367, a metal such as aluminum, titanium, chromium, nickel, copper, yttrium, zirconium, molybdenum, silver, tantalum, or tungsten can be used, for example. Alternatively, for the conductors 366 and 367, an alloy containing two or more selected from the above metals as its main components can be used. Alternatively, for the conductors 366 and 367, a light-transmitting conductive material such as indium oxide, indium tin oxide (ITO), indium oxide containing tungsten, indium zinc oxide containing tungsten, indium oxide containing titanium, ITO containing titanium, indium zinc oxide, zinc oxide (ZnO), ZnO containing gallium, or indium tin oxide containing silicon can be used. Alternatively, for the conductors 366 and 367, silicide (e.g., nickel silicide) or a semiconductor (e.g., polycrystalline silicon or an oxide semiconductor) whose resistance is lowered by, for example, containing an impurity element may be used. Alternatively, for the conductors 366 and 367, a film containing graphene can be used. The film containing graphene can be formed, for example, by reducing a film containing graphene oxide. Alternatively, a conductive paste (e.g., a conductive paste containing silver, carbon, or copper) or a conductive polymer (e.g., polythiophene) may be used for the conductors 366 and 367. A conductive paste is preferable because it is inexpensive. A conductive polymer is preferable because it is easily applied. Alternatively, the conductor 366, the conductor 367, or both can have a single-layer structure containing any of the above materials or a structure (a stacked structure) in which two or more selected from the above materials overlap each other.

The conductor 369 serves as a wiring electrically connected to the low-resistance region 368*p* of the transistor 300LT. That is, the conductor 369 serves as a source or a drain of the transistor 300LT. Note that the conductor 369 can be formed using any of the materials usable for the conductors 366 and 367.

The circuit layer SICL in the display apparatus 1000 in FIG. 52 may have a structure in which a plurality of substrates are attached to each other, for example. The circuit layer SICL in a display apparatus 1000B4 in FIG. 58 includes the substrate 310 and a substrate 310A and has a structure in which an upper surface of the substrate 310 and a bottom surface of the substrate 310A are attached to each other. Note that FIG. 58 illustrates the circuit layer SICL and only the layer of the pixel layer PXAL including the transistors 500; thus, for the wiring layer LINL and the layer of the pixel layer PXAL including light-emitting devices, the structure of the display apparatus 1000 in FIG. 52 can be referred to.

Figure 58:
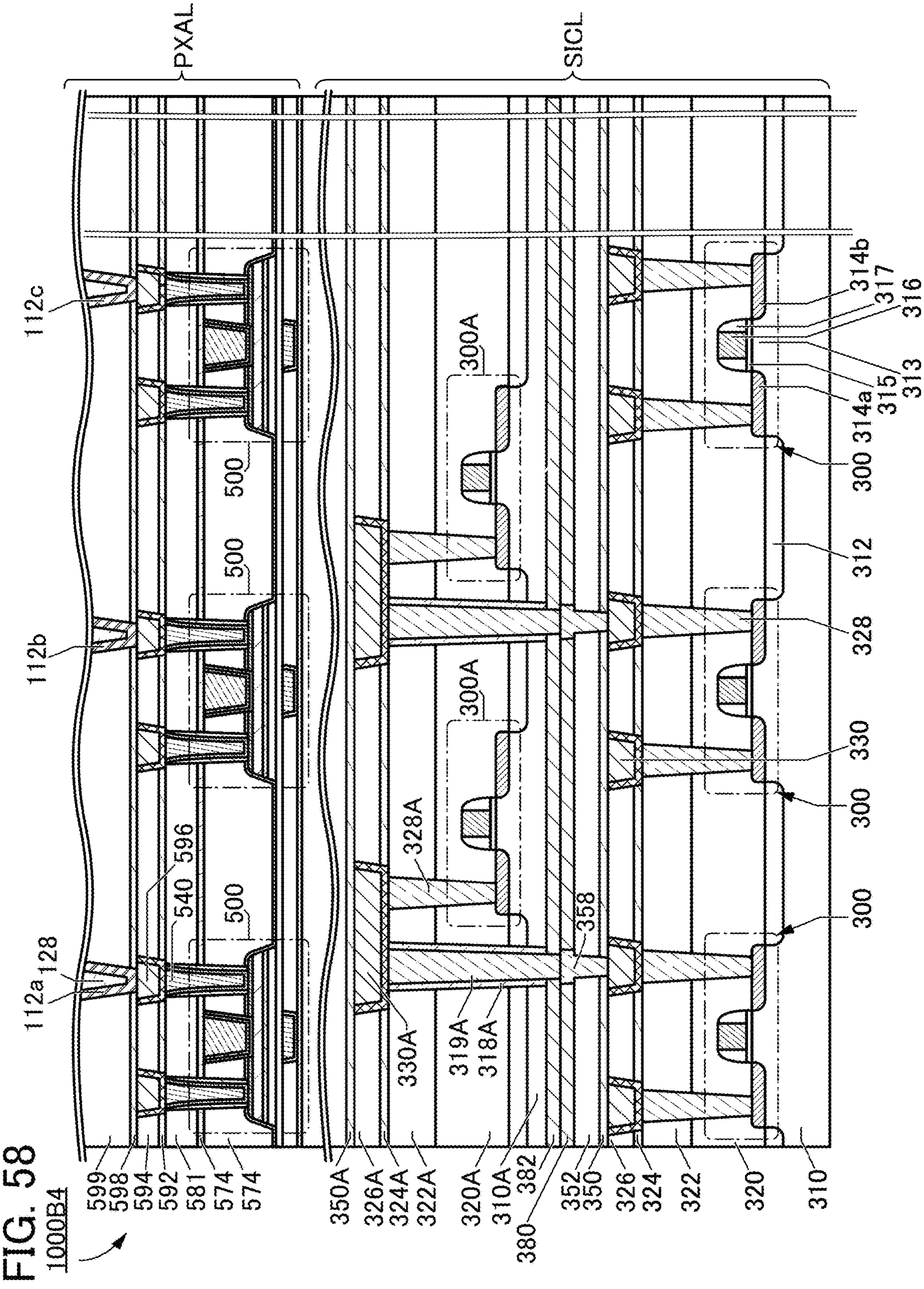
FIG. 58 is a schematic cross-sectional diagram illustrating a structure example of a display apparatus.

For the components from the substrate 310 to the insulator 326 and the conductor 330 in the display apparatus 1000B4 in FIG. 58, the description of the display apparatus 1000 in FIG. 52 can be referred to.

As in the display apparatus 1000 in FIG. 52, the insulator 350 and the insulator 352 are formed in this order over the insulator 326 and the conductor 330.

The conductor 358 is embedded to fill an opening portion provided in regions of the insulator 350 and the insulator 352 which overlap with part of the conductor 330. The conductor 358 is also formed over the insulator 352. After that, the conductor 358 is patterned into a form of a wiring, a terminal, or a pad through an etching step or the like.

The conductor 358 can be formed using, for example, copper, aluminum, tin, zinc, tungsten, silver, platinum, or gold. The material used for the conductor 358 preferably contains the same component as the material used for a later-described conductor 319A.

Then, an insulator 380 is formed to cover the insulator 352 and the conductor 358 and is subsequently subjected to planarization treatment by a chemical mechanical polishing (CMP) method until the conductor 358 is exposed. In this manner, the conductor 358 serving as a wiring, a terminal, or a pad can be formed over the substrate 310.

The insulator 380 is preferably formed using a film that inhibits diffusion of impurities such as water and hydrogen (a film having a barrier property). In other words, the insulator 380 is preferably formed using any of the materials usable for the insulator 324. Like the insulator 326, the insulator 380 may be formed using an insulator having a relatively low dielectric constant to reduce the parasitic capacitance generated between wirings, for example. In other words, the insulator 380 may be formed using any of the materials usable for the insulator 326. The insulator 380 preferably contains the same component as the material used for an insulator 382 to be described later.

Next, the substrate 310A is described. As the substrate 310A, a semiconductor substrate usable as the substrate 310 can be used, for example.

Transistors, insulators, and conductors are formed over the substrate 310A as over the substrate 310. Specifically, transistors 300A are formed over the substrate 310A, an insulator 320A is formed to cover the transistors 300A, and an insulator 322A, an insulator 324A, an insulator 326A, and an insulator 350A are formed in this order over the insulator 320A. Note that the insulator 320A can be formed using a material usable for the insulator 320. Similarly, the insulator 322A can be formed using a material usable for the insulator 322; the insulator 324A, a material usable for the insulator 324; the insulator 326A, a material usable for the insulator 326; and the insulator 350A, a material usable for the insulator 350.

Like the conductor 328, a conductor 328A serving as a plug or a wiring is embedded in the insulator 320A and the insulator 322A. Like the conductor 330, a conductor 330A serving as a plug or a wiring is embedded in the insulator 324A and the insulator 326A. Note that the conductor 328A can be formed using a material usable for the conductor 328 and the conductor 330A can be formed using a material usable for the conductor 330.

For the components above the insulator 350A in the display apparatus 1000B4, the description of the display apparatus 1000 can be referred to.

The insulator 382 is formed on a surface of the substrate 310A opposite to a surface where the transistor 300A is formed. The insulator 382 can be formed using a material usable for the insulator 380, as described above.

In addition to the opening in which the conductor 328A is formed, an opening is formed in the insulator 320A and the insulator 322A in a region overlapping with the conductor 358. The opening formed in the region overlapping with the conductor 358 has a side surface provided with an insulator 318A, and the conductor 319A is formed to fill a remaining space of the opening. In particular, the conductor 319A is sometimes referred to as a through silicon via (TSV).

The conductor 319A can be formed using a material usable for the conductor 358, as described above. The insulator 318A has a function of insulating the conductor 319A from the substrate 310A, for example. Note that the insulator 318A is preferably formed using, for example, any of the materials usable for the insulator 320 or the insulator 324.

The insulator 380 and the conductor 358 serve as bonding layers for the substrate 310 side, and the insulator 382 and the conductor 319A serve as bonding layers for the substrate 310A side. That is, the insulator 380 and the conductor 358 that are formed over the substrate 310 can be bonded to the insulator 382 and the conductor 319A that are formed on the substrate 310A in a bonding step, for example.

Before the bonding step, for example, planarization treatment is performed to make surfaces of the insulator 380 and the conductor 358 level with each other on the substrate 310 side. In a similar manner, planarization treatment is performed to make surfaces of the insulator 382 and the conductor 319A level with each other on the substrate 310 side.

In the bonding step, hydrophilic bonding or the like can be employed for bonding of the insulator 380 and the insulator 382, i.e., bonding of insulating layers; in the hydrophilic bonding, after high planarity is obtained by polishing (e.g., a CMP method), the surfaces of the insulators are subjected to hydrophilicity treatment with oxygen plasma or the like, arranged in contact with and bonded to each other temporarily, and then dehydrated by heat treatment to perform final bonding. The hydrophilic bonding can also cause bonding at an atomic level; thus, bonding with excellent mechanical strength can be obtained.

Surface activated bonding, diffusion bonding, or the like can be employed for bonding of the conductor 358 and the conductor 319A, i.e., bonding of conductors. Surface activated bonding is a method in which an oxide film and a layer adsorbing impurities over the surface of each conductor are removed by sputtering treatment or the like and the cleaned and activated surfaces of the conductors are made to be in contact with and bonded to each other. Diffusion bonding is a method in which the surfaces of the conductors are bonded to each other by adjusting temperature and pressure together. Both methods can cause bonding at an atomic level and therefore the bonding with excellent electric and mechanical strength can be achieved.

Through the above-described bonding step, the conductor 358 on the substrate 310 side can be electrically connected to the conductor 319A on the substrate 310A side. In addition, mechanically strong connection can be established between the insulator 380 on the substrate 310 side and the insulator 382 on the substrate 310A side.

The insulating layers and the metal layers are mixed on the bonding surfaces of the substrates 310 and 310A; therefore, for example, surface activated bonding and hydrophilic bonding are preferably performed in combination when the substrates 310 and 310A are bonded to each other. For example, the following method can be used: the surfaces of the metal layers are made clean after polishing, the surfaces of the metal layers are subjected to antioxidant treatment and hydrophilicity treatment, and then bonding is performed. Alternatively, hydrophilicity treatment may be performed with the metal layers having surfaces of a hardly oxidizable metal such as gold.

Note that the substrate 310 and the substrate 310A may be bonded by a bonding method different from the above-described methods. For example, the substrate 310 and the substrate 310A may be bonded by flip-chip bonding. In the case of employing flip-chip bonding, a connection terminal such as a bump may be provided above the conductor 358 on the substrate 310 side or provided below the conductor 319A on the substrate 310A side. Flip-chip bonding can be performed by, for example, injecting a resin containing anisotropic conductive particles between the insulator 380 and the insulator 382 and between the conductor 358 and the conductor 319A, or by using a Sn—Ag solder. Alternatively, ultrasonic wave bonding can be used in the case where the bump and a conductor connected to the bump are gold. To reduce thermal stress or physical stress such as an impact, the above-described flip-chip bonding may be combined with injection of an underfill agent between the insulator 380 and the insulator 382 and between the conductor 358 and the conductor 319A. Furthermore, a die bonding film may be used in bonding of the substrate 310 and the substrate 310A, for example.

Structure Example 4 of Display Apparatus

The transistor 500 included in the pixel layer PXAL of the display apparatus 1000 in FIG. 52 may have a different structure, for example. A display apparatus 1000C in FIG. 59A shows a structure example in which a transistor 200 that is a bottom-gate top-contact (BGTC) transistor is used instead of the transistor 500 in the display apparatus 1000 in FIG. 52. Note that FIG. 59A illustrates only the pixel layer PXAL in the display apparatus 1000C, and for the circuit layer SICL and the wiring layer LINL, the structure of the display apparatus 1000 in FIG. 52 can be referred to.

In the display apparatus 1000C in FIG. 59A, the insulator 322 is provided above the wiring layer LINL.

The insulator 322 can be formed using a material usable for the insulator 320.

The plurality of transistors 200 are formed over the insulator 322. The plurality of transistors 200 can be formed with the same materials through the same process, for example.

An insulator 211, an insulator 213, an insulator 215, and an insulator 214 are provided in this order over the insulator 322. Part of the insulator 211 functions as a gate insulating layer of each transistor. Part of the insulator 213 functions as a gate insulating layer of each transistor. The insulator 215 is provided to cover the transistors. The insulator 214 is provided to cover the transistors and has a function of a planarization layer. Note that the number of gate insulating layers and the number of insulating layers covering the transistors are not limited and may each be one or two or more.

A material through which impurities such as water and hydrogen do not easily diffuse is preferably used for at least one of the insulating layers covering the transistors. This is because such an insulating layer can function as a barrier layer. Such a structure can effectively inhibit diffusion of impurities into the transistors from the outside and increase the reliability of the display apparatus.

An inorganic insulating film is preferably used for each of the insulator 211, the insulator 213, and the insulator 215. Examples of the inorganic insulating film include a silicon nitride film, a silicon oxynitride film, a silicon oxide film, a silicon nitride oxide film, an aluminum oxide film, and an aluminum nitride film. A hafnium oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used for the insulators 211, 213, and 215. The insulators 211, 213, and 215 may have a single-layer structure or a structure (a stacked structure) in which two or more of the above-described insulating films overlap.

An organic insulating layer is suitable as the insulator 214 functioning as a planarization layer. Examples of materials that can be used for the organic insulating layer include an acrylic resin, a polyimide resin, an epoxy resin, a polyamide resin, a polyimide-amide resin, a siloxane resin, a benzocyclobutene-based resin, a phenol resin, and precursors of these resins. Alternatively, the insulator 214 may have a stacked-layer structure of an organic insulating layer and an inorganic insulating layer. The outermost layer of the insulator 214 preferably functions as an etching protective layer. Thus, the formation of a depression portion in the insulator 214 can be inhibited in processing the conductor 112*a*, the conductor 126*a*, or the conductor 129*a* to be described later. Alternatively, a depression portion may be formed in the insulator 214 in processing the conductor 112*a*, the conductor 126*a*, or the conductor 129*a*.

Note that the insulator 214 corresponds to the insulator 599 in the display apparatus 1000 in FIG. 52. For this reason, a method of forming an insulator or a conductor positioned over the insulator 214 in the display apparatus 1000C in FIG. 59A can be described by replacing the insulator 599 with the insulator 214 in the method of forming an insulator or a conductor positioned over the insulator 599 in the display apparatus 1000 in FIG. 52.

The plurality of transistors 200 includes a conductor 221 functioning as a gate, the insulator 211 functioning as a gate insulating layer, a conductor 222*a* and a conductor 222*b* functioning as a source and a drain, a semiconductor layer 231, the insulator 213 functioning as a gate insulating layer, and a conductor 223 functioning as a gate. Here, as in the transistor 300, a plurality of layers obtained by processing the same conductive film are shown with the same hatching pattern. The insulator 211 is positioned between the conductor 221 and the semiconductor layer 231. The insulator 213 is positioned between the conductor 223 and the semiconductor layer 231.

There is no particular limitation on the structure of the transistors included in the display apparatus of this embodiment. For example, a planar transistor, a staggered transistor, or an inverted staggered transistor can be used. A top-gate transistor or a bottom-gate transistor can be used. Alternatively, gates may be provided above and below a semiconductor layer where a channel is formed.

The structure in which the semiconductor layer where a channel is formed is provided between two gates is used for each of the transistors 200. The two gates may be connected to each other and supplied with the same signal to operate the transistor. Alternatively, the threshold voltage of the transistor may be controlled by applying a potential for controlling the threshold voltage to one of the two gates and a potential for driving to the other of the two gates.

The structure of the transistor 200 is not limited to the structure illustrated in FIG. 59A. For example, a top-gate self-aligned (TGSA) transistor illustrated in each of FIGS. 59B and 59C may be employed as the transistor 200 in the display apparatus 1000C in FIG. 59A.

Transistors 200A and 200B each include the conductor 221 functioning as a gate, the insulator 211 functioning as a gate insulating layer, the semiconductor layer 231 including a channel formation region 231*i* and a pair of low-resistance regions 231*n*, the conductor 222*a* connected to one of the pair of low-resistance regions 231*n*, the conductor 222*b* connected to the other of the pair of low-resistance regions 231*n*, an insulator 225 functioning as a gate insulating layer, the conductor 223 functioning as a gate, and the insulator 215 covering the conductor 223. The insulator 211 is positioned between the conductor 221 and the channel formation region 231*i*. The insulator 225 is positioned between at least the conductor 223 and the channel formation region 231*i*. Furthermore, an insulator 218 covering the transistor may be provided.

FIG. 59B illustrates an example of the transistor 200A in which the insulator 225 covers the top surface and the side surface of the semiconductor layer 231. The conductor 222*a* and the conductor 222*b* are connected to the corresponding low-resistance regions 231*n* through openings provided in the insulator 225 and the insulator 215. One of the conductors 222*a* and 222*b* functions as a source, and the other functions as a drain.

In the transistor 200B illustrated in FIG. 59C, the insulator 225 overlaps with the channel formation region 231*i* of the semiconductor layer 231 and does not overlap with the low-resistance regions 231*n*. The structure illustrated in FIG. 59C is obtained by processing the insulator 225 with the conductor 223 as a mask, for example. In FIG. 59C, the insulator 215 is provided to cover the insulator 225 and the conductor 223, and the conductor 222*a* and the conductor 222*b* are connected to the corresponding low-resistance regions 231*n* through the openings in the insulator 215.

Structure Example 5 of Display Apparatus

Figure 60:
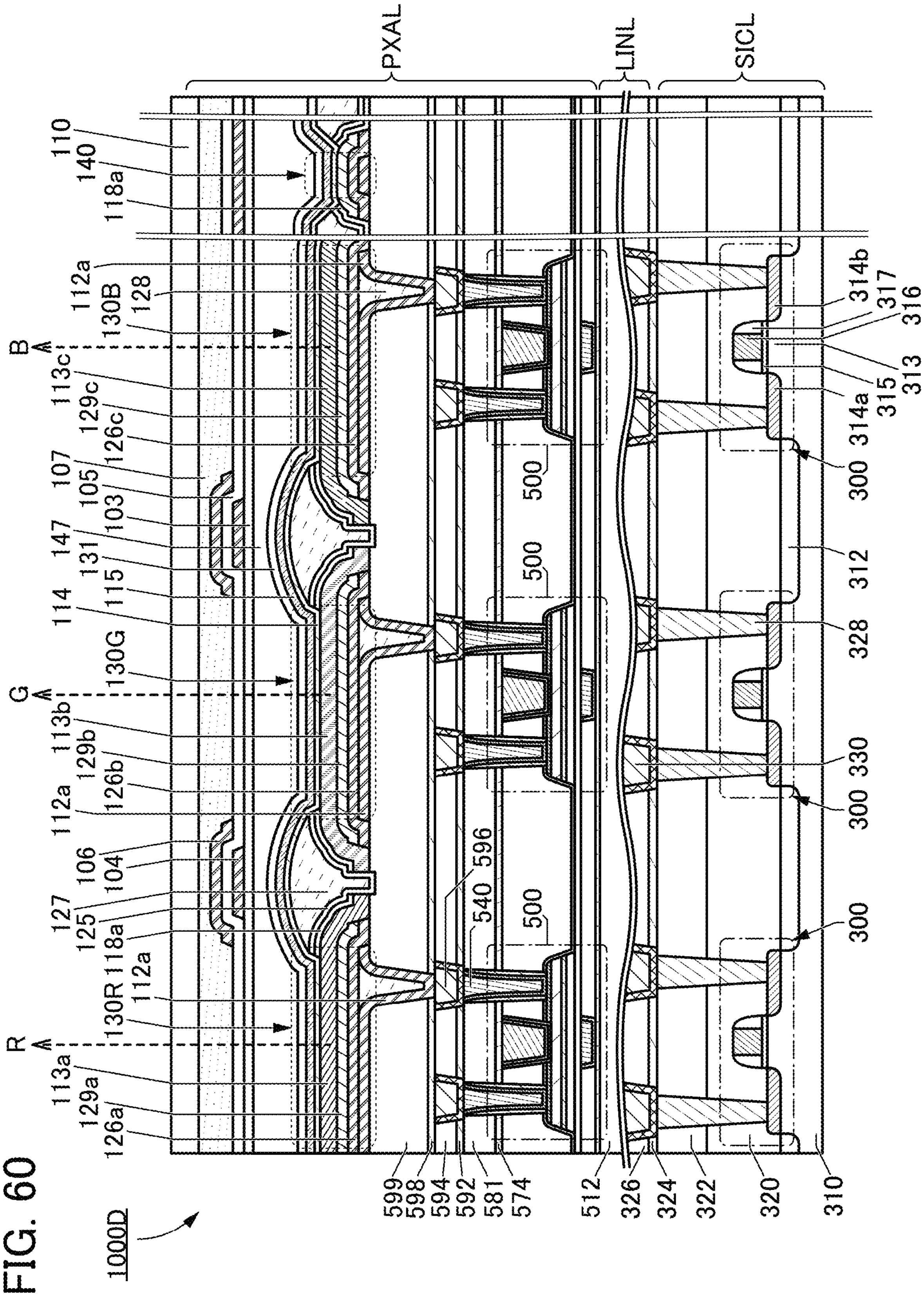
FIG. 60 is a schematic cross-sectional diagram illustrating a structure example of a display apparatus.

The display apparatus 1000 in FIG. 52 may be provided with a panel having a touch sensor function (sometimes referred to as a touch panel), for example. In a display apparatus 1000D illustrated in FIG. 60, a resin layer 147, an insulator 103, a conductor 104, an insulator 105, and a conductor 106 are formed in this order over the protective layer 131, for example.

The resin layer 147 preferably contains an organic insulating material. Examples of the organic insulating material include an acrylic resin, a polyimide resin, an epoxy resin, a polyamide resin, a polyimide-amide resin, a siloxane resin, a benzocyclobutene-based resin, a phenol resin, and precursors of these resins.

The insulator 103 preferably contains an inorganic insulating material. Examples of the inorganic insulating material include oxide and nitride such as silicon oxide, silicon oxynitride, silicon nitride oxide, silicon nitride, aluminum oxide, aluminum oxynitride, and hafnium oxide.

The conductor 104 and the conductor 106 serve as electrodes of a touch sensor. In the case of using a mutual capacitive touch sensor, a pulse potential may be supplied to one of the conductors 104 and 106, and an analog-digital (A/D) conversion circuit or a detection circuit such as a sense amplifier may be electrically connected to the other of the conductors 104 and 106, for example. In that case, capacitance is formed between the conductor 104 and the conductor 106. When a finger or the like approaches the conductor 104 and the conductor 106, the capacitance changes (specifically, the capacitance is reduced). This change in the capacitance appears, when a pulse potential is supplied to one of the conductors 104 and 106, as a change in the amplitude of a signal that occurs in the other of the conductors 104 and 106. Accordingly, the touch and approach of the finger or the like can be detected.

For the insulator 105, an inorganic insulating film or an organic insulating film can be used, for example. Specifically, for the insulator 105, a resin such as an acrylic resin or an epoxy resin can be used, for example. Alternatively, for the insulator 105, an inorganic insulating material such as silicon oxide, silicon oxynitride, silicon nitride oxide, silicon nitride, or aluminum oxide can be used, for example. Note that the insulator 105 may have either a single-layer structure or a stacked structure.

Structure Example 6 of Display Apparatus

Figure 61:
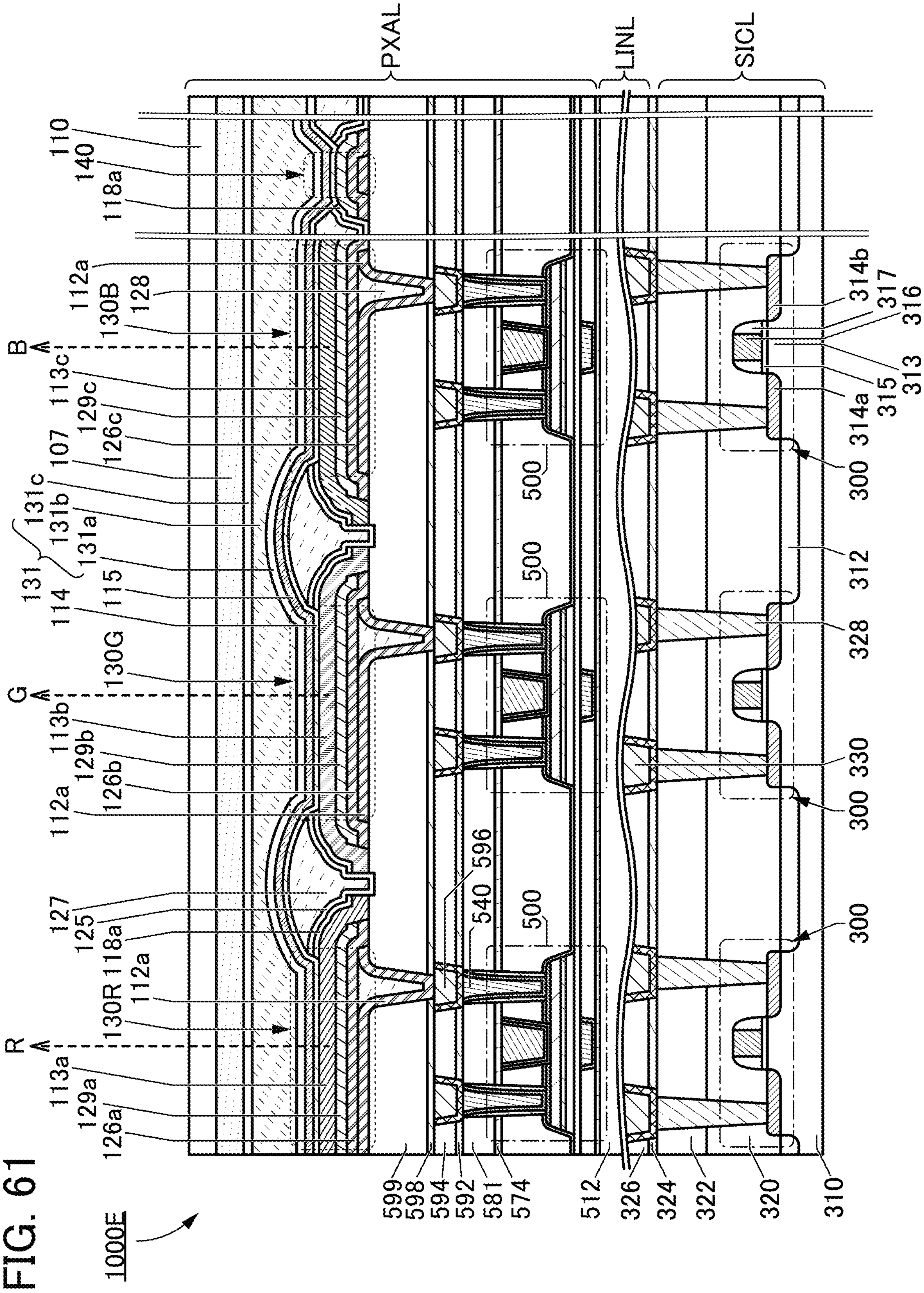
FIG. 61 is a schematic cross-sectional diagram illustrating a structure example of a display apparatus.

The protective layer 131 in the display apparatus 1000 in FIG. 52 may have a stacked structure of two or more layers, not a single-layer structure, for example. The protective layer 131 may have a three-layer structure that includes an insulator made of an inorganic material as the first layer, an insulator made of an organic material as the second layer, and an insulator made of an inorganic material as the third layer. FIG. 61 is a cross-sectional view illustrating part of a display apparatus 1000E in which the protective layer 131 has a multilayer structure including a protective layer 131*a*, a protective layer 131*b*, and a protective layer 131*c*. An insulator made of an inorganic material is used for the protective layer 131*a*, an insulator made of an organic material is used for the protective layer 131*b*, and an insulator made of an inorganic material is used for the protective layer 131*c*. Note that when an insulator made of an organic material is used for the protective layer 131*b* as in FIG. 61, the protective layer 131*b* can be used as a planarization film.

Structure Example 7 of Display Apparatus

Figure 62:
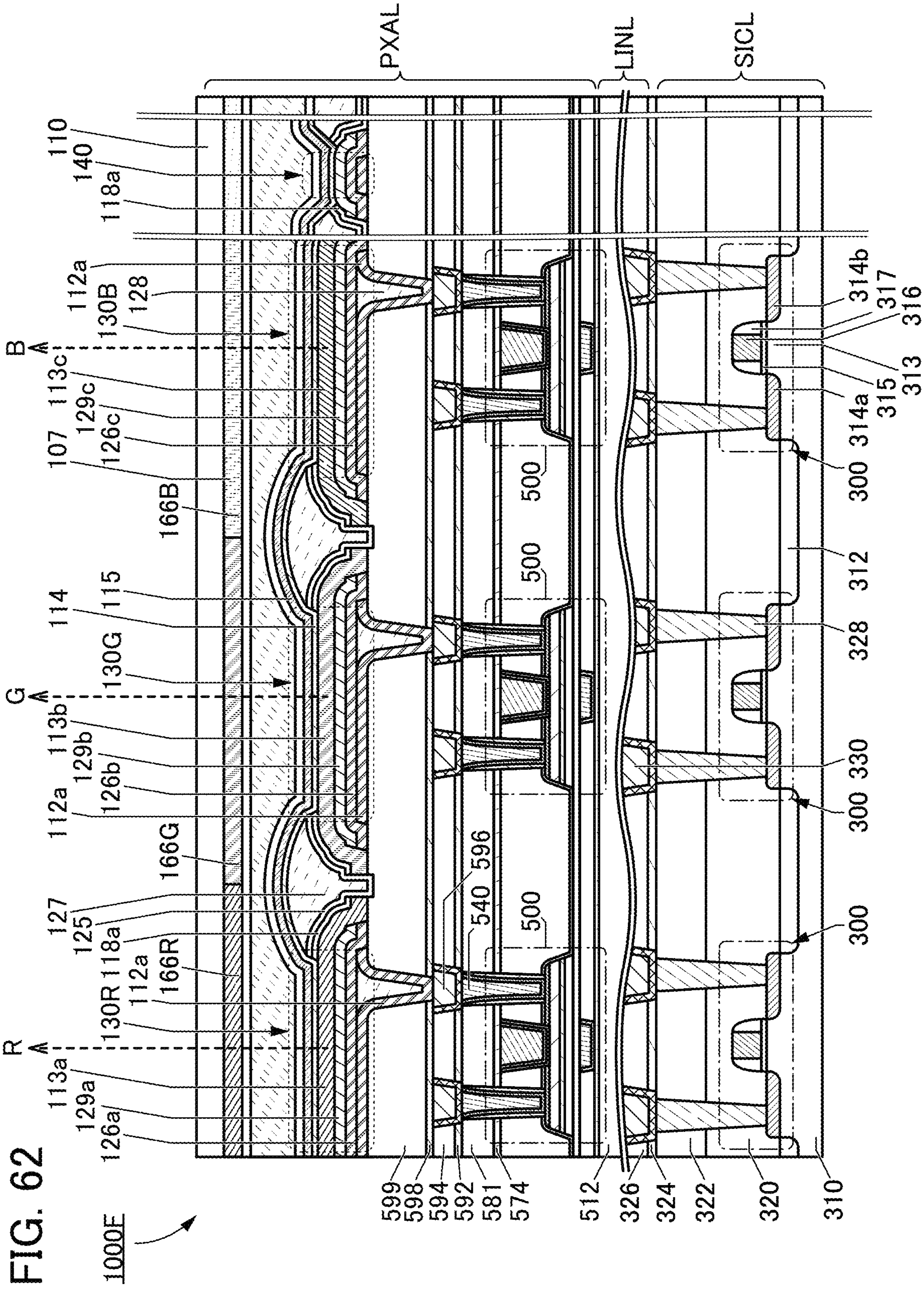
FIG. 62 is a schematic cross-sectional diagram illustrating a structure example of a display apparatus.

The display apparatus 1000 in FIG. 52 may include, for example, a coloring layer (a color filter) or the like. A display apparatus 1000F illustrated in FIG. 62 includes a coloring layer 166R, a coloring layer 166G, and a coloring layer 166B between the adhesive layer 107 and the substrate 110, for example. Note that the coloring layers 166R, 166G, and 166B can be formed on the substrate 110, for example. In the case where the light-emitting device 130R includes a red (R)-light-emitting layer, the light-emitting device 130G includes a green (G)-light-emitting layer, and the light-emitting device 130B includes a blue (B)-light-emitting layer, the coloring layer 166R is a red coloring layer, the coloring layer 166G is a green coloring layer, and the coloring layer 166B is a blue coloring layer.

Note that a black resin (sometimes referred to as a black matrix) may be provided (not illustrated) between the coloring layer 166R and the coloring layer 166G, between the coloring layer 166G and the coloring layer 166B, and between the coloring layer 166B and the coloring layer 166R. The black resin provided in the display apparatus 1000F can inhibit light emitted from a light-emitting device from entering a coloring layer included in an adjacent pixel in some cases. This can enhance the display contrast, improving the display quality of the display apparatus 1000F.

Structure Example 8 of Display Apparatus

In the display apparatus 1000 in FIG. 52, a light-emitting device may include an LED (including a micro LED), not an organic EL element, for example. In a display apparatus 1000G illustrated in FIG. 63A, a connection layer 152*a* is provided over the conductor 126*a*, an LED chip 150*a* is provided over the connection layer 152*a*, and the common electrode 115 is provided over the LED chip 150*a*, for example. Similarly, a connection layer 152*b* is provided over the conductor 126*b*, an LED chip 150*b* is provided over the connection layer 152*b*, and the common electrode 115 is provided over the LED chip 150*b*. Similarly, a connection layer 152*c* is provided over the conductor 126*c*, an LED chip 150*c* is provided over the connection layer 152*c*, and the common electrode 115 is provided over the LED chip 150*c*.

Figure 63A:
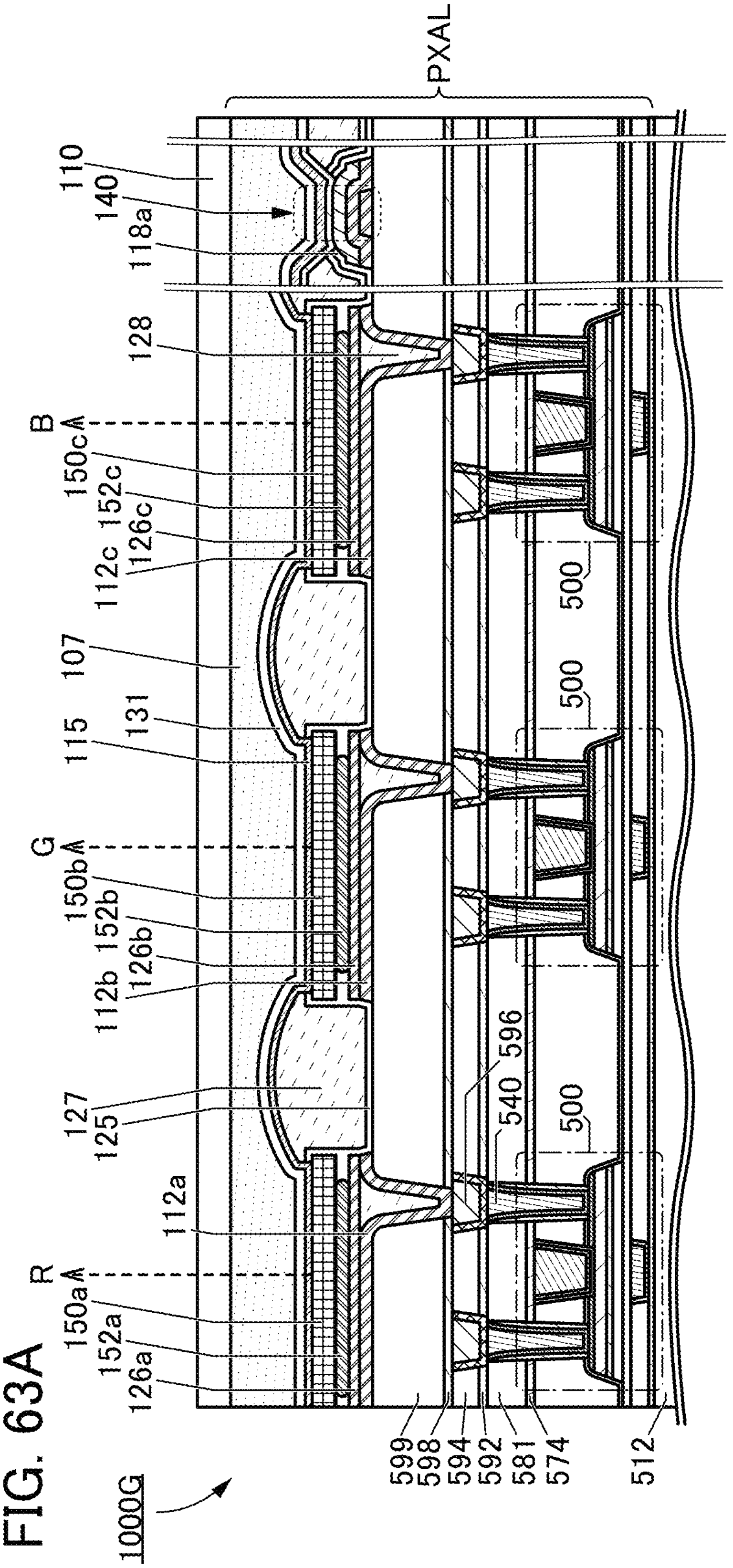
FIG. 63A is a schematic cross-sectional diagram illustrating a structure example of a display apparatus.

In the display apparatus 1000G in FIG. 63A, the insulator 125 is provided on a side surface of the connection layer 152*a* and a side surface of the LED chip 150*a*, for example. In that case, when an ALD method is employed for forming the insulator 125, the insulator 125 can formed also between the LED chip 150*a* and the conductor 126*a*. The same applies to the insulator 125 between the LED chip 150*b* and the conductor 126*b* and the insulator 125 between the LED chip 150*c* and the conductor 126*c*.

An LED chip is a light-emitting diode in which an electrode serving as a cathode, an electrode serving as an anode, a p-type semiconductor, an n-type semiconductor, and a light-emitting layer are provided over a substrate. Note that in this specification and the like, the term "LED chip" can be replaced with the term "light-emitting diode" in the description in some cases.

Specifically, in this specification and the like, a light-emitting diode whose LED chip area is less than or equal to 10000 $\mu m^2$ is referred to as a micro light-emitting diode, a light-emitting diode whose LED chip area is greater than 10000 $\mu m^2$ and less than or equal to 1 $mm^2$ is be referred to as a mini light-emitting diode, and a light-emitting diode whose LED chip area is greater than 1 $mm^2$ is be referred to as a macro light-emitting diode in some cases. Note that the area of an LED chip can be, for example, the area of an upper surface or a bottom surface of a substrate 181 in FIG. 65A, FIG. 65C, and FIG. 65D described later. Alternatively, the area of an LED chip can be, for example, the area of an upper surface or a bottom surface of an electrode 183A in FIG. 65B described later.

For example, a light-emitting diode whose LED chip area is less than or equal to 100 $\mu m^2$ can be referred to as a micro light-emitting diode (micro LED) chip. As a light-emitting diode usable for an LED package with an area of 1 $mm^2$, a micro LED chip or a mini LED chip can be used in some cases, for example.

Any of a micro light-emitting diode, a mini light-emitting diode, and a macro light-emitting diode can be used for the LED package of the display apparatus of one embodiment of the present invention. In particular, the display apparatus of one embodiment of the present invention preferably includes a micro light-emitting diode or a mini light-emitting diode, and more preferably includes a micro light-emitting diode.

In particular, the area of a LED chip of the light-emitting diode is preferably less than or equal to 1 $mm^2$, further preferably less than or equal to 10000 $\mu m^2$, still further preferably less than or equal to 3000 $\mu m^2$, even further preferably less than or equal to 700 $\mu m^2$.

The area of a light-emitting region of the light-emitting diode is preferably less than or equal to 1 $mm^2$, further preferably less than or equal to 10000 $\mu m^2$, still further preferably less than or equal to 3000 $\mu m^2$, even further preferably less than or equal to 700 $\mu m^2$. Note that the area of the light-emitting region of the light-emitting diode is the area of a top surface or a bottom surface of a light-emitting layer 184 in FIGS. 65A to 65D described later.

In this embodiment, in particular, an example in which a micro light-emitting diode is used as a light-emitting diode is described. A micro light-emitting diode having a double heterojunction is described in this embodiment. Note that there is no particular limitation on the light-emitting diode, and for example, a micro light-emitting diode having a quantum well junction or a nanocolumn light-emitting diode may be used.

Figure 63B:
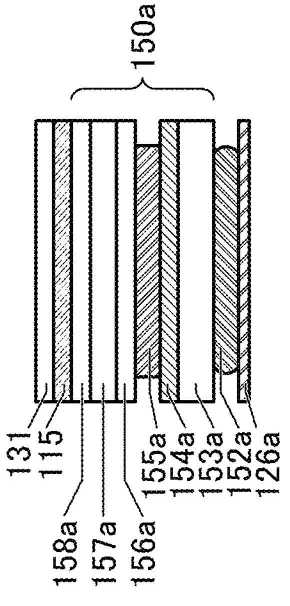
FIG. 63B is a schematic cross-sectional diagram illustrating a structure example of a light-emitting device.

FIG. 63B illustrates a specific structure example of the LED chip 150*a*. The LED chip 150*a* includes, for example, a substrate 153*a* positioned over the connection layer 152*a*, a connection layer 154*a* positioned over the substrate 153*a*, a conductor 155*a* positioned over the connection layer 154*a*, a semiconductor layer 156*a* positioned over the conductor 155*a*, a light-emitting layer 157*a* positioned over the semiconductor layer 156*a*, and a semiconductor layer 158*a* positioned over the light-emitting layer 157*a*. The LED chip 150*b* and the LED chip 150*c* may have a structure similar to that of the LED chip 150*a*. The LED chips 150*a* to 150*c* may have the same structure except for light-emitting layers (colors of light). Note that the common electrode 115 is positioned over the semiconductor layer 158*a*. In addition to the LED chip 150a, FIG. 63B also illustrates the conductor 126a, the connection layer 152a, the common electrode 115, and the protective layer 131.

A conductive material can be used for the connection layer 152a. For example, metals such as gold, silver, and tin, an alloy including any of these metals, a conductive film, or a conductive paste can be used for the connection layer 152a. For example, gold can be suitably used for the connection layer 152a. The connection layer 152a can be formed by a printing method, a transfer method, or a discharge method.

As each of the substrate 153a and the connection layer 154a, for example, a conductive silicon substrate, a silicon carbide (SiC) substrate, a gallium arsenide (GaAs) substrate, a metal substrate, or an alloy substrate can be used. An example of the metal substrate is a substrate including one or more of tungsten, copper, gold, nickel, and titanium. An example of the alloy substrate is a Si—Al alloy substrate.

The conductor 155a is electrically connected to the substrate 153a through the connection layer 154a. For the conductor 155a, for example, a conductive layer functioning as a reflective electrode can be used. That is, a material usable for the conductors 112a to 112c or the conductors 126a to 126c can be used for the conductor 155a.

The substrate 153a is electrically connected to the conductor 126a through the connection layer 152a. In the display apparatus 1000G, the connection layer 152a, the substrate 153a, the connection layer 154a, and the conductor 155a collectively serve as a pixel electrode.

The light-emitting layer 157a is positioned between the semiconductor layer 156a and the semiconductor layer 158a. The light-emitting layer 157a has a function of emitting light by recombination of an electron and a hole. An n-type semiconductor layer can be used as one of the semiconductor layer 156a and the semiconductor layer 158a, and a p-type semiconductor layer can be used as the other. An n-type semiconductor layer, an i-type semiconductor layer, or a p-type semiconductor layer can be used as the light-emitting layer 157a. That is, a semiconductor layer can be used as each of the semiconductor layer 156a, the light-emitting layer 157a, and the semiconductor layer 158a. Note that the semiconductor layer 156a, the light-emitting layer 157a, and the semiconductor layer 158a are collectively referred to as an LED layer or a light-emitting diode in some cases.

The LED layer is formed to emit light such as red light, yellow light, green light blue light, or ultraviolet light. There is no particular limitation on the structure of the LED layer; a homostructure, a heterostructure, a double-heterostructure, or the like having a PN junction or a PIN junction may be used or a metal-insulator-semiconductor (MIS) junction may be used. The LED layer may have a superlattice structure, a single quantum well structure, or a multi quantum well (MQW) structure. Alternatively, the LED layer may contain a nanocolumn LED.

A compound containing a Group 13 element and a Group 15 element can be used for the LED layer, for example. Examples of the Group 13 element include aluminum, gallium, and indium. Examples of the Group 15 element include nitrogen, phosphorus, arsenic, and antimony. The LED layer can be formed using, for example, a compound of gallium and phosphorus, a compound of gallium and arsenic, a compound of gallium, aluminum, and arsenic, a compound of aluminum, gallium, indium, and phosphorus, gallium nitride (GaN), a compound of indium and gallium nitride, or a compound of selenium and zinc.

For example, gallium nitride can be used for an LED layer emitting light in the ultraviolet wavelength range to the blue wavelength range. A compound of indium and gallium nitride can be used for an LED layer emitting light in the ultraviolet wavelength range to the green wavelength range. A compound of aluminum, gallium, indium, and phosphorus or a compound of gallium and arsenic can be used for an LED layer emitting light in the green wavelength range to the red wavelength range. A compound of gallium and arsenic can be used for an LED layer emitting light in the infrared wavelength range.

The display apparatus 1000G includes a plurality of LED chips in the display portion, but the whole display portion may be composed of a single LED chip The display apparatus 1000G has a structure in which a single LED chip emits light of one color, but may have a structure in which a single LED chip emits light of two or more colors. That is, stacked structures of one of an n-type semiconductor layer and a p-type semiconductor layer, a light-emitting layer, and the other of the n-type semiconductor layer and the p-type semiconductor layer may be provided for different colors in an LED chip included in the display apparatus 1000G.

Figure 64:
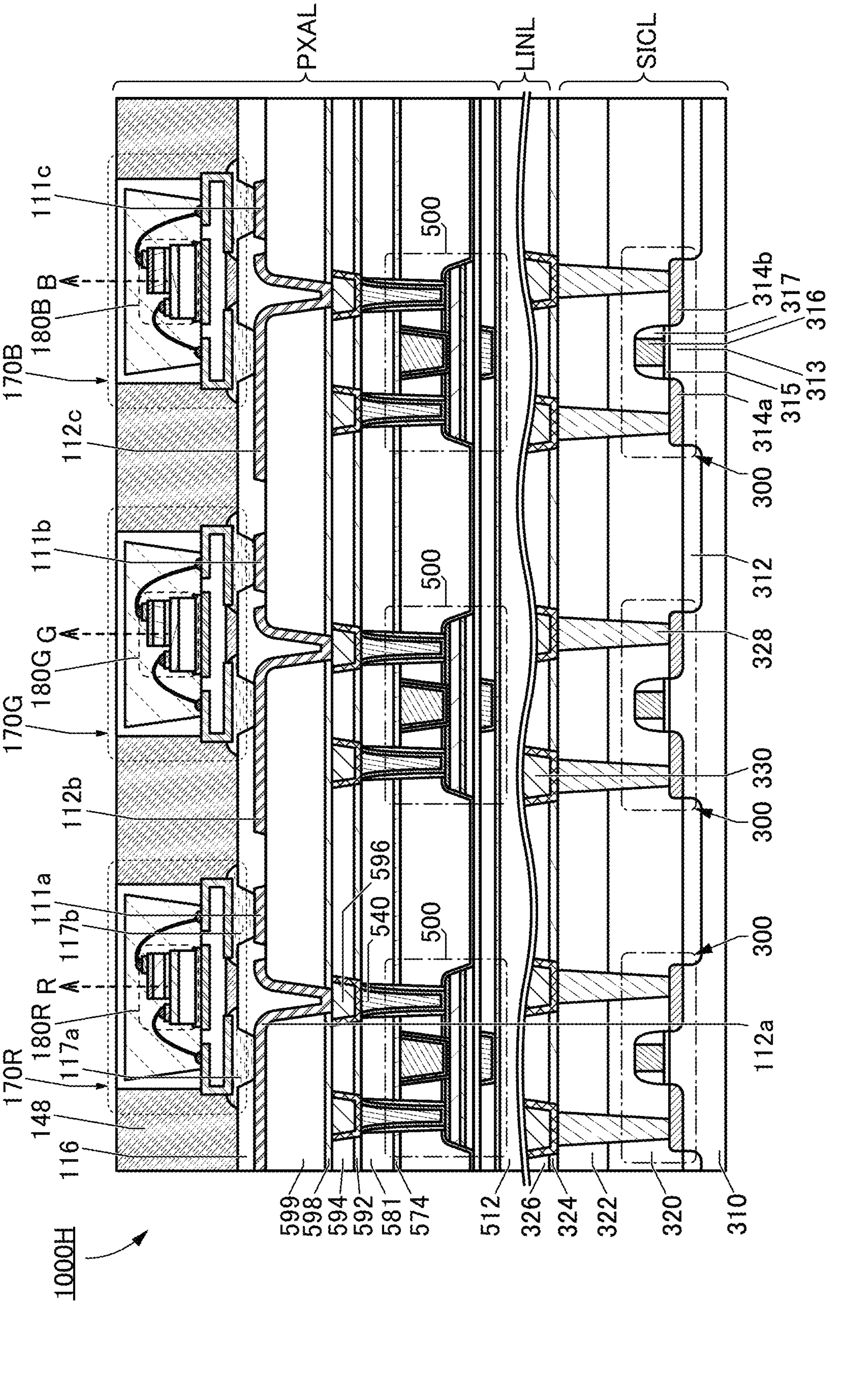
FIG. 64 is a schematic cross-sectional diagram illustrating a structure example of a display apparatus.

FIG. 64 illustrates a structure of a display apparatus including a light-emitting device including an LED (including a micro LED), which is different from the display apparatus 1000G. A display apparatus 1000H illustrated in FIG. 64 is different from the display apparatus 1000G in that a packaged LED chip is provided in the display apparatus. Specifically, in the display apparatus 1000H, an LED package 170R, an LED package 170G, and an LED package 170B are provided as light-emitting devices in the pixel layer PXAL.

In the display apparatus 1000H in FIG. 64, conductors 111a to 111c and the conductors 112a to 112c are provided over the insulator 599, for example. A protective layer 116 is provided over the conductors 111a to 111c, the conductors 112a to 112c, and the insulator 599. The protective layer 116 is formed to fill an opening of the insulator 599 whose bottom surface is regarded as the conductor 596. In particular, the protective layer 116 is preferably provided to cover end portions of the conductors 111a to 111c and the conductors 112a to 112c.

For example, a resin such as an acrylic resin, a polyimide resin, an epoxy resin, or a silicone resin is suitably used for the protective layer 116. Providing the protective layer 116 can inhibit a conductor 117a and a conductor 117b to be described later from being in contact with each other, that is, from being short-circuited. Note that depending on circumstances, the protective layer 116 is not necessarily provided over the insulator 599, the conductors 111a to 111c, and the conductors 112a to 112c.

Openings are formed in the protective layer 116 in regions partly overlapping with the conductors 111a to 111c and regions partly overlapping with the conductors 112a to 112c. The conductor 117a and the conductor 117b are provided over the protective layer 116. Specifically, the conductor 117a is provided to fill the openings of the protective layer 116 in the regions partly overlapping with the conductors 112a to 112c, and the conductor 117b is provided to fill the openings of the protective layer 116 in the regions partly overlapping with the conductors 111a to 111c.

For example, a conductive paste including a material such as silver, carbon, or copper or a bump including a material such as gold or solder can be suitably used for the conductor 117a and the conductor 117b. Each of the conductors 112a to 112c (the conductors 111a to 111c) and an electrode 172

(an electrode 173) to be described later, which are electrically connected to the conductor 117*a* (the conductor 117*b*), can be formed using a conductive material having low contact resistance with the conductor 117*a* (the conductor 117*b*). For example, in the case where a silver paste is used for the conductor 117*a* (the conductor 117*b*), an alloy of any of aluminum, titanium, copper, and silver and palladium and copper (Ag—Pd—Cu (APC)) is used as the conductive material usable for the conductors 112*a* to 112*c* (the conductors 111*a* to 111*c*) and the electrode 172 (the electrode 173), whereby the contact resistance with the conductor 117*a* (the conductor 117*b*) can be low.

The LED package 170R, the LED package 170G, and the LED package 170B are provided over the conductor 117*a* and the conductor 117*b*. Note that FIG. 65A illustrates specific structure examples of the LED package 170R, the LED package 170G, and the LED package 170B included in the display apparatus 1000H in FIG. 64.

Figure 65A:
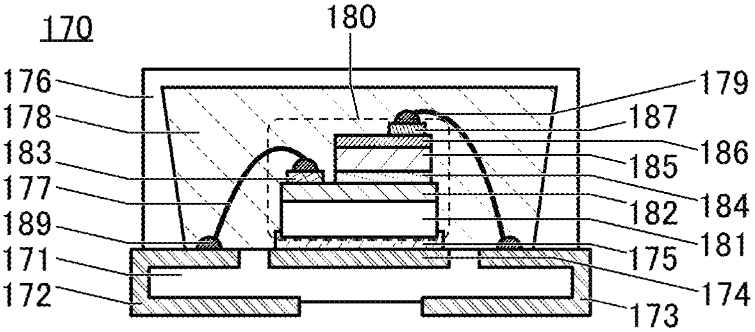
FIGS. 65A to 65D are schematic cross-sectional diagrams each illustrating a structure example of an LED package.

The LED package 170 in FIG. 65A includes a substrate 171, the electrode 172, the electrode 173, a heat sink 174, an adhesive layer 175, a case 176, a wire 177, a wire 179, a sealing layer 178, a ball 189, and an LED chip 180.

The LED chip 180 includes the substrate 181, a semiconductor layer 182, an electrode 183, the light-emitting layer 184, a semiconductor layer 185, an electrode 186, and an electrode 187.

As the substrate 171, a glass epoxy resin substrate, a polyimide substrate, a ceramic substrate, an alumina substrate, or an aluminum nitride substrate can be used, for example.

The electrode 172 and the electrode 173 are formed on a top surface, side surfaces, and a bottom surface of the substrate 171. Specifically, the electrode 172 formed on the top, side, bottom surfaces of the substrate 171 serves as one wiring. Similarly, the electrode 173 formed on the top, side, bottom surfaces of the substrate 171 serves as another wiring. Note that electrical continuity is not established between the electrode 172 and the electrode 173.

The substrate 171 is provided with a heat sink 174. The heat sink 174 has a function of releasing heat generated in the LED chip 180, for example.

Note that the electrode 172, the electrode 173, and the heat sink 174 can be formed with the same material. For example, the same material can be one element selected from nickel, copper, silver, platinum, and gold, or an alloy material containing any of the elements at 50% or higher.

The electrode 172, the electrode 173, and the heat sink 174 can be formed in the same step.

The LED chip 180 is attached above the substrate 171 with the adhesive layer 175. Specifically, the substrate 181 of the LED chip 180 is provided to overlap with the heat sink 174 on the substrate 171, with the adhesive layer 175 positioned therebetween. There is no particular limitation on a material of the adhesive layer 175. For example, the use of an adhesive with conductivity as a material of the adhesive layer 175 can increase the heat dissipation property of the LED chip 180.

The substrate 181 can be a single crystal substrate such as a sapphire substrate, a silicon carbide substrate, a silicon substrate, or a gallium nitride substrate, for example.

In the LED chip 180, the semiconductor layer 182 is formed over the substrate 181. The electrode 183 is formed over part of the semiconductor layer 182, and the light-emitting layer 184 is formed over other part of the semiconductor layer 182. The semiconductor layer 185 is formed over the light-emitting layer 184, the electrode 186 is formed over the semiconductor layer 185, and the electrode 187 is formed over part of the electrode 186.

In the LED chip 180, the light-emitting layer 184 is sandwiched between the semiconductor layer 182 and the semiconductor layer 185. In the light-emitting layer 184, electrons and holes are combined to emit light. One of the semiconductor layer 182 and the semiconductor layer 185 is an n-type semiconductor layer, and the other of the semiconductor layer 182 and the semiconductor layer 185 is a p-type semiconductor layer.

In the display apparatus 1000H in FIG. 64, a light-emitting diode included in an LED chip of each of the LED package 170R, the LED package 170G, and the LED package 170B has a stacked structure of a pair of semiconductor layers and a light-emitting layer between the pair of semiconductor layers, and emits red light, green light, or blue light. Thus, the colors of light emitted from the light-emitting diodes of the LED chips can be freely determined separately in the LED packages 170R, 170G, and 170B. For example, a compound of gallium and phosphorus, a compound of gallium and arsenic, a compound of gallium, aluminum, and arsenic, a compound of aluminum, gallium, indium, and phosphorus, gallium nitride, a compound of indium and gallium nitride, or a compound of selenium and zinc can be used for the stacked-layer structure.

The colors of light emitted from the light-emitting diodes included in the LED chips 180 of the LED packages 170 can be cyan, magenta, yellow, and white in addition to red, green, and blue.

The electrode 183 is electrically connected to the electrode 172 through the wire 177. That is, the electrode 183 serves as a pixel electrode of the light-emitting diode. The electrode 187 is electrically connected to the electrode 173 through the wire 179. That is, the electrode 187 serves as a common electrode of the light-emitting diode.

A wire bonding method can be used as a method of bonding the electrode 183 and the wire 177, a method of bonding the electrode 172 and the wire 177, a method of bonding the electrode 187 and the wire 179, and a method of bonding the electrode 173 and the wire 179, for example. A thermocompression bonding method and an ultrasonic bonding method are kinds of the wire bonding method. In a step of bonding the wire 177 and the wire 179 by the wire bonding method, the ball 189 made of the same material as the wire 179 is formed over the electrode 172, the electrode 173, the electrode 183, and the electrode 187.

For example, a material usable for the conductors 111*a* to 111*c* or the conductors 112*a* to 112*c* is preferably used for each of the electrode 183, the electrode 186, and the electrode 187. In particular, since the light-emitting layer 184 of the LED chip 180 emits light to the upside of the LED package 170, the electrode 186 is preferably a light-transmitting conductive material among the materials usable for the conductors 111*a* to 111*c* and the conductors 112*a* to 112*c*. For the same reason, the electrode 187 is preferably a light-transmitting conductive material among the materials usable for the conductors 111*a* to 111*c* and the conductors 112*a* to 112*c*.

As the wire 177 and the wire 179, a metal wire of gold, an alloy containing gold, copper, or an alloy containing copper can be used, for example.

A resin can be used as the material of the case 176. The case 176 does not necessarily cover a top surface of the LED chip 180 as long as the case 176 covers a side surface of the sealing layer 178. That is, for example, the sealing layer 178 may be exposed from the top surface of the LED chip 180. An inner side surface of the case 176, specifically, the periphery of the LED chip 180 (peripheries of the substrate 181, the semiconductor layer 182, the electrode 183, the light-emitting layer 184, the semiconductor layer 185, the electrode 186, and the electrode 187) is preferably provided with a reflector made of ceramics or the like. Part of light emitted by the light-emitting layer 184 of the LED chip 180 is reflected by the reflector, so that a larger amount of light can be extracted from the LED package 170.

The inside of the case 176 is filled with the sealing layer 178. For the sealing layer 178, a resin having a property of transmitting visible light is preferably used. Specifically, for the sealing layer 178, for example, an ultraviolet curable resin such as an epoxy resin or a silicone resin or a visible light curable resin can be used.

A variety of optical members can be provided on surfaces of a resin layer 148, the LED package 170R, the LED package 170G, and the LED package 170B, for example, in the display apparatus 1000H. Examples of the optical members include a polarizing plate, a retardation plate, a light diffusion layer (e.g., a diffusion film), an anti-reflective layer, and a light-condensing film. The surfaces of the resin layer 148, the LED package 170R, the LED package 170G, and the LED package 170B, for example, in the display apparatus 1000H may be provided with a surface protective layer such as an antistatic film preventing the attachment of a foreign substance, a water repellent film suppressing the attachment of stain, a hard coat film suppressing generation of a scratch in use, or an impact absorption layer. For example, it is preferable to provide, as the surface protective layer, a glass layer or a silica layer ($SiO_x$ layer) because the surface contamination or damage can be prevented from being generated. The surface protective layer may be formed using diamond like carbon (DLC), aluminum oxide ($AlO_x$), a polyester-based material, a polycarbonate-based material, or the like. For the surface protective layer, a material having a high transmitting property with respect to visible light is preferably used. The surface protective layer is preferably formed using a material with high hardness.

Next, a structure example of an LED package which can be used as the LED package 170R, the LED package 170G, and the LED package 170B of the display apparatus 1000H and is different from the LED package 170 in FIG. 65A is described.

Figure 65B:
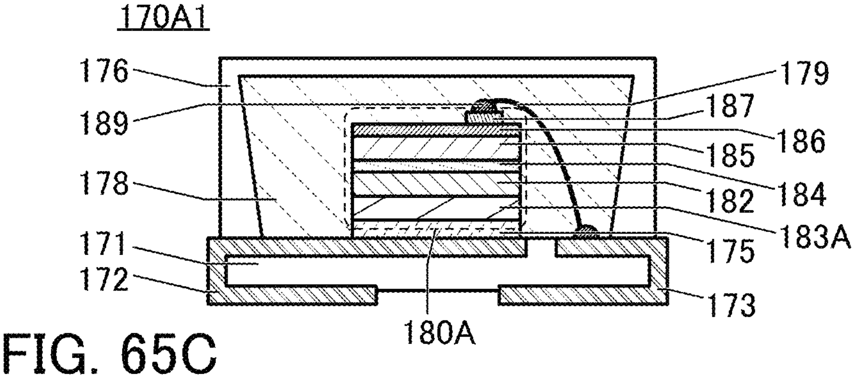

An LED package 170A1 illustrated in FIG. 65B is different from the LED package 170 in FIG. 65A in that an LED chip 180A is provided over the substrate 171. Note that a pixel electrode of the LED chip 180A is bonded to the electrode 172 not with the wire 177 but with the adhesive layer 175.

The LED package 170A1 in FIG. 65B includes the substrate 171, the electrode 172, the electrode 173, the adhesive layer 175, the case 176, the wire 179, the sealing layer 178, the ball 189, and the LED chip 180A.

In the LED package 170A1 in FIG. 65B, the LED chip 180A includes the electrode 183A and a light-emitting diode provided over the electrode 183A. The light-emitting diode includes the semiconductor layer 182, the light-emitting layer 184, the semiconductor layer 185, the electrode 186, and the electrode 187.

As the electrode 183A, a conductive substrate can be used, for example. As a kind of the conductive substrate, a metal substrate is given, for example.

The semiconductor layer 182, the light-emitting layer 184, the semiconductor layer 185, the electrode 186, and the electrode 187 are formed in this order over the electrode 183A.

For the semiconductor layer 182, the light-emitting layer 184, the semiconductor layer 185, the electrode 186, and the electrode 187, description of the LED package 170 in FIG. 65A can be referred to.

In the LED package 170A1 in FIG. 65B, the electrode 172 and the electrode 173 are formed on the top surface, the side surfaces, and the bottom surface of the substrate 171. In particular, the electrode 172 is also provided in a region of the substrate 171 where the LED chip 180A is provided. The electrode 172 formed on the top, side, bottom surfaces of the substrate 171 serves as one wiring. Similarly, the electrode 173 formed on the top, side, bottom surfaces of the substrate 171 serves as another wiring. Note that electrical continuity is not established between the electrode 172 and the electrode 173.

The LED chip 180A is attached above the substrate 171 with the adhesive layer 175. Specifically, the electrode 183A of the LED chip 180A is provided to overlap with a region of the electrode 172 provided on the substrate 171, with the adhesive layer 175 positioned therebetween. Note that the adhesive layer 175 is an adhesive having conductivity.

As described above, in the case where the LED chip 180A in which the light-emitting diode is formed over the conductive substrate is employed, the pixel electrode of the LED chip 180A and the electrode 172 of the substrate 171 are attached not with the wire 177 but with the adhesive layer 175, whereby an LED package 170A2 can be formed.

Next, a structure example of an LED package which can be used as the LED package 170R, the LED package 170G, and the LED package 170B of the display apparatus 1000H and is different from the LED package 170 in FIG. 65A and the LED package 170A1 in FIG. 65B is described.

Figure 65C:
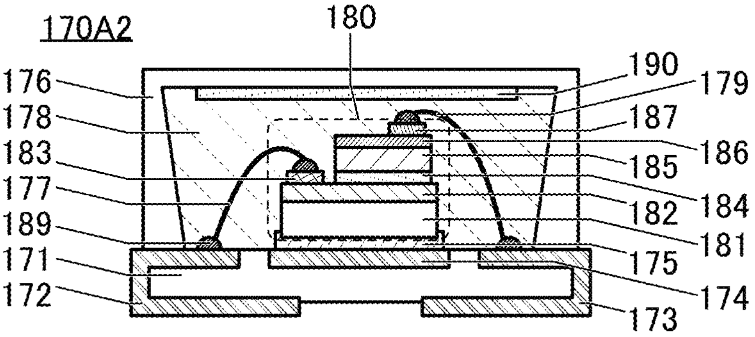

The LED package 170A2 in FIG. 65C is different from the LED package in FIG. 65A in that a color conversion layer 190 is provided inside the case 176.

Note that although a structure in which the color conversion layer 190 is provided above the sealing layer 178 is illustrated in FIG. 65C, the position of the color conversion layer 190 is not limited thereto. For example, the color conversion layer 190 may be separated inside the sealing layer 178.

As the color conversion layer 190, a phosphor or a quantum dot (QD) is preferably used. In particular, a quantum dot has an emission spectrum with a narrow peak, so that emission with high color purity can be obtained. The use of a quantum dot for the color conversion layer 190 can improve the display quality of the display apparatus 1000H.

The color conversion layer 190 has a function of converting a color of light emitted by the light-emitting layer 184 included in the LED chip 180 of the LED package 170A2 into another color.

For example, as the color conversion layer 190, a color conversion layer converting blue light into green light or a color conversion layer converting blue light into red light can be used. For example, in the case where a blue light-emitting diode is provided in a red subpixel, blue light emitted by the blue light-emitting diode passes through the color conversion layer 190, thereby being converted into red light and emitted to the upside of the case 176, that is, the outside of the display apparatus 1000H. For example, in the case where a blue light-emitting diode is provided in a green subpixel, blue light emitted by the blue light-emitting diode passes through the color conversion layer 190, thereby being converted into green light and emitted to the upside of the case 176, that is, the outside of the display apparatus 1000H.

The color conversion layer 190 can be formed by a droplet discharge method (e.g., an ink-jet method), a coating method, an imprinting method, a variety of printing methods (screen printing or offset printing), or the like. Alternatively, for the color conversion layer 190, a color conversion film such as a quantum dot film can be used.

As the phosphor, an organic resin layer having a surface on which a phosphor is printed or which is coated with a phosphor or an organic resin layer mixed with a phosphor can be used.

There is no limitation on a material of quantum dots, and examples include a Group 14 element, a Group 15 element, a Group 16 element, a compound of a plurality of Group 14 elements, a compound of an element belonging to any of Groups 4 to 14 and a Group 16 element, a compound of a Group 2 element and a Group 16 element, a compound of a Group 13 element and a Group 15 element, a compound of a Group 13 element and a Group 17 element, a compound of a Group 14 element and a Group 15 element, a compound of a Group 11 element and a Group 17 element, iron oxides, titanium oxides, spinel chalcogenides, and semiconductor clusters.

Specific examples include, but are not limited to, cadmium selenide; cadmium sulfide; cadmium telluride; zinc selenide; zinc oxide; zinc sulfide; zinc telluride; mercury sulfide; mercury selenide; mercury telluride; indium arsenide; indium phosphide; gallium arsenide; gallium phosphide; indium nitride; gallium nitride; indium antimonide; gallium antimonide; aluminum phosphide; aluminum arsenide; aluminum antimonide; lead selenide; lead telluride; lead sulfide; indium selenide; indium telluride; indium sulfide; gallium selenide; arsenic sulfide; arsenic selenide; arsenic telluride; antimony sulfide; antimony selenide; antimony telluride; bismuth sulfide; bismuth selenide; bismuth telluride; silicon; silicon carbide; germanium; tin; selenium; tellurium; boron; carbon; phosphorus; boron nitride; boron phosphide; boron arsenide; aluminum nitride; aluminum sulfide; barium sulfide; barium selenide; barium telluride; calcium sulfide; calcium selenide; calcium telluride; beryllium sulfide; beryllium selenide; beryllium telluride; magnesium sulfide; magnesium selenide; germanium sulfide; germanium selenide; germanium telluride; tin sulfide; tin selenide; tin telluride; lead oxide; copper fluoride; copper chloride; copper bromide; copper iodide; copper oxide; copper selenide; nickel oxide; cobalt oxide; cobalt sulfide; iron oxide; iron sulfide; manganese oxide; molybdenum sulfide; vanadium oxide; tungsten oxide; tantalum oxide; titanium oxide; zirconium oxide; silicon nitride; germanium nitride; aluminum oxide; barium titanate; a compound of selenium, zinc, and cadmium; a compound of indium, arsenic, and phosphorus; a compound of cadmium, selenium, and sulfur; a compound of cadmium, selenium, and tellurium; a compound of indium, gallium, and arsenic; a compound of indium, gallium, and selenium; a compound of indium, selenium, and sulfur; a compound of copper, indium, and sulfur; and a combinations thereof. What is called an alloyed quantum dot, whose composition is represented by a given ratio, may be used.

Examples of the quantum dot include a core-type quantum dot, a core-shell quantum dot, and a core-multishell quantum dot. Quantum dots have a high proportion of surface atoms and thus have high reactivity and easily cohere together. For this reason, it is preferable that a protective agent be attached to, or a protective group be provided at the surfaces of quantum dots. The attachment of the protective agent or the provision of the protective group can prevent cohesion and increase solubility in a solvent. It can also reduce reactivity and improve electrical stability.

Since band gaps of quantum dots are increased as their size (diameter) is decreased, the size is adjusted as appropriate so that light with a desired wavelength can be obtained. Light emission from the quantum dots is shifted to a blue color side, i.e., a high energy side, as the crystal size is decreased; thus, emission wavelengths of the quantum dots can be adjusted over a wavelength range in the spectrum (intensity distribution) of an ultraviolet region, a visible light region, and an infrared region by changing the size of quantum dots. The range of size (diameter) of quantum dots is, for example, greater than or equal to 0.5 nm and less than or equal to 20 nm, preferably greater than or equal to 1 nm and less than or equal to 10 nm. Peaks of the emission spectra are narrowed as the size distribution of quantum dots gets smaller, and thus light can be obtained with high color purity. The shape of quantum dots is not particularly limited and may be a spherical shape, a rod shape, a circular shape, or other shapes. A quantum rod, which is a rod-shaped quantum dot, has a function of emitting directional light.

Alternatively, a stacked-layer structure of the color conversion layer 190 and a coloring layer may be provided inside or above the LED package 170A2. Thus, light that has been converted by the color conversion layer 190 passes through the coloring layer, whereby the color purity of light can be increased. A coloring layer of the same color as light emitted by the light-emitting layer 184 may be provided in a position overlapping with the LED chip 180 (the substrate 181, the semiconductor layer 182, the electrode 183, the light-emitting layer 184, the semiconductor layer 185, the electrode 186, and the electrode 187). Providing a coloring layer of the same color can increase the color purity of light emitted by the light-emitting layer 184. Furthermore, in the case where a coloring layer is not provided in the LED package 170A2, the manufacturing process can be simplified.

The coloring layer is a colored layer that transmits light in a specific wavelength range. For example, a color filter for transmitting light in a red, green, blue, or yellow wavelength range can be used. Examples of a material that can be used for the coloring layer include a metal material, a resin material, and a resin material containing a pigment or dye.

As described above, the color conversion layer provided above the LED chip 180 enables the LED package 170A2 to emit light with a high color purity.

Note that the above-described color conversion layer may be provided also in any of the other display apparatuses described in this embodiment in addition to the display apparatus 1000H.

Next, a structure example of an LED package which can be used as the LED package 170R, the LED package 170G, and the LED package 170B of the display apparatus 1000H and is different from the LED package 170 in FIG. 65A, the LED package 170A1 in FIG. 65B, and the LED package 170A2 in FIG. 65C is described.

Figure 65D:
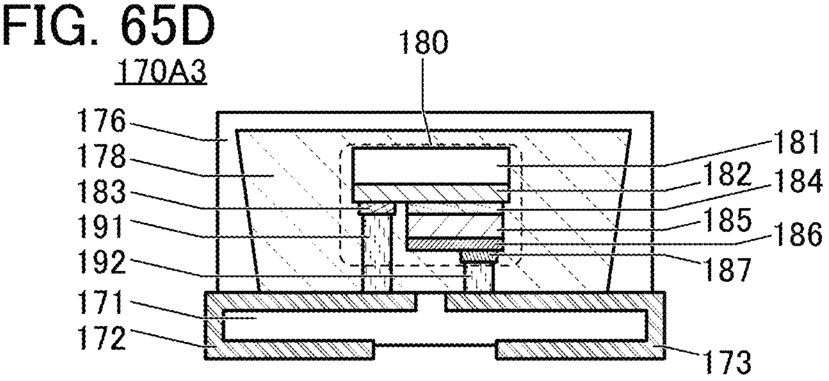

An LED package 170A3 illustrated in FIG. 65D is different from the LED package 170 in FIG. 65A in that the substrate 181 of the LED chip 180 provided over the substrate 171 is positioned above the electrode 183 and the electrode 187.

With this structure, light emitted by the light-emitting layer 184 is emitted to the upside of the LED package 170A3; thus, the substrate 181 preferably has a light-transmitting property.

In the LED package 170A3 in FIG. 65D, since the top surfaces of the electrodes 183 and 187 in the LED chip 180 face the substrate 171 side, bonding between the electrode 183 and the electrode 172 and bonding between the electrode 187 and the electrode 173 are performed not by a wire but by a conductor serving as a bump. Specifically, the electrode 183 and the electrode 172 are bonded by a conductor 191, and the electrode 187 and the electrode 173 are bonded by a conductor 192.

The conductors 191 and 192 can be formed using a material usable for the conductor 117*a* or the conductor 117*b*.

Figure 66A:
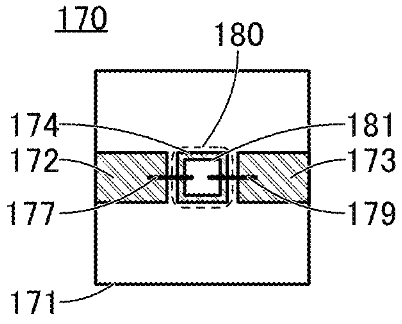
FIGS. 66A and 66B are schematic plan views each illustrating a structure example of an LED package.

Next, the number of LED chips 180 that can be provided in the LED package 170 is described. FIG. 66A is an example of a plan view of the LED package 170 in FIG. 65A. FIG. 66A illustrates the substrate 181 which is a component of the LED chip 180. Although the LED package 170 includes one LED chip 180 over the substrate 171 is described above as an example as illustrated in FIG. 66A, one embodiment of the present invention is not limited to this structure. For example, the LED package 170 may include a plurality of LED chips over the substrate 171.

Figure 66B:
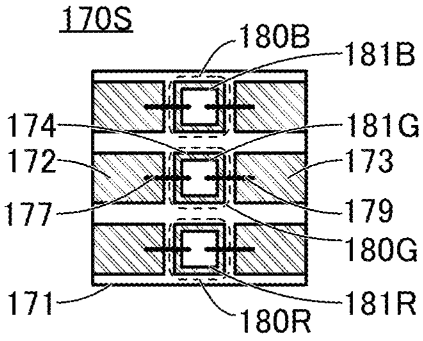

FIG. 66B illustrates a structure of an LED package 170S in which three LED chips 180R, 180G, and 180B are provided over the substrate 171. FIG. 66B illustrates a substrate 181R included in the LED chip 180R, a substrate 181G included in the LED chip 180G, and a substrate 181B included in the LED chip 180B. Light-emitting layers of light-emitting diodes included in the LED chips 180R, 180G, and 180B provided in the LED package 170S may emit light of different colors. For example, the substrate 181R is provided with a light-emitting diode emitting red light, the substrate 181G is provided with a light-emitting diode emitting green light, and the substrate 181B is provided with a light-emitting diode emitting blue light, whereby the LED package 170S can emit light of three colors, red, green, and blue.

The light-emitting diodes (the LED chips 180R, 180G, and 180B) in the above-described LED packages 170, 170A1, 170A2, 170A3, and 170S may be driven by transistors with the same structure, or may be driven by transistors with different structures. For example, in the display apparatus 1000H in FIG. 64, a transistor that drives the LED chip 180R of the LED package 170R, a transistor that drives the LED chip 180G of the LED package 170G, and a transistor that drives the LED chip 180B of the LED package 170B may be different from one another in one or more selected from a transistor size, a channel length, a channel width, and a structure. Specifically, depending on the amount of current required for light emission with desired luminance, one or both of the channel length and the channel width of the transistor may be changed for each color.

In the display apparatus 1000H in FIG. 64, a top surface of the protective layer 116, a top surface and a side surface of the conductor 117*a*, a top surface and a side surface of the conductor 117*b*, a side surface of the LED package 170R, a side surface of the LED package 170G, and a side surface of the LED package 170B may be covered with the resin layer 148. Use of a black resin for the resin layer 148 can enhance the display contrast of the display apparatus 1000H. One or more selected from a top surface of the resin layer 148 and top surfaces of the LED packages 170R, 170G, and 170B may be provided with a surface protective layer, an impact absorption layer, or both. Since each of the LED packages 170R, 170G, and 170B has a structure in which light is emitted upward, a layer provided on each of the top surfaces of the LED packages 170R, 170G, and 170B preferably has a visible-light-transmitting property.

All the conductors 112*a* to 112*c*, 117*a*, and 172 in the LED packages 170R, 170G, and 170B are referred to as pixel electrodes in some cases. Furthermore, parts of the conductors selected from the conductors 112*a* to 112*c* and the conductors 117*a* and 172 are referred to as pixel electrodes in some cases.

Note that the structure of the display apparatus of one embodiment of the present invention is not limited to the structure of the display apparatus 1000G in FIG. 63A or the display apparatus 1000H in FIG. 64.

For example, the display apparatus of one embodiment of the present invention may have not a structure in which a plurality of LED packages 170 are mounted above the substrate 310 but a structure in which a substrate provided with a plurality of light-emitting diodes are attached above the substrate 310.

Figure 67A:
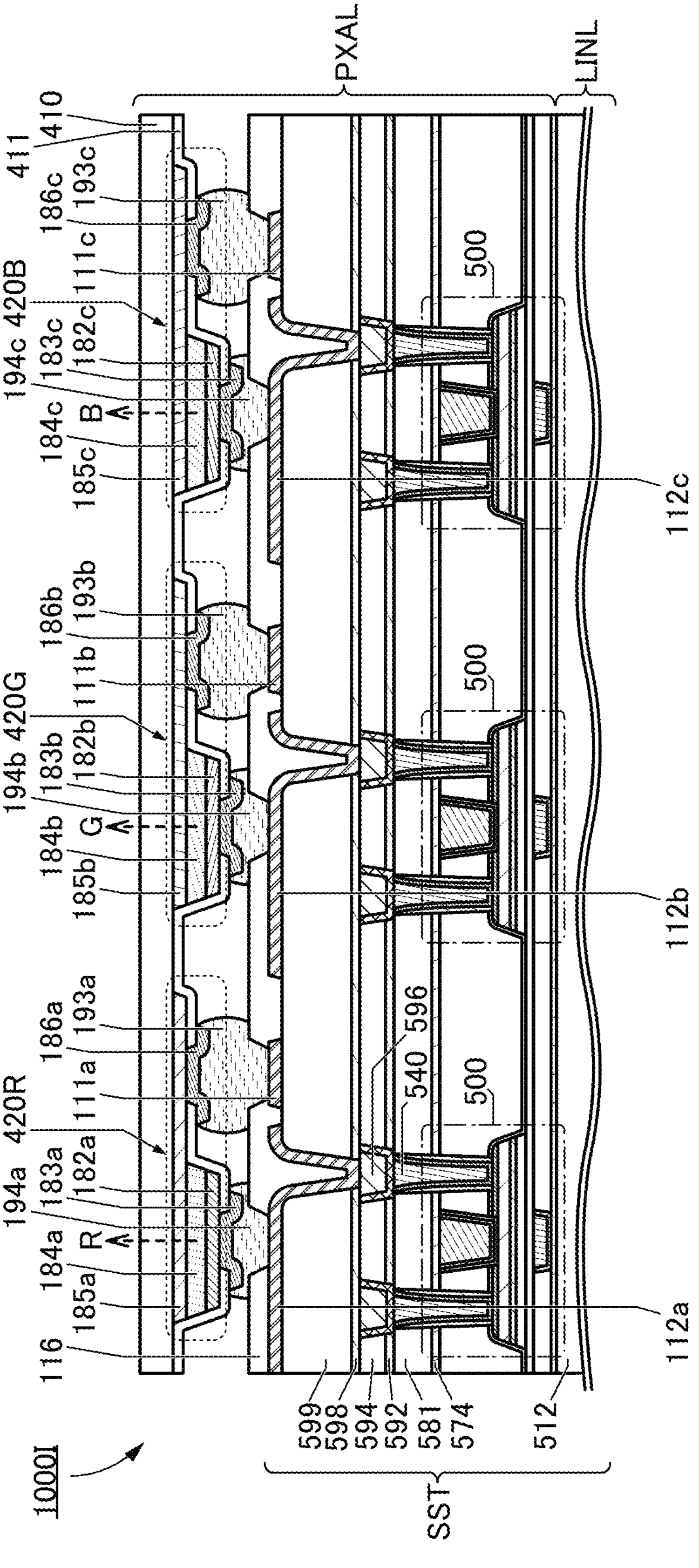
FIG. 67A is a schematic cross-sectional diagram illustrating a structure example of a display apparatus.
Figure 67B:
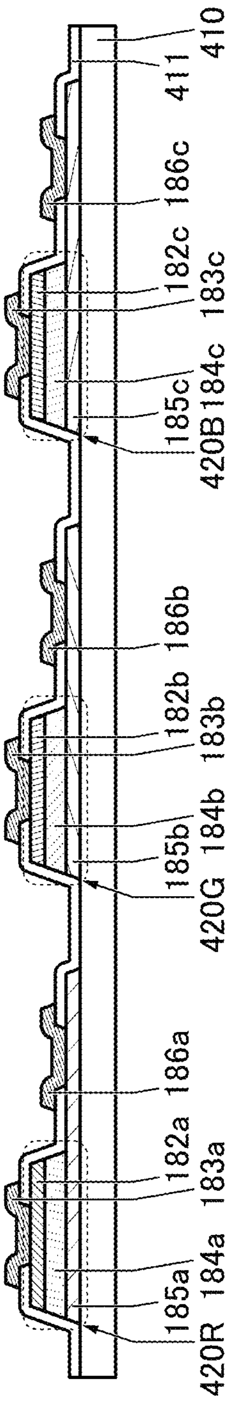
FIG. 67B is a schematic cross-sectional diagram illustrating a structure example of a substrate provided in a display apparatus and a light-emitting diode over the substrate.

FIG. 67A illustrates a display apparatus 1000I formed by attaching a substrate 410 where a plurality of light-emitting diodes are formed to the structure in which the components up to the protective layer 116 of the display apparatus 1000H in FIG. 64 have been formed (hereinafter this structure is referred to as a stack SST). FIG. 67B illustrates the substrate 410 provided with a plurality of light-emitting diodes.

A light-emitting diode 420R, a light-emitting diode 420G, and a light-emitting diode 420B are illustrated as the plurality of light-emitting diode in FIGS. 67A and 67B. The light-emitting diodes 420R, 420G, and 420B are collectively referred to as a light-emitting diode 420 in some cases.

The light-emitting diode 420R includes an electrode 183*a*, a semiconductor layer 182*a*, a light-emitting layer 184*a*, a semiconductor layer 185*a*, and an electrode 186*a*, for example. The light-emitting diode 420G includes an electrode 183*b*, a semiconductor layer 182*b*, a light-emitting layer 184*b*, a semiconductor layer 185*b*, and an electrode 186*b*, for example. The light-emitting diode 420B includes an electrode 183*c*, a semiconductor layer 182*c*, a light-emitting layer 184*c*, a semiconductor layer 185*c*, and an electrode 186*c*, for example.

Semiconductor layers 185*a* to 185*c* are formed over the substrate 410 in FIG. 67B. Light-emitting layers 184*a* to 184*c* are formed over the semiconductor layers 185*a* to 185*c*, respectively. Specifically, the semiconductor layer 182*a* is formed over the light-emitting layer 184*a*, the semiconductor layer 182*b* is formed over the light-emitting layer 184*b*, and the semiconductor layer 182*c* is formed over the light-emitting layer 184*c*. A protective layer 411 is formed to cover a top surface of the substrate 410, top surfaces and side surfaces of the semiconductor layers 185*a* to 185*c*, side surfaces of the light-emitting layers 184*a* to 184*c*, and top surfaces and side surfaces of the semiconductor layers 182*a* to 182*c*.

Note that an opening is formed in the protective layer 411 in a region overlapping with part of the semiconductor layer 182*a*, and the electrode 183*a* is formed to cover part of the protective layer 411 and a top surface of the semiconductor layer 182*a* which corresponds to a bottom surface of the opening. Similarly, an opening is formed in the protective layer 411 in a region overlapping with part of the semiconductor layer 182*b*, and the electrode 183*b* is formed to cover part of the protective layer 411 and a top surface of the semiconductor layer 182*b* which corresponds to a bottom surface of the opening. Similarly, an opening is formed in the protective layer 411 in a region overlapping with part of the semiconductor layer 182*c*, and the electrode 183*c* is formed to cover part of the protective layer 411 and a top surface of the semiconductor layer 182*c* which corresponds to a bottom surface of the opening.

An opening is formed in the protective layer 411 in a region overlapping with part of the semiconductor layer 185*a* and not overlapping with the semiconductor layer 182*a* or the light-emitting layer 184*a*, and an electrode 186*a* is formed to cover part of the protective layer 411 and the semiconductor layer 185*a* which corresponds to a bottom surface of the opening. Similarly, an opening is formed in the protective layer 411 in a region overlapping with part of the semiconductor layer 185*b* and not overlapping with the semiconductor layer 182*b* or the light-emitting layer 184*b*, and an electrode 186*b* is formed to cover part of the protective layer 411 and the semiconductor layer 185*b* which corresponds to a bottom surface of the opening. Similarly, an opening is formed in the protective layer 411 in a region overlapping with part of the semiconductor layer 185*c* and not overlapping with the semiconductor layer 182*c* or the light-emitting layer 184*c*, and an electrode 186*c* is formed to cover part of the protective layer 411 and the semiconductor layer 185*c* which corresponds to a bottom surface of the opening.

The display apparatus 1000I has a top-emission structure. Light from the light-emitting diodes 420R, 420G, and 420B are emitted to the substrate 410 side. For this reason, a material having a high visible-light-transmitting property is preferably used for the substrate 410. For example, a substrate having a high visible-light-transmitting property may be selected as the substrate 410 among substrates usable as the substrate BS.

As illustrated in FIGS. 67A and 67B, the light-emitting layer 184*a* is sandwiched between the semiconductor layer 182*a* and the semiconductor layer 185*a*. In the light-emitting layer 184*a*, electrons and holes are combined to emit light. One of the semiconductor layer 182*a* and the semiconductor layer 185*a* is an n-type semiconductor layer, and the other of the semiconductor layer 182*a* and the semiconductor layer 185*a* is a p-type semiconductor layer. Similarly, the light-emitting layer 184*b* is sandwiched between the semiconductor layer 182*b* and the semiconductor layer 185*b*. In the light-emitting layer 184*b*, electrons and holes are combined to emit light. One of the semiconductor layer 182*b* and the semiconductor layer 185*b* is an n-type semiconductor layer, and the other of the semiconductor layer 182*b* and the semiconductor layer 185*b* is a p-type semiconductor layer. Similarly, the light-emitting layer 184*c* is sandwiched between the semiconductor layer 182*c* and the semiconductor layer 185*c*. In the light-emitting layer 184*c*, electrons and holes are combined to emit light. One of the semiconductor layer 182*c* and the semiconductor layer 185*c* is an n-type semiconductor layer, and the other of the semiconductor layer 182*c* and the semiconductor layer 185*c* is a p-type semiconductor layer.

Each of the light-emitting diodes 420R, 420G, and 420B provided in the display apparatus 1000I in FIG. 67A has a stacked structure in which a light-emitting layer is sandwiched between a pair of semiconductor layers. The stacked structure is formed to emit red light, green light, or blue light. Thus, colors of light emitted can be freely determined separately in the light-emitting diodes 420R, 420G, and 420B. For example, the light-emitting diode 420R emits red light, the light-emitting diode 420G emits green light, and the light-emitting diode 420B emits blue light. The stacked structure can be the one applicable to the light-emitting diode of the LED package 170 in FIG. 64.

The color of light, other than red, green, and blue, emitted by the light-emitting diode 420 can be cyan, magenta, yellow, or white, for example.

For the protective layer 411, an inorganic insulating film that can be used as the insulator 105 or an organic insulating film can be used, for example. Alternatively, the protective layer 411 can be formed using a material usable for the sealing layer 178 of the LED package 170 in FIG. 65A, for example.

The substrate 410 is attached to the stack SST with use of conductors 193*a* to 193*c* and conductors 194*a* to 194*c* each serving as a bump. Specifically, the conductor 112*a* of the stack SST and the electrode 183*a* of the light-emitting diode 420R are bonded through the conductor 194*a*; the conductor 111*a* of the stack SST and the electrode 186*a* of the light-emitting diode 420R are bonded through the conductor 193*a*; the conductor 112*b* of the stack SST and the electrode 183*b* of the light-emitting diode 420G are bonded through the conductor 194*b*; the conductor 111*b* of the stack SST and the electrode 186*b* of the light-emitting diode 420G are bonded through the conductor 193*b*; the conductor 112*c* of the stack SST and the electrode 183*c* of the light-emitting diode 420B are bonded through the conductor 194*c*; and the conductor 111*c* of the stack SST and the electrode 186*c* of the light-emitting diode 420B are bonded through the conductor 193*c*.

The conductors 193*a* to 193*c* and the conductors 194*a* to 194*c* can be formed using a material usable for the conductor 117*a* or the conductor 117*b*.

The color conversion layer 190 used in the LED package 170A2 in FIG. 65C can be used for the display apparatus 1000I. Specifically, the color conversion layer 190 is provided between the substrate 410 and one or more selected from the semiconductor layers 185*a* to 185*c* in the path of light emitted by the light-emitting diode 420R, the light-emitting diode 420G, or the light-emitting diode 420B, whereby the color conversion layer 190 can convert the color of light emitted by the light-emitting layer into a different color.

Note that the structure examples of the display apparatuses described above may be combined with one another as appropriate.

Structure Example of Light-Emitting Device

Next, a structure example of a light-emitting device that can be used for the light-emitting device 130 of the above-described display apparatus is described.

Figure 68A:
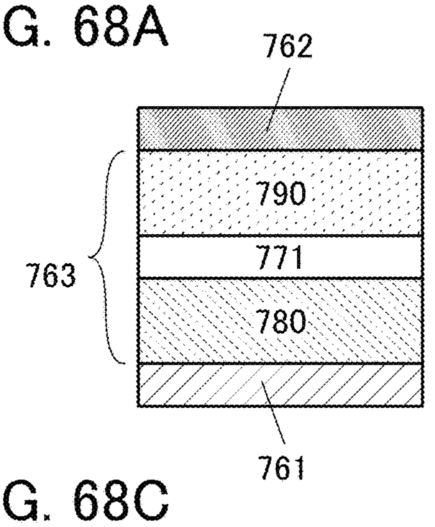
FIGS. 68A to 68F each illustrate a structure example of a light-emitting device.

As illustrated in FIG. 68A, the light-emitting device includes an EL layer 763 between a pair of electrodes (a lower electrode 761 and an upper electrode 762). The EL layer 763 can include a layer 780, a light-emitting layer 771, and a layer 790.

The light-emitting layer 771 contains at least a light-emitting substance (also referred to as a light-emitting material).

In the case where the lower electrode 761 serves as an anode and the upper electrode 762 serves as a cathode, the layer 780 includes one or more of a layer containing a substance with a high hole-injection property (a hole-injection layer), a layer containing a substance with a high hole-transport property (a hole-transport layer), and a layer containing a substance with a high electron-blocking property (an electron-blocking layer). The layer 790 includes one or more of a layer containing a substance having a high electron-injection property (an electron-injection layer), a layer containing a substance having a high electron-transport property (an electron-transport layer), and a layer containing a substance having a high hole-blocking property (a hole-blocking layer). In the case where the lower electrode 761 serves as a cathode and the upper electrode 762 serves as an anode, the above structures of the layer 780 and the layer 790 are interchanged.

The structure including the layer 780, the light-emitting layer 771, and the layer 790, which is provided between a pair of electrodes, can function as a single light-emitting unit, and the structure in FIG. 68A is referred to as a single structure in this specification.

Figure 68B:
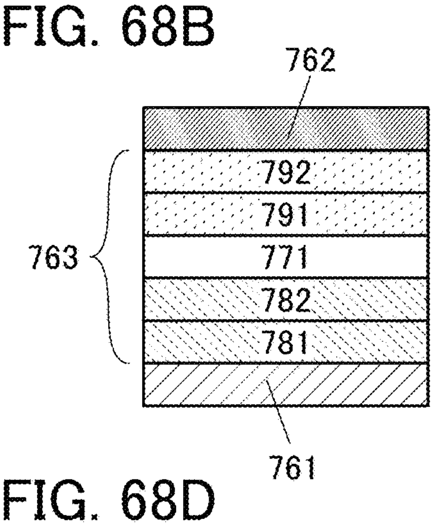

FIG. 68B shows a modification example of the EL layer 763 included in the light-emitting device illustrated in FIG. 68A. Specifically, the light-emitting device illustrated in FIG. 68B includes a layer 781 over the lower electrode 761, a layer 782 over the layer 781, the light-emitting layer 771 over the layer 782, a layer 791 over the light-emitting layer 771, a layer 792 over the layer 791, and the upper electrode 762 over the layer 792.

In the case where the lower electrode 761 serves as an anode and the upper electrode 762 serves as a cathode, for example, the layer 781 can be a hole-injection layer, the layer 782 can be a hole-transport layer, the layer 791 can be an electron-transport layer, and the layer 792 can be an electron-injection layer. In the case where the lower electrode 761 serves as a cathode and the upper electrode 762 serves as an anode, the layer 781 can be an electron-injection layer, the layer 782 can be an electron-transport layer, the layer 791 can be a hole-transport layer, and the layer 792 can be a hole-injection layer. With such a layered structure, carriers can be efficiently injected to the light-emitting layer 771, and the efficiency of the recombination of carriers in the light-emitting layer 771 can be enhanced.

Figure 68C:
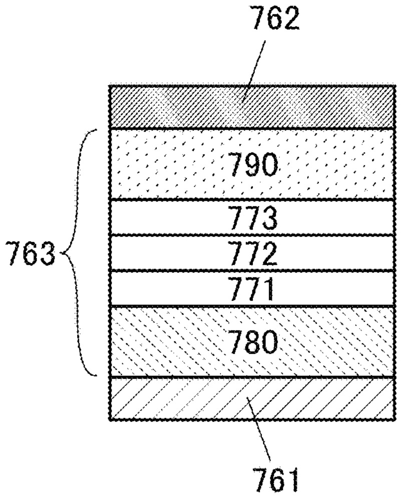
Figure 68D:
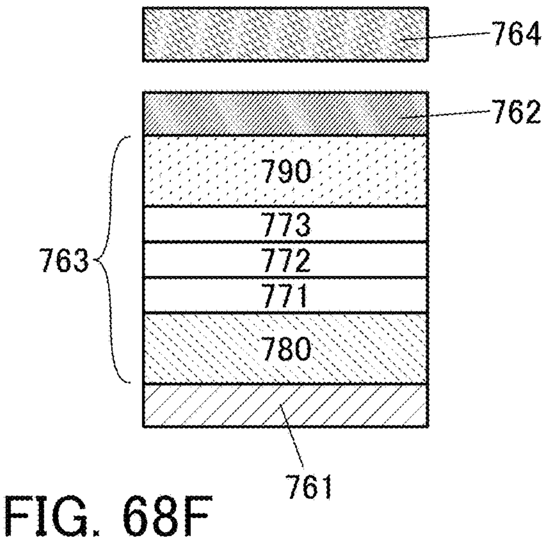

Note that structures in which a plurality of light-emitting layers (the light-emitting layer 771, a light-emitting layer 772, and a light-emitting layer 773) are provided between the layer 780 and the layer 790 as illustrated in FIGS. 68C and 68D are variations of the single structure. Although FIGS. 68C and 68D each illustrate an example including three light-emitting layers, a light-emitting device with a single structure may include two light-emitting layers or four or more light-emitting layers. The light-emitting device with a single structure may include a buffer layer between two light-emitting layers.

Figure 68E:
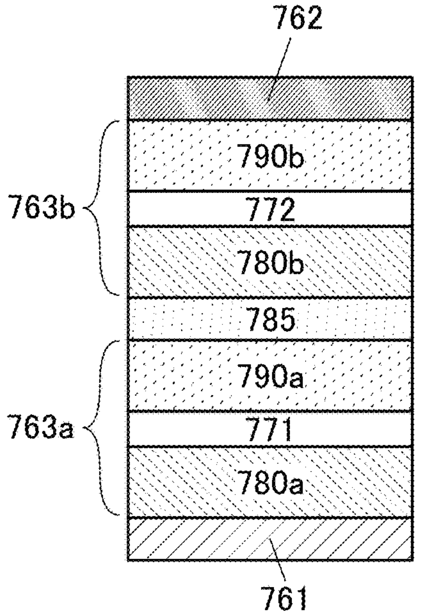
Figure 68F:
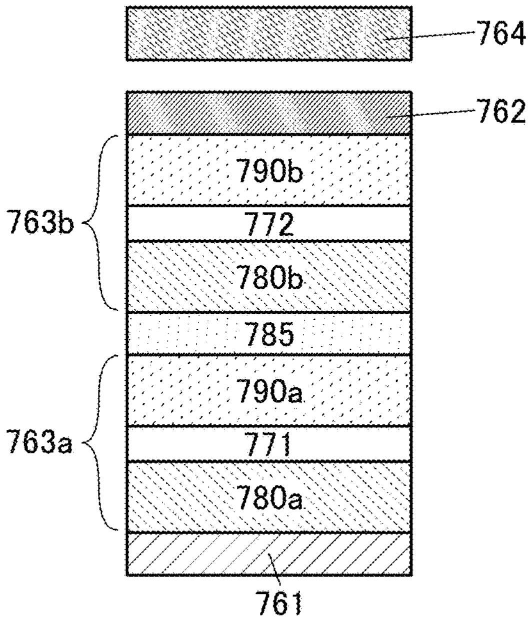

A structure in which a plurality of light-emitting units (a light-emitting unit 763*a* and a light-emitting unit 763*b*) are connected in series through a charge-generation layer 785 (also referred to as an intermediate layer) as illustrated in FIGS. 68E and 68F is referred to as a tandem structure in this specification. A tandem structure may be referred to as a stack structure. A tandem structure enables a light-emitting device capable of high-luminance light emission. Furthermore, a tandem structure allows the amount of current needed for obtaining the same luminance, as compared to the case of using a single structure, to be reduced; thus, the display apparatus with the tandem structure can have higher reliability.

FIGS. 68D and 68F each illustrate an example of a display apparatus including a layer 764 overlapping with a light-emitting device. FIG. 68D illustrates an example in which the layer 764 overlaps with a light-emitting device illustrated in FIG. 68C, and FIG. 68F illustrates an example in which the layer 764 overlaps with a light-emitting device illustrated in FIG. 68E.

A color conversion layer, a color filter (a coloring layer), or both can be used as the layer 764.

In FIGS. 68C and 68D, light-emitting substances that emit light of the same color, or moreover, the same light-emitting substance may be used for the light-emitting layer 771, the light-emitting layer 772, and the light-emitting layer 773. For example, a light-emitting substance that emits blue light may be used for the light-emitting layers 771, 772, and 773. In a subpixel exhibiting blue light, blue light emitted by the light-emitting device can be extracted. In a subpixel exhibiting red light and a subpixel exhibiting green light, respective color conversion layers are provided as the layer 764 illustrated in FIG. 68D, whereby blue light emitted by light-emitting devices can be converted into light with a longer wavelength and thus red light or green light can be extracted.

Alternatively, light-emitting substances that emit light of different colors may be used for the light-emitting layers 771, 772, and 773. In particular, the light-emitting device preferably enables white light emission by combining light emitted by the light-emitting layers 771, 772, and 773. For example, a light-emitting device with a single structure preferably include a light-emitting layer containing a light-emitting substance emitting blue light and a light-emitting layer containing a light-emitting substance emitting visible light with a longer wavelength than blue light.

For example, in the case where the light-emitting device with a single structure includes three light-emitting layers, the light-emitting device preferably includes a light-emitting layer containing a light-emitting substance emitting red (R) light, a light-emitting layer containing a light-emitting substance emitting green (G) light, and a light-emitting layer containing a light-emitting substance emitting blue (B) light. The stacking order of the light-emitting layers can be, for example, a red (R) light-emitting layer, a green (G) light-emitting layer, and a blue (B) light-emitting layer from the anode side, or a red (R) light-emitting layer, a blue (B) light-emitting layer, and a green (G) light-emitting layer from the anode side. At this time, a buffer layer may be provided between a red (R) light-emitting layer and a green (G) light-emitting layer or between a red (R) light-emitting layer and a blue (B) light-emitting layer.

For example, in the case where the light-emitting device with a single structure includes two light-emitting layers, the light-emitting device preferably includes a light-emitting layer containing a light-emitting substance emitting blue (B) light and a light-emitting layer containing a light-emitting substance emitting yellow (Y) light. Such a structure may be referred to as a BY single structure.

A color filter may be provided as the layer 764 illustrated in FIG. 68D. When white light passes through the color filter, light of a desired color can be obtained.

A light-emitting device that emits white light preferably includes two or more kinds of light-emitting substances. For example, to obtain white light emission by using two light-emitting substances, the two light-emitting substances are selected such that emission colors of the light-emitting substances are complementary colors. For example, when the emission colors of the first light-emitting layer and the second light-emitting layer are made complementary, the light-emitting device can be configured to emit white light as a whole. To obtain white light emission by using three or more light-emitting layers, the light-emitting device is configured to emit white light as a whole by combining emission colors of the three or more light-emitting layers.

In FIGS. 68E and 68F, light-emitting substances that emit light of the same color, or moreover, the same light-emitting substance may be used for the light-emitting layers 771 and 772.

For example, in light-emitting devices included in subpixels that exhibit light of different colors, a light-emitting substance that emits blue light may be used for the light-emitting layers 771 and 772. In a subpixel that exhibits blue light, blue light emitted from the light-emitting device can be extracted. In a subpixel that exhibits red light and a subpixel that exhibits green light, by providing a color conversion layer as the layer 764 illustrated in FIG. 68F, blue light emitted from the light-emitting device can be converted into light with a longer wavelength, and red light or green light can be extracted.

In the case where the light-emitting device having the structure illustrated in FIG. 68E or 68F is used in subpixels that exhibit light of different colors, different light-emitting substances may be used in the subpixels. Specifically, in the light-emitting device included in the subpixel that exhibits red light, a light-emitting substance that emits red light may be used for the light-emitting layers 771 and 772. Similarly, in the light-emitting device included in the subpixel that exhibits green light, a light-emitting substance that emits green light may be used for the light-emitting layers 771 and 772. In the light-emitting device included in the subpixel that exhibits blue light, a light-emitting substance that emits blue light may be used for the light-emitting layers 771 and 772. The display device with such a structure employs light-emitting devices having a tandem structure and is regarded as having the SBS structure. Thus, the display device can have both the advantage of the tandem structure and the advantage of the SBS structure. Accordingly, a highly reliable light-emitting apparatus capable of emitting light at high luminance is achieved.

In FIGS. 68E and 68F, light-emitting substances that emit light of different colors may be used for the light-emitting layers 771 and 772. White light is obtained when the light-emitting layers 771 and 772 emit light of complementary colors. As the layer 764 illustrated in FIG. 68F, a color filter may be provided. When white light passes through the color filter, light of a desired color can be obtained.

Although FIGS. 68E and 68F illustrate examples in which the light-emitting unit 763*a* includes one light-emitting layer 771 and the light-emitting unit 763*b* includes one light-emitting layer 772, one embodiment of the present invention is not limited thereto. Each of the light-emitting units 763*a* and 763*b* may include two or more light-emitting layers.

Although FIGS. 68E and 68F illustrate examples in which the light-emitting device includes two light-emitting units, one embodiment of the present invention is not limited thereto. The light-emitting device may include three or more light-emitting units.

Figure 69A:
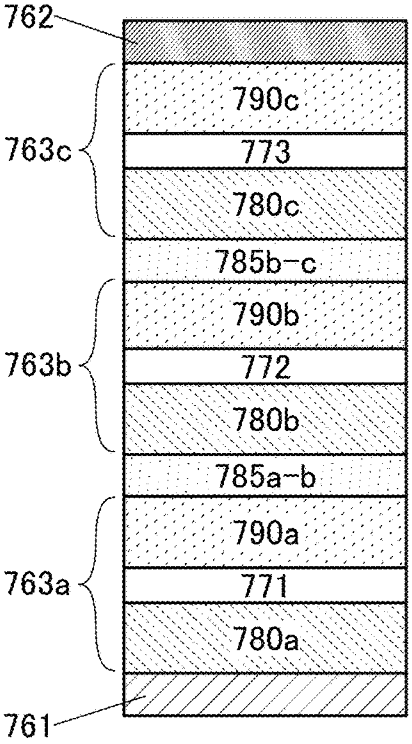
FIGS. 69A to 69C each illustrate a structure example of a light-emitting device.
Figure 69B:
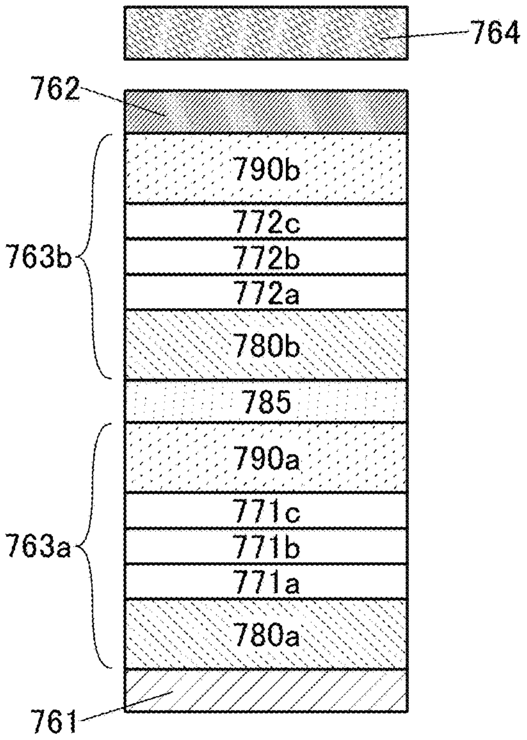
Figure 69C:
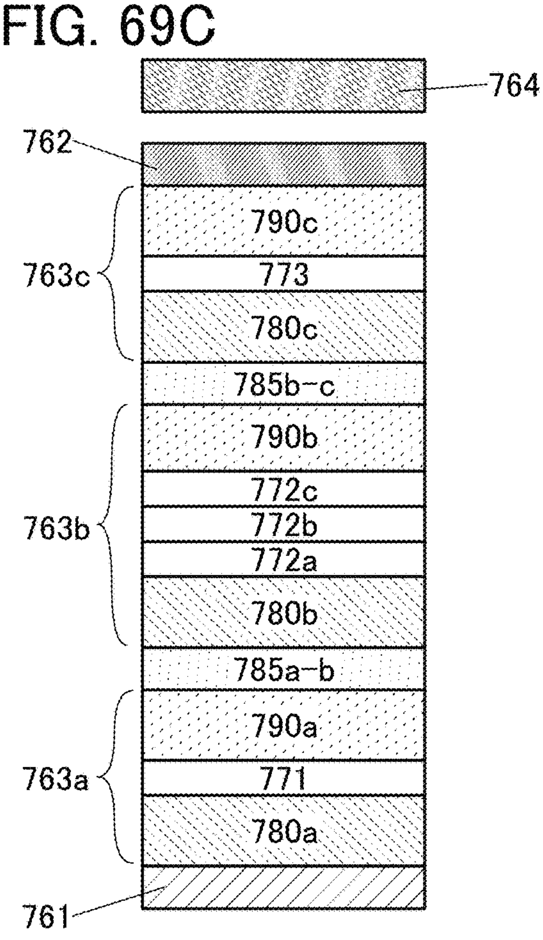

Specifically, structures of light-emitting devices illustrated in FIGS. 69A and 69C are given as examples.

FIG. 69A illustrates a structure including three light-emitting units. Note that a structure including two light-emitting units may be referred to as a two-unit tandem structure, and a structure including three light-emitting units may be referred to as a three-unit tandem structure.

A light-emitting device illustrated in FIG. 69A has a structure in which a plurality of light-emitting units (the light-emitting units 763*a*, 763*b*, and 763*c*) are connected in series through charge-generation layers (a charge-generation layer 785*a-b* and a charge-generation layer 785*b-c*). Specifically, in the light-emitting device illustrated in FIG. 68A, the light-emitting unit 763*a*, the charge-generation layer 785*a-b*, the light-emitting unit 763*b*, the charge-generation layer 785*b-c*, and the light-emitting unit 763*c* are stacked in this order. The light-emitting unit 763*a* includes a layer 780*a*, the light-emitting layer 771, and a layer 790*a*. The light-emitting unit 763*b* includes a layer 780*b*, the light-emitting layer 772, and a layer 790*b*. The light-emitting unit 763*c* includes a layer 780*c*, the light-emitting layer 773, and a layer 790*c*.

For the charge-generation layer 785*a-b* and the charge-generation layer 785*b-c*, the above description of the charge-generation layer 785 can be referred to.

In FIG. 69A, the light-emitting layers 771, 772, and 773 each preferably contain a light-emitting substance that emits light of the same color. Specifically, the light-emitting layers 771, 772, and 773 can each contain a light-emitting substance that emits red (R) light (i.e., an R\R\R three-unit tandem structure), can each contain a light-emitting substance that emits green (G) light (i.e., a G\G\G three-unit tandem structure), or can each contain a light-emitting substance that emits blue (B) light (i.e., a B\B\B three-unit tandem structure). Note that in the structure illustrated in FIG. 69A, the light-emitting layers 771, 772, and 773 may contain light-emitting substances which emit light of different colors. The structure illustrated in FIG. 69A may exhibit white (W) light by mixing light emitted from the light-emitting layers 771, 772, and 773. In the structure illustrated in FIG. 69A, the layer 764 may be provided as a color filter as in the structures illustrated in FIGS. 69B and 69C.

Note that the structures of the light-emitting substances that emit light of the same color are not limited to the above structure. For example, as illustrated in FIG. 69B, light-emitting units each including a plurality of light-emitting layers may be stacked in a tandem light-emitting device. FIG. 69B shows a structure in which a plurality of light-emitting units (the light-emitting units 763*a* and 763*b*) are connected in series through the charge-generation layer 785. The light-emitting unit 763*a* includes the layer 780*a*, a light-emitting layer 771*a*, a light-emitting layer 771*b*, a light-emitting layer 771*c*, and the layer 790*a*. The light-emitting unit 763*b* includes the layer 780*b*, a light-emitting layer 772*a*, a light-emitting layer 772*b*, a light-emitting layer 772*c*, and the layer 790*b*.

In FIG. 69B, the light-emitting unit 763*a* is configured to emit white (W) light by combining light of the light-emitting layers 771*a*, 771*b*, and 771*c*. In addition, the light-emitting unit 763*b* is configured to emit white (W) light by combining light of the light-emitting layers 772*a*, 772*b*, and 772*c*. In other words, the structure illustrated in FIG. 69C is a W\W two-unit tandem structure. Note that there is no particular limitation on the stacking order of the light-emitting layers 772*a*, 772*b*, and 772*c*. Similarly, there is no particular limitation on the stacking order of the light-emitting layers 771*a*, 771*b*, and 771*c*. The practitioner can select the optimal stacking order as appropriate. Although not illustrated, the structure illustrated in FIG. 53B may be a W\W\W three-unit tandem structure or a tandem structure of four or more units.

Other examples of the structure of a light-emitting device having a tandem structure include a B\Y two-unit tandem structure including a light-emitting unit that emits yellow (Y) light and a light-emitting unit that emits blue (B) light; an R·G\B two-unit tandem structure including a light-emitting unit that emits red (R) light and green (G) light and a light-emitting unit that emits blue (B) light; a B\Y\B three-unit tandem structure including a light-emitting unit that emits blue (B) light, a light-emitting unit that emits yellow (Y) light, and a light-emitting unit that emits blue (B) light in this order; a B\YG\B three-unit tandem structure including a light-emitting unit that emits blue (B) light, a light-emitting unit that emits yellow green (YG) light, and a light-emitting unit that emits blue (B) light in this order; and a B\G\B three-unit tandem structure including a light-emitting unit that emits blue (B) light, a light-emitting unit that emits green (G) light, and a light-emitting unit that emits blue (B) light in this order. Note that "a·b" means that one light-emitting unit contains a light-emitting substance that emits light of the color "a" and a light-emitting substance that emits light of the color "b".

As illustrated in FIG. 69C, a light-emitting unit including one light-emitting substance and a light-emitting unit including a plurality of light-emitting substance may be used in combination.

Specifically, in the structure illustrated in FIG. 69C, a plurality of light-emitting units (the light-emitting units 763*a*, 763*b*, and 763*c*) are connected in series through the charge-generation layers (the charge-generation layer 785*a-b* and the charge-generation layer 785*b-c*). The light-emitting unit 763*a* includes the layer 780*a*, the light-emitting layer 771, and the layer 790*a*. The light-emitting unit 763*b* includes the layer 780*b*, the light-emitting layer 772*a*, the light-emitting layer 772*b*, the light-emitting layer 772*c*, and the layer 790*b*. The light-emitting unit 763*c* includes the layer 780*c*, the light-emitting layer 773, and the layer 790*c*. For example, the structure illustrated in FIG. 69C can be a B\R·G·YG\B three-unit tandem structure in which the light-emitting unit 763*a* emits blue (B) light, the light-emitting unit 763*b* emits red (R) light, green (G) light, and yellow green (YG) light, and the light-emitting unit 763*c* emits blue (B) light.

Examples of the number of stacked light-emitting units and the order of colors from the anode side include a two-unit structure of B and Y; a two-unit structure of B and a light-emitting unit X; a three-unit structure of B, Y, and B; and a three-unit structure of B, the light-emitting unit X, and B. Examples of the number of light-emitting layers stacked in the light-emitting unit X and the order of colors from the anode side include a two-layer structure of R and Y; a two-layer structure of R and G; a two-layer structure of G and R; a three-layer structure of G, R, and G; and a three-layer structure of R, G, and R. Another layer may be provided between two light-emitting layers.

In FIGS. 68C and 68D, each of the layers 780 and 790 may independently have a stacked-layer structure of two or more layers as in FIG. 68B.

In FIGS. 68E and 68F, the light-emitting unit 763*a* includes a layer 780*a*, the light-emitting layer 771, and a layer 790*a* and the light-emitting unit 763*b* includes a layer 780*b*, the light-emitting layer 772, and a layer 790*b*.

In the case where the lower electrode 761 is the anode and the upper electrode 762 is the cathode, each of the layers 780*a* and 780*b* includes one or more of a hole-injection layer, a hole-transport layer, and an electron-blocking layer. Each of the layers 790*a* and 790*b* includes one or more of an electron-injection layer, an electron-transport layer, and a hole-blocking layer. In the case where the lower electrode 761 is the cathode and the upper electrode 762 is the anode, the above structures of the layer 780*a* and the layer 790*a* are switched, and the above structures of the layer 780*b* and the layer 790*b* are switched.

In the case where the lower electrode 761 is the anode and the upper electrode 762 is the cathode, for example, the layer 780*a* includes a hole-injection layer and a hole-transport layer over the hole-injection layer and may also include an electron-blocking layer over the hole-transport layer. The layer 790*a* includes an electron-transport layer and may also include a hole-blocking layer between the light-emitting layer 771 and the electron-transport layer. The layer 780*b* includes a hole-transport layer and may also include an electron-blocking layer over the hole-transport layer. The layer 790*b* includes an electron-transport layer and an electron-injection layer over the electron-transport layer and may also include a hole-blocking layer between the light-emitting layer 772 and the electron-transport layer. In the case where the lower electrode 761 is the cathode and the upper electrode 762 is the anode, for example, the layer 780*a* includes an electron-injection layer and an electron-transport layer over the electron-injection layer and may also include a hole-blocking layer over the electron-transport layer. The layer 790*a* includes a hole-transport layer and may also include an electron-blocking layer between the light-emitting layer 771 and the hole-transport layer. The layer 780*b* includes an electron-transport layer and may also include a hole-blocking layer over the electron-transport layer. The layer 790*b* includes a hole-transport layer and a hole-injection layer over the hole-transport layer and may also include an electron-blocking layer between the light-emitting layer 772 and the hole-transport layer.

In the case of fabricating a light-emitting device having a tandem structure, two light-emitting units are stacked with the charge-generation layer 785 positioned therebetween. The charge-generation layer 785 includes at least a charge-generation region. The charge-generation layer 785 has a function of injecting electrons into one of the two light-emitting units and injecting holes to the other when voltage is applied between the pair of electrodes.

Next, a material usable for the light-emitting device will be described.

A conductive film that transmits visible light is used as the electrode through which light is extracted, which is either the lower electrode 761 or the upper electrode 762. A conductive film that reflects visible light is preferably used as the electrode through which light is not extracted. In the case where a display device includes a light-emitting device that emits infrared light, a conductive film that transmits visible light and infrared light is used as the electrode through which light is extracted, and a conductive film that reflects visible light and infrared light is preferably used as the electrode through which light is not extracted.

A conductive film that transmits visible light may be used also as the electrode through which light is not extracted. In that case, this electrode is preferably provided between a reflective layer and the EL layer 763. In other words, light emitted by the EL layer 763 may be reflected by the reflective layer to be extracted from the display device.

As the material of the pair of electrodes of the light-emitting device, a metal, an alloy, an electrically conductive compound, a mixture thereof, and the like can be used as appropriate. Specific examples of the material include a metal such as aluminum, magnesium, titanium, chromium, manganese, iron, cobalt, nickel, copper, gallium, zinc, indium, tin, molybdenum, tantalum, tungsten, palladium, gold, platinum, silver, yttrium, and neodymium; and an alloy containing any of these metals in appropriate combination. Examples of the material include indium tin oxide (In—Sn oxide, also referred to as ITO), In—Si—Sn oxide (also referred to as ITSO), indium zinc oxide (In—Zn oxide), and In—W—Zn oxide. Another example of the material is an alloy containing aluminum (an aluminum alloy). An example of the alloy containing aluminum is an alloy (Al—Ni—La) of aluminum (Al), nickel (Ni), and lanthanum (La). Another example of the material is an alloy (Ag—Pd—Cu, also referred to as APC) of silver, palladium, and copper. Other examples of the material include Group 1 and 2 elements of the periodic table that are not shown above (e.g., lithium, cesium, calcium, and strontium), a rare earth metal element such as europium and ytterbium, an alloy containing any of these elements in appropriate combination, and graphene.

The light-emitting device preferably employs a microcavity structure. Therefore, one of the pair of electrodes of the light-emitting device is preferably an electrode having properties of transmitting and reflecting visible light (a transflective electrode), and the other is preferably an electrode having a property of reflecting visible light (a reflective electrode). When the light-emitting device has a microcavity structure, light obtained from the light-emitting layer can be resonated between the electrodes, whereby light emitted from the light-emitting device can be intensified.

The transflective electrode is preferably formed with, for example, a conductor having properties of transmitting and reflecting visible light. Alternatively, for example, the transflective electrode may have a stacked-layer structure of a conductive layer that can be used as a reflective electrode and a conductive layer that can be used as an electrode having a property of transmitting visible light (also referred to as a transparent electrode).

The transparent electrode has a light transmittance higher than or equal to 40%. For example, an electrode having a visible light (light with wavelengths greater than or equal to 400 nm and less than 750 nm) transmittance higher than or equal to 40% is preferably used as the transparent electrode of the light-emitting device. The transflective electrode has a visible light reflectance higher than or equal to 10% and lower than or equal to 95%, preferably higher than or equal to 30% and lower than or equal to 80%. The reflective electrode has a visible light reflectance higher than or equal to 40% and lower than or equal to 100%, preferably higher than or equal to 70% and lower than or equal to 100%. These electrodes preferably have a resistivity lower than or equal to $1\times10^{-2}\Omega$cm.

The light-emitting device includes at least a light-emitting layer. In addition to the light-emitting layer, the light-emitting device may further include a layer containing any of a substance with a high hole-injection property, a substance with a high hole-transport property, a hole-blocking material, a substance with a high electron-transport property, an electron-blocking material, a substance with a high electron-injection property, or a substance with a bipolar property (a substance with high electron-transport and hole-transport properties). For example, the light-emitting device can include one or more of a hole-injection layer, a hole-transport layer, a hole-blocking layer, a charge-generation layer, an electron-blocking layer, an electron-transport layer, and an electron-injection layer in addition to the light-emitting layer.

Either a low molecular compound or a high molecular compound can be used in the light-emitting device, and an inorganic compound may also be included. Each layer included in the light-emitting device can be formed by an evaporation method (including a vacuum evaporation method), a transfer method, a printing method, an inkjet method, a coating method, or the like.

The light-emitting layer can contain one or more kinds of light-emitting substances. As the light-emitting substance, a substance whose emission color is, for example, blue, violet, bluish violet, green, yellow green, yellow, orange, or red is used as appropriate. Alternatively, as the light-emitting substance, a substance that emits near-infrared light can be used.

Examples of the light-emitting substance include a fluorescent material, a phosphorescent material, a TADF material, and a quantum dot material.

Examples of a fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of a phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer may contain one or more kinds of organic compounds (e.g., a host material and an assist material) in addition to the light-emitting substance (guest material). As one or more kinds of organic compounds, one or both of a substance with a high hole-transport property (hole-transport material) and a substance with a high electron-transport property (electron-transport material) can be used. As the hole-transport material, an aftermentioned material with a high hole-transport property usable for a hole-transport layer can be used. As the electron-transport material, an aftermentioned material with a high electron-transport property usable for the electron-transport layer can be used. Alternatively, as one or more kinds of organic compounds, a bipolar material or a TADF material may be used.

The light-emitting layer preferably includes a phosphorescent material and a combination of a hole-transport material and an electron-transport material that easily forms an exciplex, for example. With such a structure, light emission can be efficiently obtained by exciplex-triplet energy transfer (ExTET), which is energy transfer from the exciplex to the light-emitting substance (phosphorescent material). When a combination of materials is selected so as to form an exciplex that emits light whose wavelength overlaps the wavelength of a lowest-energy-side absorption band of the light-emitting substance, energy can be transferred smoothly and light emission can be obtained efficiently. With this structure, high efficiency, low-voltage driving, and a long lifetime of the light-emitting device can be achieved at the same time.

The hole-injection layer injects holes from the anode to the hole-transport layer and contains a material with a high hole-injection property. Examples of the material with a high hole-injection property include an aromatic amine compound and a composite material containing a hole-transport material and an acceptor material (electron-accepting material).

As the hole-transport material, the aftermentioned material with a high hole-transport property usable for the hole-transport layer can be used.

As the acceptor material, an oxide of a metal that belongs to any of Groups 4 to 8 of the periodic table can be used, for example. Specific examples of the oxide of the metal include molybdenum oxide, vanadium oxide, niobium oxide, tantalum oxide, chromium oxide, tungsten oxide, manganese oxide, and rhenium oxide. Among these, molybdenum oxide is especially preferable since it is stable in the air, has a low hygroscopic property, and is easy to handle. An organic acceptor material containing fluorine can also be used. An organic acceptor material such as a quinodimethane derivative, a chloranil derivative, and a hexaazatriphenylene derivative can also be used.

As the material with a high hole-injection property, a material containing a hole-transport material and the oxide of a metal that belongs to any of Groups 4 to 8 of the periodic table (typically molybdenum oxide) may be used, for example.

The hole-transport layer transports holes injected from the anode by the hole-injection layer, to the light-emitting layer.

The hole-transport layer contains a hole-transport material. The hole-transport material preferably has a hole mobility higher than or equal to $1\times10^{-6}$ $cm^2/Vs$. Note that other substances can also be used as long as the substances have a hole-transport property higher than an electron-transport property. As the hole-transport material, a material having a high hole-transport property, such as a π-electron rich heteroaromatic compound (e.g., a carbazole derivative, a thiophene derivative, or a furan derivative) or an aromatic amine (a compound having an aromatic amine skeleton), is preferred.

The electron-blocking layer is provided in contact with the light-emitting layer. The electron-blocking layer contains a material that has a hole-transport property and can block electrons. The electron-blocking layer can be formed using a material having an electron-blocking property among the hole-transport materials.

Since the electron-blocking layer has a hole-transport property, the electron-blocking layer can also be referred to as a hole-transport layer. A hole-transport layer having an electron-blocking property can be referred to as an electron-blocking layer.

The electron-transport layer transports electrons injected from the cathode by the electron-injection layer, to the light-emitting layer. The electron-transport layer contains an electron-transport material. The electron-transport material preferably has an electron mobility higher than or equal to $1\times10^{-6}$ $cm^2/Vs$. Note that other substances can also be used as long as the substances have an electron-transport property higher than a hole-transport property. As the electron-transport material, any of the following materials having a high electron-transport property can be used, for example: a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, and π-electron deficient heteroaromatic compound such as a nitrogen-containing heteroaromatic compound.

The hole-blocking layer is provided in contact with the light-emitting layer. The hole-blocking layer contains a material that has an electron-transport property and can block holes. The hole-blocking layer can be formed using a material having a hole-blocking property among the electron-transport materials.

Since the hole-blocking layer has an electron-transport property, the hole-blocking layer can also be referred to as an electron-transport layer. An electron-transport layer having a hole-blocking property can be referred to as a hole-blocking layer.

The electron-injection layer injects electrons from the cathode to the electron-transport layer and contains a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The difference between the lowest unoccupied molecular orbital (LUMO) level of the material with a high electron-injection property and the work function of the material used for the cathode is preferably small (specifically, less than or equal to 0.5 eV).

The electron-injection layer can be formed using an alkali metal, an alkaline earth metal, or a compound thereof, such as lithium, cesium, ytterbium, lithium fluoride (LiF), cesium fluoride (CsF), calcium fluoride ($CaF_x$, where x is a given number), 8-(quinolinolato) lithium (abbreviation: Liq), 2-(2-pyridyl) phenolatolithium (abbreviation: LiPP), 2-(2-pyridyl)-3-pyridinolatolithium (abbreviation: LiPPy), 4-phenyl-2-(2-pyridyl) phenolatolithium (abbreviation: LiPPP), lithium oxide ($LiO_x$), or cesium carbonate, for example. The electron-injection layer may have a stacked-layer structure of two or more layers. In the stacked-layer structure, for example, lithium fluoride can be used for the first layer and ytterbium can be used for the second layer.

The electron-injection layer may contain an electron-transport material. For example, a compound having an unshared electron pair and an electron deficient heteroaromatic ring can be used as the electron-transport material. Specifically, it is possible to use a compound having at least one of a pyridine ring, a diazine ring (a pyrimidine ring, a pyrazine ring, or a pyridazine ring), and a triazine ring.

Note that the LUMO level of the organic compound having an unshared electron pair is preferably greater than or equal to −3.6 eV and less than or equal to −2.3 eV. In general, the highest occupied molecular orbital (HOMO) level and the LUMO level of an organic compound can be estimated by cyclic voltammetry (CV), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino[2,3-a: 2',3'-c]phenazine (abbreviation: HATNA), or 2,4,6-tris[3'-(pyridin-3-yl) biphenyl-3-yl]-1,3,5-triazine (abbreviation: TmPPPyTz) can be used as the organic compound having an unshared electron pair. Note that NBPhen has a higher glass transition temperature (Tg) than BPhen and thus has high heat resistance.

The charge-generation layer includes at least a charge-generation region, as described above. The charge-generation region preferably contains an acceptor material, and for example, preferably contains a hole-transport material and an acceptor material, each of which can be used for the hole-injection layer.

The charge-generation layer preferably includes a layer containing a material with a high electron-injection property. The layer can be referred to as an electron-injection buffer layer. The electron-injection buffer layer is preferably provided between the charge-generation region and the electron-transport layer. Providing the electron-injection buffer layer can relieve an injection barrier between the charge-generation region and the electron-transport layer; thus, electrons generated in the charge-generation region can be easily injected to the electron-transport layer.

The electron-injection buffer layer preferably contains an alkali metal or an alkaline earth metal, and for example, can contain an alkali metal compound or an alkaline earth metal compound. Specifically, the electron-injection buffer layer preferably contains an inorganic compound containing an alkali metal and oxygen or an inorganic compound containing an alkaline earth metal and oxygen, and further preferably contains an inorganic compound containing lithium and oxygen (e.g., lithium oxide ($Li_2O$)). Furthermore, a material that can be used for the electron-injection layer is suitably used for the electron-injection buffer layer.

The charge-generation layer preferably includes a layer containing a material with a high electron-transport property. The layer can be referred to as an electron-relay layer. The electron-relay layer is preferably provided between the charge-generation region and the electron-injection buffer layer. In the case where the charge-generation layer does not include the electron-injection buffer layer, the electron-relay layer is preferably provided between the charge-generation region and the electron-transport layer. The electron-relay layer has a function of preventing an interaction between the charge-generation region and the electron-injection buffer layer (or the electron-transport layer) and transferring electrons smoothly.

For the electron-relay layer, it is preferable to use a phthalocyanine-based material such as copper (II) phthalocyanine (abbreviation: CuPc) or a metal complex having a metal-oxygen bond and an aromatic ligand.

Note that the charge-generation region, the electron-injection buffer layer, and the electron-relay layer cannot be clearly distinguished from each other in some cases depending on their cross-sectional shapes, characteristics, or the like.

The charge-generation layer may contain a donor material instead of an acceptor material. For example, as the charge-generation layer, a layer containing an electron-transport material and a donor material that can be used for the electron-injection layer may be provided.

When light-emitting units are stacked, the charge-generation layer provided between two light-emitting units can suppress an increase in driving voltage.

Configuration Example of Pixel Circuit

Here, configuration examples of a pixel circuit that can be included in the pixel layer PXAL are described.

Figure 70A:
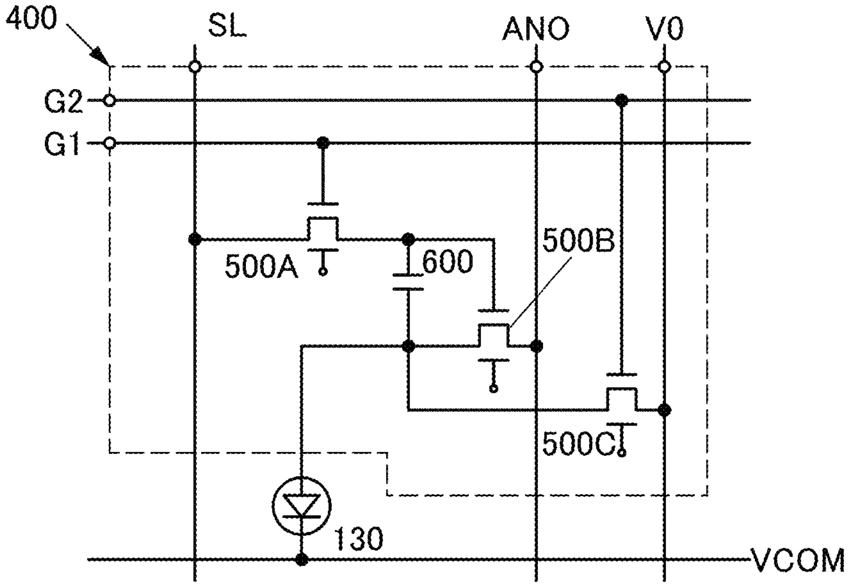
FIG. 70A is a circuit diagram illustrating a structure example of a pixel circuit included in a display apparatus.
Figure 70B:
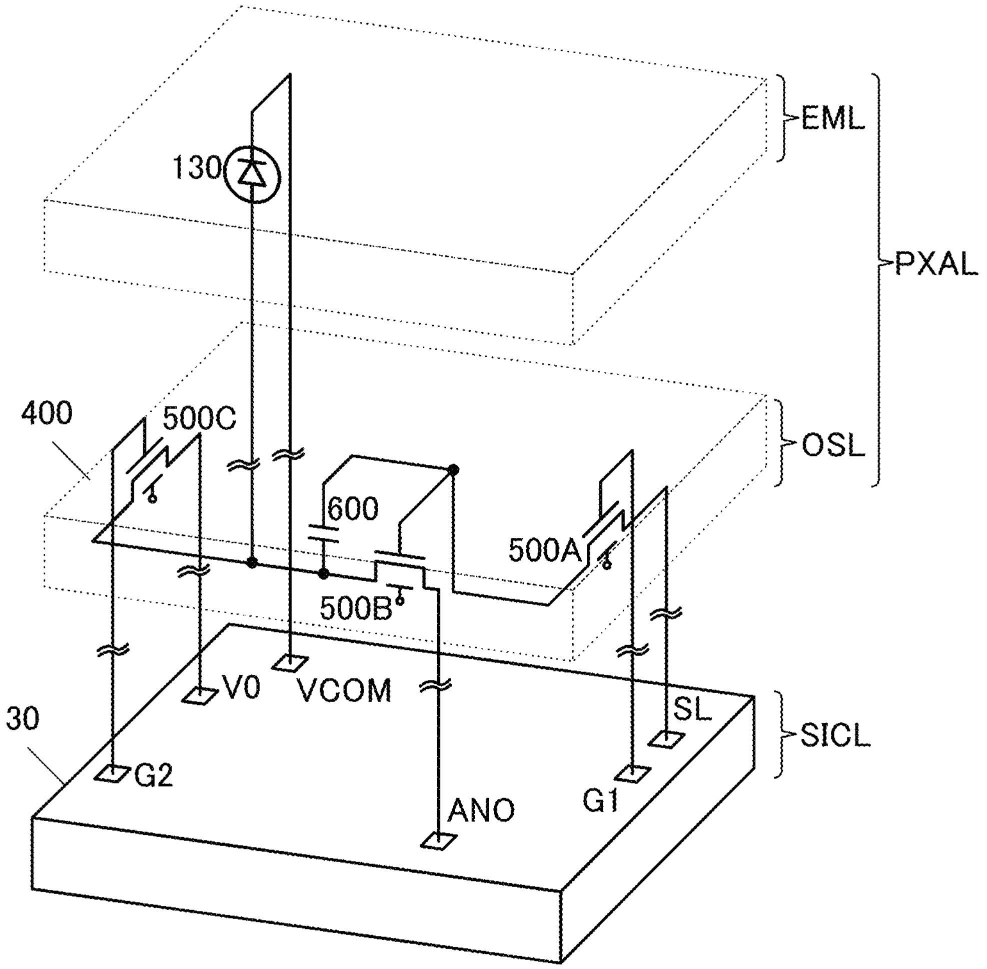
FIG. 70B is a schematic perspective view illustrating a structure example of a pixel circuit included in a display apparatus.

FIGS. 70A and 70B show a configuration example of a pixel circuit that can be included in the pixel layer PXAL and the light-emitting device 130 connected to the pixel circuit. FIG. 70A shows connection of circuit elements of a pixel circuit 400 included in the pixel layer PXAL, and FIG. 70B schematically shows the positional relation of the circuit layer SICL including a driver circuit 30, a layer OSL including a plurality of transistors of the pixel circuit, and a layer EML including the light-emitting device 130. Note that the pixel layer PXAL in the display apparatus 1000 in FIG. 70B includes the layer OSL and the layer EML, for example. A transistor 500A, a transistor 500B, and a transistor 500C included in the layer OSL illustrated in FIG. 70B each correspond to the transistor 500 in FIG. 52 or the transistor 200 in FIG. 59A, for example. The light-emitting device 130 included in the layer EML illustrated in FIG. 70B corresponds to the light-emitting device 130R, the light-emitting device 130G, or the light-emitting device 130B in FIG. 52.

The pixel circuit 400 illustrated as an example in FIGS. 70A and 70B includes the transistor 500A, the transistor 500B, the transistor 500C, and a capacitor 600. As the transistors 500A, 500B, and 500C, for example, transistors usable as the above-described transistor 500 or 200 can be used. That is, the transistors 500A, 500B, and 500C can be OS transistors. Alternatively, the transistors 500A, 500B, and 500C can be Si transistors. In particular, in the case where the transistors 500A, 500B, and 500C are OS transistors, each of the transistors 500A, 500B, and 500C preferably includes a back gate, in which case the back gate and a gate can be supplied with the same signals or different signals. Although each of the transistors 500A, 500B, and 500C in FIGS. 70A and 70B includes a back gate, each of the transistors 500A, 500B, and 500C does not necessarily include a back gate.

The transistor 500B includes the gate electrically connected to the transistor 500A, a first terminal electrically connected to the light-emitting device 130, and a second terminal electrically connected to a wiring ANO. The wiring ANO supplies a potential for supplying a current to the light-emitting device 130.

The transistor 500A includes a first terminal electrically connected to the gate of the transistor 500B, a second terminal electrically connected to the wiring SL functioning as a source line, and the gate having a function of controlling switching between the on/off states based on the potential of a wiring G1 functioning as a gate line.

The transistor 500C includes a first terminal electrically connected to a wiring V0, a second terminal electrically connected to the light-emitting device 130, and the gate having a function of controlling the on/off states based on the potential of a wiring G2 functioning as a gate line. The wiring V0 supplies a reference potential and outputs a current flowing in the pixel circuit 400 to the driver circuit 30.

The capacitor 600 includes a conductive film electrically connected to the gate of the transistor 500B and a conductive film electrically connected to the second terminal of the transistor 500C.

The light-emitting device 130 includes a first terminal electrically connected to the first terminal of the transistor 500B and a second terminal electrically connected to a wiring VCOM. The wiring VCOM supplies a potential for supplying a current to the light-emitting device 130.

Accordingly, the intensity of light emitted by the light-emitting device 130 can be controlled in accordance with an image signal supplied to the gate of the transistor 500B. Furthermore, variations in the gate-source voltage of the transistor 500B can be reduced by the reference potential of the wiring V0 supplied through the transistor 500C.

A current value that can be used for setting of pixel parameters can be output from the wiring V0. Specifically, the wiring V0 can function as a monitor line for outputting a current flowing in the transistor 500B or a current flowing in the light-emitting device 130 to the outside. A current output to the wiring V0 is converted into a voltage by, for example, a source follower circuit and output to the outside. Alternatively, the current is converted into a digital signal by, for example, an A/D converter, and can be output to the AI accelerator which is described in the above embodiment and included in the peripheral circuit PRPH.

In the configuration illustrated as an example in FIG. 70B, the wirings electrically connecting the pixel circuit 400 and the driver circuit 30 can be short, so that the wiring resistance of the wirings can be low. Thus, data writing can be performed at a high speed, leading to high-speed operation of the display apparatus 1000. Therefore, even when the number of pixel circuits 400 included in the display apparatus 1000 is large, a sufficiently long frame period can be ensured and thus the pixel density of the display apparatus 1000 can be increased. In addition, the increased pixel density of the display apparatus 1000 can increase the definition of an image displayed by the display apparatus 1000. For example, the pixel density of the display apparatus 1000 can be greater than or equal to 500 ppi, preferably greater than or equal to 1000 ppi, further preferably greater than or equal to 3000 ppi, still further preferably greater than or equal to 5000 ppi, still further preferably greater than or equal to 6000 ppi. Thus, the display apparatus 1000 can be, for example, a display apparatus for AR or VR and can be suitably used in an electronic device with a short distance between the display portion and the user, such as a head-mounted display.

<Pixel Layout>

Here, a pixel layout is described. There is no particular limitation on the arrangement of subpixels, and a variety of methods can be employed. Examples of the arrangement of subpixels include stripe arrangement, S-stripe arrangement, matrix arrangement, delta arrangement, Bayer arrangement, and PenTile arrangement.

Examples of a top surface shape of the subpixel include polygons such as a triangle, a tetragon (including a rectangle and a square), and a pentagon; polygons with rounded corners; an ellipse; and a circle. Here, a top surface shape of the subpixel corresponds to a top surface shape of a light-emitting region of the light-emitting device.

Figure 71A:
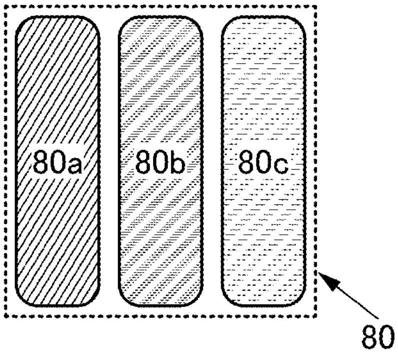
FIGS. 71A to 71G are plan views each illustrating an example of a pixel.
Figure 72A:
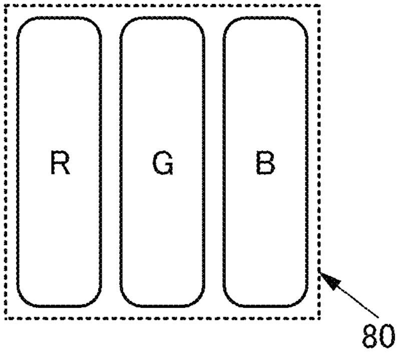
FIGS. 72A to 72F are plan views each illustrating an example of a pixel.

The pixel 80 in FIG. 71A employs stripe arrangement. The pixel 80 in FIG. 71A includes three subpixels: a subpixel 80*a*, a subpixel 80*b*, and a subpixel 80*c*. For example, the subpixel 80*a* may be a red subpixel R, the subpixel 80*b* may be a green subpixel G, and the subpixel 80*c* may be a blue subpixel B, as illustrated in FIG. 72A.

Figure 71B:
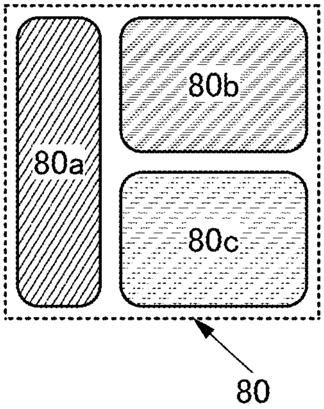
Figure 72B:
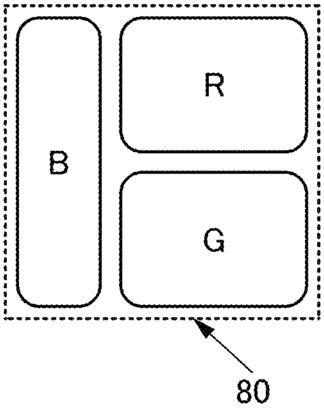

The pixel 80 in FIG. 71B employs S-stripe arrangement. The pixel 80 in FIG. 71B includes three subpixels: the subpixel 80*a*, the subpixel 80*b*, and the subpixel 80*c*. For example, the subpixel 80*a* may be the blue subpixel B, the subpixel 80*b* may be the red subpixel R, and the subpixel 80*c* may be the green subpixel G, as illustrated in FIG. 72B.

Figure 71C:
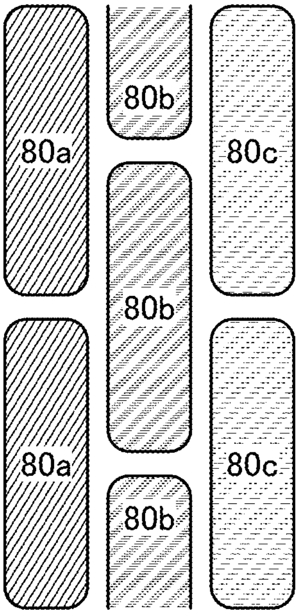
Figure 72C:
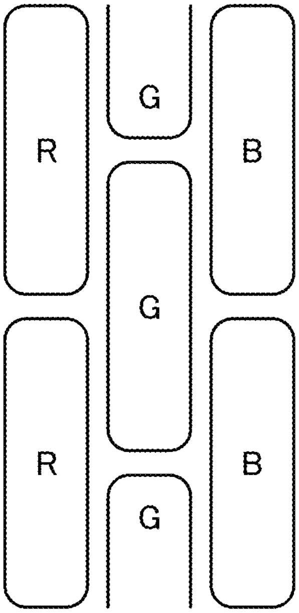

FIG. 71C illustrates an example where subpixels of different colors are arranged in a zigzag manner. Specifically, the positions of the top sides of two subpixels arranged in the column direction (e.g., the subpixel 80*a* and the subpixel 80*b* or the subpixel 80*b* and the subpixel 80*c*) are not aligned in the plan view. For example, the subpixel 80*a* may be a red subpixel R, the subpixel 80*b* may be a green subpixel G, and the subpixel 80*c* may be a blue subpixel B, as illustrated in FIG. 72C.

Figure 71D:
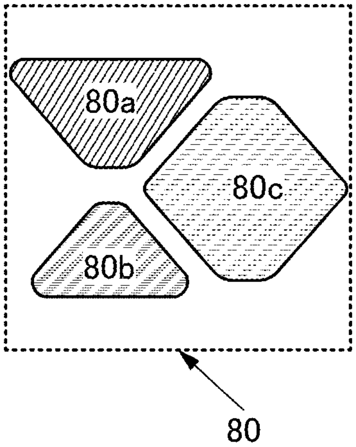
Figure 72D:
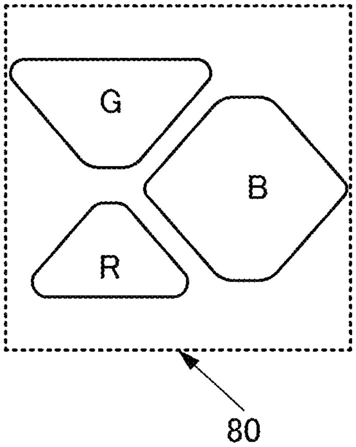

The pixel 80 illustrated in FIG. 71D includes the subpixel 80*a* whose top surface has a rough trapezoidal shape with rounded corners, the subpixel 80*b* whose top surface has a rough triangle shape with rounded corners, and the subpixel 80*c* whose top surface has a rough tetragonal or rough hexagonal shape with rounded corners. The subpixel 80*a* has a larger light-emitting area than the subpixel 80*b*. In this manner, the shapes and sizes of the subpixels can be determined independently. For example, the size of a subpixel including a light-emitting device with higher reliability can be smaller. For example, the subpixel 80*a* may be the green subpixel G, the subpixel 80*b* may be the red subpixel R, and the subpixel 80*c* may be the blue subpixel B, as illustrated in FIG. 72D.

Figure 71E:
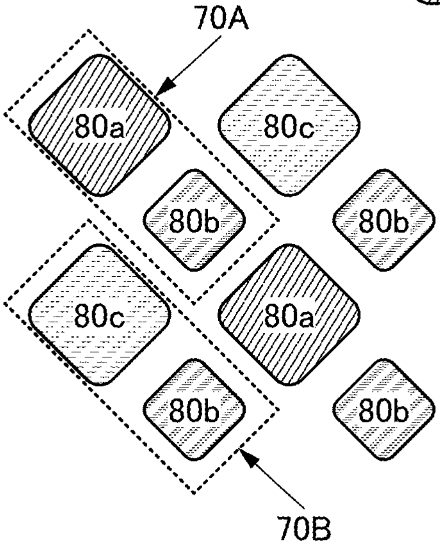
Figure 72E:
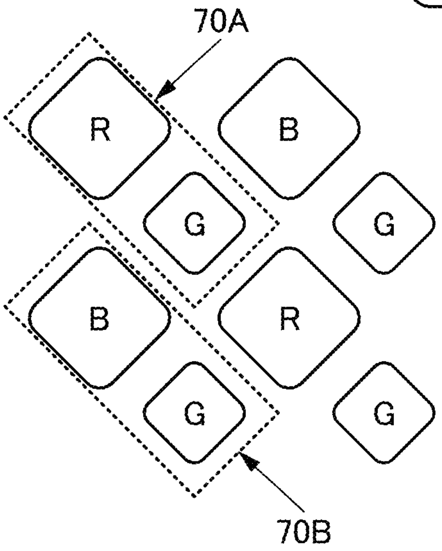

A pixel 70A and a pixel 70B in FIG. 71E employs PenTile arrangement. FIG. 71E illustrates an example in which the pixels 70A each including the subpixel 80*a* and the subpixel 80*b* and the pixels 70B each including the subpixel 80*b* and the subpixel 80*c* are alternately arranged. For example, the subpixel 80*a* may be the red subpixel R, the subpixel 80*b* may be the green subpixel G, and the subpixel 80*c* may be the blue subpixel B, as illustrated in FIG. 72E.

Figure 71F:
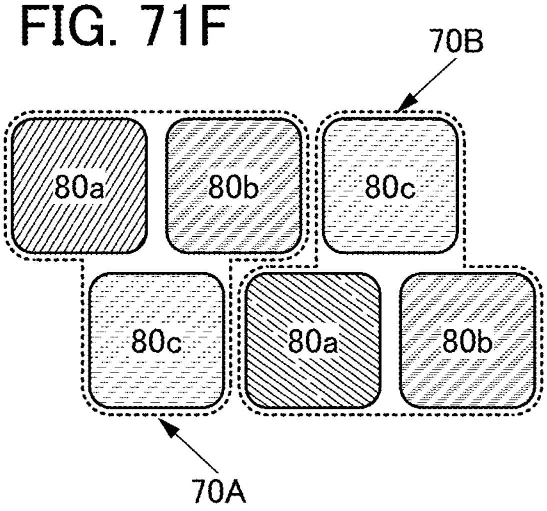
Figure 71G:
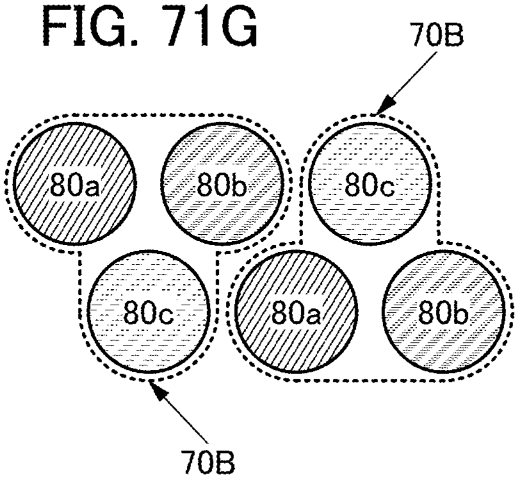
Figure 72F:
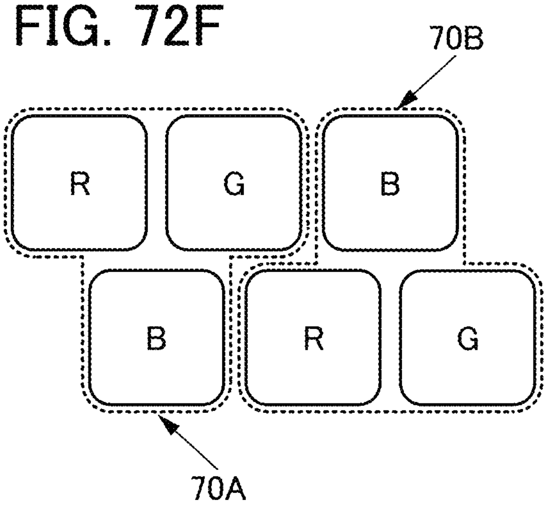

The pixel 70A and the pixel 70B in FIGS. 71F and 71G employ delta arrangement. The pixel 70A includes two subpixels (the subpixels 80*a* and 80*b*) in the upper row (first row) and one subpixel (the subpixel 80*c*) in the lower row (second row). The pixel 70B includes one subpixel (the subpixel 80*c*) in the upper row (first row) and two subpixels (the subpixels 80*a* and 80*b*) in the lower row (second row). For example, the subpixel 80*a* may be the red subpixel R, the subpixel 80*b* may be the green subpixel G, and the subpixel 80*c* may be the blue subpixel B, as illustrated in FIG. 72F.

FIG. 71F shows an example where the top surface of each subpixel has a rough tetragonal shape with rounded corners, and FIG. 71G shows an example where the top surface of each subpixel is circular.

In a photolithography method, as a pattern to be processed becomes finer, the influence of light diffraction becomes more difficult to ignore; therefore, the fidelity in transferring a photomask pattern by light exposure is degraded, and it becomes difficult to process a resist mask into a desired shape. Thus, a pattern with rounded corners is likely to be formed even with a rectangular photomask pattern. Consequently, the top surface of a subpixel can have a polygonal shape with rounded corners, an elliptical shape, or a circular shape.

Furthermore, in the method for manufacturing the display apparatus of one embodiment of the present invention, the EL layer is processed into an island shape with the use of a resist mask. A resist film formed over the EL layer needs to be cured at a temperature lower than the upper temperature limit of the EL layer. Therefore, the resist film is insufficiently cured in some cases depending on the upper temperature limit of the material of the EL layer and the curing temperature of the resist material. An insufficiently cured resist film may have a shape different from a desired shape by processing. As a result, the top surface of the EL layer may have a polygonal shape with rounded corners, an elliptical shape, a circular shape, or the like. For example, when a resist mask with a square top surface is intended to be formed, a resist mask with a circular top surface may be formed, and the top surface of the EL layer may be circular.

To obtain a desired top surface shape of the EL layer, a technique of correcting a mask pattern in advance so that a transferred pattern agrees with a design pattern (an optical proximity correction (OPC) technique) may be used. Specifically, with the OPC technique, a pattern for correction is added to a corner portion or the like of a figure on a mask pattern.

Figure 73A:
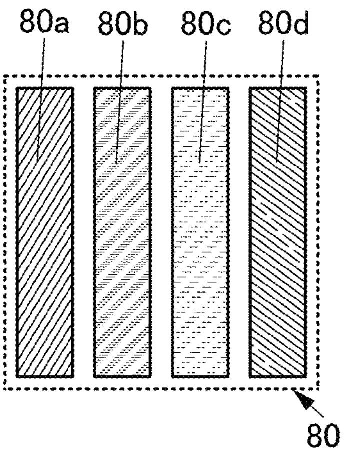
FIGS. 73A to 73H are plan views each illustrating an example of a pixel.
Figure 73B:
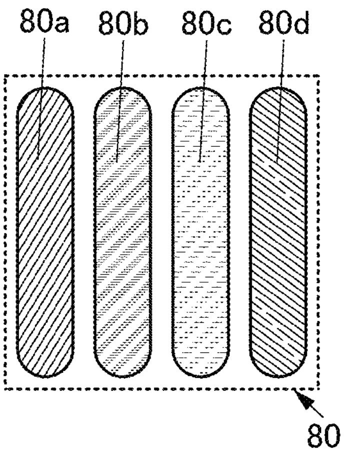
Figure 73C:
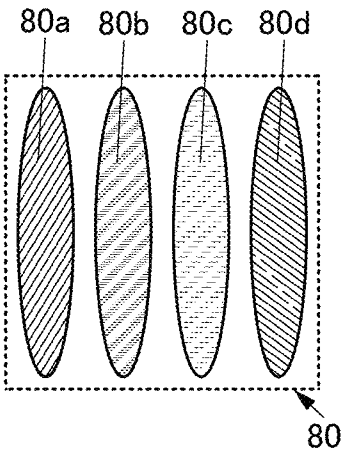

Each of the pixels 80 in FIGS. 73A to 73C employs stripe arrangement.

FIG. 73A illustrates an example in which each subpixel has a rectangular top surface shape, FIG. 73B illustrates an example in which each subpixel has a top surface shape formed by combining two half circles and a rectangle, and FIG. 73C illustrates an example in which each subpixel has an elliptical top surface shape.

Figure 73D:
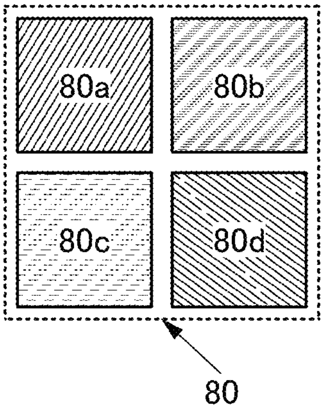
Figure 73E:
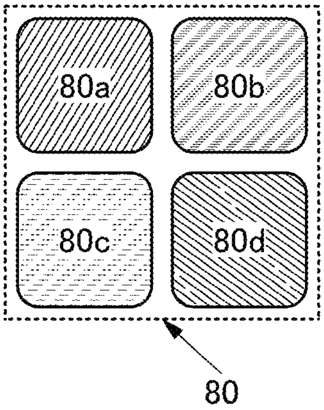
Figure 73F:
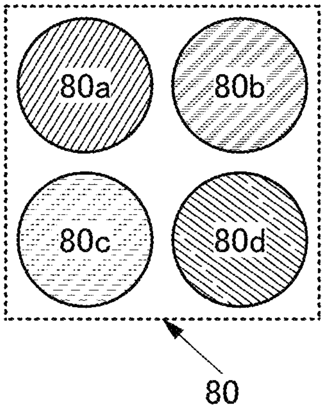

Each of the pixels 80 in FIGS. 73D to 73F employs matrix arrangement.

FIG. 73D illustrates an example in which each subpixel has a square top surface shape, FIG. 73E illustrates an example in which each subpixel has a substantially square top surface shape with rounded corners, and FIG. 73F illustrates an example in which each subpixel has a circular top surface shape.

Figure 74A:
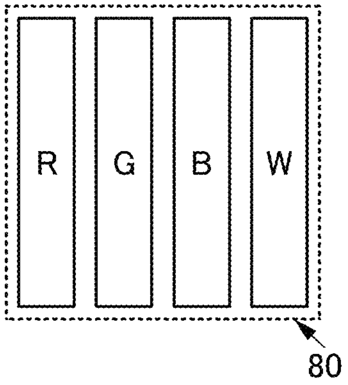
FIGS. 74A to 74D are plan views each illustrating an example of a pixel.
Figure 74B:
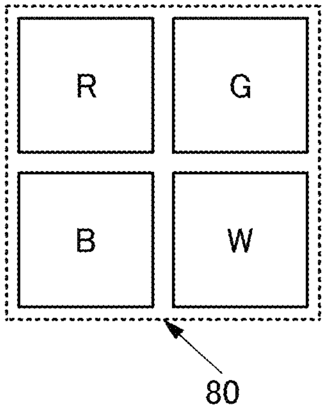

Each of the pixels 80 in FIGS. 73A to 73F includes four subpixels: the subpixel 80*a*, the subpixel 80*b*, the subpixel 80*c*, and a subpixel 80*d*. The subpixels 80*a*, 80*b*, 80*c*, and 80*d* emit light of different colors. For example, the subpixels 80*a*, 80*b*, 80*c*, and 80*d* can be subpixels for red, green, blue, and white, respectively, as illustrated in FIGS. 74A and 74B. Alternatively, the subpixels 80*a*, 80*b*, 80*c*, and 80*d* can be subpixels which emit red, green, blue, and infrared light, respectively.

The subpixel 80_d_ includes a light-emitting device. The light-emitting device includes, for example, a pixel electrode, an EL layer, and a common electrode. The pixel electrode can be formed using a material similar to that for the conductors 112_a_ to 112_c_ or the conductors 126_a_ to 126_c_. The EL layer is formed using a material similar to that for the first layer 113_a_, the second layer 113_b_, or the third layer 113_c_.

Figure 73G:
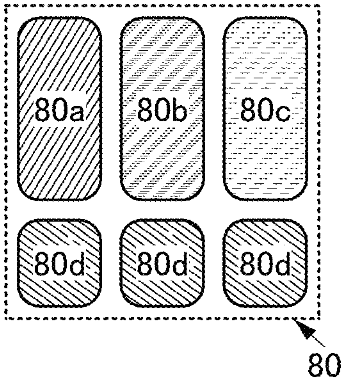

FIG. 73G illustrates an example in which one pixel 80 consists of two rows and three columns. The pixel 80 includes three subpixels (the subpixels 80_a_, 80_b_, and 80_c_) in the upper row (first row) and three subpixels 80_d_ in the lower row (second row). In other words, the pixel 80 includes the subpixel 80_a_ and the subpixel 80_d_ in the left column (first column), the subpixel 80_b_ and another subpixel 80_d_ in the center column (second column), and the subpixel 80_c_ and another subpixel 80_d_ in the right column (third column). Matching the positions of the subpixels in the upper row and the lower row as illustrated in FIG. 73G enables dust and the like that would be produced in the manufacturing process to be removed efficiently. Thus, a display apparatus having high display quality can be provided.

Figure 73H:
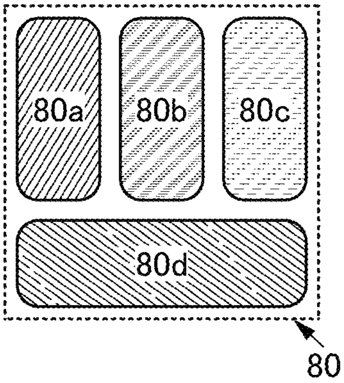

FIG. 73H illustrates an example in which one pixel 80 consists of two rows and three columns. The pixel 80 includes three subpixels (the subpixels 80_a_, 80_b_, and 80_c_) in the upper row (first row) and one subpixel (the subpixel 80_d_) in the lower row (second row). In other words, the pixel 80 includes the subpixel 80_a_ in the left column (the first column), the subpixel 80_b_ in the center column (the second column), the subpixel 80_c_ in the right column (the third column), and the subpixel 80_d_ across these three columns.

Figure 74C:
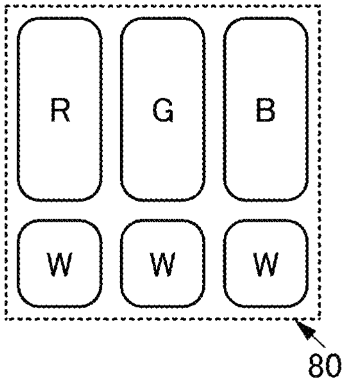
Figure 74D:
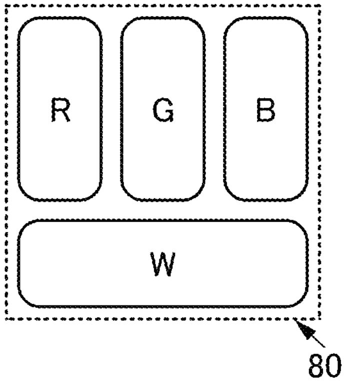

In the pixel 80 in each of FIGS. 73G and 73H, for example, the subpixel 80_a_ can be the red subpixel R, the subpixel 80_b_ can be the green subpixel G, the subpixel 80_c_ can be the blue subpixel B, and the subpixel 80_d_ can be a white subpixel W, as illustrated in FIGS. 74C and 74D.

Next, an example of a pixel layout applicable to the display apparatus 1000G in FIG. 63 and the display apparatus 1000H in FIG. 64 is described. The pixel layout of the display apparatus 1000G and the display apparatus 1000H can be regarded as a plan view (a top view) of the LED chips 150_a_ to 150_c_ of the display apparatus 1000G in FIG. 63 or a plan view (a top view) of the LED chips 180R, 180G, and 180B of the display apparatus 1000H in FIG. 64.

Figure 75A:
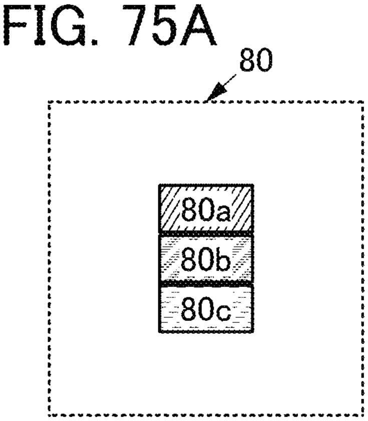
FIGS. 75A to 75G are plan views each illustrating an example of a pixel.

In the pixel 80 in FIG. 75A, subpixels each have a rectangular top surface and are arranged such that long sides of the subpixels are adjacent to one another. Note that the subpixels may be arranged to be in contact with each other or not to be in contact with each other.

The pixel 80 in FIG. 75A includes three subpixels: the subpixel 80_a_, the subpixel 80_b_, and the subpixel 80_c_. As an example, the subpixels 80_a_, 80_b_, and 80_c_ emit light of different colors. The different colors can be, for example, red (R), green (G), and blue (B). Thus, the subpixels 80_a_, 80_b_, and 80_c_ can be subpixels for red (R), green (G), and blue (B), respectively, as illustrated in FIG. 75B.

Figure 75B:
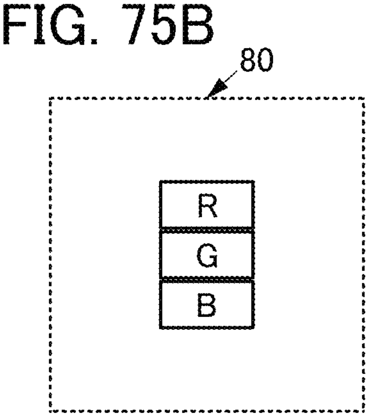

Note that in FIG. 75B, the colors of light emitted by the subpixels 80_a_, 80_b_, and 80_c_ can be cyan (C), magenta (M), yellow (Y), or white (W) in addition to red (R), green (G), and blue (B).

The number of subpixels included in the pixel 80 in FIG. 75A is three, but may be one, two, or four or more. For example, the pixel 80 in FIG. 75C includes four subpixels: the subpixel 80_a_, the subpixel 80_b_, the subpixel 80_c_, and the subpixel 80_d_. The subpixels 80_a_, 80_b_, 80_c_, and 80_d_ in the pixel 80 in FIG. 75C emit light of different colors in a manner similar to that of the pixel 80 in FIG. 75A. The different colors here can be, for example, red (R), green (G), blue (B), and white (W). Accordingly, the subpixels 80_a_, 80_b_, 80_c_, and 80_d_ can be subpixels for red (R), green (G), blue (B), and white (W), respectively, as illustrated in FIG. 75D.

Figure 75C:
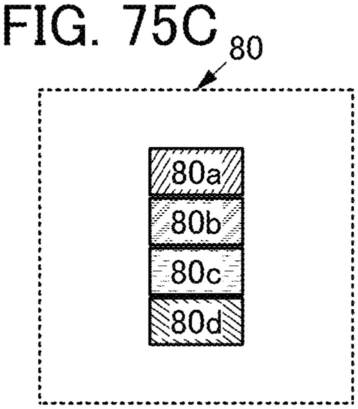
Figure 75D:
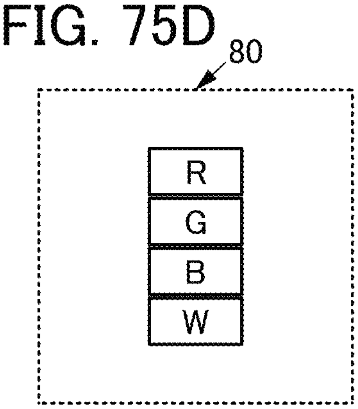

Note that in FIG. 75D, the colors of light emitted by the subpixels 80_a_, 80_b_, 80_c_, and 80_d_ can be cyan (C), magenta (M), or yellow (Y) in addition to red (R), green (G), blue (B), and or white (W).

Although FIGS. 75A and 75C illustrate the pixel 80 in which the subpixels are arranged such that the long sides are adjacent to one another as an example, the subpixels in the pixel 80 may be arranged such that the short sides are adjacent to one another.

Figure 75E:
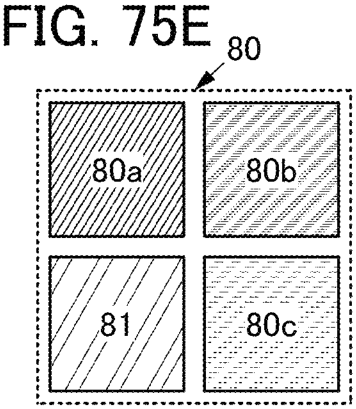

FIG. 75E illustrates an example in which each subpixel has a square top surface and an electrode is formed.

The pixel 80 in FIG. 75E includes a conductor 81 serving as an electrode and three subpixels: the subpixel 80_a_, the subpixel 80_b_, and the subpixel 80_c_.

As an example, the subpixels 80_a_, 80_b_, and 80_c_ emit light of different colors. The different colors can be, for example, red (R), green (G), and blue (B). Thus, the subpixels 80_a_, 80_b_, and 80_c_ can be subpixels for red (R), green (G), and blue (B), respectively, as illustrated in FIG. 75F.

Figure 75F:
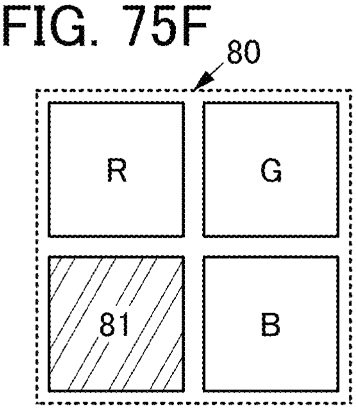

Note that in FIG. 75F, the colors of light emitted by the subpixels 80_a_, 80_b_, and 80_c_ can be cyan (C), magenta (M), yellow (Y), or white (W) in addition to red (R), green (G), and blue (B).

The conductor 81 has a function of a common electrode of light-emitting diodes provided in the subpixels 80_a_, 80_b_, and 80_c_, for example. In particular, the common electrode preferably serves as a cathode electrode of the light-emitting diode provided in each of the subpixels 80_a_, 80_b_, and 80_c_.

The conductor 81 corresponds to the electrode 172 or the electrode 173 in the LED package 170 in FIG. 65A, for example. Thus, a material usable for the electrode 172 or the electrode 173 can be used as a material for the conductor 81, for example.

Figure 75G:
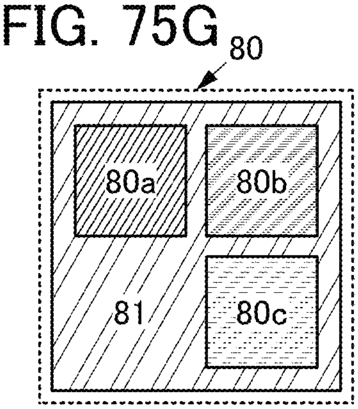

Note that the conductor 81 may be provided such that the subpixels 80_a_, 80_b_, and 80_c_ are positioned above the conductor 81 as illustrated in FIG. 75G. That is, the subpixels 80_a_, 80_b_, and 80_c_ are provided over the conductor 81. The conductor 81 of the pixel 80 in FIG. 75G corresponds the electrode 172 of the LED package 170A1 in FIG. 65B.

Although a conductor corresponding to the electrode 173 of the LED package 170A1 in FIG. 65B is not illustrated in the pixel 80 in FIG. 75G, the pixel 80 in FIG. 75G may include the conductor corresponding to the electrode 173.

The number of electrodes of the pixel 80 in FIG. 75E is one, but may be two or more. For example, the number of electrodes of the pixel 80 may be determined in accordance with the number of subpixels. For example, in the case where an anode electrode and a cathode electrode are provided in each of three subpixels in the pixel 80 in FIG. 75E, the number of electrodes provided in the pixel 80 is six. For another example, in the case where an anode electrode and a common electrode serving as a cathode electrode are provided in each of three subpixels in the pixel 80 in FIG. 75E, the number of electrodes provided in the pixel 80 can be four.

The top surface of the conductor 81 of the pixel 80 has a square shape in FIG. 75E, but may have a variety of shapes such as a substantial trapezoid with rounded corners, a substantial square with rounded corners, a substantial hexagon with rounded corners, a shape by combining a half circle and a rectangle, a circle, or an ellipse.

One of the plurality of subpixels included in the pixel 80 illustrated in each of FIGS. 71A to 71G, FIGS. 73A to 73H, FIGS. 75A and 75C may be replaced with the conductor 81.

Note that the insulators, the conductors, and the semiconductors disclosed in this specification and the like can be formed by a physical vapor deposition (PVD) method or a CVD method. Examples of the PVD method include a sputtering method, a resistance-heating evaporation method, an electron beam evaporation method, a molecular beam epitaxy (MBE) method, and a PLD method. Examples of the CVD method include a plasma CVD method and a thermal CVD method. Examples of the thermal CVD method include a metal organic chemical vapor deposition (MOCVD) method and an ALD method.

A thermal CVD method has an advantage that no defect due to plasma damage is generated since it does not utilize plasma for forming a film.

Deposition by a thermal CVD method may be performed in such a manner that a source gas and an oxidizer are supplied to a chamber at a time, the pressure in the chamber is set to an atmospheric pressure or a reduced pressure, and the source gas and the oxidizer react with each other in the vicinity of a substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching of corresponding switching valves (also referred to as high-speed valves) such that the source gases are not mixed. For example, a first source gas is introduced, an inert gas (e.g., argon or nitrogen) or the like is introduced at the same time as or after the introduction of the first source gas, and then a second source gas is introduced. Note that in the case where the first source gas and the inert gas are introduced at a time, the inert gas serves as a carrier gas, and the inert gas may also be introduced at the same time as the introduction of the second source gas. Alternatively, the second source gas may be introduced after the first source gas is exhausted by vacuum evacuation instead of the introduction of the inert gas. The first source gas is adsorbed on a surface of a substrate to form a first thin layer, and then the second source gas is introduced to react with the first thin layer; thus, a second thin layer is stacked over the first thin layer, and a thin film is formed as a result. The sequence of the gas introduction is controlled and repeated a plurality of times until a desired thickness is obtained, whereby a thin film with excellent step coverage can be formed. The thickness of the thin film can be adjusted by the number of repetition times of the sequence of the gas introduction; therefore, an ALD method makes it possible to adjust a thickness accurately and thus is suitable for manufacturing a minute FET.

A variety of films such as the metal film, the semiconductor film, and the inorganic insulating film described in this embodiment and the foregoing embodiments can be formed by a thermal CVD method such as an MOCVD method or an ALD method. For example, to form an In—Ga—Zn—O film, trimethylindium ($In(CH_3)_3$), trimethylgallium ($Ga(CH_3)_3$), and dimethylzinc ($Zn(CH_3)_2$) are used. Without limitation to the above combination, triethylgallium ($Ga(C_2H_5)_3$) can be used instead of trimethylgallium, and diethylzinc ($Zn(C_2H_5)_2$) can be used instead of dimethylzinc.

For example, when a hafnium oxide film is formed by a deposition apparatus using an ALD method, two kinds of gases, i.e., ozone ($O_3$) as an oxidizer and a source gas obtained by vaporization of a liquid containing a solvent and a hafnium precursor compound (hafnium alkoxide or hafnium amide such as tetrakis(dimethylamide) hafnium (TDMAH, $Hf[N(CH_3)_2]_4$)) are used. Alternatively, tetrakis(ethylmethylamide) hafnium may be used, for instance.

For example, when an aluminum oxide film is formed by a deposition apparatus using ALD, two kinds of gases, i.e., $H_2O$ as an oxidizer and a source gas obtained by vaporization of a liquid containing a solvent and an aluminum precursor compound (e.g., trimethylaluminum (e.g., TMA or $Al(CH_3)_3$)) are used. Alternatively, tris(dimethylamide)aluminum, triisobutylaluminum, aluminum tris(2,2,6,6-tetramethyl-3,5-heptanedionate), or the like may be used.

For example, when a silicon oxide film is formed by a deposition apparatus using an ALD method, hexachlorodisilane is adsorbed on a surface where the film is to be formed, and radicals of an oxidizing gas (e.g., $O_2$ or dinitrogen monoxide) are supplied to react with the adsorbate.

For example, when a tungsten film is formed by a deposition apparatus using an ALD method, a $WF_6$ gas and a $B_2H_6$ gas are sequentially introduced to form an initial tungsten film, and then a $WF_6$ gas and an $H_2$ gas are sequentially introduced to form a tungsten film. Note that a $SiH_4$ gas may be used instead of a $B_2H_6$ gas.

In the case where an In—Ga—Zn—O film is formed as an oxide semiconductor film with a deposition apparatus using an ALD method, a precursor (sometimes called a metal precursor) and an oxidizer (sometimes called a reactant or a non-metal precursor) are sequentially and repetitively introduced. Specifically, for example, an $In(CH_3)_3$ gas as a precursor and as an $O_3$ gas as an oxidizer are introduced to form an In—O layer; a $Ga(CH_3)_3$ gas as a precursor and an $O_3$ gas as an oxidizer are introduced to form a GaO layer; and then, a $Zn(CH_3)_2$ gas as a precursor and an $O_3$ gas as an oxidizer are introduced to form a ZnO layer. Note that the order of these layers is not limited to this example. A mixed oxide layer such as an In—Ga—O layer, an In—Zn—O layer, or a Ga—Zn—O layer may be formed with the use of these gases. Note that although an $H_2O$ gas that is obtained by bubbling water with an inert gas (e.g., argon) may be used instead of an $O_3$ gas, it is preferable to use an $O_3$ gas, which does not contain H. An $In(C_2H_5)_3$ gas may be used instead of an $In(CH_3)_3$ gas. A $Ga(C_2H_5)_3$ gas may be used instead of a $Ga(CH_3)_3$ gas. Moreover, a $Zn(C_2H_5)_2$ gas may be used instead of a $Zn(CH_3)_2$ gas.

The display portion of the display apparatus of one embodiment of the present invention can have a freely selected screen ratio (aspect ratio). For example, the display portion is compliant with any of various screen ratios such as 1:1 (square), 4:3, 16:9, 16:10, 21:9, or 32:9.

The shape of the display portion of the display apparatus of one embodiment of the present invention is not particularly limited. The display portion can have any of various shapes such as a rectangular shape, a polygonal shape (e.g., octagon), a circular shape, and an elliptical shape.

Note that this embodiment can be combined with any of the other embodiments in this specification as appropriate.

Embodiment 5

In this embodiment, a transistor that can be used in the semiconductor device of one embodiment of the present invention, specifically, the transistor 500 described in Embodiment 4, will be described.

Structure Example of Transistor

Figure 76A:
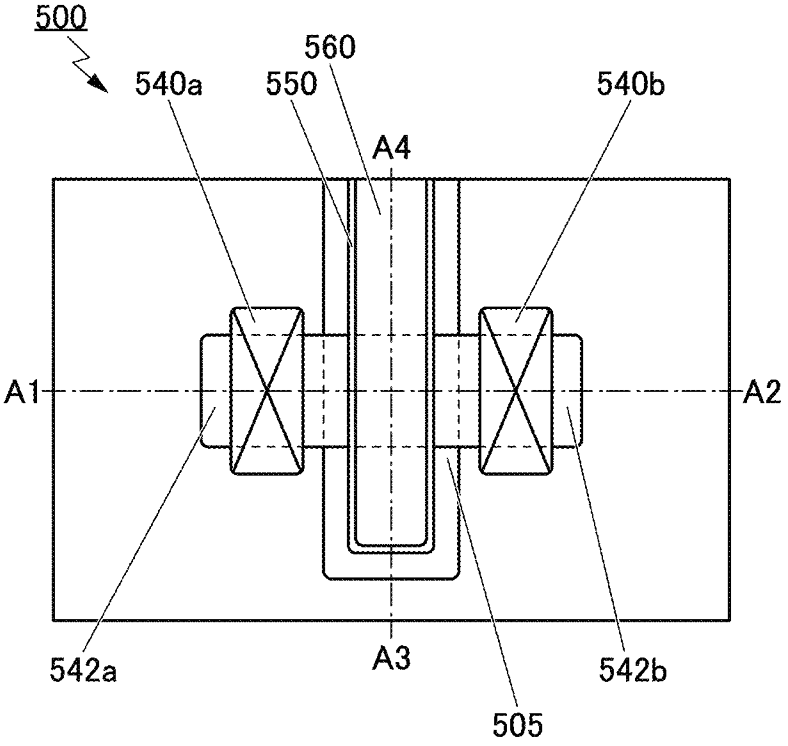
FIG. 76A is a schematic plan view illustrating a structure example of a transistor.
Figure 76C:
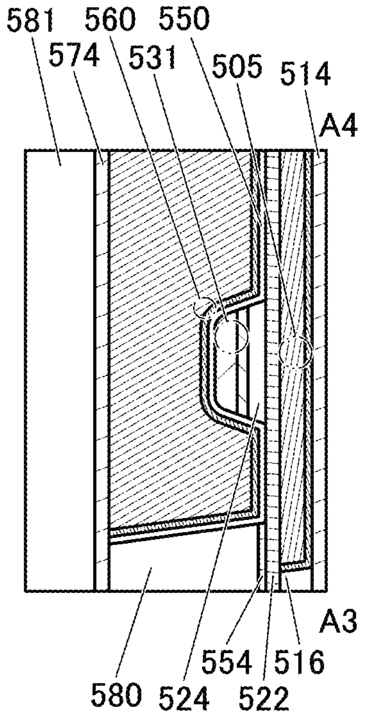
FIGS. 76B and 76C are schematic cross-sectional diagrams each illustrating a structure example of the transistor.
Figure 76B:
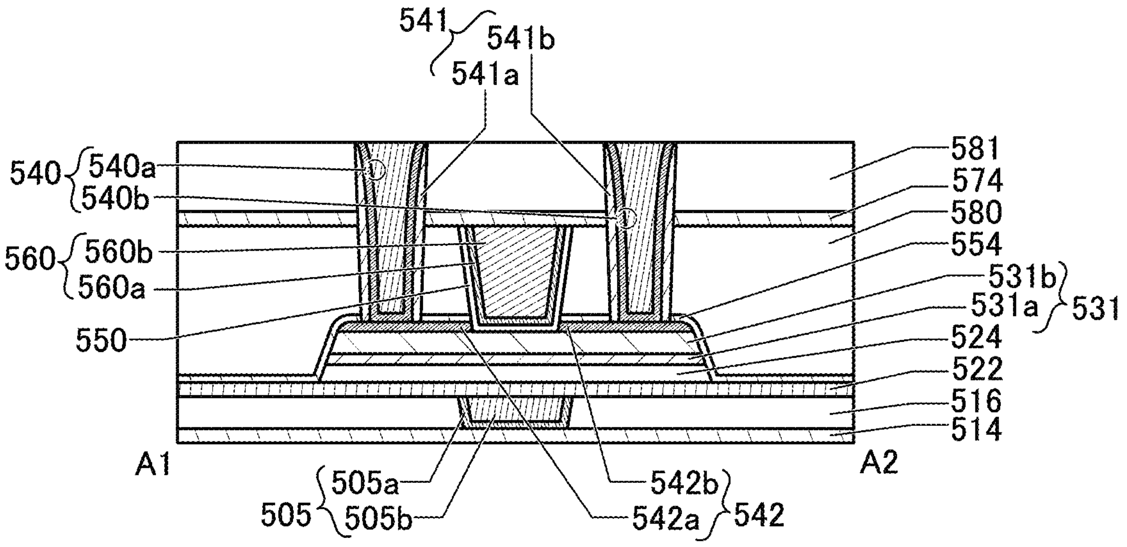

FIGS. 76A to 76C are a top view and cross-sectional views illustrating the transistor 500 that can be used in the semiconductor device of one embodiment of the present invention.

FIG. 76A is a plan view of the transistor 500. FIGS. 76B and 76C are cross-sectional views of the transistor 500. Here, FIG. 76B is a cross-sectional view of a portion indicated by the dashed-dotted line A1-A2 in FIG. 76A and is a cross-sectional view in the channel length direction of the transistor 500. FIG. 76C is a cross-sectional view of a portion indicated by the dashed-dotted line A3-A4 in FIG. 76A and is a cross-sectional view in the channel width direction of the transistor 500. Note that some components are not illustrated in the plan view of FIG. 76A for clarity of the drawing.

As illustrated in FIGS. 76A to 76C, the transistor 500 includes a metal oxide 531*a*, a metal oxide 531*b*, a conductor 542*a*, a conductor 542*b*, an insulator 580, a conductor 560, and an insulator 550.

The metal oxide 531*a* is provided over a substrate (not illustrated), for example. The metal oxide 531*b* is provided over the metal oxide 531*a*. The conductor 542*a* and the conductor 542*b* are provided to be apart from each other over the metal oxide 531*b*. The insulator 580 is provided over the conductor 542*a* and the conductor 542*b*. Specifically, an opening is formed in the insulator 580 in a region between the conductor 542*a* and the conductor 542*b*. The conductor 560 is provided in the opening. The insulator 550 is provided between the conductor 560 and the metal oxide 531*b*, the conductor 542*a*, the conductor 542*b*, and the insulator 580. Here, as illustrated in FIGS. 76B and 76C, a top surface of the conductor 560 is substantially level with top surfaces of the insulator 550 and the insulator 580. Note that in the following description, the metal oxide 531*a* and the metal oxide 531*b* are sometimes collectively referred to as a metal oxide 531. The conductor 542*a* and the conductor 542*b* are sometimes collectively referred to as a conductor 542.

In the transistor 500 illustrated in FIGS. 76A to 76C, side surfaces of the conductor 542*a* and the conductor 542*b* on the conductor 560 side are substantially perpendicular. Note that the transistor 500 illustrated in FIGS. 76A to 76C is not limited thereto, and the angle formed between the side surfaces and the bottom surfaces of the conductor 542*a* and the conductor 542*b* may be greater than or equal to 10° and less than or equal to 80°, preferably greater than or equal to 30° and less than or equal to 60°. The side surfaces of the conductor 542*a* and the conductor 542*b* that face each other may have a plurality of surfaces.

In the transistor 500, two layers of the metal oxide 531*a* and the metal oxide 531*b* are stacked in and around the region where the channel is formed (hereinafter also referred to as channel formation region); however, the present invention is not limited thereto. For example, a single-layer structure of the metal oxide 531*b* or a stacked-layer structure of three or more layers may be employed. Alternatively, each of the metal oxide 531*a* and the metal oxide 531*b* may have a stacked-layer structure of two or more layers.

Here, the conductor 560 functions as a gate electrode of the transistor, and the conductor 542*a* and the conductor 542*b* each function as a source electrode or a drain electrode. As described above, the conductor 560 is formed to be embedded in the opening of the insulator 580 and the region between the conductor 542*a* and the conductor 542*b*. Here, the positions of the conductor 560, the conductor 542*a*, and the conductor 542*b* are selected in a self-aligned manner with respect to the opening of the insulator 580. In other words, in the transistor 500, the gate electrode can be positioned between the source electrode and the drain electrode in a self-aligned manner. Thus, the conductor 560 can be formed without an alignment margin, resulting in a reduction in the area occupied by the transistor 500. Accordingly, the display device can have higher definition. In addition, the display device can have a narrow bezel.

As illustrated in FIG. 76B, the conductor 560 preferably includes a conductor 560*a* provided inside the insulator 550 and a conductor 560*b* provided to be embedded inside the conductor 560*a*. Although the conductor 560 has a two-layer structure in FIGS. 76B and 76C, the present invention is not limited to this. For example, the conductor 560 may have a single-layer structure or a stacked-layer structure of three or more layers.

The transistor 500 preferably includes the insulator 514 positioned over the substrate (not illustrated); the insulator 516 positioned over the insulator 514; a conductor 505 positioned to be embedded in the insulator 516; the insulator 522 positioned over the insulator 516 and the conductor 505; and the insulator 524 positioned over the insulator 522. The metal oxide 531*a* is preferably provided over the insulator 524.

As illustrated in FIGS. 76B and 76C, an insulator 554 is preferably provided between the insulator 580 and the insulator 522, the insulator 524, the metal oxide 531*a*, the metal oxide 531*b*, the conductor 542*a*, the conductor 542*b*, and the insulator 550. Here, as illustrated in FIGS. 76B and 76C, the insulator 554 is preferably in contact with a side surface of the insulator 550, a top surface and a side surface of the conductor 542*a*, a top surface and a side surface of the conductor 542*b*, a side surface of the metal oxide 531*a*, a side surface of the metal oxide 531*b*, a side surface of the insulator 524, and a top surface of the insulator 522.

The insulator 574 and the insulator 581 functioning as interlayer films are preferably provided over the transistor 500. Here, the insulator 574 is preferably provided in contact with the top surfaces of the conductor 560, the insulator 550, and the insulator 580.

The insulator 522, the insulator 554, and the insulator 574 preferably have a function of inhibiting diffusion of hydrogen (e.g., hydrogen atoms, hydrogen molecules, or both). For example, the insulator 522, the insulator 554, and the insulator 574 preferably have a lower hydrogen permeability than the insulator 524, the insulator 550, and the insulator 580. Moreover, the insulator 522 and the insulator 554 preferably have a function of inhibiting diffusion of oxygen (e.g., oxygen atoms, oxygen molecules, or both). For example, the insulator 522 and the insulator 554 preferably have a lower oxygen permeability than the insulator 524, the insulator 550, and the insulator 580.

A conductor 540 (a conductor 540*a* and a conductor 540*b*) that is electrically connected to the transistor 500 and functions as a plug is preferably provided. An insulator 541 (an insulator 541*a* and an insulator 541*b*) is provided in contact with the side surface of the conductor 540 functioning as a plug. In other words, the insulator 541 is provided in contact with the inner wall of an opening in the insulator 554, the insulator 580, the insulator 574, and the insulator 581. A structure may be employed in which a first conductor of the conductor 540 is provided in contact with the side surface of the insulator 541 and a second conductor of the conductor 540 is provided on the inner side of the first conductor. Here, the top surface of the conductor 540 and a top surface of the insulator 581 can be substantially level with each other. Although the transistor 500 has a structure in which the first conductor of the conductor 540 and the second conductor of the conductor 540 are stacked, the present invention is not limited thereto. For example, the conductor 540 may have a single-layer structure or a stacked-layer structure of three or more layers. In the case where a component has a stacked-layer structure, layers may be distinguished by ordinal numbers corresponding to the formation order.

In the transistor 500, a metal oxide functioning as an oxide semiconductor (hereinafter also referred to as an oxide semiconductor) is preferably used for the metal oxide 531 including the channel formation region (the metal oxide 531*a* and the metal oxide 531*b*). For example, it is preferable to use a metal oxide having a band gap of 2 eV or more, preferably 2.5 eV or more as the metal oxide to be the channel formation region of the metal oxide 531.

The metal oxide preferably contains at least indium (In) or zinc (Zn). In particular, the metal oxide preferably contains indium (In) and zinc (Zn). In addition to them, an element M is preferably contained. As the element M, one or more of aluminum (Al), gallium (Ga), yttrium (Y), tin (Sn), boron (B), titanium (Ti), iron (Fe), nickel (Ni), germanium (Ge), zirconium (Zr), molybdenum (Mo), lanthanum (La), cerium (Ce), neodymium (Nd), hafnium (Hf), tantalum (Ta), tungsten (W), magnesium (Mg), and cobalt (Co) can be used. In particular, the element M is preferably one or more of aluminum (Al), gallium (Ga), yttrium (Y), and tin (Sn). Furthermore, the element M preferably contains one or both of Ga and Sn.

The metal oxide 531*b* in a region that does not overlap with the conductor 542 sometimes have smaller thickness than the metal oxide 531*b* in a region that overlaps with the conductor 542. The thin region is formed when part of a top surface of the metal oxide 531*b* is removed at the time of forming the conductor 542*a* and the conductor 542*b*. When a conductive film to be the conductor 542 is formed, a low-resistance region is sometimes formed on the top surface of the metal oxide 531*b* in the vicinity of the interface with the conductive film. Removing the low-resistance region positioned between the conductor 542*a* and the conductor 542*b* on the top surface of the metal oxide 531*b* in this manner can prevent formation of the channel in the region.

According to one embodiment of the present invention, a display device that includes small-size transistors and thus has high resolution can be provided. A display device that includes a transistor with a high on-state current and thus has high luminance can be provided. A display device that includes a transistor operating at high speed and thus operates at high speed can be provided. A display device that includes a transistor having stable electrical characteristics and thus is highly reliable can be provided. A display device that includes a transistor with a low off-state current and thus has low power consumption can be provided.

The structure of the transistor 500 that can be used in the display device of one embodiment of the present invention is described in detail.

The conductor 505 is placed so as to include a region overlapping with the metal oxide 531 and the conductor 560. Furthermore, the conductor 505 is preferably provided to be embedded in the insulator 516.

The conductor 505 includes a conductor 505*a* and a conductor 505*b*. The conductor 505*a* is provided in contact with a bottom surface and a side wall of an opening provided in the insulator 516. The conductor 505*b* is provided to be embedded in a depressed portion formed by the conductor 505*a*. Here, a top surface of the conductor 505*b* is substantially level with a top surfaces of the conductor 505*a* and the insulator 516.

The conductor 505*a* is preferably formed using a conductive material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, the conductor 505*a* is preferably formed using a conductive material having a function of inhibiting diffusion of oxygen (e.g., oxygen atoms, oxygen molecules, or both).

When the conductor 505*a* is formed using a conductive material having a function of inhibiting diffusion of hydrogen, impurities such as hydrogen contained in the conductor 505*b* can be prevented from diffusing into the metal oxide 531 through the insulator 524 and the like. When the conductor 505*a* is formed using a conductive material having a function of inhibiting diffusion of oxygen, the conductivity of the conductor 505*b* can be inhibited from being lowered because of oxidation. Examples of the conductive material having a function of inhibiting diffusion of oxygen include titanium, titanium nitride, tantalum, tantalum nitride, ruthenium, and ruthenium oxide. Thus, the conductor 505*a* may be a single layer or a stacked layer of the above conductive materials. For example, titanium nitride may be used for the conductor 505*a*.

A conductive material containing tungsten, copper, or aluminum as its main component is preferably used for the conductor 505*b*. For example, tungsten may be used for the conductor 505*b*.

The conductor 560 sometimes functions as a first gate (sometimes referred to as a top gate) electrode. The conductor 505 sometimes functions as a second gate (sometimes referred to as a bottom gate) electrode. In that case, by changing a potential applied to the conductor 505 independently of a potential applied to the conductor 560, $V_{th}$ of the transistor 500 can be controlled. In particular, by applying a negative potential to the conductor 505, $V_{th}$ of the transistor 500 can be increased and the off-state current can be reduced. Thus, a drain current at the time when a potential applied to the conductor 560 is 0 V can be lower in the case where a negative potential is applied to the conductor 505 than in the case where the negative potential is not applied to the conductor 505.

The conductor 505 is preferably provided to be larger than the channel formation region in the metal oxide 531. In particular, it is preferable that the conductor 505 extend beyond an end portion of the metal oxide 531 that intersects with the channel width direction, as illustrated in FIG. 76C. In other words, the conductor 505 and the conductor 560 preferably overlap with each other with the insulator positioned therebetween, in a region outside the side surface of the metal oxide 531 in the channel width direction.

With the above structure, the channel formation region of the metal oxide 531 can be electrically surrounded by electric fields of the conductor 560 functioning as the first gate electrode and electric fields of the conductor 505 functioning as the second gate electrode.

Furthermore, as illustrated in FIG. 76C, the conductor 505 extends to function as a wiring as well. However, without limitation to this structure, a structure in which a conductor functioning as a wiring is provided below the conductor 505 may be employed.

The insulator 514 preferably functions as a barrier insulating film that inhibits the entry of impurities such as water and hydrogen to the transistor 500 from the substrate side.

Accordingly, it is preferable to use, for the insulator 514, an insulating material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom (an insulating material through which the above impurities are less likely to pass). Alternatively, it is preferable to use an insulating material having a function of inhibiting diffusion of oxygen (e.g., an oxygen atom, an oxygen molecule, or both) (an insulating material through which the oxygen is less likely to pass).

For example, aluminum oxide or silicon nitride is preferably used for the insulator 514. Accordingly, it is possible to inhibit diffusion of impurities such as water and hydrogen to the transistor 500 side from the substrate side through the insulator 514. Alternatively, it is possible to inhibit diffusion of oxygen contained in the insulator 524 and the like to the substrate side through the insulator 514.

The dielectric constant of each of the insulator 516, the insulator 580, and the insulator 581 each functioning as an interlayer film is preferably lower than that of the insulator 514. When a material with a low dielectric constant is used for an interlayer film, the parasitic capacitance generated between wirings can be reduced. For example, silicon oxide, silicon oxynitride, silicon nitride oxide, or silicon nitride can be used for the insulator 516, the insulator 580, and the insulator 581. For example, silicon oxide to which fluorine is added, silicon oxide to which carbon is added, silicon oxide to which carbon and nitrogen are added, or silicon oxide having pores can be used for the insulator 516, the insulator 580, and the insulator 581. A material combined with any of the above materials as appropriate may be used for the insulator 516, the insulator 580, and the insulator 581.

The insulator 522 and the insulator 524 function as a gate insulator.

Here, the insulator 524 in contact with the metal oxide 531 preferably release oxygen by heating. In this specification, oxygen that is released by heating is referred to as excess oxygen in some cases. For example, silicon oxide or silicon oxynitride can be used as appropriate for the insulator 524. When an insulator containing oxygen is provided in contact with the metal oxide 531, oxygen vacancies in the metal oxide 531 can be reduced, leading to improved reliability of the transistor 500.

Specifically, an oxide material that releases part of oxygen by heating is preferably used for the insulator 524. An oxide that releases oxygen by heating is an oxide film in which the amount of released oxygen converted into oxygen atoms is greater than or equal to $1.0\times10^{18}$ atoms/$cm^3$, preferably greater than or equal to $1.0\times10^{19}$ atoms/$cm^3$, further preferably greater than or equal to $2.0\times10^{19}$ atoms/$cm^3$ or greater than or equal to $3.0\times10^{20}$ atoms/$cm^3$ in TDS analysis. Note that the temperature of the film surface in the TDS analysis is preferably in the range of 100° C. to 700° C. or 100° C. to 400° C.

Like the insulator 514, the insulator 522 preferably serves as a barrier insulating film that inhibits the entry of impurities such as water and hydrogen into the transistor 500 from the substrate side. The insulator 522 preferably has lower hydrogen permeability than the insulator 524, for example. When the insulator 524, the metal oxide 531, and the insulator 550 are surrounded by the insulator 522, the insulator 554, and the insulator 574, entry of impurities such as water or hydrogen into the transistor 500 from the outside can be inhibited.

Furthermore, it is preferable that the insulator 522 have a function of inhibiting diffusion of oxygen (e.g., an oxygen atom, an oxygen molecule, or both) (it is preferable that the above oxygen be less likely to pass through the insulator 522). For example, the insulator 522 preferably has a lower oxygen permeability than the insulator 524. The insulator 522 preferably has a function of inhibiting diffusion of oxygen or impurities, in which case oxygen contained in the metal oxide 531 can be preventing from diffusing to the substrate side. Moreover, the conductor 505 can be inhibited from reacting with oxygen contained in the insulator 524 or the metal oxide 531.

As the insulator 522, an insulator containing an oxide of one or both of aluminum and hafnium, which is an insulating material, is preferably used. Examples of the insulator containing an oxide of one or both of aluminum and hafnium include aluminum oxide, hafnium oxide, and an oxide containing aluminum and hafnium (hafnium aluminate). In the case where the insulator 522 is formed using such a material, the insulator 522 functions as a layer inhibiting release of oxygen from the metal oxide 531 and the entry of impurities such as hydrogen into the metal oxide 531 from the periphery of the transistor 500.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over the above insulator.

The insulator 522 may be a single layer or a stacked layer using an insulator containing a high-k material, such as aluminum oxide, hafnium oxide, tantalum oxide, zirconium oxide, lead zirconate titanate (PZT), strontium titanate ($SrTiO_3$), or $(Ba,Sr)TiO_3$ (BST). With further miniaturization and higher integration of a transistor, for example, a problem such as generation of leakage current may arise because of a thinned gate insulator. When a high-k material is used for the insulator functioning as a gate insulator, a gate potential at the time of operation of the transistor can be reduced while the physical thickness is maintained.

Note that the insulator 522 and the insulator 524 may each have a stacked-layer structure of two or more layers. In that cases, without limitation to a stacked-layer structure formed of the same material, a stacked-layer structure formed of different materials may be employed. For example, an insulator similar to the insulator 524 may be provided below the insulator 522.

The metal oxide 531 includes the metal oxide 531*a* and the metal oxide 531*b* over the metal oxide 531*a*. When the metal oxide 531 includes the metal oxide 531*a* under the metal oxide 531*b*, it is possible to inhibit diffusion of impurities into the metal oxide 531*b* from the components formed below the metal oxide 531*a*.

Note that the metal oxide 531 preferably has a stacked-layer structure of a plurality of oxide layers that differ in the atomic ratio of metal atoms. For example, in the case where the metal oxide 531 contains at least indium (In) and an element M, the proportion of the number of atoms of the element M contained in the metal oxide 531*a* to the number of atoms of all elements that constitute the metal oxide 531*a* is preferably higher than the proportion of the number of atoms of the element M contained in the metal oxide 531*b* to the number of atoms of all elements that constitute the metal oxide 531*b*. In addition, the atomic ratio of the element M to In in the metal oxide 531*a* is preferably higher than the atomic ratio of the element M to In in the metal oxide 531*b*.

The energy of the conduction band minimum of each of the metal oxide 531*a* is preferably higher than that of the metal oxide 531*b*. In other words, the electron affinity of each of the metal oxide 531*a* is preferably smaller than that of the metal oxide 531*b*.

Here, the energy level of the conduction band minimum gently changes at junction portions between the metal oxide 531*a* and the metal oxide 531*b*. In other words, the energy level of the conduction band minimum at junction portions between the metal oxide 531*a* and the metal oxide 531*b* is continuously varied or are continuously connected. This can be achieved by decreasing the density of defect states in a mixed layer formed at the interface between the metal oxide 531*a* and the metal oxide 531*b*.

Specifically, when the metal oxide 531*a* and the metal oxide 531*b* contain the same element (as a main component) in addition to oxygen, a mixed layer with a low density of defect states can be formed. For example, in the case where the metal oxide 531*b* is an In—Ga—Zn oxide, an In—Ga—Zn oxide, a Ga—Zn oxide, or gallium oxide can be used as the metal oxide 531*a*.

Specifically, as the metal oxide 531*a*, a metal oxide with In:Ga:Zn=1:3:4 [atomic ratio] or 1:1:0.5 [atomic ratio] can be used. As the metal oxide 531*b*, a metal oxide with In:Ga:Zn=1:1:1 [atomic ratio], 4:2:3 [atomic ratio], or 3:1:2 [atomic ratio] can be used.

At this time, the metal oxide 531*b* serves as a main carrier path. When the metal oxide 531*a* has the above structure, the density of defect states at the interface between the metal oxide 531*a* and the metal oxide 531*b* can be made low. This reduces the influence of interface scattering on carrier conduction, and the transistor 500 can have a high on-state current and high frequency characteristics.

The conductor 542 (the conductor 542*a* and the conductor 542*b*) functioning as the source electrode and the drain electrode is provided over the metal oxide 531*b*. For the conductor 542, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing two or more selected from the above metal elements; an alloy containing two or more selected from the above metal elements. For example, for the conductor 542, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that hold their conductivity even when absorbing oxygen.

When the conductor 542 is provided in contact with the metal oxide 531, the oxygen concentration of the metal oxide 531 in the vicinity of the conductor 542 sometimes decreases. In addition, a metal compound layer that contains the metal contained in the conductor 542 and the component of the metal oxide 531 is sometimes formed in the metal oxide 531 in the vicinity of the conductor 542. In such a case, the carrier density of the region in the metal oxide 531 in the vicinity of the conductor 542 increases, and the region becomes a low-resistance region.

Here, the region between the conductor 542*a* and the conductor 542*b* is formed to overlap with the opening of the insulator 580. Accordingly, the conductor 560 can be formed in a self-aligned manner between the conductor 542*a* and the conductor 542*b*.

The insulator 550 serves as a gate insulator. The insulator 550 is preferably provided in contact with the top surface of the metal oxide 531*b*. For the insulator 550, silicon oxide, silicon oxynitride, silicon nitride oxide, or silicon nitride can be used. Alternatively, for the insulator 550, silicon oxide to which fluorine is added, silicon oxide to which carbon is added, silicon oxide to which carbon and nitrogen are added, or silicon oxide having pores can be used. In particular, silicon oxide or silicon oxynitride is preferable because of being thermally stable.

As in the insulator 524, the concentration of impurities such as water or hydrogen in the insulator 550 is preferably reduced. The thickness of the insulator 550 is preferably greater than or equal to 1 nm and less than or equal to 20 nm.

An insulator may be provided between the insulator 550 and the insulator 580, the insulator 554, the conductor 542, and the metal oxide 531*b*. For example, aluminum oxide or hafnium oxide is preferably used for the insulator. Providing the insulator can inhibit at least one of release of oxygen from the metal oxide 531*b*, excessive supply of oxygen to the metal oxide 531*b*, and oxidation of the conductor 542.

A metal oxide may be provided between the insulator 550 and the conductor 560. The metal oxide preferably inhibits oxygen diffusion from the insulator 550 into the conductor 560. Accordingly, oxidation of the conductor 560 due to oxygen in the insulator 550 can be inhibited.

The metal oxide functions as part of the gate insulator in some cases. Therefore, when silicon oxide or silicon oxynitride is used for the insulator 550, a metal oxide that is a high-k material with a high relative permittivity is preferably used as the metal oxide. When the gate insulator has a stacked-layer structure of the insulator 550 and the metal oxide, the stacked-layer structure can be thermally stable and have a high relative permittivity. Accordingly, a gate potential applied during operation of the transistor can be lowered while the physical thickness of the gate insulator is maintained. In addition, the equivalent oxide thickness (EOT) of the insulator functioning as the gate insulator can be reduced.

Specifically, a metal oxide containing one kind or two or more kinds selected from hafnium, aluminum, gallium, yttrium, zirconium, tungsten, titanium, tantalum, nickel, germanium, magnesium, and the like can be used for the metal oxide. In particular, an insulator containing an oxide of one or both of aluminum and hafnium, such as aluminum oxide, hafnium oxide, or an oxide containing aluminum and hafnium (hafnium aluminate) is preferably used for the metal oxide.

Although the conductor 560 has a two-layer structure in FIGS. 76B and 76C, the conductor 560 may have a single-layer structure or a stacked-layer structure of three or more layers.

The conductor 560*a* is preferably formed using the aforementioned conductor having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, it is preferable to use a conductive material having a function of inhibiting diffusion of oxygen (e.g., an oxygen atom, an oxygen molecule, or both).

When the conductor 560*a* has a function of inhibiting diffusion of oxygen, the conductivity of the conductor 560*b* can be inhibited from being lowered because of oxidation due to oxygen contained in the insulator 550. Examples of a conductive material having a function of inhibiting oxygen diffusion include tantalum, tantalum nitride, ruthenium, and ruthenium oxide.

Moreover, a conductive material containing tungsten, copper, or aluminum as its main component is preferably used for the conductor 560*b*. The conductor 560 also functions as a wiring and thus is preferably formed using a conductor having high conductivity. For example, a conductive material containing tungsten, copper, or aluminum as its main component can be used. The conductor 560*b* may have a stacked-layer structure, for example, a stacked-layer structure of titanium or titanium nitride and the above conductive material.

As illustrated in FIG. 76A and FIG. 76C, the side surface of the metal oxide 531 is covered with the conductor 560 in a region where the metal oxide 531*b* does not overlap with the conductor 542, that is, the channel formation region of the metal oxide 531. Accordingly, electric fields of the conductor 560 functioning as the first gate electrode are likely to act on the side surface of the metal oxide 531. Thus, the on-state current of the transistor 500 can be increased and the frequency characteristics can be improved.

Like the insulator 514, the insulator 554 preferably serves as a barrier insulating film that inhibits the entry of impurities such as water and hydrogen into the transistor 500 from the insulator 580 side. The insulator 554 preferably has lower hydrogen permeability than the insulator 524, for example. Furthermore, as illustrated in FIGS. 76B and 76C, the insulator 554 is preferably in contact with the side surface of the insulator 550, the top surface and the side surface of the conductor 542*a*, the top surface and the side surface of the conductor 542*b*, the side surface of the metal oxide 531*a*, the side surface of the metal oxide 531*b*, and the side surface of the insulator 524. Such a structure can inhibit the entry of hydrogen contained in the insulator 580 into the metal oxide 531 through the top surfaces or side surfaces of the conductor 542*a*, the conductor 542*b*, the metal oxide 531*a*, the metal oxide 531*b*, and the insulator 524.

Furthermore, it is preferable that the insulator 554 have a function of inhibiting diffusion of oxygen (e.g., an oxygen atom, an oxygen molecule, or both) (it is preferable that the above oxygen be less likely to pass through the insulator 554). For example, the insulator 554 preferably has lower oxygen permeability than the insulator 580 or the insulator 524.

The insulator 554 is preferably formed by a sputtering method. When the insulator 554 is formed by a sputtering method in an oxygen-containing atmosphere, oxygen can be added to the vicinity of a region of the insulator 524 that is in contact with the insulator 554. Thus, oxygen can be supplied from the region to the metal oxide 531 through the insulator 524. Here, with the insulator 554 having a function of inhibiting upward oxygen diffusion, oxygen can be prevented from diffusing from the metal oxide 531 into the insulator 580. Moreover, with the insulator 522 having a function of inhibiting downward oxygen diffusion, oxygen can be prevented from diffusing from the metal oxide 531 to the substrate side. In the above manner, oxygen is supplied to the channel formation region of the metal oxide 531. Accordingly, oxygen vacancies in the metal oxide 531 can be reduced, so that the transistor can be prevented from having normally-on characteristics (a state in which a channel exists and a current flows through a transistor when a voltage of 0 V is applied between a gate and a source).

As the insulator 554, an insulator containing an oxide of one or both of aluminum and hafnium is preferably formed, for example. Examples of the insulator containing an oxide of one or both of aluminum and hafnium include aluminum oxide, hafnium oxide, and an oxide containing aluminum and hafnium (hafnium aluminate).

The insulator 580 is provided over the insulator 524, the metal oxide 531, and the conductor 542 with the insulator 554 therebetween. The insulator 580 preferably includes, for example, silicon oxide, silicon oxynitride, silicon nitride oxide, silicon oxide to which fluorine is added, silicon oxide to which carbon is added, silicon oxide to which carbon and nitrogen are added, or porous silicon oxide. In particular, silicon oxide and silicon oxynitride are preferable because they are thermally stable. In particular, materials such as silicon oxide, silicon oxynitride, and porous silicon oxide are preferably used, in which case a region containing oxygen released by heating can be easily formed.

The concentration of impurities such as water and hydrogen in the insulator 580 is preferably reduced. In addition, the top surface of the insulator 580 may be planarized.

Like the insulator 514, the insulator 574 preferably functions as a barrier insulating film that inhibits the entry of impurities such as water or hydrogen into the insulator 580 from the above. As the insulator 574, for example, the insulator that can be used as the insulator 514 or the insulator 554 can be used.

The insulator 581 functioning as an interlayer film is preferably provided over the insulator 574. As in the insulator 524 or the like, the concentration of impurities such as water and hydrogen in the insulator 581 is preferably reduced.

A conductor 540*a* and a conductor 540*b* are provided in the openings formed in the insulator 581, the insulator 574, the insulator 580, and the insulator 554. The conductors 540*a* and 540*b* are provided to face each other with the conductor 560 positioned therebetween. Note that it is preferable that the top surfaces of the conductors 540*a* and 540*b* be substantially level with the top surface of the insulator 581.

The insulator 541*a* is provided in contact with the inner walls of the openings in the insulator 581, the insulator 574, the insulator 580, and the insulator 554, and the first conductor of the conductor 540*a* is formed in contact with the side surface of the insulator 541*a*. The conductor 542*a* is positioned on at least part of the bottom portion of the opening, and the conductor 540*a* is in contact with the conductor 542*a*. Similarly, the insulator 541*b* is provided in contact with the inner walls of the openings in the insulator 581, the insulator 574, the insulator 580, and the insulator 554, and the first conductor of the conductor 540*b* is formed in contact with the side surface of the insulator 541*b*. The conductor 542*b* is positioned on at least part of the bottom portion of the opening, and the conductor 540*b* is in contact with the conductor 542*b*.

The conductors 540*a* and 540*b* are preferably formed using a conductive material containing tungsten, copper, or aluminum as its main component. The conductors 540*a* and 540*b* may have a stacked-layer structure.

In the case where the conductor 540 has a stacked structure, for a conductor in contact with the conductor 542, the insulator 554, the insulator 580, the insulator 574, and the insulator 581, the above-described conductor having a function of inhibiting diffusion of impurities such as water and hydrogen is preferably used. For example, tantalum, tantalum nitride, titanium, titanium nitride, ruthenium, or ruthenium oxide is preferably used for the conductor. The conductor having a function of inhibiting diffusion of impurities such as water and hydrogen may have a single-layer structure or a stacked structure. The use of the conductor can inhibit oxygen added to the insulator 580 from being absorbed by the conductors 540*a* and 540*b*. Moreover, impurities such as water and hydrogen can be inhibited from entering the metal oxide 531 through the conductors 540*a* and 540*b* from a layer above the insulator 581.

As the insulator 541*a* and the insulator 541*b*, for example, the insulator that can be used as the insulator 554 can be used. Since the insulator 541*a* and the insulator 541*b* are provided in contact with the insulator 554, impurities such as water and hydrogen in the insulator 580 can be inhibited from entering the metal oxide 531 through the conductors 540*a* and 540*b*. Furthermore, oxygen contained in the insulator 580 can be prevented from being absorbed by the conductors 540*a* and 540*b*.

Although not illustrated, a conductor functioning as a wiring may be provided in contact with the top surfaces of the conductors 540*a* and 540*b*. For the conductor functioning as a wiring, a conductive material containing tungsten, copper, or aluminum as its main component is preferably used. Furthermore, the conductor may have a stacked-layer structure and may be a stack of titanium or a titanium nitride and any of the above conductive materials, for example. Note that the conductor may be formed to be embedded in an opening provided in an insulator.

<Materials for Transistor>

Materials that can be used for the transistor 500 will be described.

[Substrate]

As a substrate over which the transistor 500 is formed, for example, an insulator substrate, a semiconductor substrate, or a conductor substrate may be used. Examples of the insulator substrate include a glass substrate, a quartz substrate, a sapphire substrate, a stabilized zirconia substrate (e.g., an yttria-stabilized zirconia substrate), and a resin substrate. An example of the semiconductor substrate is a semiconductor substrate containing silicon or germanium. Another example of the semiconductor substrate is a compound semiconductor substrate containing silicon carbide, silicon germanium, gallium arsenide, indium phosphide, zinc oxide, or gallium oxide. Another example of the semiconductor substrate is a semiconductor substrate in which an insulator region is provided in the above-described semiconductor substrate, e.g., an SOI substrate. Examples of the conductor substrate include a graphite substrate, a metal substrate, an alloy substrate, and a conductive resin substrate. Other examples of the conductor substrate include a substrate containing a metal nitride and a substrate containing a metal oxide. Other examples of the conductor substrate include an insulator substrate provided with a conductor or a semiconductor, a semiconductor substrate provided with a conductor or an insulator, and a conductor substrate provided with a semiconductor or an insulator. Alternatively, these substrates provided with elements may be used. Examples of the element provided over the substrate include a capacitor, a register, a switching element, a light-emitting element, and a memory element.

[Insulator]

Examples of an insulator include an oxide, a nitride, an oxynitride, a nitride oxide, a metal oxide, a metal oxynitride, and a metal nitride oxide, each of which has an insulating property.

With further miniaturization or higher integration of a transistor, for example, a problem such as generation of leakage current may arise because of a thinned gate insulator. When a high-k material is used for the insulator functioning as a gate insulator, the voltage at the time of operation of the transistor can be reduced while the physical thickness is maintained. By contrast, when a material with a low relative permittivity is used for the insulator functioning as an interlayer film, parasitic capacitance generated between wirings can be reduced. Thus, a material is preferably selected depending on the function of an insulator.

Examples of the insulator having a high relative permittivity include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator having a low relative permittivity include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor including an oxide semiconductor is surrounded by insulators having a function of inhibiting the passage of oxygen and impurities such as water and hydrogen (e.g., the insulator 514, the insulator 522, the insulator 554, and the insulator 574), the electrical characteristics of the transistor can be stable. An insulator having a function of inhibiting the passage of oxygen and impurities such as water and hydrogen can be formed to have a single layer or a stacked layer including an insulator containing one or more selected from boron, carbon, nitrogen, oxygen, fluorine, magnesium, aluminum, silicon, phosphorus, chlorine, argon, gallium, germanium, yttrium, zirconium, lanthanum, neodymium, hafnium, and tantalum. Specifically, as the insulator having a function of inhibiting the passage of oxygen and impurities such as water and hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide or a metal nitride such as aluminum nitride, aluminum titanium nitride, titanium nitride, silicon nitride oxide, or silicon nitride can be used. Examples of the insulator having a function of inhibiting the passage of oxygen and impurities such as water and hydrogen include metal nitride such as aluminum nitride, aluminum titanium nitride, titanium nitride, silicon nitride oxide, and silicon nitride.

An insulator functioning as a gate insulator preferably includes a region containing oxygen released by heating. For example, a structure where silicon oxide or silicon oxynitride that includes a region containing oxygen released by heating is provided in contact with the metal oxide 531 can compensate for oxygen vacancies in the metal oxide 531.

[Conductor]

For a conductor, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements; an alloy containing a combination of the above metal elements; or the like. Alternatively, for the conductor, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen. Alternatively, for the conductor, silicide (e.g., nickel silicide) or a semiconductor with high electrical conductivity typified by polycrystalline silicon containing an impurity element (e.g., phosphorus) may be used, for example.

A plurality of conductors formed using any of the above materials may be stacked. For example, a stacked-layer structure combining a material containing the above metal element and a conductive material containing oxygen may be employed. Alternatively, a stacked-layer structure combining a material containing the above metal element and a conductive material containing nitrogen may be employed. Further alternatively, a stacked-layer structure combining a material containing the above metal element, a conductive material containing oxygen, and a conductive material containing nitrogen may be employed.

In the case where a metal oxide is used for the channel formation region of the transistor, the conductor functioning as the gate electrode preferably employs a stacked-layer structure combining a material containing the above metal element and a conductive material containing oxygen. In that case, the conductive material containing oxygen is preferably provided on the channel formation region side. When the conductive material containing oxygen is provided on the channel formation region side, oxygen released from the conductive material is easily supplied to the channel formation region.

It is particularly preferable to use, for the conductor functioning as the gate electrode, a conductive material containing oxygen and a metal element contained in a metal oxide where the channel is formed. As another example, a conductive material containing the above metal element and nitrogen may be used for the conductor. As another example, a conductive material containing nitrogen, such as titanium nitride or tantalum nitride, may be used for the conductor. As another example, indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used for the conductor. As another example, indium gallium zinc oxide containing nitrogen may be used for the conductor. With the use of such a material, hydrogen contained in the metal oxide where the channel is formed can be captured in some cases. Alternatively, hydrogen entering from an external insulator or the like can be captured in some cases.

The structures described in this embodiment can be used in combination with any of the structures described in the other embodiments as appropriate.

Embodiment 6

Described in this embodiment is a metal oxide (hereinafter also referred to as an oxide semiconductor) applicable to an OS transistor described in the above embodiments.

A metal oxide used in an OS transistor preferably contains at least indium or zinc, and further preferably contains indium and zinc. The metal oxide preferably contains indium, M (M is one or more of gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example. Specifically, M is preferably one or more of gallium, aluminum, yttrium, and tin and is further preferably gallium. The metal oxide can be formed by a sputtering method, a chemical vapor deposition (CVD) method such as a metal organic chemical vapor deposition (MOCVD) method, an atomic layer deposition (ALD) method, or the like.

Hereinafter, an oxide containing indium (In), gallium (Ga), and zinc (Zn) is described as an example of the metal oxide. Note that an oxide containing indium (In), gallium (Ga), and zinc (Zn) may be referred to as an In—Ga—Zn oxide.

<Classification of Crystal Structure>

Examples of a crystal structure of an oxide semiconductor include amorphous (including completely amorphous), c-axis-aligned crystalline (CAAC), nanocrystalline (nc), cloud-aligned composite (CAC), single crystal, and polycrystalline structures.

A crystal structure of a film or a substrate can be analyzed with an X-ray diffraction (XRD) spectrum. For example, evaluation is possible using an XRD spectrum which is obtained by grazing-incidence XRD (GIXD) measurement. Note that a GIXD method is also referred to as a thin film method or a Seemann-Bohlin method. Hereinafter, an XRD spectrum obtained from GIXD measurement is simply referred to as an XRD spectrum in some cases.

For example, the peak of the XRD spectrum of a quartz glass substrate has a substantially bilaterally symmetrical shape. On the other hand, the peak of the XRD spectrum of an In—Ga—Zn oxide film having a crystal structure has a bilaterally asymmetrical shape. The bilaterally asymmetrical peak of the XRD spectrum shows the existence of crystal in the film or the substrate. In other words, the crystal structure of the film or the substrate cannot be regarded as "amorphous" unless it has a bilaterally symmetrical peak in the XRD spectrum.

The crystal structure of a film or a substrate can be analyzed with a diffraction pattern obtained by nanobeam electron diffraction (NBED) (also referred to as a nanobeam electron diffraction pattern). For example, a halo pattern is observed in the diffraction pattern of a quartz glass substrate, which indicates that the quartz glass substrate is in an amorphous state. Furthermore, not a halo pattern but a spot-like pattern is observed in the diffraction pattern of an In—Ga—Zn oxide film formed at room temperature. Thus, it is presumed that the In—Ga—Zn oxide film formed at room temperature is in an intermediate state, which is neither a single crystal or polycrystalline state nor an amorphous state, and that it cannot be concluded that the In—Ga—Zn oxide film is in an amorphous state.

<<Structure of Oxide Semiconductor>>

Oxide semiconductors may be classified in a manner different from the above-described one when classified in terms of the structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Next, the CAAC-OS, nc-OS, and a-like OS will be described in detail.

[CAAC-OS]

The CAAC-OS is an oxide semiconductor that has a plurality of crystal regions each of which has c-axis alignment in a particular direction. Note that the particular direction refers to the thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the maximum diameter of the crystal region may be approximately several tens of nanometers.

In the case of an In—Ga—Zn oxide, the CAAC-OS tends to have a layered crystal structure (also referred to as a stacked-layer structure) in which a layer containing indium (In) and oxygen (hereinafter, an In layer) and a layer containing gallium (Ga), zinc (Zn), and oxygen (hereinafter, an (Ga,Zn) layer) are stacked. Indium and gallium can be replaced with each other. Therefore, indium may be contained in the (Ga,Zn) layer. In addition, gallium may be contained in the In layer. Note that zinc may be contained in the In layer. Such a layered structure is observed as a lattice image in a high-resolution transmission electron microscope (TEM) image, for example.

When the CAAC-OS film is subjected to structural analysis by out-of-plane XRD measurement with an XRD apparatus using θ/2θ scanning, for example, a peak indicating c-axis alignment is detected at or around 2θ=31°. Note that the position of the peak indicating c-axis alignment (the value of 2θ) may change depending on the kind or composition of the metal element contained in the CAAC-OS.

For example, a plurality of bright spots are observed in the electron diffraction pattern of the CAAC-OS film. Note that one spot and another spot are symmetric with respect to a spot of the incident electron beam which passes through a sample (also referred to as a direct spot).

When the crystal region is observed from the particular direction, a lattice arrangement in the crystal region is basically a hexagonal lattice arrangement; however, a unit lattice is not always a regular hexagon and is a non-regular hexagon in some cases. For example, a pentagonal lattice arrangement or a heptagonal lattice arrangement is included in the distortion in some cases. Note that a clear grain boundary cannot be observed even in the vicinity of the distortion in the CAAC-OS. That is, formation of a grain boundary is inhibited by the distortion of a lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear grain boundary is observed is what is called a polycrystal structure. It is highly probable that the grain boundary becomes a recombination center and traps carriers and thus decreases the on-state current and/or field-effect mobility of a transistor, for example. Hence, the CAAC-OS in which no clear grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a grain boundary as compared with an In oxide.

The CAAC-OS is an oxide semiconductor with high crystallinity in which no clear grain boundary is observed. Thus, in the CAAC-OS, a reduction in electron mobility due to the grain boundary is less likely to occur. Entry of impurities and/or formation of defects might decrease the crystallinity of an oxide semiconductor. This means that the CAAC-OS can be referred to as an oxide semiconductor having small amounts of impurities and defects (e.g., oxygen vacancies).

Therefore, an oxide semiconductor including the CAAC-OS is physically stable. Accordingly, the oxide semiconductor including the CAAC-OS is resistant to heat and has high reliability. In addition, the CAAC-OS is stable with respect to high temperatures in the manufacturing process (i.e., thermal budget). Accordingly, the use of the CAAC-OS for the OS transistor can extend a degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. There is no regularity of crystal orientation between different nanocrystals in the nc-OS. Hence, the orientation in the whole film is not observed. Accordingly, the nc-OS cannot be distinguished from an a-like OS or an amorphous oxide semiconductor by some analysis methods. For example, when an nc-OS film is subjected to structural analysis by out-of-plane XRD measurement with an XRD apparatus using θ/2θ scanning, a peak indicating crystallinity is not observed. Furthermore, a halo pattern is shown in a selected-area electron diffraction pattern of the nc-OS film obtained using an electron beam having a probe diameter larger than the diameter of a nanocrystal (e.g., larger than or equal to 50 nm). Meanwhile, in some cases, a plurality of spots in a ring-like region with a direct spot as the center are observed in a nanobeam electron diffraction pattern of the nc-OS film obtained using an electron beam with a probe diameter nearly equal to or smaller than the diameter of a nanocrystal (e.g., 1 nm or larger and 30 nm or smaller).

[a-like OS]

The a-like OS is an oxide semiconductor having a structure between those of the nc-OS and the amorphous oxide semiconductor. The a-like OS has a void or a low-density region. That is, the a-like OS has lower crystallinity than the nc-OS and the CAAC-OS. Moreover, the a-like OS has higher hydrogen concentration than the nc-OS and the CAAC-OS.

<<Composition of Oxide Semiconductor>>

Next, the CAC-OS will be described in detail. Note that the CAC-OS relates to the material composition.

[CAC-OS]

The CAC-OS refers to a composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that in the following description of a metal oxide, a state in which one or more types of metal elements are unevenly distributed and regions including the metal element(s) are mixed is referred to as a mosaic pattern or a patch-like pattern. The regions each have a size greater than or equal to 0.5 nm and less than or equal to 10 nm, preferably greater than or equal to 1 nm and less than or equal to 3 nm, or a similar size.

The CAC-OS also refers to a composition in which materials are separated into a first region and a second region to form a mosaic pattern, and the first regions are distributed in the film. This composition is hereinafter also referred to as a cloud-like composition. That is, the CAC-OS is a composite metal oxide having a composition in which the first regions and the second regions are mixed.

Here, the atomic ratios of In, Ga, and Zn to a metal element included in a CAC-OS in an In—Ga—Zn oxide are expressed as [In], [Ga], and [Zn], respectively. For example, the first region in the CAC-OS in the In—Ga—Zn oxide has [In] higher than that in the composition of the CAC-OS film. Moreover, the second region of the CAC-OS in the In—Ga—Zn oxide has [Ga] higher than that in the composition of the CAC-OS film. Alternatively, for example, the first region has higher [In] and lower [Ga] than the second region. Moreover, the second region has higher [Ga] and lower [In] than the first region.

Specifically, the first region includes indium oxide or indium zinc oxide as its main component. The second region includes gallium oxide or gallium zinc oxide as its main component. That is, the first region can be referred to as a region containing In as its main component. The second region can be referred to as a region containing Ga as its main component.

Note that a clear boundary between the first region and the second region cannot be observed in some cases.

In a material composition of a CAC-OS in an In—Ga—Zn oxide that contains In, Ga, Zn, and O, regions containing Ga as a main component are observed in part of the CAC-OS and regions containing In as a main component are observed in part thereof. These regions randomly exist to form a mosaic pattern. Thus, it is suggested that the CAC-OS has a structure in which metal elements are unevenly distributed.

The CAC-OS can be formed by a sputtering method under a condition where a substrate is not heated, for example. In the case of forming the CAC-OS by a sputtering method, one or more selected from an inert gas (typically, argon), an oxygen gas, and a nitrogen gas can be used as a deposition gas. The proportion of the flow rate of an oxygen gas in the total flow rate of the deposition gas during deposition is preferably as low as possible. For example, the proportion of the flow rate of an oxygen gas in the total flow rate of the deposition gas is preferably higher than or equal to 0% and lower than 30%, further preferably higher than or equal to 0% and lower than or equal to 10%.

For example, energy dispersive X-ray spectroscopy (EDX) is used to obtain EDX mapping, and according to the EDX mapping, the CAC-OS in the In—Ga—Zn oxide has a composition in which the regions containing In as a main component (the first regions) and the regions containing Ga as a main component (the second regions) are unevenly distributed and mixed.

Here, the first region has a higher conductivity than the second region. In other words, when carriers flow through the first region, the conductivity of a metal oxide is exhibited. Accordingly, when the first regions are distributed in a metal oxide as a cloud, high field-effect mobility (μ) can be achieved.

The second region has a higher insulating property than the first region. In other words, when the second regions are distributed in a metal oxide, leakage current can be inhibited.

Thus, in the case where the CAC-OS is used for a transistor, a switching function (on/off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current (Ion), high field-effect mobility (u), and excellent switching operation can be achieved A transistor including the CAC-OS is highly reliable. Thus, the CAC-OS is suitably used in a variety of semiconductor devices typified by a display apparatus.

An oxide semiconductor can have any of various structures that show various different properties. Two or more of an amorphous oxide semiconductor, a polycrystalline oxide semiconductor, an a-like OS, the CAC-OS, an nc-OS, and the CAAC-OS may be included in an oxide semiconductor of one embodiment of the present invention.

<Transistor Including Oxide Semiconductor>

Next, a transistor including the above oxide semiconductor will be described.

When the oxide semiconductor is used for a transistor, the transistor can have high field-effect mobility. In addition, the transistor can have high reliability.

It is particularly preferable that an oxide containing indium (In), gallium (Ga), and zinc (Zn) (also referred to as IGZO) be used for the semiconductor layer where a channel is formed. Alternatively, an oxide containing indium (In), aluminum (Al), and zinc (Zn) (also referred to as IAZO) may be used for the semiconductor layer. Alternatively, an oxide containing indium (In), aluminum (Al), gallium (Ga), and zinc (Zn) (also referred to as IAGZO) may be used for the semiconductor layer.

An oxide semiconductor having a low carrier concentration is preferably used for the transistor. For example, the carrier concentration of an oxide semiconductor is lower than or equal to $1\times10^{17}$ $cm^{-3}$, preferably lower than or equal to $1\times10^{15}$ $cm^{-3}$, further preferably lower than or equal to $1\times10^{13}$ $cm^{-3}$, still further preferably lower than or equal to $1\times10^{11}$ $cm^{-3}$, yet further preferably lower than $1\times10^{10}$ $cm^{-3}$, and higher than or equal to $1\times10^{-9}$ $cm^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Charges trapped by the trap states in an oxide semiconductor take a long time to be released and may behave like fixed charges. A transistor whose channel formation region is formed in an oxide semiconductor having a high density of trap states has unstable electrical characteristics in some cases.

In order to obtain stable electrical characteristics of the transistor, reducing the concentration of impurities in the oxide semiconductor is effective. In order to reduce the impurity concentration in the oxide semiconductor, the impurity concentration in a film that is adjacent to the oxide semiconductor is preferably reduced. Examples of impurities include hydrogen, nitrogen, alkali metal, alkaline earth metal, iron, nickel, and silicon. Note that an impurity in an oxide semiconductor refers to, for example, elements other than the main components of the oxide semiconductor. For example, an element with a concentration lower than 0.1 atomic % is regarded as an impurity.

<Impurities>

The influence of impurities in the oxide semiconductor will be described.

When silicon or carbon, which is a Group 14 element, is contained in an oxide semiconductor, defect states are formed in the oxide semiconductor. Thus, the concentration of silicon or carbon in the oxide semiconductor (the concentration measured by secondary ion mass spectrometry (SIMS)) is lower than or equal to $2\times10^{18}$ atoms/cm$^3$, preferably lower than or equal to $2\times10^{17}$ atoms/cm$^3$.

When the oxide semiconductor contains alkali metal or alkaline earth metal, defect states are formed and carriers are generated in some cases. Accordingly, a transistor including an oxide semiconductor that contains alkali metal or alkaline earth metal tends to become normally-on. Thus, the concentration of alkali metal or alkaline earth metal in the oxide semiconductor, which is measured by SIMS, is lower than or equal to $1\times10^{18}$ atoms/cm$^3$, preferably lower than or equal to $2\times10^{16}$ atoms/cm$^3$.

An oxide semiconductor containing nitrogen easily becomes n-type by generation of electrons serving as carriers and an increase in carrier concentration. As a result, a transistor including, as a semiconductor, an oxide semiconductor that contains nitrogen tends to become normally-on. When nitrogen is contained in the oxide semiconductor, a trap state is sometimes formed. This might make the electrical characteristics of the transistor unstable. Thus, the concentration of nitrogen in the oxide semiconductor, which is measured by SIMS, is lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in an oxide semiconductor reacts with oxygen bonded to a metal atom to be water, and thus causes an oxygen vacancy in some cases. Entry of hydrogen into the oxygen vacancy generates an electron serving as a carrier in some cases. Furthermore, some hydrogen may react with oxygen bonded to a metal atom and generate an electron serving as a carrier. Thus, a transistor including an oxide semiconductor that contains hydrogen tends to become normally-on. For this reason, hydrogen in the oxide semiconductor is preferably reduced as much as possible. Specifically, the concentration of hydrogen in the oxide semiconductor, which is measured by SIMS, is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for a channel formation region in a transistor, the transistor can have stable electrical characteristics.

The structures described in this embodiment can be used in combination with any of the structures described in the other embodiments as appropriate.

Embodiment 7

This embodiment will describe a display module that can be used in the electronic device of one embodiment of the present invention.

Structure Example of Display Module

First, a display module including the display apparatus that can be used in an electronic device of one embodiment of the present invention is described.

Figure 77A:
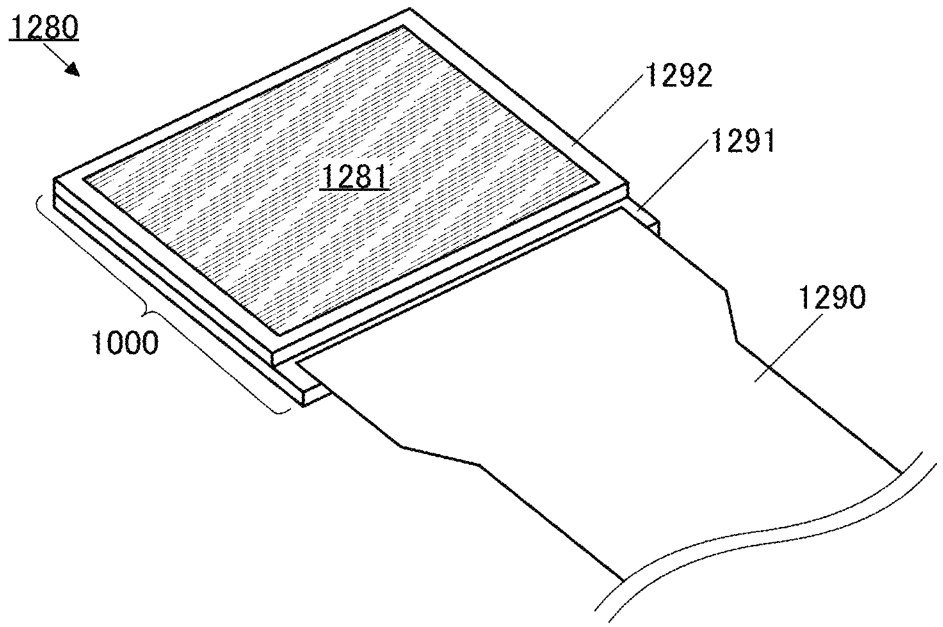
FIGS. 77A and 77B illustrate structure examples of a display module.

FIG. 77A is a perspective view of a display module 1280. The display module 1280 includes the display apparatus 1000 and an FPC 1290.

The display module 1280 includes a substrate 1291 and a substrate 1292. The display module 1280 includes a display portion 1281. The display portion 1281 is a region of the display module 1280 where an image is displayed and is a region where light emitted from pixels provided in a pixel portion 1284 described later can be seen.

Figure 77B:
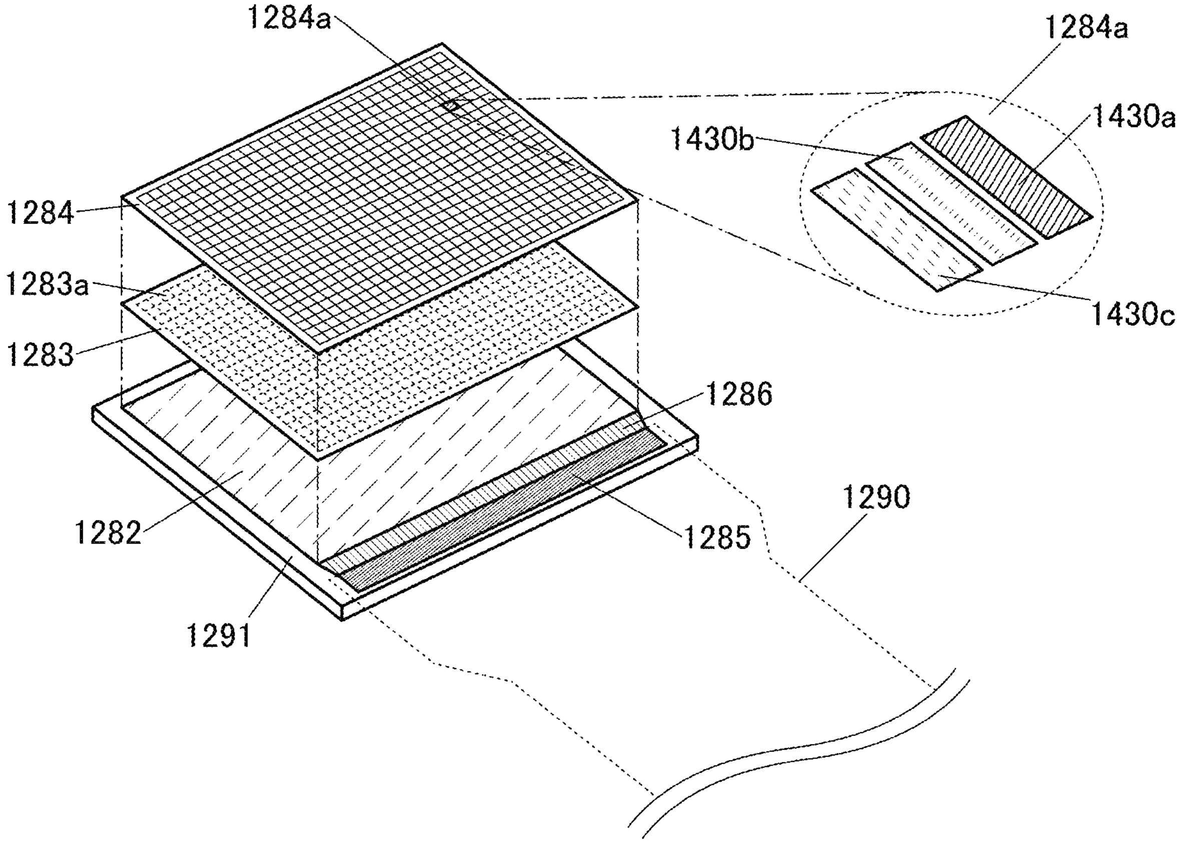

FIG. 77B is a perspective view schematically illustrating a structure on the substrate 1291 side. Over the substrate 1291, a circuit portion 1282, a pixel circuit portion 1283 over the circuit portion 1282, and the pixel portion 1284 over the pixel circuit portion 1283 are stacked. In addition, a terminal portion 1285 for connection to the FPC 1290 is included in a portion not overlapping with the pixel portion 1284 over the substrate 1291. The terminal portion 1285 and the circuit portion 1282 are electrically connected to each other through a wiring portion 1286 formed of a plurality of wirings.

Note that the pixel portion 1284 and the pixel circuit portion 1283 correspond to the pixel layer PXAL described above, for example. The circuit portion 1282 corresponds to the circuit layer SICL described above, for example.

The pixel portion 1284 includes a plurality of pixels 1284*a* arranged periodically. An enlarged view of one pixel 1284*a* is illustrated on the right side in FIG. 77B. The pixel 1284*a* includes a light-emitting device 1430*a*, a light-emitting device 1430*b*, and a light-emitting device 1430*c* whose emission colors are different from each other. Note that the light-emitting device 1430*a*, the light-emitting device 1430*b*, and the light-emitting device 1430*c* correspond to, for example, the light-emitting device 130R, the light-emitting device 130G, and the light-emitting device 130B. The above-described light-emitting devices may be arranged in a stripe pattern as illustrated in FIG. 77B. Alternatively, a variety of kinds of patterns such as a delta pattern or a PenTile pattern can be employed.

The pixel circuit portion 1283 includes a plurality of pixel circuits 1283*a* arranged periodically.

One pixel circuit 1283*a* is a circuit that controls light emission from three light-emitting devices included in one pixel 1284*a*. One pixel circuit 1283*a* may be provided with three circuits each of which controls light emission of one light-emitting device. For example, the pixel circuit 1283*a* can include at least one selection transistor, one current control transistor (driving transistor), and a capacitor for one light-emitting device. A gate signal is input to a gate of the selection transistor, and a source signal is input to one of a source and a drain of the selection transistor. With such a structure, an active-matrix display apparatus is achieved.

The circuit portion 1282 includes a circuit for driving the pixel circuits 1283*a* in the pixel circuit portion 1283. For example, one or both of a gate line driver circuit and a source line driver circuit are preferably included. In addition, at least one of an arithmetic circuit, a memory circuit, a power supply circuit, and the like may be included.

The FPC 1290 serves as a wiring for supplying an image signal, a power supply potential, or the like to the circuit portion 1282 from the outside. An IC may be mounted on the FPC 1290.

The display module 1280 can have a structure in which one or both of the pixel circuit portion 1283 and the circuit portion 1282 are stacked below the pixel portion 1284; thus, the aperture ratio (the effective display area ratio) of the display portion 1281 can be significantly high. For example, the aperture ratio of the display portion 1281 can be higher than or equal to 40% and lower than 100%, preferably higher than or equal to 50% and lower than or equal to 95%, and further preferably higher than or equal to 60% and lower than or equal to 95%. Furthermore, the pixels 1284*a* can be arranged extremely densely and thus the display portion 1281 can have greatly high resolution. For example, the pixels 1284*a* are preferably arranged in the display portion 1281 with a resolution higher than or equal to 2000 ppi, preferably higher than or equal to 3000 ppi, further preferably higher than or equal to 5000 ppi, still further preferably higher than or equal to 6000 ppi, and lower than or equal to 20000 ppi or lower than or equal to 30000 ppi.

Such a display module 1280 has extremely high resolution, and thus can be suitably used for a device for VR such as a head-mounted display or a glasses-type device for AR. For example, even in the case of a structure in which the display portion of the display module 1280 is seen through a lens, pixels of the extremely-high-resolution display portion 1281 included in the display module 1280 are prevented from being seen when the display portion is enlarged by the lens, so that display providing a high sense of immersion can be performed. Without being limited thereto, the display module 1280 can be suitably used for electronic devices including a relatively small display portion. For example, the display module 1280 can be favorably used in a display portion of an electronic device to be worn on a human body, such as a wrist-watch type electronic device.

Note that this embodiment can be combined with any of the other embodiments in this specification as appropriate.

Embodiment 8

In this embodiment, an example of a head-mounted display including a display apparatus will be described as an example of an electronic device of one embodiment of the present invention.

Figure 78A:
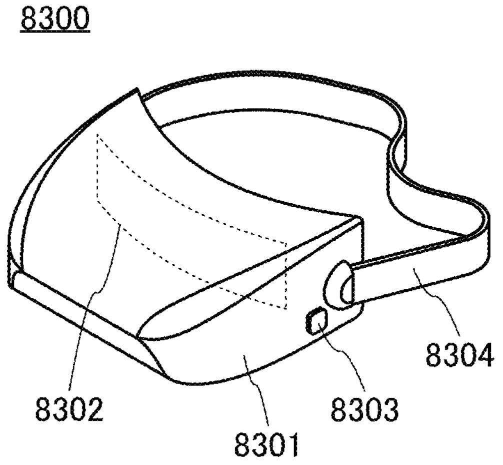
FIGS. 78A to 78F illustrate structure examples of electronic devices.
Figure 78B:
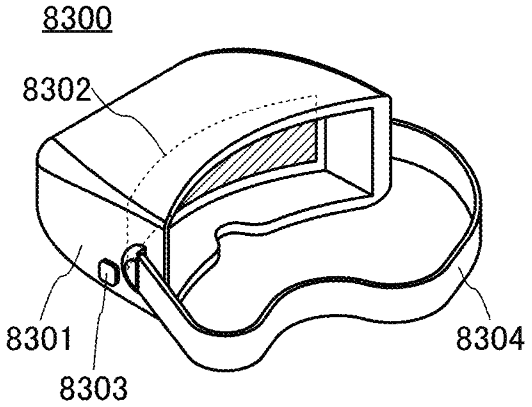

FIGS. 78A and 78B are external views of an electronic device 8300, which is a head-mounted display.

The electronic device 8300 includes a housing 8301, a display portion 8302, an operation button 8303, and a band-like fixing member 8304.

The operation button 8303 functions as a power button or the like. The electronic device 8300 may include another button in addition to the operation button 8303.

Figure 78C:
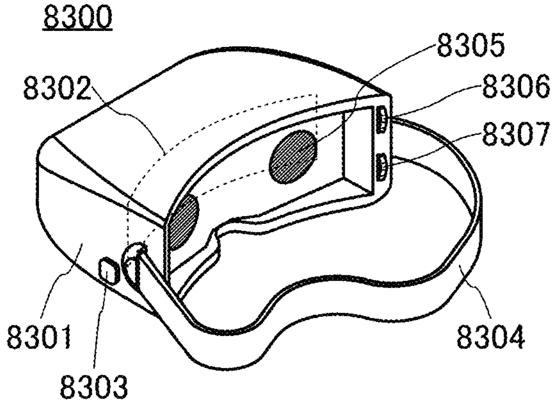

As shown in FIG. 78C, lenses 8305 may be provided between the display portions 8302 and the user's eyes. The user can see magnified images on the display portions 8302 through the lenses 8305, thereby having a more realistic sensation. In this case, as shown in FIG. 78C, a dial 8306 for changing the position of the lenses and adjusting visibility may be provided.

As the display portion 8302, a display apparatus with extremely high definition is preferably used, for example. With use of a display apparatus with extremely high definition for the display portion 8302, even when the display portion 8302 is enlarged by the lens 8305 as illustrated in FIG. 78C, a more realistic image can be displayed without user's visual recognition of pixels.

FIGS. 78A to 78C show examples in which the head-mounted display includes one display portion 8302. Such a structure can reduce the number of components.

The display portion 8302 can display an image for the right eye and an image for the left eye side by side on a right region and a left region, respectively. Thus, a three-dimensional image using binocular disparity can be displayed.

One image which can be seen with both eyes may be displayed on the entire display portion 8302. Thus, a panorama image can be displayed from end to end of the field of view, which can provide a higher sense of reality.

Here, the electronic device 8300 preferably has a mechanism for optimizing the curvature of the display portion 8302 in accordance with the size of the user's head, the position of the user's eyes, or the like. For example, the user himself/herself may adjust the curvature of the display portion 8302 by operating a dial 8307 for adjusting the curvature of the display portion 8302. Alternatively, the electronic device 8300 may include a sensor for detecting the size of the user's head, or the position of the user's eyes (e.g., a camera, a contact sensor, and a noncontact sensor) on the housing 8301 and have a mechanism for adjusting the curvature of the display portion 8302 on the basis of data detected by the sensor.

In the case where the lenses 8305 are used, the electronic device 8300 preferably has a mechanism for adjusting the position and angle of the lenses 8305 in synchronization with the curvature of the display portion 8302. Alternatively, the dial 8306 may have a function of adjusting the angle of the lenses.

Figure 78D:
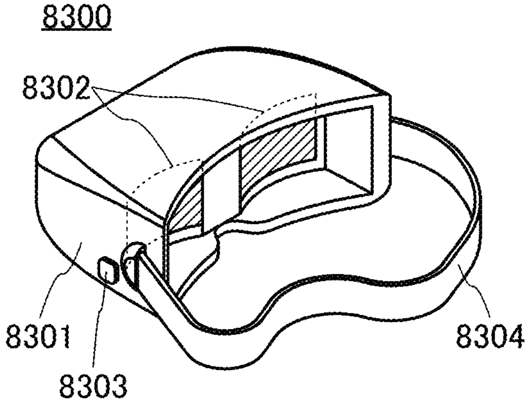
Figure 78E:
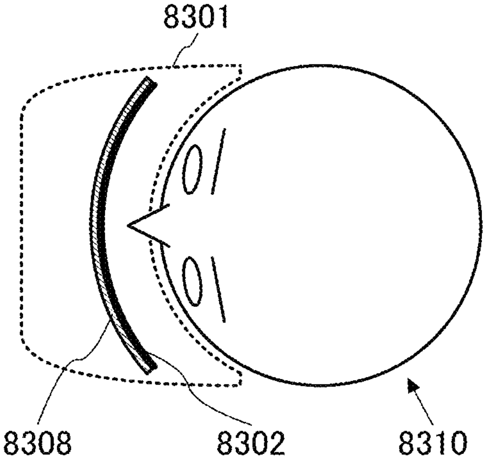
Figure 78F:
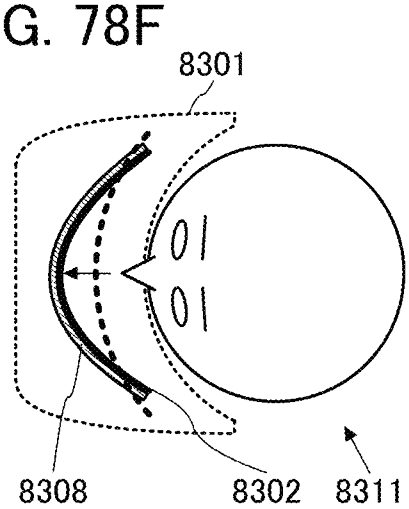

FIGS. 78E and 78F show an example of including a driver portion 8308 that controls the curvature of the display portion 8302. The driver portion 8308 is fixed to a part or the whole of the display portion 8302. The driver portion 8308 has a function of changing the shape of the display portion 8302 when the part of the driver portion 8308 that is fixed to the display portion 8302 changes in shape or moves.

FIG. 78E is a schematic view showing the case where a user 8310 having a relatively large head wears the housing 8301. In that case, the driver portion 8308 adjusts the shape of the display portion 8302 so that the curvature is relatively small (the radius of curvature is large).

By contrast, FIG. 78F shows the case where a user 8311 having a smaller head than the user 8310 wears the housing 8301. The user 8311 has a shorter distance between the eyes than the user 8310. In that case, the driver portion 8308 adjusts the shape of the display portion 8302 so that the curvature is large (the radius of curvature is small). In FIG. 78F, the position and shape of the display portion 8302 in FIG. 78E are denoted by a dashed line.

When the electronic device 8300 has such a mechanism for adjusting the curvature of the display portion 8302, optimal display can be offered to a variety of users of all ages and genders.

When the curvature of the display portion 8302 is changed in accordance with contents displayed on the display portion 8302, the user can feel high realistic sensation. For example, shaking can be expressed by vibrating the curvature of the display portion 8302. In this way, it is possible to produce various effects according to the scene in contents, and provide the user with new experiences. Further realistic display can be provided in conjunction with a vibration module provided in the housing 8301.

Note that the electronic device 8300 may include two display portions 8302 as shown in FIG. 78D.

When the two display portions 8302 are provided, the user's eyes can see the respective display portions. This allows a high-display resolution image to be displayed even when three-dimensional display using parallax is performed. In addition, the display portion 8302 is curved around an arc with an approximate center at the user's eye. This keeps a certain distance between the user's eye and the display surface of the display portion, enabling the user to see a more natural image. Furthermore, the user's eye is positioned in the normal direction of the display surface of the display portion; therefore, even when the luminance or chromaticity of light from the display portion is changed with the viewing angle, the influence of the change can be substantially ignorable and thus a more realistic image can be displayed.

Figure 79A:
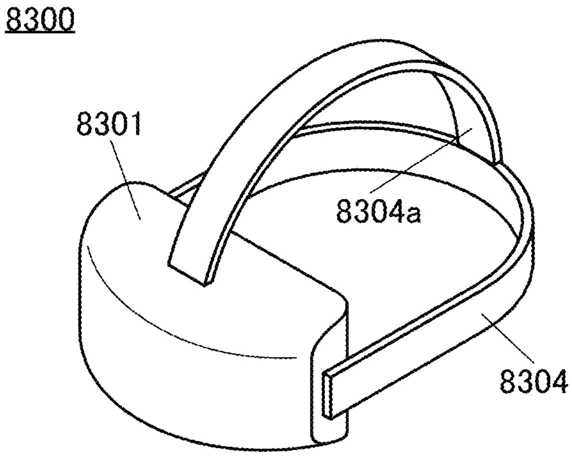
FIGS. 79A to 79D each illustrate a structure example of an electronic device.
Figure 79B:
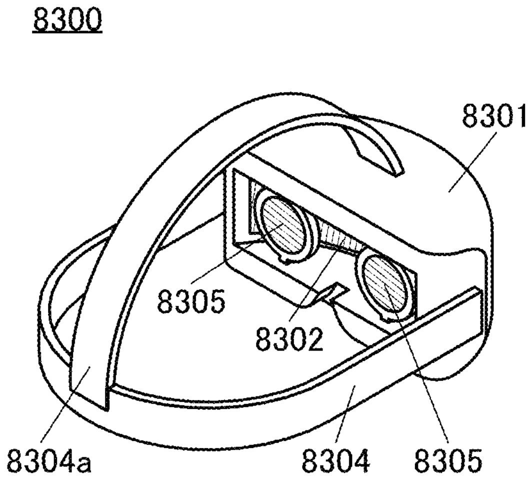
Figure 79C:
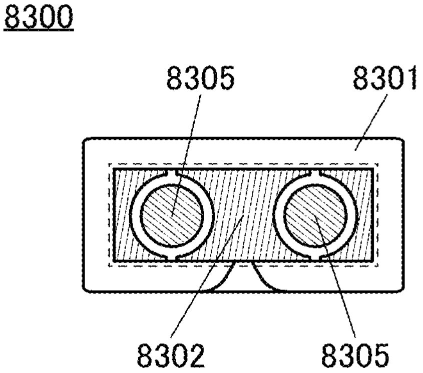

FIGS. 79A to 79C are external views of another electronic device 8300, which is different from the electronic devices 8300 in FIGS. 78A to 78D. Specifically, the electronic device 8300 in FIGS. 79A to 79C is different from those in FIGS. 78A to 78D in including a fixture member 8304*a* worn on a head and a pair of lenses 8305, for example.

A user can see display on the display portion 8302 through the lenses 8305. The display portion 8302 is preferably curved because the user can feel high realistic sensation. Another image displayed in another region of the display portion 8302 is viewed through the lenses 8305, so that three-dimensional display using parallax can be performed. Note that the number of the display portions 8302 is not limited to one; two display portions 8302 may be provided for user's respective eyes.

As the display portion 8302, a display apparatus with extremely high definition is preferably used, for example. With use of a display apparatus with extremely high definition for the display portion 8302, even when the display portion 8302 is enlarged by the lens 8305 as illustrated in FIG. 79C, a more realistic image can be displayed without user's visual recognition of pixels.

Figure 79D:
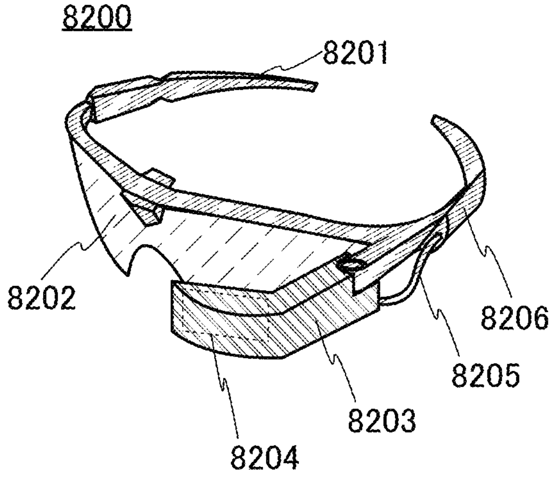

The head-mounted display, which is an electronic device of one embodiment of the present invention, may be an electronic device 8200 in FIG. 79D, which is a glasses-type head-mounted display.

The electronic device 8200 includes a mounting portion 8201, a lens 8202, a main body 8203, a display portion 8204, and a cable 8205. The mounting portion 8201 includes a battery 8206.

Power is supplied from the battery 8206 to the main body 8203 through the cable 8205. The main body 8203 includes a wireless receiver to receive image data and display it on the display portion 8204. The main body 8203 includes a camera, and data on the movement of the eyeballs or the eyelids of the user can be used as an input means.

The mounting portion 8201 may include a plurality of electrodes capable of sensing the current flowing accompanying with the movement of the user's eyeball at a position in contact with the user to recognize the user's sight line. The mounting portion 8201 may also have a function of monitoring the user's pulse with use of the current flowing in the electrodes. The mounting portion 8201 may include a sensor, such as a temperature sensor, a pressure sensor, or an acceleration sensor; thus, the electronic device 8200 may have a function of displaying the user's biological information on the display portion 8204. For example, the electronic device 8200 may have a function of changing images displayed on the display portion 8204 in accordance with the movement of the user's head.

Figure 80A:
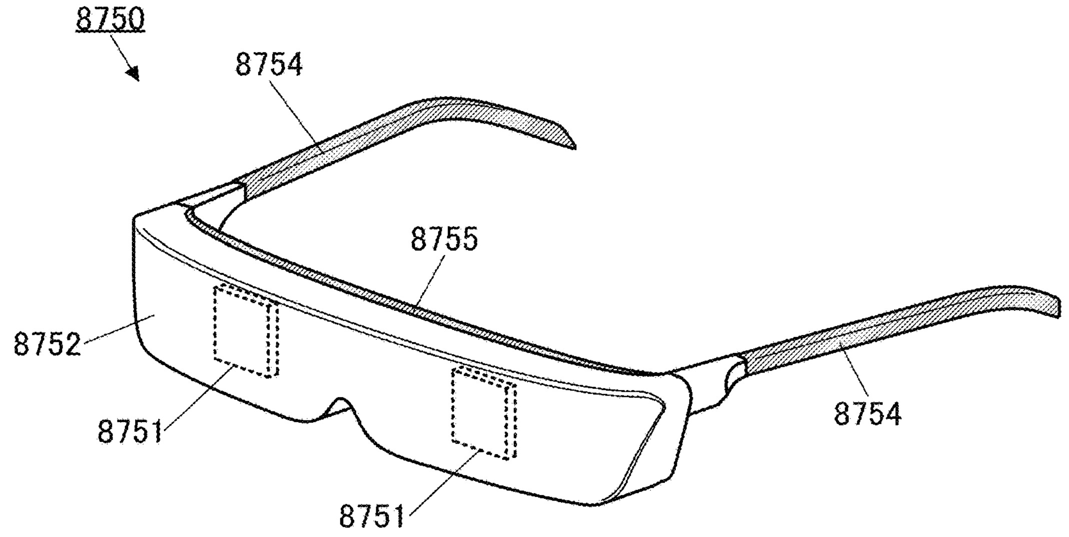
FIGS. 80A to 80C illustrate a structure example of an electronic devices.
Figure 80B:
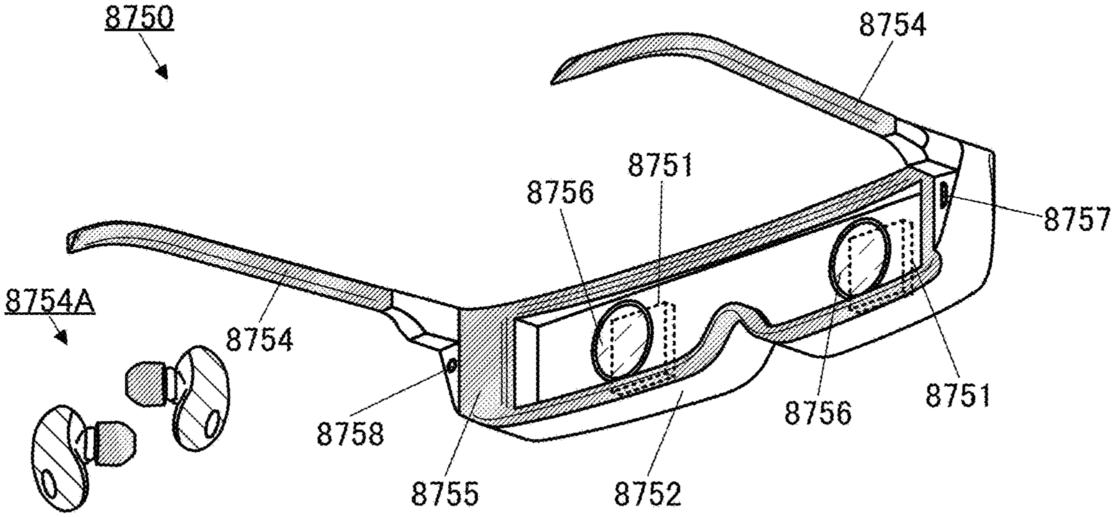
Figure 80C:
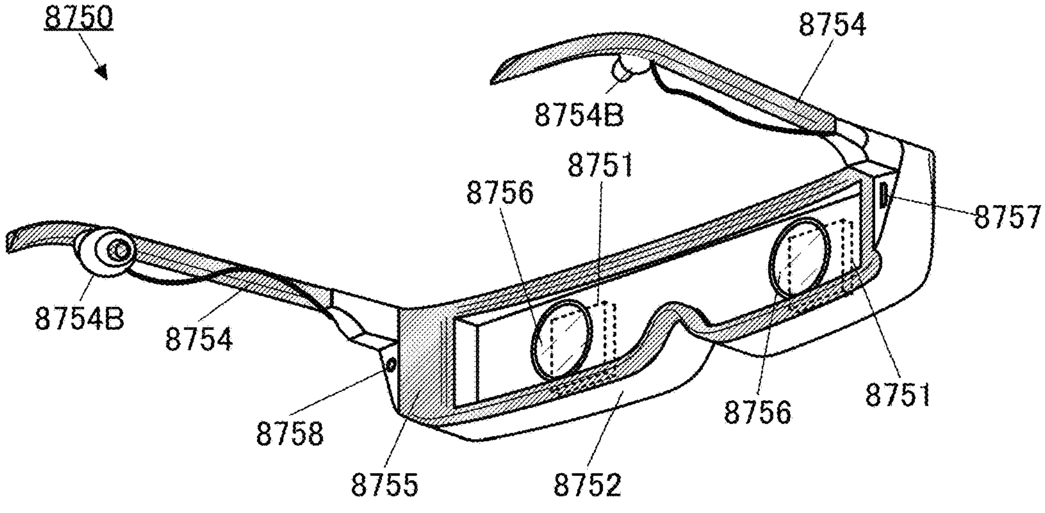

FIGS. 80A to 80C each illustrate an external view of an electronic device 8750, which is different from the electronic devices 8300 illustrated in FIGS. 78A to 78D and FIGS. 79A to 79C and the electronic device 8200 illustrated in FIG. 79D.

FIG. 80A is a perspective view illustrating the front surface, the top surface, and the left side surface of the electronic device 8750, and FIGS. 80B and 80C are perspective views each illustrating the back surface, the bottom surface, and the right side surface of the electronic device 8750.

The electronic device 8750 includes a pair of display apparatuses 8751, a housing 8752, a pair of temples 8754, a cushion 8755, and a pair of lenses 8756. The pair of display apparatuses 8751 is positioned to be seen through the lenses 8756 inside the housing 8752.

Here, one of the pair of display apparatuses 8751 corresponds to the display apparatus DSP in FIG. 10, for example. Although not illustrated, the electronic device 8750 illustrated in FIGS. 80A to 80C includes an electronic component including the processing unit described in the above embodiment (e.g., the peripheral circuit PRPH described in Embodiment 3). Although not illustrated, the electronic device 8750 illustrated in FIGS. 80A to 80C includes a camera. The camera can take an image of the user's eye and its vicinity. Although not illustrated, in the housing 8752 of the electronic device 8750 illustrated in FIGS. 80A to 80C, a motion detection portion, an audio, a control portion, a communication portion, and a battery are provided.

The electronic device 8750 is an electronic device for VR. A user wearing the electronic device 8750 can see an image displayed on the display apparatus 8751 through the lens 8756. Furthermore, when the pair of display apparatuses 8751 displays different images, three-dimensional display using parallax can be performed.

An input terminal 8757 and an output terminal 8758 are provided on the back surface side of the housing 8752. A cable for supplying an image signal from a video output device or power for charging a battery provided in the housing 8752 can be connected to the input terminal 8757. The output terminal 8758 can function as, for example, an audio output terminal to which earphones or headphones can be connected.

The housing 8752 preferably includes a mechanism by which the left and right positions of the lens 8756 and the display apparatus 8751 can be adjusted to the optimal positions in accordance with the position of the user's eye. In addition, the housing 8752 preferably includes a mechanism for adjusting focus by changing the distance between the lens 8756 and the display apparatus 8751.

With use of the camera, the display apparatus 8751, and the above electronic component, the electronic device 8750 can estimate the state of a user of the electronic device 8750 and can display information on the estimated user's state on the display apparatus 8751. Alternatively, information on a user of an electronic device connected to the electronic device 8750 through a network can be displayed on the display apparatus 8751.

The cushion 8755 is a portion in contact with the user's face (e.g., forehead or cheek). The cushion 8755 is in close contact with the user's face, so that light leakage can be prevented, which increases the sense of immersion. A soft material is preferably used for the cushion 8755 so that the cushion 8755 is in close contact with the face of the user wearing the electronic device 8750. For example, a material such as rubber, silicone rubber, urethane, or sponge can be used. Furthermore, when a material whose surface is covered with cloth, or leather (e.g., natural leather or synthetic leather) is used, a gap is unlikely to be generated between the user's face and the cushion 8755, whereby light leakage can be suitably prevented. Furthermore, using such a material is preferable because it has a soft texture and the user does not feel cold when wearing the device in a cold season. The member in contact with user's skin, such as the cushion 8755 or the temple 8754, is preferably detachable because cleaning or replacement can be easily performed.

The electronic device in this embodiment may further include earphones 8754A. The earphones 8754A include a communication portion (not illustrated) and has a wireless communication function. The earphones 8754A can output audio data with the wireless communication function. Note that the earphones 8754A may include a vibration mechanism to function as bone-conduction earphones.

Like earphones 8754B illustrated in FIG. 80C, the earphones 8754A can be connected to the temple 8754 directly or by wiring. The earphones 8754B and the temple 8754 may each have a magnet. This is preferred because the earphones 8754B can be fixed to the temple 8754 with magnetic force and thus can be easily housed.

The earphones 8754A may include a sensor portion. With use of the sensor portion, the state of the user of the electronic device can be estimated.

The electronic device of one embodiment of the present invention may include one or more of an antenna, a battery, a camera, a speaker, a microphone, a touch sensor, and an operation button, in addition to any one of the above components.

The electronic device of one embodiment of the present invention may include a secondary battery. It is preferable that the secondary battery be capable of being charged by noncontact power transmission.

Examples of the secondary battery include a lithium ion secondary battery (such as a lithium polymer battery using a gel electrolyte (lithium ion polymer battery)), a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. With the antenna receiving a signal, the electronic device can display an image, information, or the like on a display portion. When the electronic device includes an antenna and a secondary battery, the antenna may be used for contactless power transmission.

The display portion of the electronic device of one embodiment of the present invention can display, for example, an image with full high definition, 4K2K, 8K4K, 16K8K, or higher display resolution.

Note that this embodiment can be combined with any of the other embodiments in this specification as appropriate.

Embodiment 9

In this embodiment, electronic devices each including a display apparatus fabricated using one embodiment of the present invention will be described.

Electronic devices described below as examples are each provided with a display apparatus of one embodiment of the present invention in a display portion. Thus, the electronic devices achieve high definition.

One embodiment of the present invention includes the display apparatus and one or more selected from an antenna, a battery, a housing, a camera, a speaker, a microphone, a touch sensor, and an operation button.

The electronic device of one embodiment of the present invention may include a secondary battery. It is preferable that the secondary battery be capable of being charged by noncontact power transmission.

For the secondary battery, for example, the description of the secondary battery described in Embodiment 8 can be referred to.

The electronic device of one embodiment of the present invention may include an antenna. For the antenna, for example, the description of the antenna described in Embodiment 8 can be referred to.

The display portion of the electronic device of one embodiment of the present invention can display, for example, an image with full high definition, 4K2K, 8K4K, 16K8K, or higher display resolution.

As examples of the electronic device, electronic devices having a relatively large screen, such as a television device, a laptop personal computer, a monitor device, digital signage, a pachinko machine, and a game machine are given. In addition, as examples of the electronic device, electronic devices having a relatively small screen, such as a digital camera, a digital video camera, a digital photo frame, a mobile phone device, a portable game machine, a portable information terminal, and an audio reproducing device are given.

An electronic device to which one embodiment of the present invention is applied can be incorporated along an inner wall or an outer wall of a house or a building. The electronic device can be incorporated along a flat surface or a curved surface of an interior or an exterior of an automobile or the like.

[Mobile Phone]

Figure 81A:
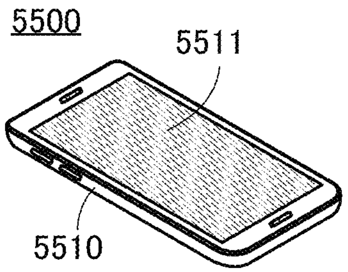
FIGS. 81A to 81H illustrate structure examples of electronic devices.

An information terminal 5500 illustrated in FIG. 81A is a mobile phone (a smartphone), which is a type of information terminal. The information terminal 5500 includes a housing 5510 and a display portion 5511. As input interfaces, a touch panel and a button are provided in the display portion 5511 and the housing 5510, respectively.

[Wearable Terminal]

Figure 81B:
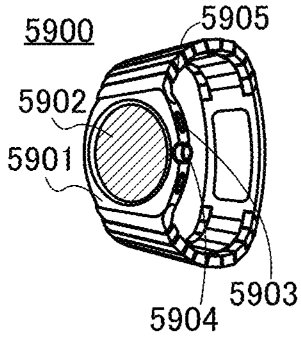

FIG. 81B is an external view of an information terminal 5900 as an example of a wearable terminal. The information terminal 5900 includes a housing 5901, a display portion 5902, an operation button 5903, a crown 5904, and a band 5905.

[Information Terminal]

Figure 81C:
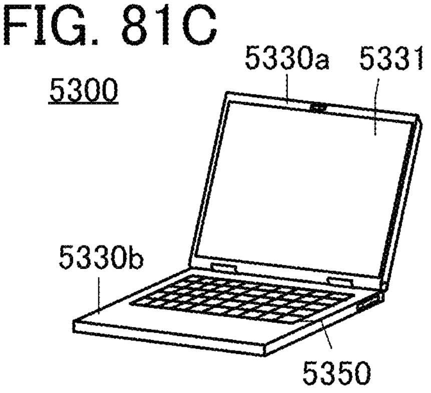

FIG. 81C illustrates a notebook information terminal 5300. The notebook information terminal 5300 in FIG. 81C includes, for example, a display portion 5331 in a housing 5330*a* and a keyboard portion 5350 in a housing 5330*b*.

Note that although FIGS. 81A to 81C illustrate a smartphone, a wearable terminal, and a notebook information terminal as examples of electronic device, one embodiment of the present invention can also be applied to an information terminal other than a smartphone, a wearable terminal, and a notebook information terminal. Examples of the information terminals other than a smartphone, a wearable terminal, and a notebook information terminal include a personal digital assistant (PDA), a desktop information terminal, and a workstation.

[Camera]

Figure 81D:
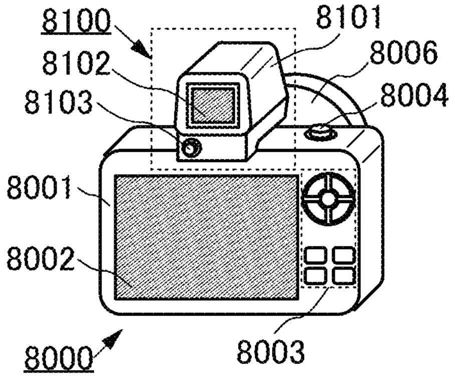

FIG. 81D is an external view of a camera 8000 to which a finder 8100 is attached.

The camera 8000 includes a housing 8001, a display portion 8002, operation buttons 8003, and a shutter button 8004. Furthermore, a detachable lens 8006 is attached to the camera 8000.

Note that the lens 8006 may be included in the housing of the camera 8000.

Images can be taken with the camera 8000 at the press of the shutter button 8004 or the touch of the display portion 8002 serving as a touch panel.

The housing 8001 includes a mount including an electrode, so that the finder 8100, a stroboscope, or the like can be connected to the housing.

The finder 8100 includes a housing 8101, a display portion 8102, and a button 8103.

The housing 8101 is attached to the camera 8000 by a mount for engagement with the mount of the camera 8000. The finder 8100 can display an image received from the camera 8000 on the display portion 8102.

The button 8103 functions as a power supply button.

The display apparatus of one embodiment of the present invention can be applied to the display portion 8002, the display portion 8102, or both. Note that a finder may be incorporated in the camera 8000.

[Game Machine]

Figure 81E:
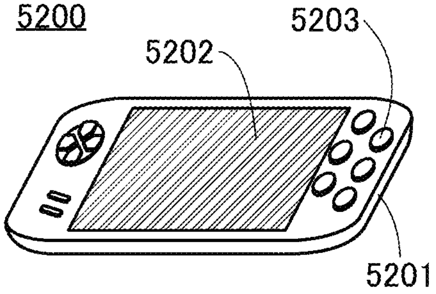

FIG. 81E is an external view of a portable game machine 5200 as an example of a game machine. The portable game machine 5200 includes a housing 5201, a display portion 5202, and a button 5203.

An image displayed on the portable game machine 5200 can be output with a display apparatus included in a television device, a personal computer display, a game display, or a head-mounted display.

The portable game machine 5200 can have low power consumption by including the display apparatus described in the above embodiment. Furthermore, heat generation from a circuit can be reduced owing to low power consumption; thus, the influence of heat generation on the circuit, the peripheral circuit, and the module can be reduced.

Although FIG. 81E illustrates the portable game machine as an example of a game machine, the electronic device of one embodiment of the present invention is not limited thereto. Examples of the electronic device of one embodiment of the present invention include a stationary game machine, an arcade game machine installed in an entertainment facility (e.g., a game center or an amusement park), and a throwing machine for batting practice installed in sports facilities.

[Television Device]

Figure 81F:
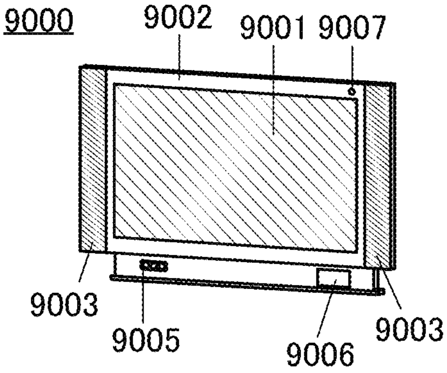

FIG. 81F is a perspective view illustrating a television device. The television device 9000 includes a housing 9002, a display portion 9001, a speaker 9003, an operation key 9005 (including a power switch or an operation switch), a connection terminal 9006, a sensor 9007 (a sensor having a function of measuring or detecting force, displacement, position, speed, acceleration, angular velocity, rotational frequency, distance, liquid, magnetism, temperature, chemical substance, sound, time, hardness, electric field, current, voltage, power, radiation, flow rate, humidity, gradient, oscillation, odor, or light (including visible light, invisible light such as infrared rays or ultraviolet rays)). The display apparatus of one embodiment of the present invention can be provided in the television device. The television device can include the display portion 9001 having a screen size of, for example, 50 inches or more, or 100 inches or more.

The television device 9000 to which the display apparatus described in the above embodiment is applied achieves low power consumption. Furthermore, heat generation from a circuit can be reduced owing to low power consumption; thus, the influence of heat generation on the circuit, the peripheral circuit, and the module can be reduced.

[Moving Vehicle]

The display apparatus of one embodiment of the present invention can be used around a driver's seat in a car, which is a moving vehicle.

Figure 81G:
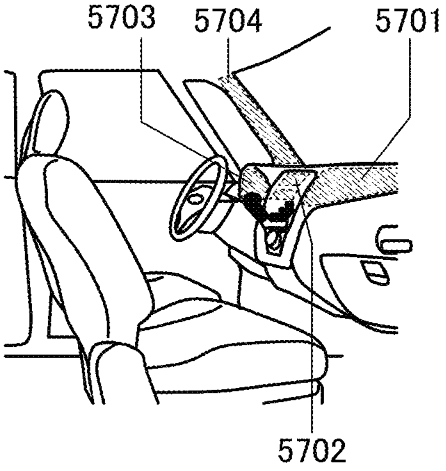

FIG. 81G illustrates a windshield and its vicinity inside a car. FIG. 81G shows a display panel 5701, a display panel 5702, and a display panel 5703 which are attached to a dashboard, and a display panel 5704 attached to a pillar.

The display panels 5701 to 5703 can display one or more of navigation data, a speedometer, a tachometer, a mileage, a fuel meter, a gearshift state, and air-conditioning settings. Items displayed on the display panel and their layout can be changed as appropriate to suit the user's preferences, resulting in more sophisticated design. The display panels 5701 to 5703 can also be used as lighting devices.

The display panel 5704 can compensate for the view obstructed by the pillar (blind areas) by showing an image taken by an imaging unit provided for the car body. That is, displaying an image taken by the imaging unit provided on the outside of the car body leads to elimination of blind areas and enhancement of safety. Displaying an image to compensate for the area which a driver cannot see, makes it possible for the driver to confirm safety easily and comfortably. The display panel 5704 can also be used as a lighting device.

The display apparatus of one embodiment of the present invention can be used for the display panels 5701 to 5704, for example.

Although a car is described above as an example of a moving vehicle, moving vehicles are not limited to a car. Examples of the moving vehicles include a train, a monorail train, a ship, and a flying object (a helicopter, an unmanned aircraft (a drone), an airplane, and a rocket), and these moving vehicles can use the display apparatus of one embodiment of the present invention.

[Digital Signage]

Figure 81H:
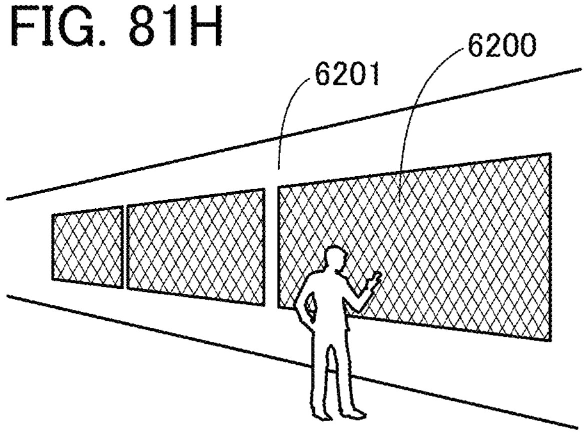

FIG. 81H illustrates an example of a digital signage that can be attached to a wall. FIG. 81H illustrates a state where a digital signage 6200 is attached to a wall 6201. The display apparatus of one embodiment of the present invention can be used in a display portion in the digital signage 6200, for example. An interface such as a touch panel may be provided in the digital signage 6200.

Note that an electronic device attachable to a wall is described above as an example of a digital signage, the kind of the digital signage is not limited thereto. Examples of the digital signage include a digital signage mounted on a pillar, a freestanding digital signage placed on the ground, and a digital signage mounted on a rooftop or a side wall of a building.

Note that this embodiment can be combined with any of the other embodiments in this specification as appropriate.

This application is based on Japanese Patent Application Serial No. 2021-208382 filed with Japan Patent Office on Dec. 22, 2021, the entire contents of which are hereby incorporated by reference.

What is claimed is:

1. A display apparatus comprising:

a pixel comprising a first switch, a second switch, a driving transistor, a first capacitor, and a light-emitting device; and a circuit comprising a third switch, a fourth switch, a fifth switch, a second capacitor, and a driver circuit, wherein the circuit is configured to transmit an image data signal to a wiring, wherein a first terminal of the first switch is electrically connected to a first terminal of the first capacitor, one of a source and a drain of the driving transistor, and the light-emitting device, wherein a second terminal of the first switch is electrically connected to the wiring, wherein a first terminal of the second switch is electrically connected to a first gate of the driving transistor and a second terminal of the first capacitor, wherein a first terminal of the third switch is electrically connected to the wiring, wherein a first terminal of the second capacitor is directly connected to the first terminal of the third switch, wherein a first terminal of the fourth switch is directly connected to a second terminal of the second capacitor, wherein the first terminal of the fourth switch is electrically connected to a first terminal of the fifth switch, and wherein a second terminal of the fifth switch is electrically connected to the driver circuit.

2. The display apparatus according to claim 1, wherein the first switch comprises a first transistor, wherein the second switch comprises a second transistor, wherein the first terminal of the first switch is one of a source and a drain of the first transistor, wherein the second terminal of the first switch is the other of the source and the drain of the first transistor, and wherein the first terminal of the second switch is one of a source and a drain of the second transistor.

3. The display apparatus according to claim 1, wherein the third switch comprises a third transistor, wherein the fourth switch comprises a fourth transistor, wherein the fifth switch comprises a fifth transistor, wherein the first terminal of the third switch is one of a source and a drain of the third transistor, wherein the first terminal of the fourth switch is one of a source and a drain of the fourth transistor, wherein the first terminal of the fifth switch is one of a source and a drain of the fifth transistor, and wherein the second terminal of the fifth switch is the other of the source and the drain of the fifth transistor.

4. The display apparatus according to claim 1, wherein the pixel further comprises a sixth switch, a seventh switch, and a third capacitor, wherein a first terminal of the sixth switch is electrically connected to the first terminal of the first switch and a first terminal of the third capacitor, wherein a second terminal of the sixth switch is electrically connected to the first gate of the driving transistor, and wherein a first terminal of the seventh switch is electrically connected to a second gate of the driving transistor and a second terminal the third capacitor.

5. The display apparatus according to claim 1, wherein the driver circuit is configured to transmit the image data signal to the circuit.

6. The display apparatus according to claim 1, wherein the light-emitting device comprises an organic EL device.

* * * * *